(12) United States Patent
Engel et al.

(10) Patent No.: US 11,370,969 B2
(45) Date of Patent: *Jun. 28, 2022

(54) LIQUID-CRYSTAL MEDIUM

(71) Applicant: Merck Patent GmbH, Darmstadt (DE)

(72) Inventors: Martin Engel, Darmstadt (DE);
Sebastian Hofmeyer, Bad Koenig (DE); Christoph Marten, Reinheim (DE); Lars Lietzau, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 201 days.

This patent is subject to a terminal disclaimer.

(21) Appl. No.: 16/583,622

(22) Filed: Sep. 26, 2019

(65) Prior Publication Data

US 2020/0102499 A1 Apr. 2, 2020

(30) Foreign Application Priority Data

Sep. 27, 2018 (EP) .................................... 18197231

(51) Int. Cl.
*C09K 19/34* (2006.01)
*C09K 19/30* (2006.01)
*C09K 19/12* (2006.01)

(52) U.S. Cl.
CPC ...... *C09K 19/3491* (2013.01); *C09K 19/3003* (2013.01); *C09K 19/3028* (2013.01); *C09K 19/3048* (2013.01); *C09K 19/3068* (2013.01); *C09K 2019/123* (2013.01); *C09K 2019/301* (2013.01); *C09K 2019/3004* (2013.01); *C09K 2019/3006* (2013.01); *C09K 2019/3016* (2013.01); *C09K 2019/3021* (2013.01); *C09K 2019/3031* (2013.01); *C09K 2019/3037* (2013.01); *C09K 2019/3051* (2013.01); *C09K 2019/3071* (2013.01); *C09K 2019/3078* (2013.01)

(58) Field of Classification Search
CPC .................................................. C09K 19/30
See application file for complete search history.

(56) References Cited

U.S. PATENT DOCUMENTS 7,255,900 B2 8/2007 Schmidt et al.
9,279,082 B2 * 3/2016 Taugerbeck ....... C09K 19/3402
9,512,102 B2 * 12/2016 Reiffenrath ........ C09K 19/3491
10,017,695 B2 7/2018 Lietzau et al.
2005/0258399 A1 11/2005 Schmidt et al.
2015/0299161 A1 10/2015 Reiffenrath et al.
2019/0093013 A1 * 3/2019 Manabe ............ C09K 19/3048
2019/0345129 A1 11/2019 Li et al.
2019/0345389 A1 11/2019 Hirschmann et al.

FOREIGN PATENT DOCUMENTS

| CN | 108264498 A | 7/2018 | |
| DE | 102015004271 A1 * | 10/2015 | ........... C07D 409/04 |
| EP | 2937342 A1 | 10/2015 | |
| EP | 3085753 B1 | 4/2019 | |
| WO | 02/055463 A1 | 7/2002 | |
| WO | 16146245 A1 | 9/2016 | |
| WO | 18100016 A1 | 6/2018 | |
| WO | 19007821 A1 | 1/2019 | |

OTHER PUBLICATIONS

Search report in corresponding EP19199422.7 dated Feb. 7, 2020 (pp. 1-6).
Search report in corresponding EP19199422.7 dated Oct. 13, 2020 (pp. 1-4).

* cited by examiner

*Primary Examiner* — Chanceity N Robinson
(74) *Attorney, Agent, or Firm* — Millen White Zelano and Branigan, PC; Csaba Henter

(57) ABSTRACT

A liquid-crystalline medium containing one or more compounds of formula IA,

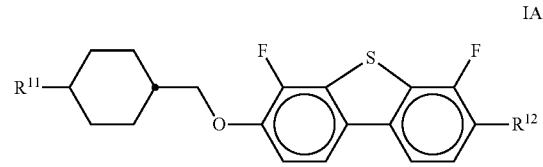

IA and the use thereof in an active-matrix display, in particular in a VA, IPS, U-IPS, FFS, UB-FFS, SA-VA, SA-FFS, PS-VA, PS-OCB, PS-IPS, PS-FFS, PS-UB-FFS, PS-posi-VA, PS-TN, polymer stabilised SA-VA or polymer stabilised SA-FFS display.

20 Claims, No Drawings

LIQUID-CRYSTAL MEDIUM

The present invention relates to liquid-crystal (LC) media and to the use of the LC media for optical, electro-optical and electronic purposes, in particular in LC displays, especially in IPS, FFS, VA or PS-VA displays.

One of the liquid-crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favorable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays. These displays require an LC medium with high reliability.

Herein, the term "reliability" means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorising the reliability usually the voltage holding ration (VHR) value is used, which is a measure for maintaining a constant electrical voltage in a test display. Among other factors, a high VHR is a prerequisite for a high reliability of the LC medium.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slit electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are displays of the so-called PS ("polymer sustained") or PSA ("polymer sustained alignment") type, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC mixture has proven particularly suitable.

Unless indicated otherwise, the term "PSA" is used hereinafter when referring to displays of the polymer sustained alignment type in general, and the term "PS" is used when referring to specific display modes, like PS-VA, PS-TN and the like.

Also, unless indicated otherwise, the term "RM" is used hereinafter when referring to a polymerisable mesogenic or liquid-crystalline compound.

In the meantime, the PS(A) principle is being used in various conventional LC display modes. Thus, for example, PS-VA, PS-OCB, PS-IPS, PS-FFS, PS-UB-FFS and PS-TN displays are known. The polymerisation of the RMs preferably takes place with an applied voltage in the case of PS-VA and PS-OCB displays, and with or without, preferably without, an applied voltage in the case of PS-IPS displays. As can be demonstrated in test cells, the PS(A) method results in a pretilt in the cell. In the case of PS-VA displays, the pretilt has a positive effect on response times. For PS-VA displays, a standard MVA or PVA pixel and electrode layout can be used. In addition, however, it is also possible, for example, to manage with only one structured electrode side and no protrusions, which significantly simplifies production and at the same time results in very good contrast and in very good transparency to light.

PS-VA displays are described, for example, in EP 1 170 626 A2, U.S. Pat. Nos. 6,861,107, 7,169,449, US 2004/0191428 A1, US 2006/0066793 A1 and US 2006/0103804 A1. PS-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described, for example, in U.S. Pat. No. 6,177,972 and Appl. Phys. Lett. 1999, 75(21), 3264. PS-TN displays are described, for example, in Optics Express 2004, 12(7), 1221.

Liquid crystalline media suitable for application in the types of display mentioned above according to the present invention are also disclosed in EP 17161352.

Another problem observed in prior art is that LC media for use in PSA displays, including but not limited to displays of the PSA type, do often exhibit high viscosities and, as a consequence, high switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photo-polymerisation of the RMs in the PSA display is usually carried out by exposure to UV radiation, which may cause a VHR drop in the LC medium.

In addition there is a great demand for PSA displays, and LC media and polymerisable compounds for use in such PSA displays, which enable a high specific resistance at the same time as a large working-temperature range, short response times, even at low temperatures, and a low threshold voltage, a low pretilt angle, a multiplicity of grey shades, high contrast and a broad viewing angle, have high reliability and high values for the VHR after UV exposure, and, in case of the polymerisable compounds, have low melting points and a high solubility in the LC host mixtures. In PSA displays for mobile applications, it is especially desired to have available LC media that show low threshold voltage and high birefringence.

There is thus still a great demand for LC media for use in such displays, which do not show the drawbacks as described above, or only do so to a small extent, and have improved properties. None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

The invention is based on the object of providing novel suitable materials, in LC media, optionally comprising reactive mesogens (RM), for use in PSA displays, which do not have the disadvantages indicated above or do so to a reduced extent.

Further, it is an object of the present invention to provide alternative media in addition to existing media known to the skilled person in order to broaden the range of available materials what allows for a more specific optimisation of a particular display.

These objects have been achieved in accordance with the present invention by materials and processes as described in the present application. In particular, it has been found, surprisingly, that the use of liquid crystalline hosts as described hereinafter allows to achieve the advantageous effects as mentioned above.

The invention relates to an LC medium comprising one or more compounds of formula IA

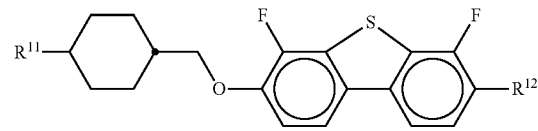

in which
$R^{11}$, $R^{12}$ identically or differently, denote H, an alkyl or alkoxy radical having 1 to 15 C atoms, in which one or more $CH_2$ groups in these radicals are optionally replaced, independently of one another, by
—C≡C—, —$CF_2$O—, —O$CF_2$—, —CH═CH—,

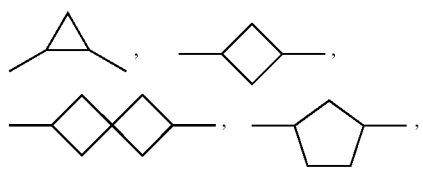

—O—, —CO—O— or —O—CO— in such a way that O atoms are not linked directly to one another, and in which, in addition, one or more H atoms may be replaced by halogen.

Media of this type can be used, in particular, for electro-optical displays having active-matrix addressing based on the ECB effect and for IPS (in-plane switching) displays or FFS (fringe field switching) displays.

The media are distinguished by a surprisingly low rotational viscosity and high clearing temperatures in combination with high voltage holding ratio. This, and the broad nematic phase range and excellent low-temperature stability of the media at −20° C. and −30° C. enables displays with broad operating temperature ranges, fast switching times and also excellent stability under storage at deep temperatures.

The mixtures according to the invention are furthermore distinguished by the fact that, in addition to the improvement in the rotational viscosity $\gamma_1$, relatively high values of the elastic constants $K_{33}$ for improving the response times can be observed. The use of the compounds of the formula IA in LC mixtures, preferably having negative dielectric anisotropy, the ratio of rotational viscosity $\gamma_1$ and elastic constants $K_1$ is reduced.

Preferred embodiments of the invention are defined in the dependent claims and are indicated below.

The liquid crystal medium according to the invention, herein also referred to as liquid crystal host mixture, is suitable for the use in polymer stabilised displays. To this end, the medium according to the invention optionally comprises one or more polymerisable compounds of formula P $$P\text{-}Sp\text{-}A^1\text{-}(Z^1\text{-}A^2)_z\text{-}R \qquad P$$

wherein the individual radicals, independently of each other and on each occurrence identically or differently, have the following meanings:
P a polymerisable group,
Sp a spacer group or a single bond,
$A^1$, $A^2$ an aromatic, heteroaromatic, alicyclic or heterocyclic group, preferably having 4 to 25 ring atoms, which may also contain fused rings, and which is unsubstituted, or mono- or polysubstituted by L,
$Z^1$ —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH═CH—, —CF═CF—, —CH═CF—, —CF═CH—, —C≡C—, —CH═CH—CO—O—, —O—CO—CH═CH—, —CH$_2$—CH$_2$—CO—O—, —O—CO—CH$_2$—CH$_2$—, —CR$^0$R$^{00}$—, or a single bond,
R$^0$, R$^{00}$ H or alkyl having 1 to 12 C atoms,
R H, L, or P-Sp-,
L F, Cl, —CN, P-Sp- or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl,
z 0, 1, 2 or 3,
n1 1, 2, 3 or 4.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 2001, 73(5), 888 and C. Tschierske, G. Pelzl, S. Diele, Angew. Chem. 2004, 116, 6340-6368.

As used herein, the terms "optically active" and "chiral" are synonyms for materials that are able to induce a helical pitch in a nematic host material, also referred to as "chiral dopants".

The term "spacer group", hereinafter also referred to as "Sp", as used herein is known to the person skilled in the art and is described in the literature, see, for example, Pure Appl. Chem. 2001, 73(5), 888 and C. Tschierske, G. Pelzl, S. Diele, Angew. Chem. 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

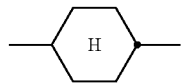

denotes a trans-1,4-cyclohexylene ring, and

denotes a 1,4-phenylene ring.

In a group

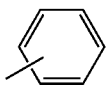

the single bond shown between the two ring atoms can be attached to any free position of the benzene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I, preferably F or Cl.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclo-pentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3- oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazo-thiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrroli-dine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

$A^1$ and $A^2$ very preferably denote

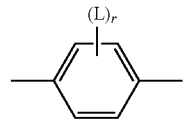

in which L has one of the meanings indicated above and r denotes 0, 1, 2, 3 or 4, in particular

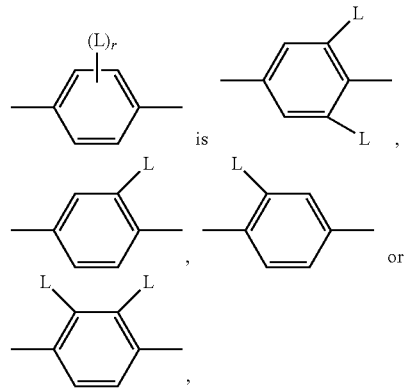

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O—, $CH_2$=$CW^1$—CO—,

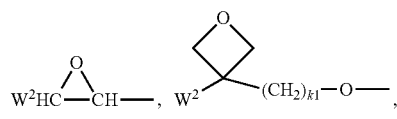

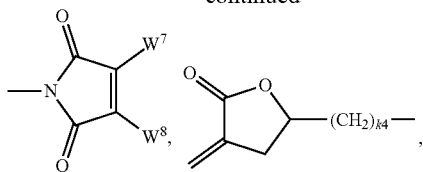

$CH_2=CW^2-(O)_{k3}-$, $CW^1=CH-CO-(O)_{k3}-$, $CW^1=CH-CO-NH-$, $CH_2=CW^1-CO-NH-$, $-CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, $HOOC-$, $OCN-$ and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1-CO-O-$, $CH_2=CW^1-CO-$,

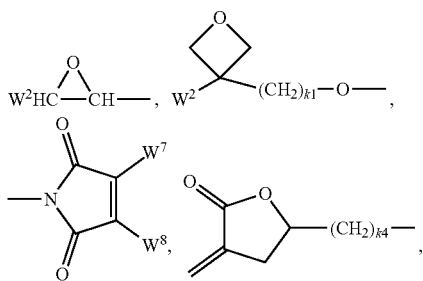

$CH_2=CW^2-O-$, $CH_2=CW^2-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$ and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

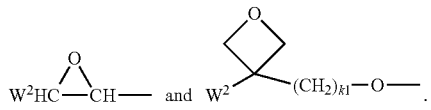

Further preferred polymerisable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula R-Sp"-X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by $-O-$, $-S-$, $-NH-$, $-N(R^0)-$, $-Si(R^0R^{00})-$, $-CO-$, $-CO-O-$, $-O-CO-$, $-O-CO-O-$, $-S-CO-$, $-CO-S-$, $-N(R^{00})-CO-O-$, $-O-CO-N(R^0)-$, $-N(R^0)-CO-N(R^{00})-$, $-CH=CH-$ or $-C\equiv C-$ in such a way that O and/or S atoms are not linked directly to one another, X" denotes $-O-$, $-S-$, $-CO-$, $-CO-O-$, $-O-CO-$, $-O-CO-O-$, $-CO-N(R^0)-$, $-N(R^0)-CO-$, $-N(R^0)-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^0-$, $-CY^2=CY^3-$, $-C\equiv C-$, $-CH=CH-CO-O-$, $-O-CO-CH=CH-$ or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably $-O-$, $-S-$, $-CO-$, $-COO-$, $-OCO-$, $-O-COO-$, $-CO-NR^0-$, $-NR^0-CO-$, $-NR^0-CO-NR^{00}-$ or a single bond.

Typical spacer groups Sp and -Sp"-X"— are, for example, $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^0R^{00}-O)_{p1}-$, in which p1 is an integer from 1 to 12, q1 is an integer from 1 to 3, and $R^0$ and $R^{00}$ have the meanings indicated above.

Particularly preferred groups Sp and -Sp"-X"— are $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

In a preferred embodiment of the invention the compounds of formula P and its subformulae contain a spacer group Sp that is substituted by one or more polymerisable groups P, so that the group Sp-P corresponds to Sp(P)$_s$, with s being ≥2 (branched polymerisable groups).

Preferred compounds of formula P according to this preferred embodiment are those wherein s is 2, i.e. compounds which contain a group Sp(P)$_2$. Very preferred compounds of formula P according to this preferred embodiment contain a group selected from the following formulae:

| | |
|---|---|
| —X-alkyl-CHPP | S1 |
| —X-alkyl-CH((CH$_2$)$_{aa}$P)((CH$_2$)$_{bb}$P) | S2 |
| —X—N((CH$_2$)$_{aa}$P)((CH$_2$)$_{bb}$P) | S3 |
| —X-alkyl-CHP—CH$_2$—CH$_2$P | S4 |
| —X-alkyl-C(CH$_2$P)(CH$_2$P)—C$_{aa}$H$_{2aa+1}$ | S5 |
| —X-alkyl-CHP—CH$_2$P | S6 |
| —X-alkyl-CPP—C$_{aa}$H$_{2aa+1}$ | S7 |
| —X-alkyl-CHPCHP—C$_{aa}$H$_{2aa+1}$ | S8 | in which P is as defined in formula P,
alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)═C(R$^0$)—, —C≡C—, —N(R$^0$)—, —O—, —S—, —CO—, —CO—O—, —O—CO—, —O—CO—O— in such a way that O and/or S atoms are not linked directly to one another, where R$^0$ has the meaning indicated above,
aa and bb each, independently of one another, denote 0, 1, 2, 3, 4, 5 or 6,
X has one of the meanings indicated for X", and is preferably O, CO, SO$_2$, O—CO—, CO—O or a single bond.

Preferred spacer groups Sp(P)$_2$ are selected from formulae S1, S2 and S3.

Very preferred spacer groups Sp(P)$_2$ are selected from the following subformulae:

| | |
|---|---|
| —CHPP | S1a |
| —O—CHPP | S1b |
| —CH$_2$—CHPP | S1c |
| —OCH$_2$—CHPP | S1d |
| —CH(CH$_2$—P)(CH$_2$—P) | S2a |
| —OCH(CH$_2$—P)(CH$_2$—P) | S2b |
| —CH$_2$—CH(CH$_2$—P)(CH$_2$—P) | S2c |
| —OCH$_2$—CH(CH$_2$—P)(CH$_2$—P) | S2d |
| —CO—NH((CH$_2$)$_2$P)((CH$_2$)$_2$P) | S3a |

In the compounds of formula P and its subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula P and its subformulae as described above and below, wherein all polymerisable groups P that are present in the compound have the same meaning, and very preferably denote acrylate or methacrylate, most preferably methacrylate.

In the compounds of formula P and its subformulae as described above and below, R preferably denotes P-Sp-.

Further preferred are compounds of formula P and its subformulae as described above and below, wherein Sp denotes a single bond or —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Further preferred are compounds of formula P and its subformulae as described above and below, wherein at least one group Sp is a single bond.

Further preferred are compounds of formula P and its subformulae as described above and below, wherein at least one group Sp is different from a single bond, and is preferably selected from —(CH$_2$)$_{p1}$—, —O—(CH$_2$)$_{p1}$—, —O—CO—(CH$_2$)$_{p1}$, or —CO—O—(CH$_2$)$_{p1}$, wherein p1 is 2, 3, 4, 5 or 6, and, if Sp is —O—(CH$_2$)$_{p1}$—, —O—CO—(CH$_2$)$_{p1}$ or —CO—O—(CH$_2$)$_{p1}$ the O-atom or CO-group, respectively, is linked to the benzene ring.

Very preferred groups -A$^1$-(Z-A$^2$)$_z$- in formula P are selected from the following formulae

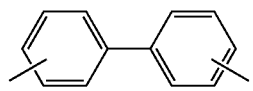
A1

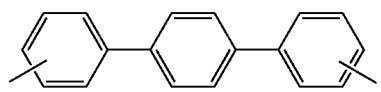
A2

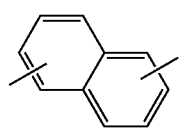
A3

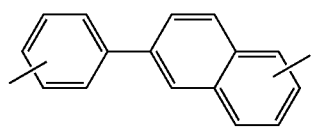
A4

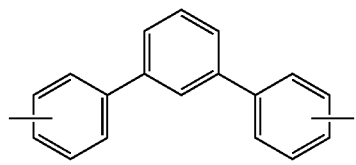
A5

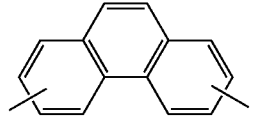
A6 wherein at least one benzene ring is substituted by at last one group L and the benzene rings are optionally further substituted by one or more groups L or P-Sp-.

Preferred compounds of formula P and their subformulae are selected from the following preferred embodiments, including any combination thereof:
All groups P in the compound have the same meaning,
-A$^1$-(Z-A$^2$)$_z$- is selected from formulae A1, A2 and A5,
the compounds contain exactly two polymerizable groups (represented by the groups P), the compounds contain exactly three polymerizable groups (represented by the groups P), P is selected from the group consisting of acrylate, methacrylate and oxetane, very preferably acrylate or methacrylate, P is methacrylate, all groups Sp are a single bond, at least one of the groups Sp is a single bond and at least one of the groups Sp is different from a single bond, Sp, when being different from a single bond, is —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring, Sp is a single bond or denotes —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring, R denotes P-Sp-, R does not denote or contain a polymerizable group, R does not denote or contain a polymerizable group and denotes straight chain, branched or cyclic alkyl having 1 to 25 C atoms, wherein one or more non-adjacent CH₂-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or $L^a$, L or L' denote F, Cl or CN, L is F.

In formula IA, $R^{11}$ and $R^{12}$ preferably denote alkyl or alkenyl or alkoxy having 1 to 7 C atoms, and $R^{12}$ particularly preferably denotes alkoxy having 1 to 7 C atoms.

The compounds of formula IA are preferably selected from the group of compounds of the formulae IA-1 to IA-10:

IA-1
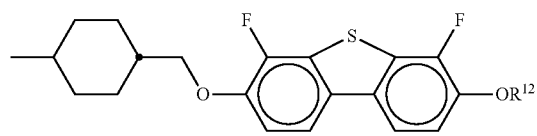

IA-2
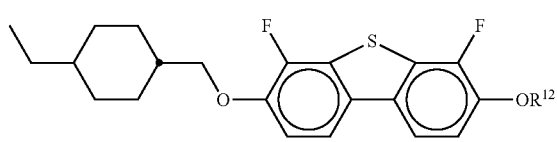

IA-3
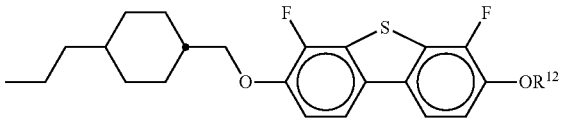

IA-4
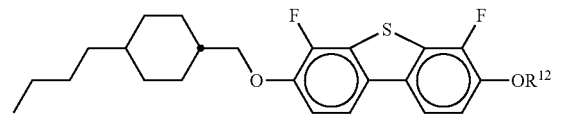

IA-5
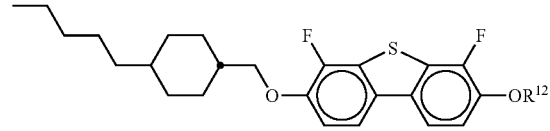

IA-6
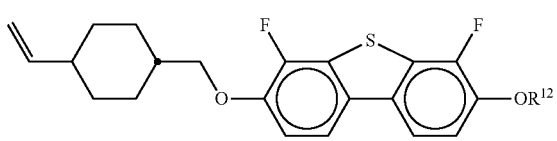

IA-7
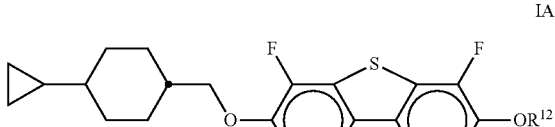

IA-8
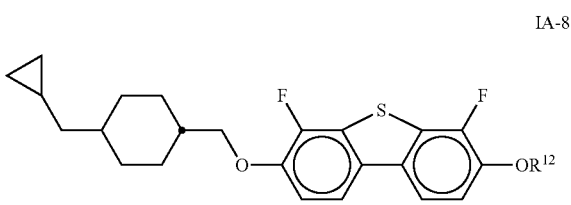

IA-9
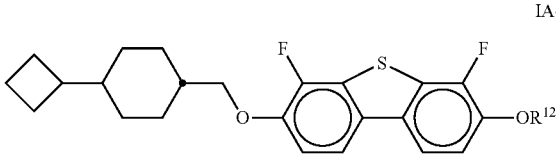

IA-10
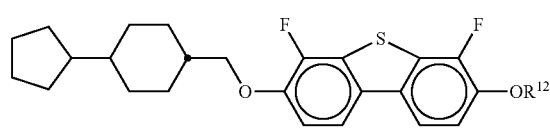

in which $R^{12}$ denotes alkyl having 1 to 7 C-atoms, preferably ethyl, n-propyl or n-butyl.

Preferably, the media according to the invention comprise one or more compounds selected from the group of compounds of formulae IIA, IIB, IIC and IID, IIA
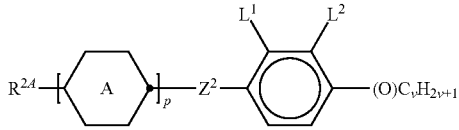

IIB
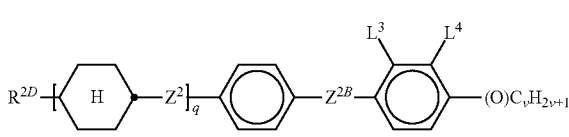

IIC
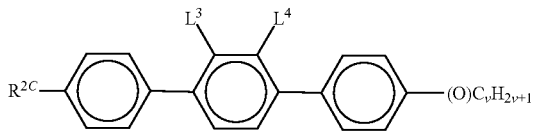

-continued

IID

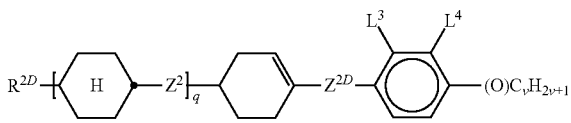

in which
R$^{2A}$, R$^{2B}$, R$^{2C}$ and R$^{2D}$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

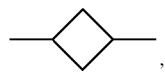

—C≡C—, —CF$_2$O—, —OCF$_2$—, —OC—O— or —O—CO— in such a way that O atoms are not linked directly to one another,
L$^1$ to L$^4$ each, independently of one another, denote F, Cl, CF$_3$ or CHF$_2$,
Z$^2$, Z$^{2B}$ and Z$^{2D}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—,
p denotes 0, 1 or 2,
q denotes 0 or 1, and
v denotes 1 to 6.
In a preferred embodiment of the present invention the medium comprises one or more compounds of formula IB

IB

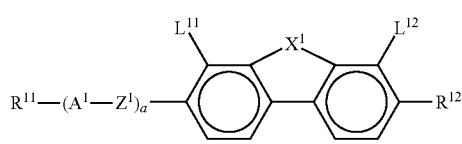

in which
R$^{11}$ and R$^{12}$ each, independently of one another, denote H, an alkyl or alkoxy radical having 1 to 15 C atoms, where, in addition, one or more CH$_2$ groups in these radicals may each be replaced, independently of one another, by —C≡C—, —CF$_2$O—, —OCF$_2$—CH=CH—,

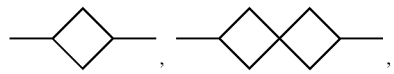

O—, —CO—O— or —O—CO— in such a way that O atoms are not linked directly to one another, and in which, in addition, one or more H atoms may be replaced by halogen,
A$^1$ in each occurrence independently of one another denotes
a) a 1,4-cyclohexenylene or 1,4-cyclohexylene radical, in which one or two non-adjacent CH$_2$ groups may be replaced by —O— or —S—,
b) a 1,4-phenylene radical, in which one or two CH groups may be replaced by N,
c) a radical from the group piperidine-1,4-diyl, 1,4-bicyclo[2.2.2]-octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
where the radicals a), b) and c) may be mono- or polysubstituted by halogen atoms,
a denotes 0, 1 or 2, preferably 0 or 1, particularly preferably 0
Z$^1$ in each occurrence independently of one another denotes —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond,
X$^1$ denotes S or O, and
L$^{11}$ and L$^{12}$ each, independently of one another, denote F, Cl, CF$_3$ or CHF$_2$, preferably H or F, most preferably F,
with the proviso that compounds of formula IA are excluded;
In the compounds of the formula IA, IB and IC, R$^{11}$ and R$^{12}$ preferably each, independently of one another, denote straight-chain alkyl, in particular CH$_3$, n-C$_2$H$_5$, n-C$_3$H$_7$, n-C$_4$H$_9$, n-C$_5$H$_{11}$, n-C$_6$H$_{13}$— or n-C$_7$H$_{15}$, straight-chain alkoxy, in particular CH$_3$—O, n-C$_2$H$_5$—O, n-C$_3$H$_7$—O, n-C$_4$H$_9$—O, n-C$_5$H$_{11}$—O or n-C$_6$H$_{13}$—O, furthermore alkenyl, in particular CH$_2$=CH, CH$_3$CH=CH, CH$_3$CH=CHCH$_2$ or CH$_3$CH$_2$CH=CH, branched alkoxy, in particular (CH$_3$)$_2$CH(CH$_2$)$_3$O, and alkenyloxy, in particular CH$_2$=CHO, CH$_2$=CH$_2$CH$_2$O, CH$_3$CH=CHCH$_2$O or CH$_3$CH$_2$CH=CHCH$_2$O.
R$^{11}$ particularly preferably denotes straight-chain alkyl having 1 to 7 C atoms and R$^{12}$ particularly preferably denotes straight-chain alkoxy having 1 to 6 C atoms, in particular methoxy, ethoxy, propoxy, butoxy, pentoxy or hexoxy.
L$^{11}$ and L$^{12}$ in formula IB preferably both denote F.
The parameter "a" in formula IB preferably denotes 1.
Preferred compounds of the formula IB present in the media are the compounds of the formulae IB-1 to IB-3, preferably of formula IB-2,

IB-1

IB-2

IB-3

in which
the occurring groups have the meanings given above, and preferably
$R^{11}$ denotes straight-chain alkyl,
$R^{12}$ denotes alkoxy, and
$L^{11}$ and $L^{12}$ both denote F.

In a preferred embodiment the media comprise one or more compounds of the formula IB selected from the group of compounds of formulae IB-O-1 to IB-O-3, preferably of formula IB-O-2

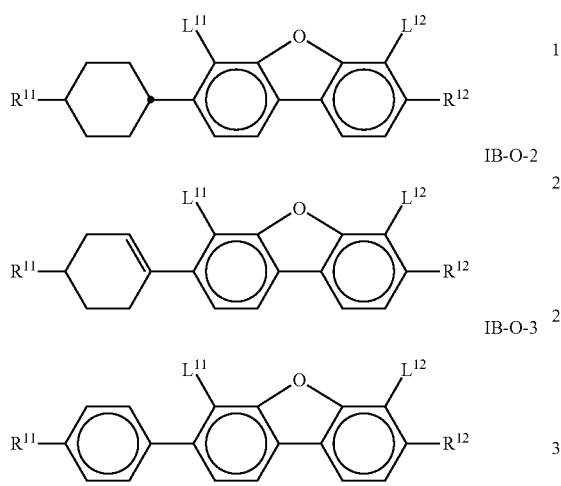

IB-O-1

IB-O-2

IB-O-3 in which the occurring groups have the meanings given above.

In another preferred embodiment the media comprise one or more compounds of the formula IB selected from the group of compounds of formulae IB-S-1 to IB-S-3, preferably of formula IB-S-2,

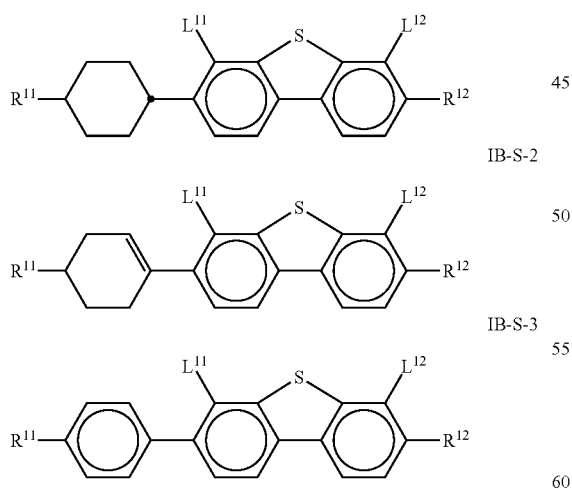

IB-S-1

IB-S-2

IB-S-3 in which the parameters have the meanings given above.

In a preferred embodiment of the present invention the media comprise one or more compounds selected from the group of compounds of formulae IB-O-1 to IB-O-3 and one or more compounds selected from the group of compounds of formulae IB-S-1 to IB-S-3.

In a preferred embodiment the media comprise one or more compounds of the formula IC

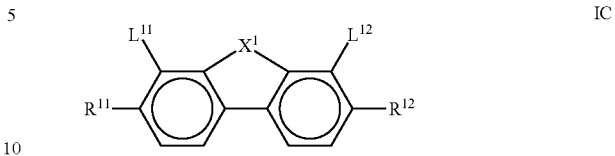

IC in which the occurring have the same meanings as given under formula IB above and preferably
$X^1$ denotes S,
$R^{11}$ and $R^{12}$ each, independently of one another, an alkyl, alkenyl or alkoxy radical having up to 15 C atoms, more preferably one or both of them denote an alkoxy radical and
$L^{11}$ and $L^{12}$ each preferably denote F.

In a preferred embodiment the media comprise one or more compounds of the formula IC selected from the group of compounds of formulae IC-O-1 to IC-O-10, preferably of formula IC-O-6,

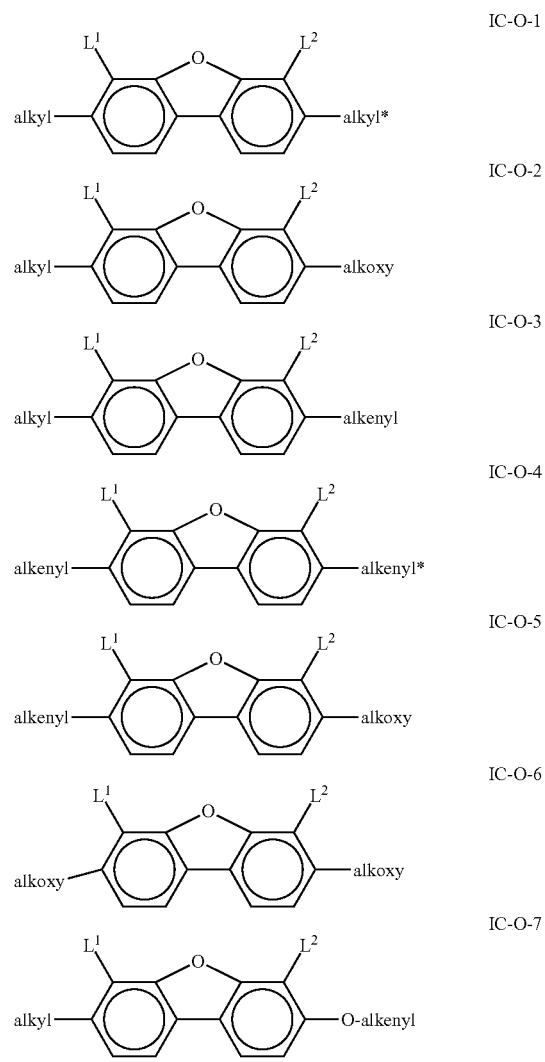

IC-O-1

IC-O-2

IC-O-3

IC-O-4

IC-O-5

IC-O-6

IC-O-7

-continued

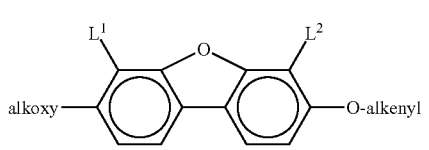
IC-O-8

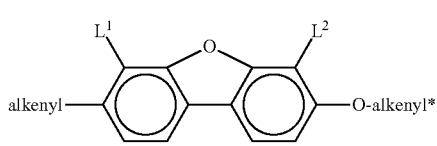
IC-O-9

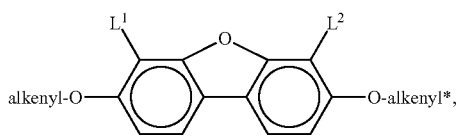
IC-O-10 in which
alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl.

In a further preferred embodiment the media comprise, either alternatively or additionally to one or more compounds selected from the group of compounds of formulae IC-O-1 to IC-O-10, one or more compounds of the formula IC, wherein $X^1$ is S, preferably selected from the group of compounds of formulae IC-S-1 to IC-S-10, preferably of formula IC-S-6, which have the identical structures to the corresponding compounds of formulae IC-O-1 to IC-O-10 having the same number, with the sole exception that the bridging atom (i.e. $X^1$) is an S atom instead of an O atom.

The compounds of the formula IA, IB and IC can be prepared, for example, as described in US 2005/0258399 or WO 02/055463 A1. Compounds of formula IA are disclosed in DE 102015004271 A1.

Preferred embodiments of the liquid-crystalline medium according to the invention are indicated below:

a) Liquid-crystalline medium which additionally comprises one or more compounds selected from the group of the compounds of the formulae IIA, IIB, IIC and IID,
In the compounds of the formulae IIA, IIB and IID, $Z^2$ may have identical or different meanings. In the compounds of the formula IIB, $Z^2$ and $Z^{2B}$ may have identical or different meanings. In the compounds of the formula IID, $Z^2$ and $Z^{2D}$ may have identical or different meanings.
In the compounds of the formulae IIA, IIB, IIC and IID, $R^{2A}$, $R^{2B}$, $R^{2C}$ and $R^{2D}$ each preferably denote alkyl having 1 to 6 C atoms, in particular $CH_3$, $C_2H_5$, n-$C_3H_7$, n-$C_4H_9$, n-$C_5H_{11}$.
In the compounds of the formulae IIA, IIB and IID, $L^1$, $L^2$, $L^3$ and $L^4$ preferably denote $L^1=L^2=F$ and $L^3=L^4=F$, furthermore $L^1=F$ and $L^2=Cl$, $L^1=Cl$ and $L^2=F$, $L^3=F$ and $L^4=Cl$, $L^3=Cl$ and $L^4=F$. $Z^2$ and $Z^{2'}$ in the formulae IIA and IIB preferably each, independently of one another, denote a single bond, furthermore a —$C_2H_4$— bridge.
If, in the formula IIB, $Z^2$=—$C_2H_4$— or —$CH_2O$—, $Z^{2B}$ is preferably a single bond or, if $Z^{2B}$=—$C_2H_4$— or —$CH_2O$—, $Z^2$ is preferably a single bond.

In formula IID, $Z^{2D}$ is preferably a single bond.
In the compounds of the formulae IIA, IIB and IID, (O)$C_vH_{2v+1}$ preferably denotes O$C_vH_{2v+1}$. In the compounds of the formula IIC, (O)$C_vH_{2v+1}$ preferably denotes $C_vH_{2v+1}$.
In the compounds of the formula IIC, $L^3$ and $L^4$ preferably each denote F.
Preferred compounds of the formulae IIA, IIB and IIC are indicated below:

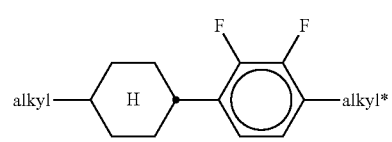
IIA-1

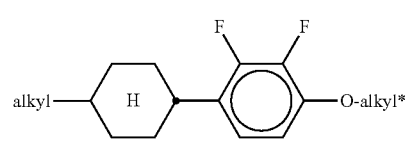
IIA-2

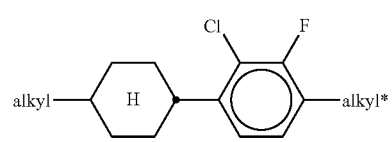
IIA-3

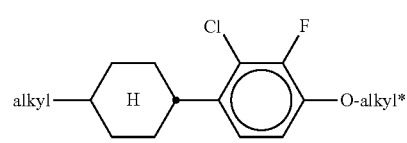
IIA-4

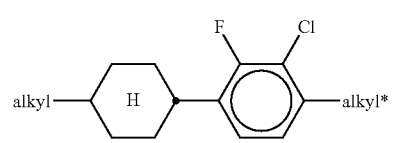
IIA-5

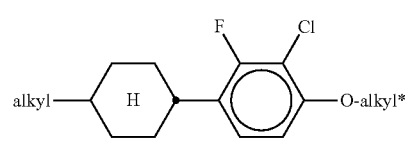
IIA-6

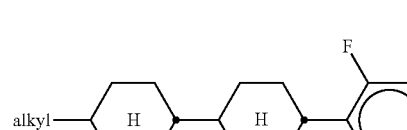
IIA-7

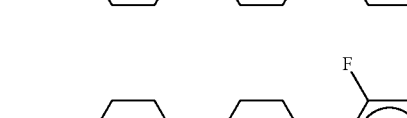
IIA-8

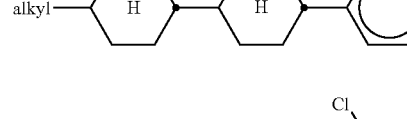
IIA-9

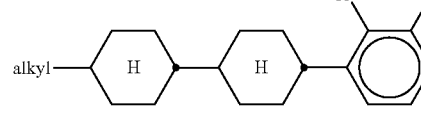

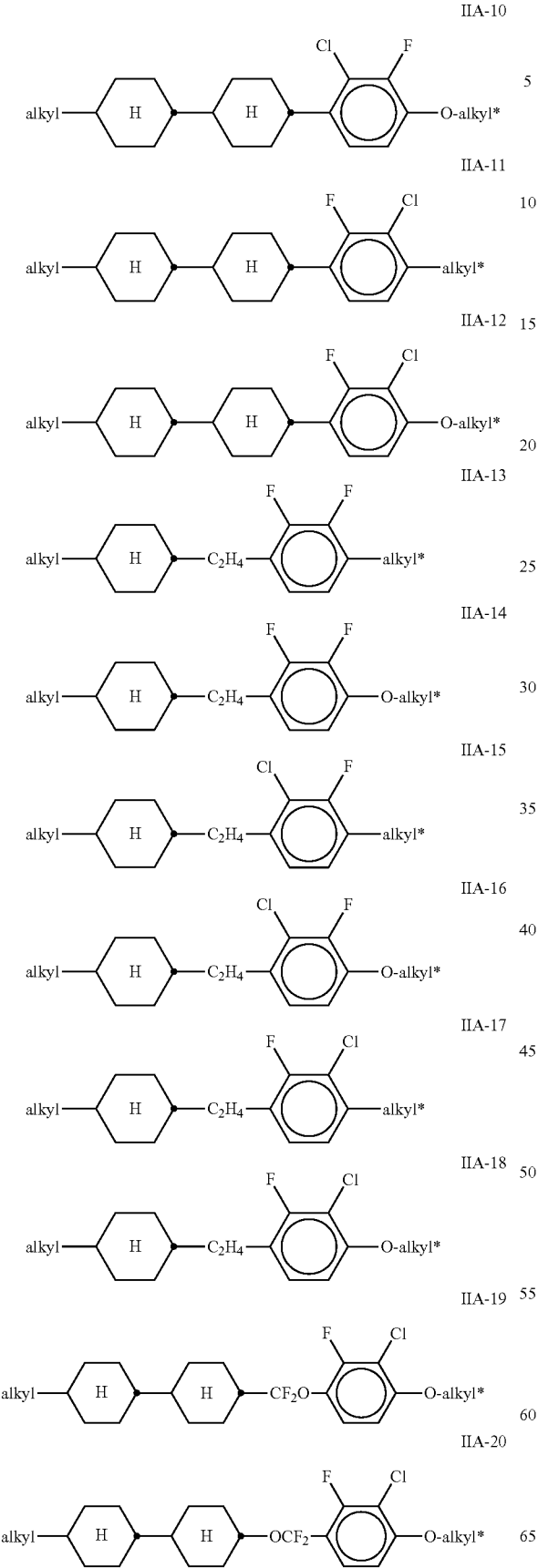
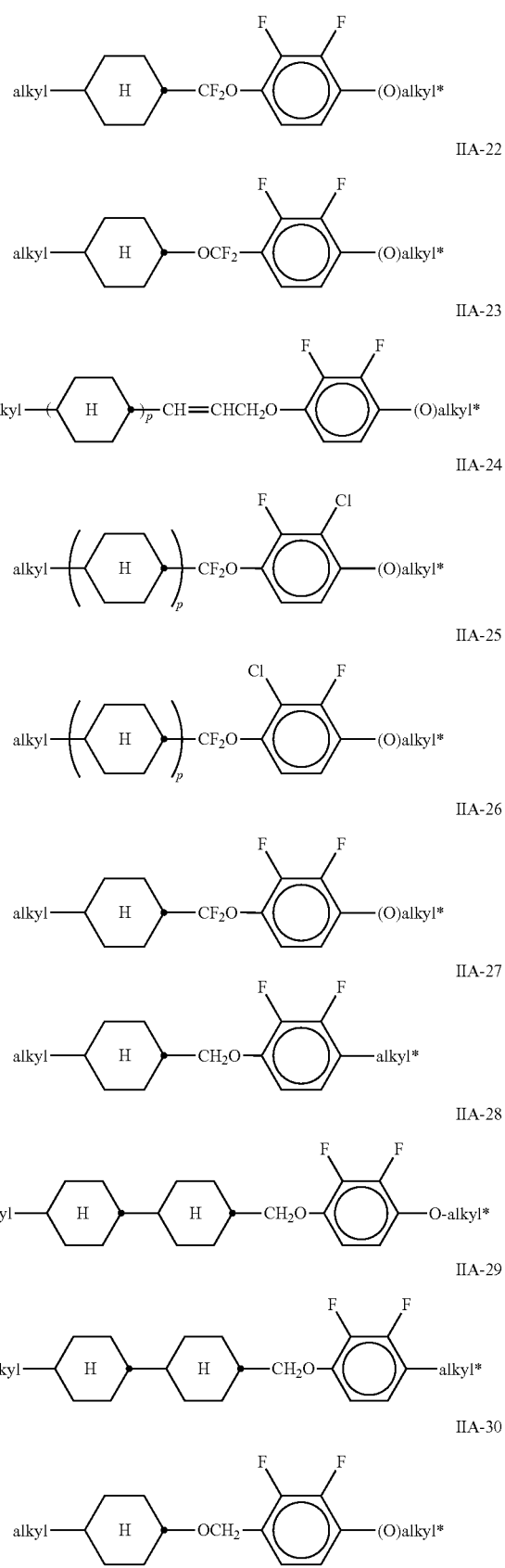

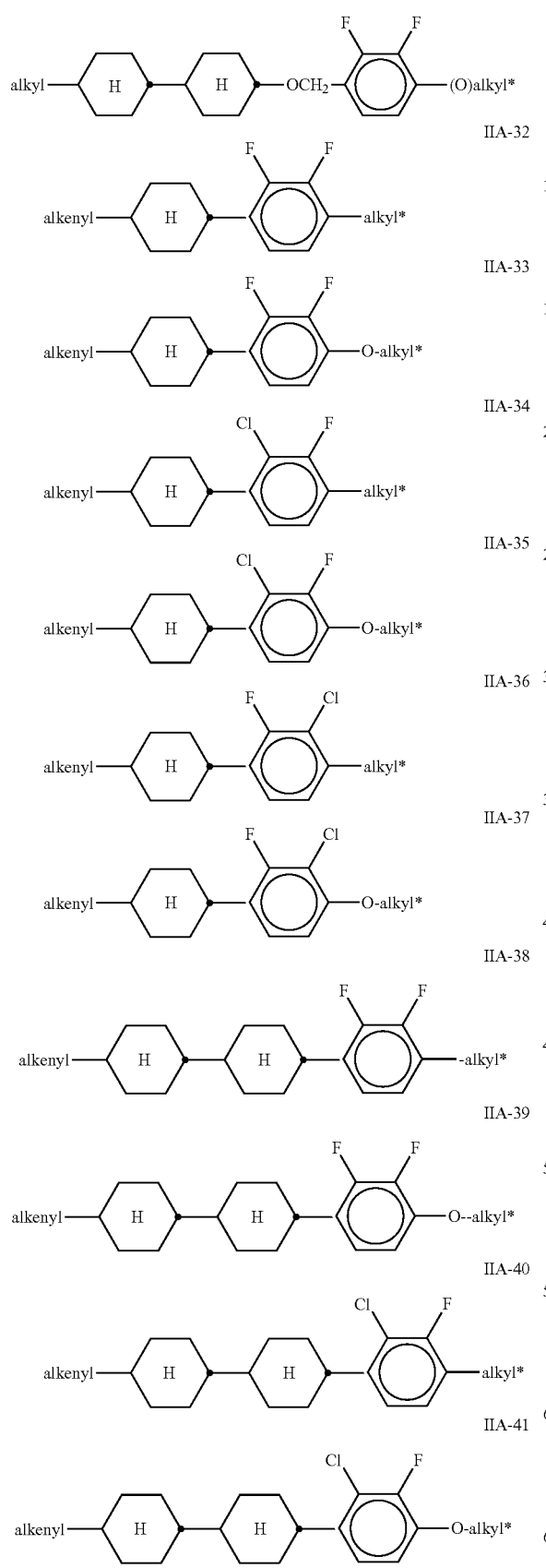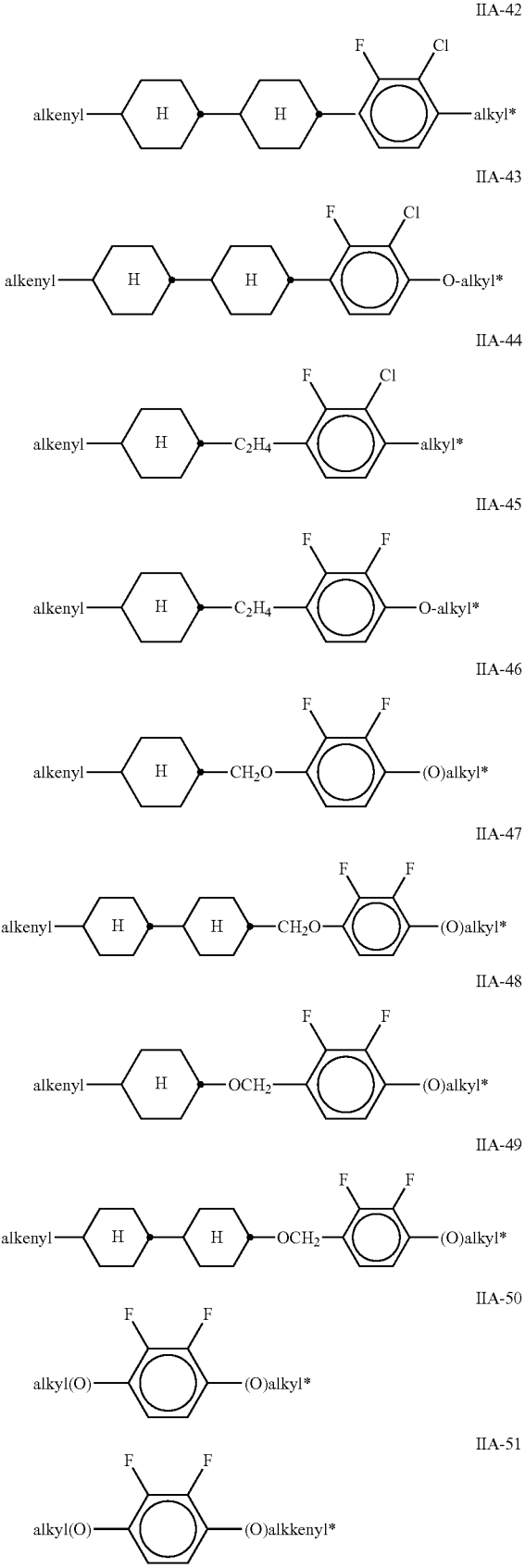

IIA-52
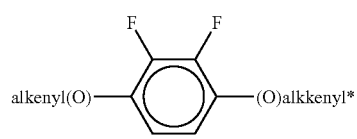
IIB-1
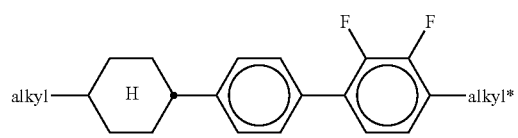
IIB-2
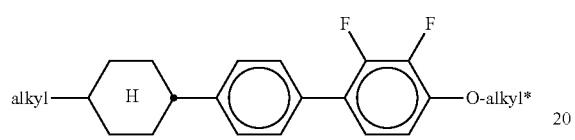
IIB-3
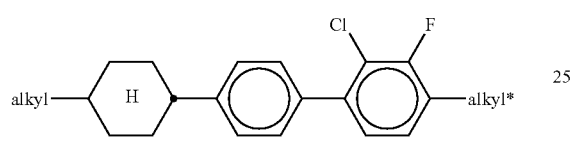
IIB-4
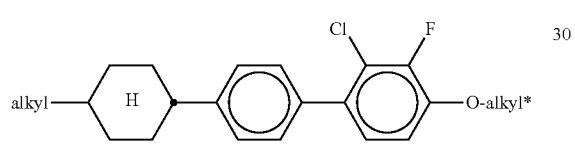
IIB-5
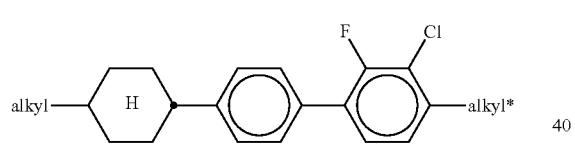
IIB-6
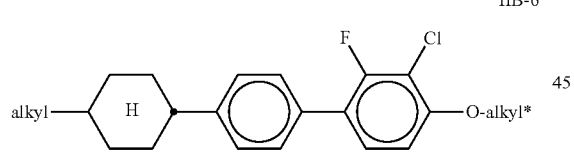
IIB-7
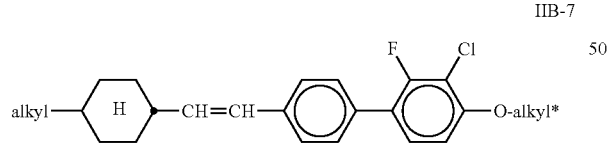
IIB-8
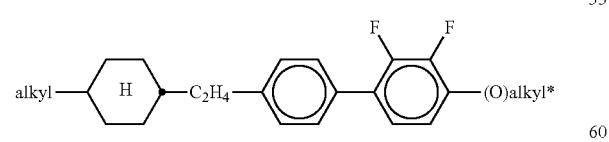
IIB-9
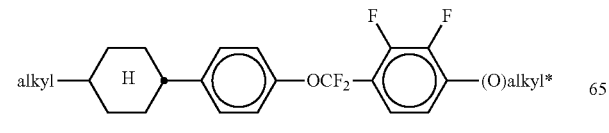
IIB-10
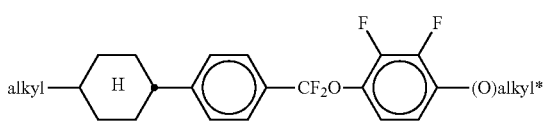
IIB-11
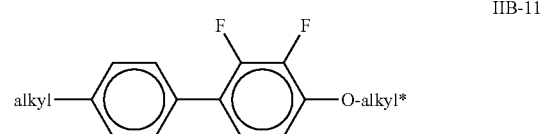
IIB-12
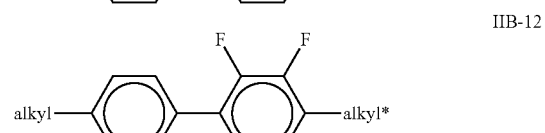
IIB-13
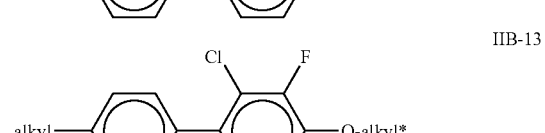
IIB-14
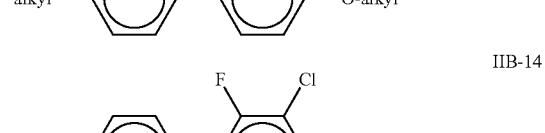
IIB-15
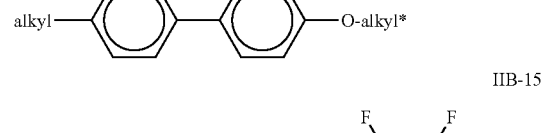
IIB-16
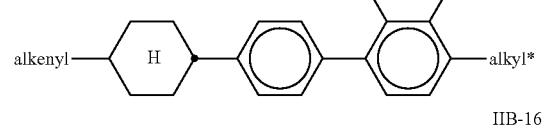
IIC-1
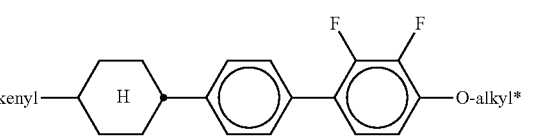
IID-1
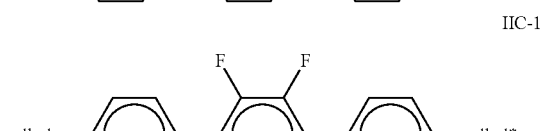
IID-2
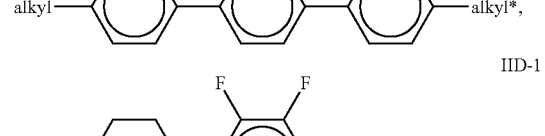
IID-3
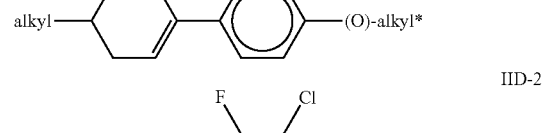

-continued

IID-4
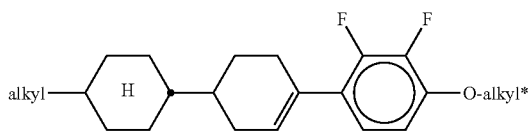

IID-5
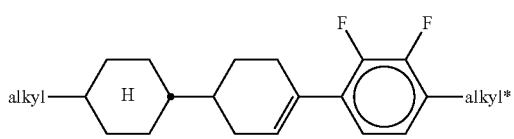

IID-6
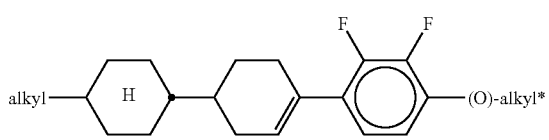

IID-7
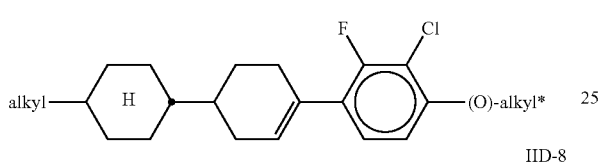

IID-8
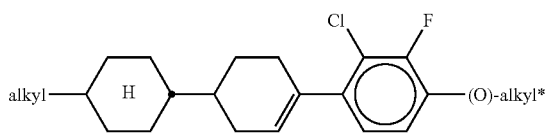

in which
alkyl and alkyl* each, independently of one another, denote a straight-chain alkyl radical having 1 to 6 C atoms,
alkenyl and alkenyl* each, independently of one another, denote a straight-chain alkenyl radical having 2 to 6 C atoms, and
(O) denotes —O— or a single bond.

Particularly preferred mixtures according to the invention comprise one or more compounds of the formulae IIA-2, IIA-8, IIA-14, IIA-26, 11-28, IIA-33, IIA-39, IIA-45, IIA-46, IIA-47, IIA-50, IIB-2, IIB-11, IIB-16, IIC-1, and IID-4.

The proportion of compounds of the formulae IIA and/or IIB in the mixture as a whole is preferably at least 20% by weight.

Particularly preferred media according to the invention comprise at least one compound of the formula IIC-1,

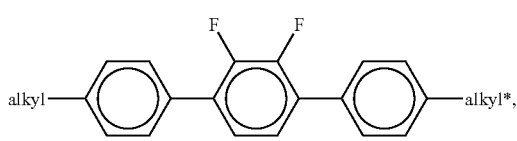

in which alkyl and alkyl* have the meanings indicated above, preferably in amounts of >3% by weight, in particular >5% by weight and particularly preferably 5 to 25% by weight.

b) Liquid-crystalline medium which additionally comprises one or more compounds of the formula III, III
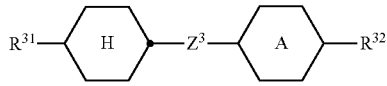

in which
$R^{31}$ and $R^{32}$ each, independently of one another, denote a straight-chain alkyl, alkoxy, alkenyl, alkoxyalkyl or alkoxy radical having up to 12 C atoms, and

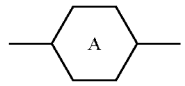

denotes

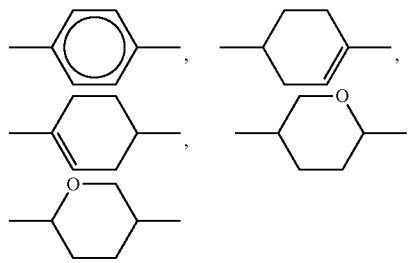

$Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$—, —CF=CF—.

Preferred compounds of the formula III are indicated below:

IIIa
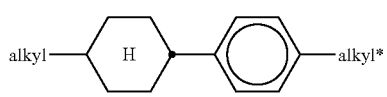

IIIb
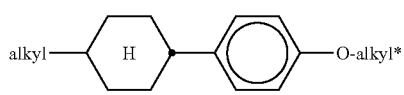

IIIc
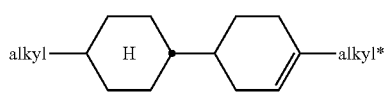

IIId
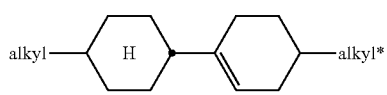

in which
alkyl and alkyl* each, independently of one another, denote a straight-chain alkyl radical having 1 to 6 C atoms.

The medium according to the invention preferably comprises at least one compound of the formula IIIa and/or formula IIIb.

The proportion of compounds of the formula III in the mixture as a whole is preferably at least 5% by weight c) Liquid-crystalline medium additionally comprising a compound of the formula

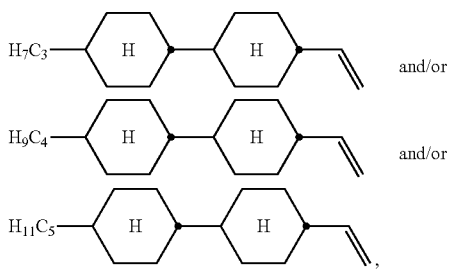

preferably in total amounts of ≥5% by weight, in particular ≥10% by weight.

Preference is furthermore given to mixtures according to the invention comprising the compound (acronym: CC-3-V1)

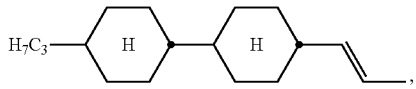

preferably in amounts of 2 to 15% by weight.

Preferred mixtures comprise 5 to 60% by weight, preferably 10 to 55% by weight, in particular 20 to 50% by weight, of the compound of the formula (acronym: CC-3-V)

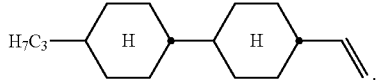

Preference is furthermore given to mixtures which comprise a compound of the formula (acronym: CC-3-V)

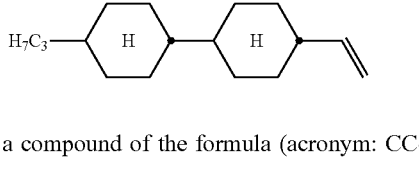

and a compound of the formula (acronym: CC-3-V1)

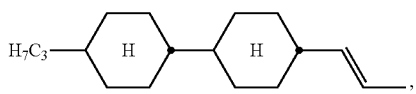

preferably in a total amount in the range of from 10 to 60% by weight.

d) Liquid-crystalline medium which additionally comprises one or more tetracyclic compounds of the formulae

V-1

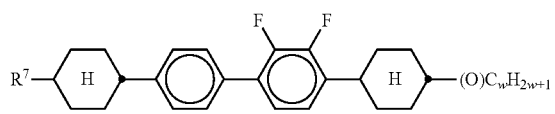

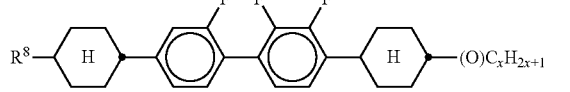

V-2

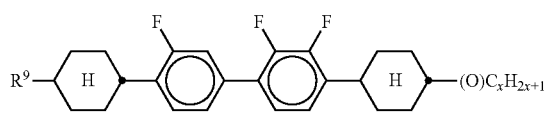

V-3

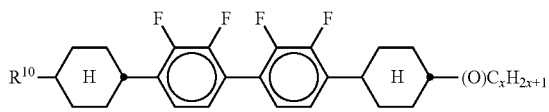

V-4

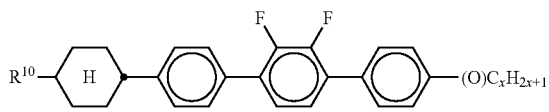

V-5

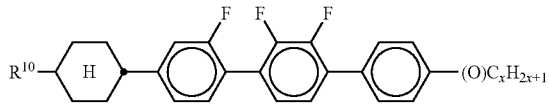

V-6

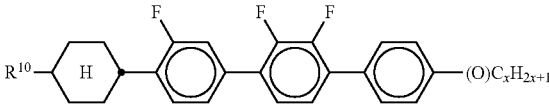

V-7

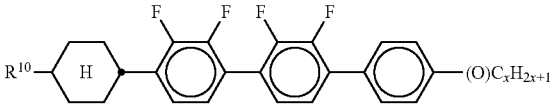

V-8

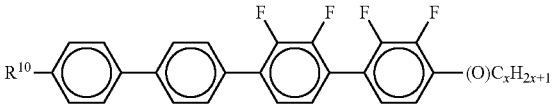

V-9 in which $R^{7-10}$ each, independently of one another, denote H, an alkyl or alkenyl radical having up to 15 C atoms, which is unsubstituted, monosubstituted by CN or $CF_3$ or at least monosubstituted by halogen, in which one or more $CH_2$ groups are optionally replaced by —O—, —S—,

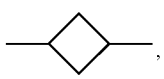

—C≡C—, —$CF_2$O—, —O$CF_2$—, —OC—O— or —O—CO— in such a way that O atoms are not linked directly to one another, and w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6,

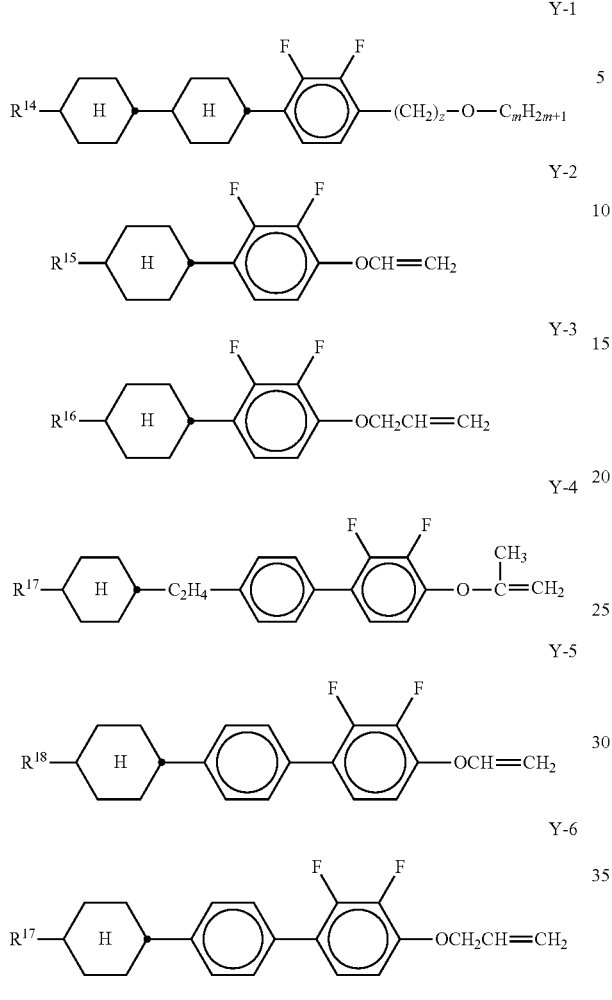

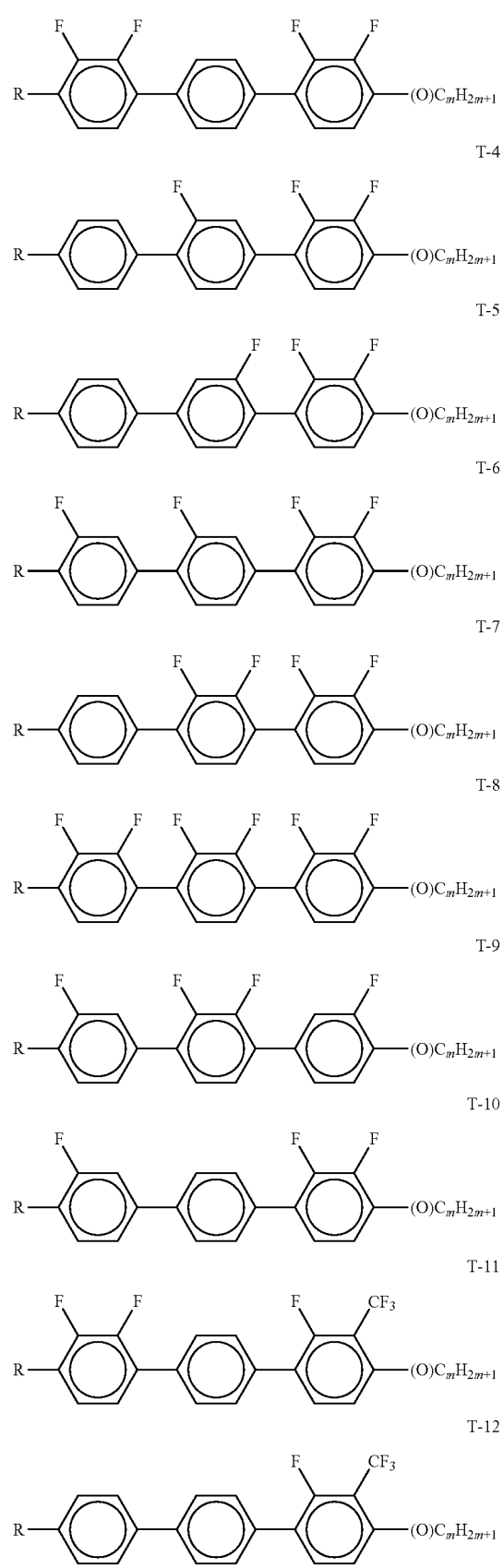

in which $R^{14}$-$R^{19}$ each, independently of one another, denote an alkyl or alkoxy radical having 1 to 6 C atoms; z and m each, independently of one another, denote 1 to 6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21,

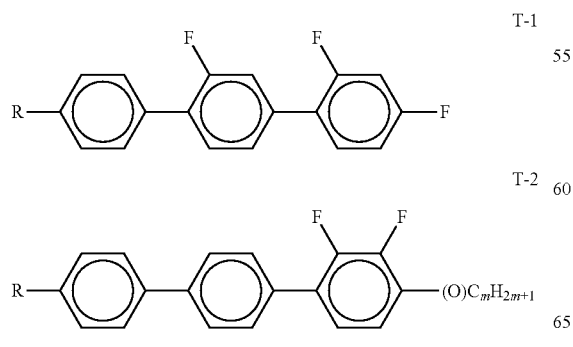

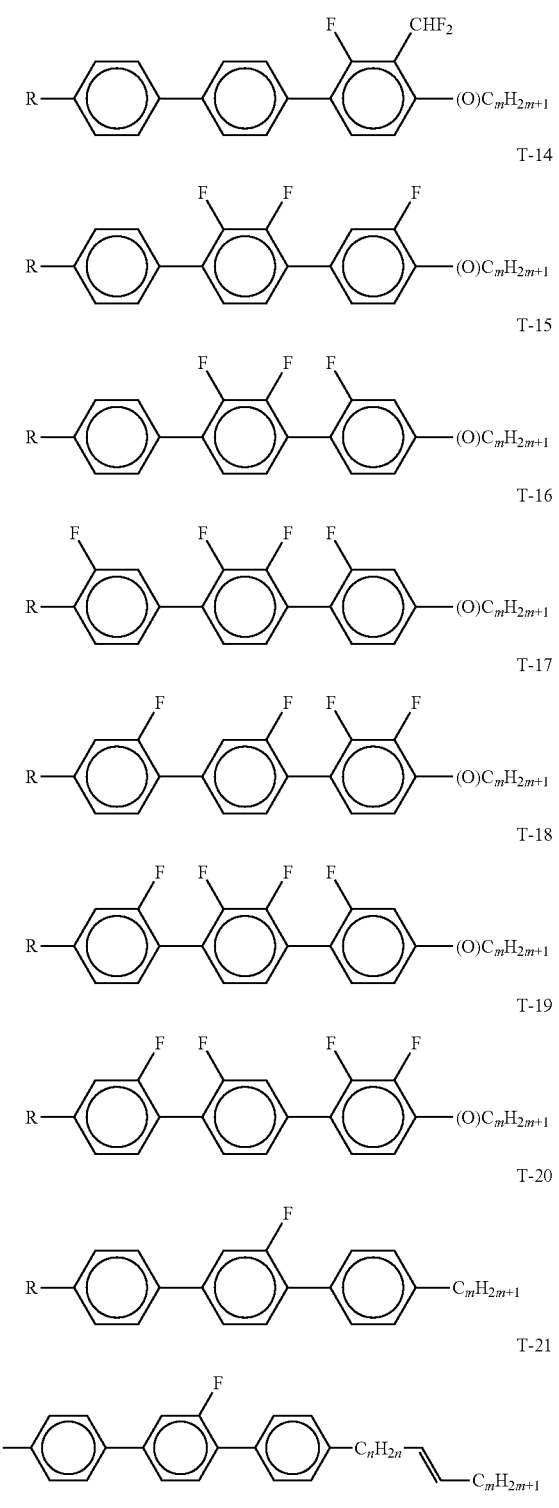

in which
R denotes a straight-chain alkyl or alkoxy radical having 1 to 6 C atoms, (O) denotes —O— or a single bond, and m=0, 1, 2, 3, 4, 5 or 6 and n denotes 0, 1, 2, 3 or 4.

R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2 to 30% by weight, in particular 5 to 20% by weight.

Particular preference is given to compounds of the formulae T-1, T-2, T-4, T-20 and T-21. In these compounds, R preferably denotes alkyl, furthermore alkoxy, each having 1 to 5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2 to 20% by weight of one or more terphenyl compounds selected from the group of the compounds T-1 to T-21.

g) Liquid-crystalline medium additionally comprising one or more biphenyls of the formulae B-1 to B-3,

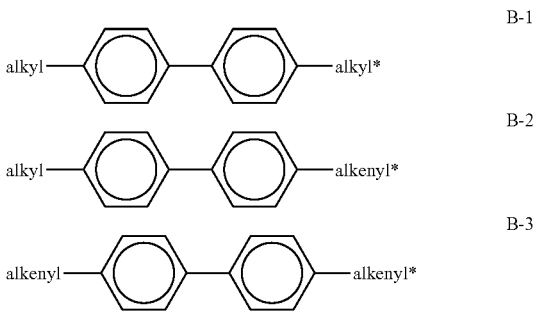

in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

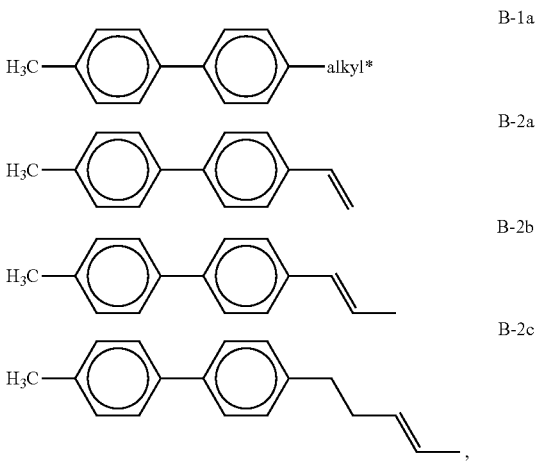

in which alkyl* denotes an alkyl radical having 1 to 6 C atoms. The medium according to the invention particularly preferably comprises one or more compounds of the formulae B-1a and/or B-2c.

h) Liquid-crystalline medium comprising at least one compound of the formulae Z-1 to Z-7,
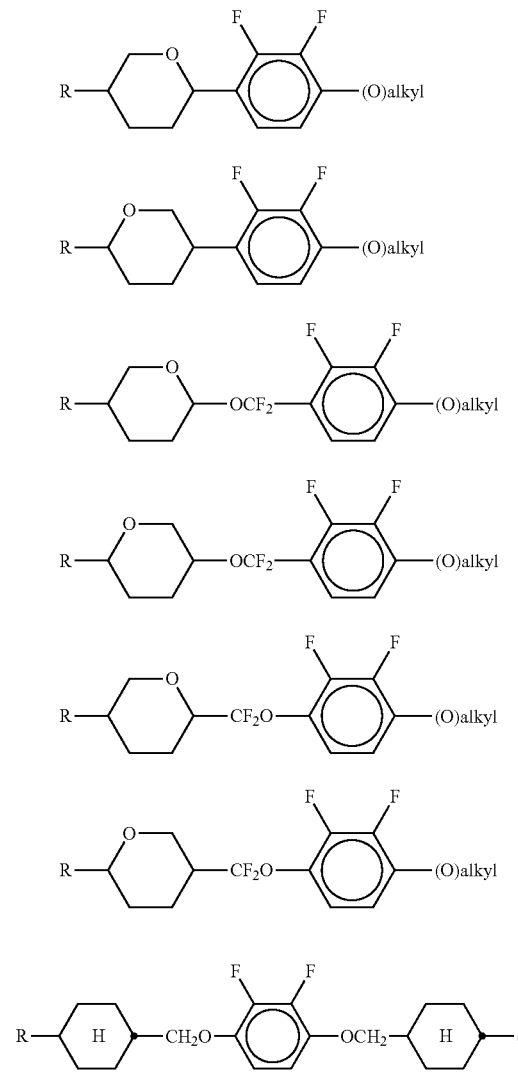
in which R and alkyl have the meanings indicated above.
i) Liquid-crystalline medium additionally comprising at least one compound of the formulae O-1 to O-18,
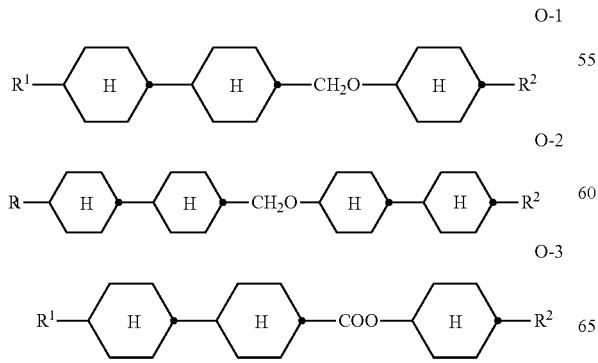
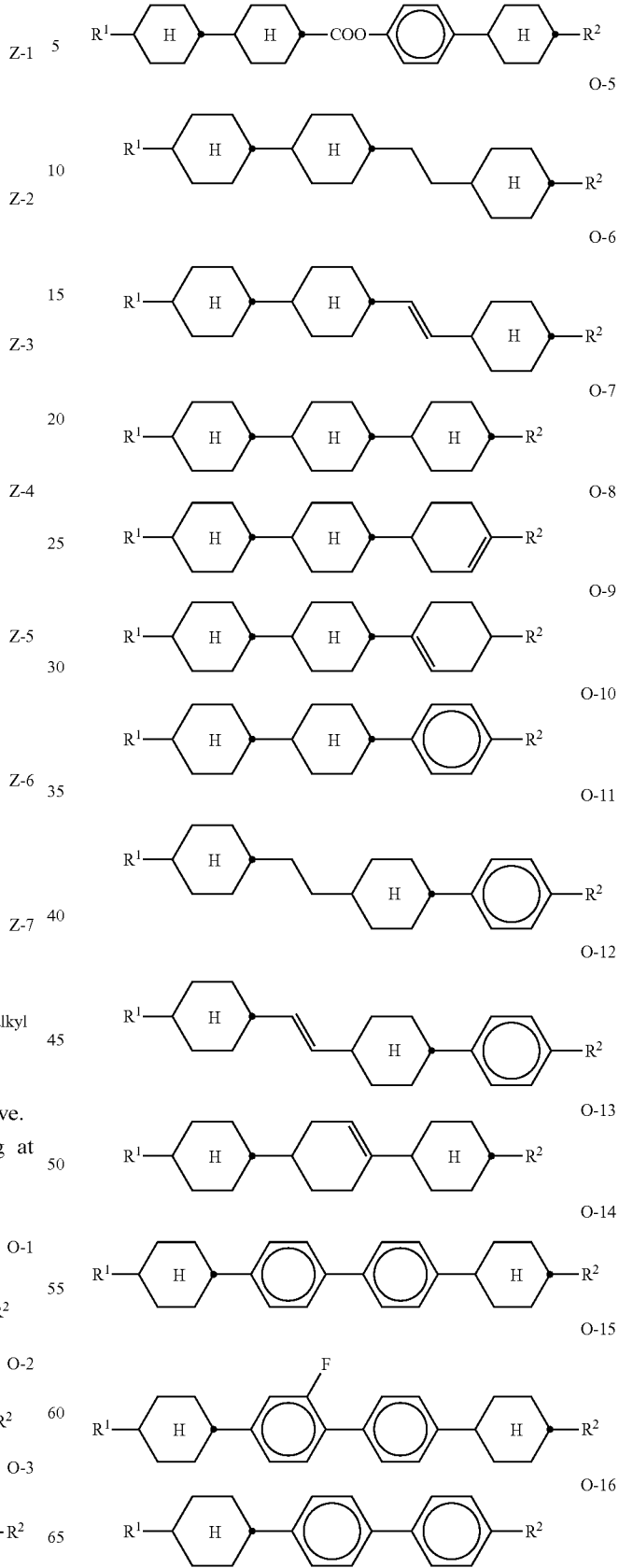

-continued

O-17
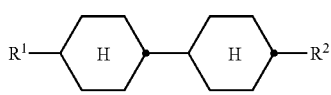

O-18
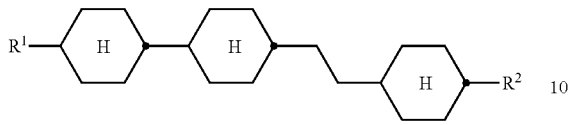

in which R¹ and R² have the meanings indicated for $R^{2A}$. R¹ and R² preferably each, independently of one another, denote straight-chain alkyl or alkenyl.

Preferred media comprise one or more compounds of the formulae O-1, O-3, O-4, O-6, O-7, O-10, O-11, O-12, O-14, O-15, O-16 and/or O-17.

Particularly preferred comprise one or more compounds selected from the group of the compounds of the formula O-17, Mixtures according to the invention very particularly preferably comprise the compounds of the formula O-10, O-12, O-16 and/or O-17, in particular in amounts of 5 to 30%.

Preferred compounds of the formulae O-10 and O-17 are indicated below:

O-10a

O-10b
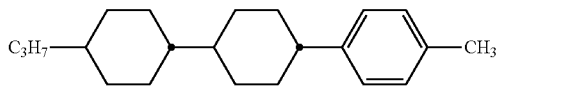

O-10c
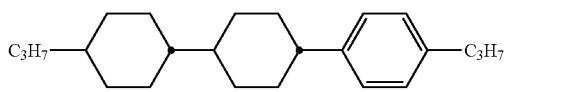

O-17a
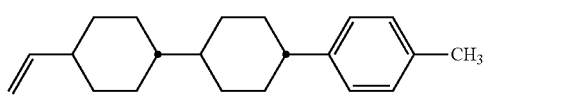

O-17b
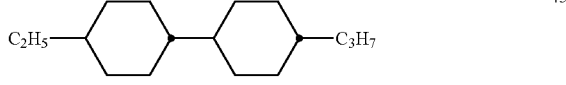

O-17c
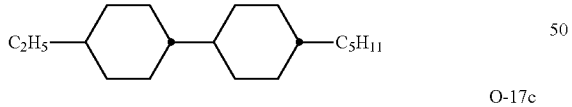

O-17d

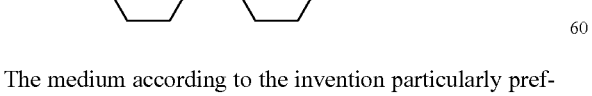

The medium according to the invention particularly preferably comprises the tricyclic compounds of the formula O-10a and/or of the formula O-10b in combination with one or more bicyclic compounds of the formulae O-17a to O-17d. The total proportion of the compounds of the formulae O-10a and/or O-10b in combination with one or more compounds selected from the bicyclic compounds of the formulae O-17a to O-17d is 5 to 40%, very particularly preferably 15 to 35%.

Very particularly preferred mixtures comprise compounds O-10a and O-17a:

O-10a
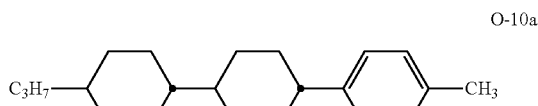

O-17a
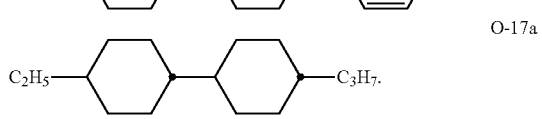

The compounds O-10a and O-17a are preferably present in the mixture in a concentration of 15 to 35%, particularly preferably 15 to 25% and especially preferably 18 to 22%, based on the mixture as a whole.

Very particularly preferred mixtures comprise the compounds O-10b and O-17a:

O-10b
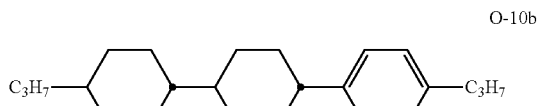

O-17a
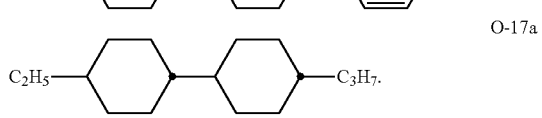

The compounds O-10b and O-17a are preferably present in the mixture in a concentration of 15 to 35%, particularly preferably 15 to 25% and especially preferably 18 to 22%, based on the mixture as a whole.

Very particularly preferred mixtures comprise the following three compounds:

O-10a
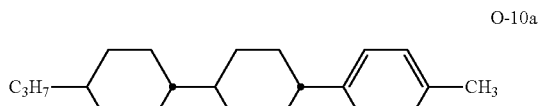

O-10b
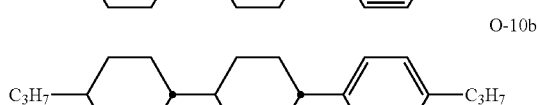

O-17a
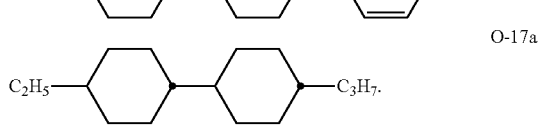

The compounds O-10a, O-10b and O-17a are preferably present in the mixture in a concentration of 15 to 35%, particularly preferably 15 to 25% and especially preferably 18 to 22%, based on the mixture as a whole.

Preferred mixtures comprise at least one compound selected from the group of the compounds

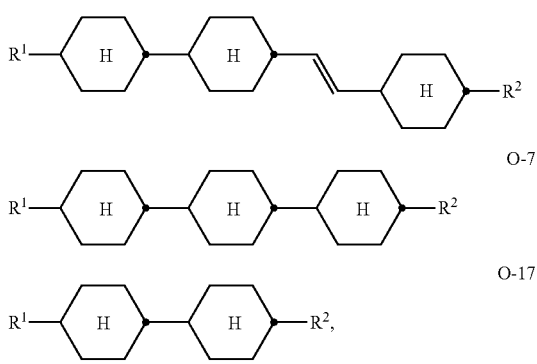

O-6

O-7

O-17 in which R¹ and R² have the meanings indicated above. Preferably in the compounds O-6, 0-7 and O-17, R¹ denotes alkyl or alkenyl having 1 to 6 or 2 to 6 C atoms respectively and R² denotes alkenyl having 2 to 6 C atoms.

Preferred mixtures comprise at least one compound of the formulae O-6a, O-6b, O-7a, O-7b, O-17e, O-17f, O-17g and O-17h:

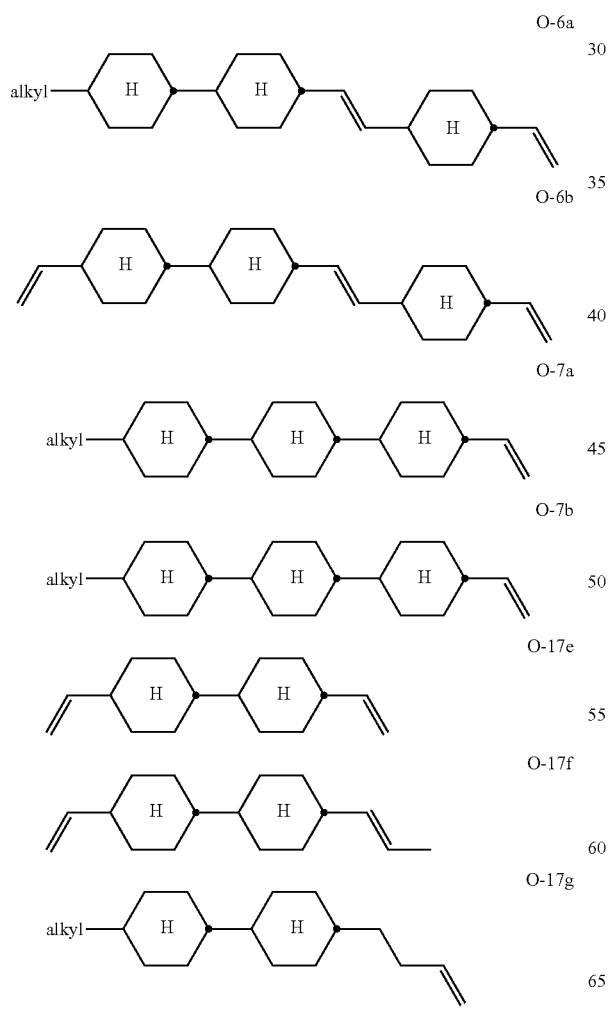

O-6a

O-6b

O-7a

O-7b

O-17e

O-17f

O-17g

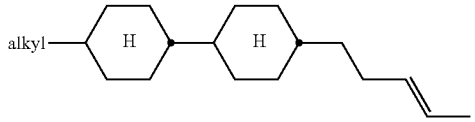

O-17h in which alkyl denotes an alkyl radical having 1 to 6 C atoms.

The compounds of the formulae O-6, 0-7 and O-17e-h are preferably present in the mixtures according to the invention in amounts of 1 to 40% by weight, preferably 2 to 35% by weight and very particularly preferably 2 to 30% by weight.

j) Preferred liquid-crystalline media according to the invention comprise one or more substances which contain a tetrahydronaphthyl or naphthyl unit, such as, for example, the compounds of the formulae N-1 to N-5,

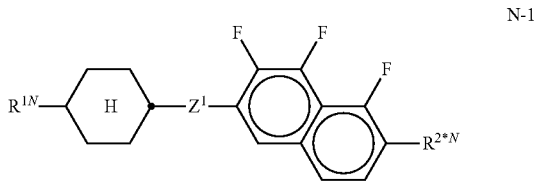

N-1

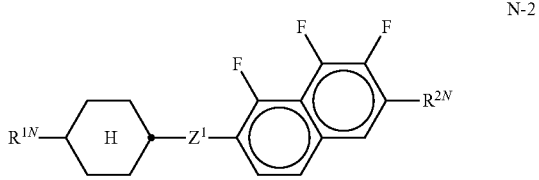

N-2

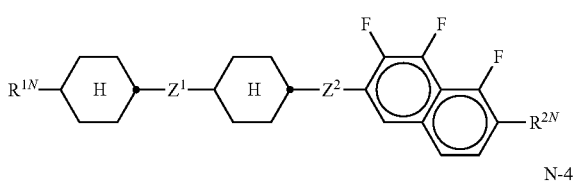

N-3

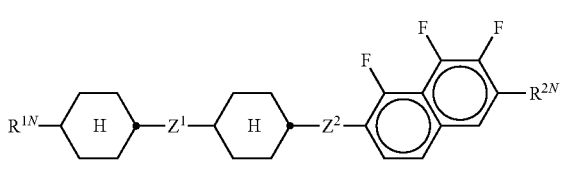

N-4

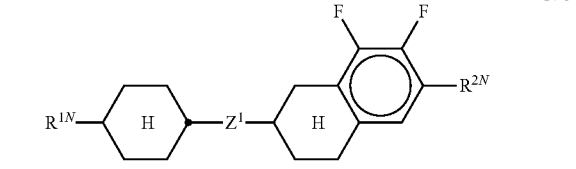

N-5 in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —C$_2$F$_4$—, —CF=CF—, —CF=CH—, —CH=CF—, —CF$_2$O—, —OCF$_2$—, —CH$_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF-1 and BF-2,

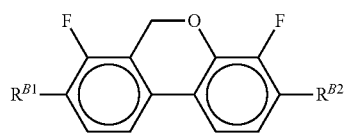
BC

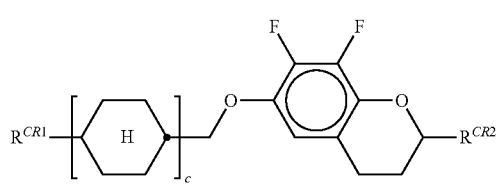
CR

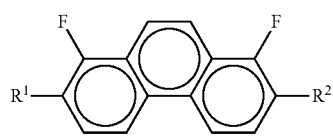
PH-1

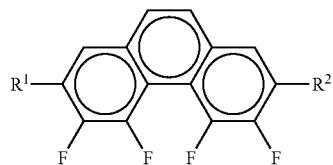
PH-2 in which
$R^{B1}$, $R^{B2}$, $R^{CR1}$, $R^{CR2}$, $R^1$, $R^2$ each, independently of one another, have the meaning of $R^{2A}$. c is 0, 1 or 2 and d denotes 1 or 2. $R^1$ and $R^2$ preferably, independently of one another, denote alkyl or alkoxy having 1 to 6 C atoms. The compounds of the formulae BF-1 and BF-2 should not be identical to one or more compounds of the formula I.

The mixtures according to the invention preferably comprise the compounds of the formulae BC, CR, PH-1, PH-2 and/or BF in amounts of 3 to 20% by weight, in particular in amounts of 3 to 15% by weight.

Particularly preferred compounds of the formulae BC and CR are the compounds BC-1 to BC-7 and CR-1 to CR-5,

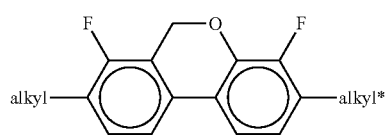
BC-1

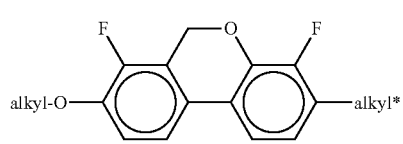
BC-2

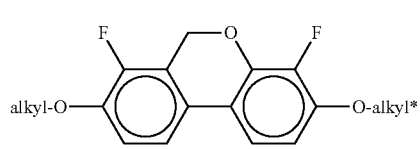
BC-3

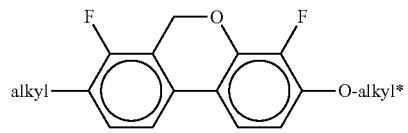
BC-4

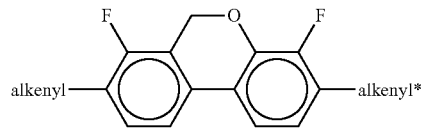
BC-5

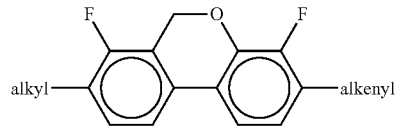
BC-6

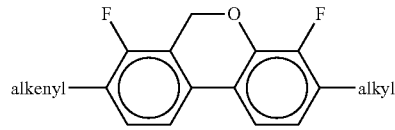
BC-7

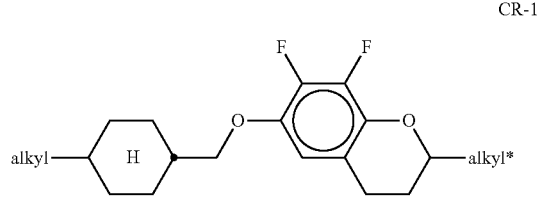
CR-1

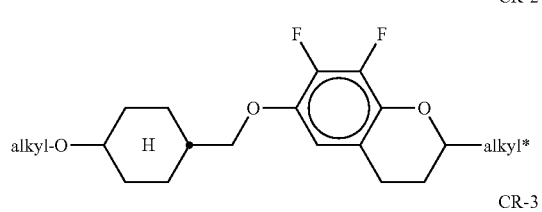
CR-2

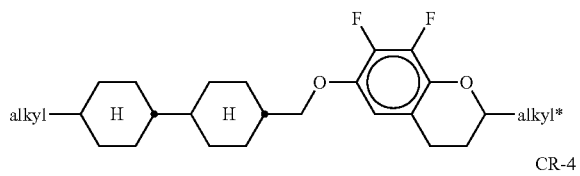
CR-3

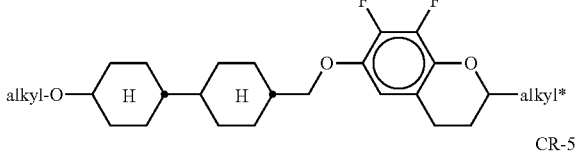
CR-4

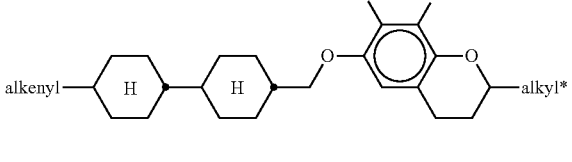
CR-5 in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

Very particular preference is given to mixtures comprising one, two or three compounds of the formula BC-2, BF-1 and/or BF-2.

l) Preferred mixtures comprise one or more indane compounds of the formula In,

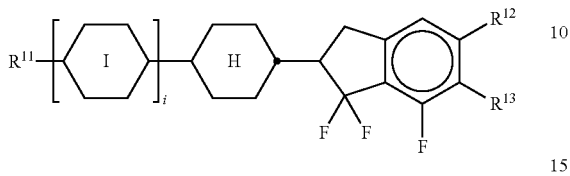

In in which

R$^{11}$, R$^{12}$, R$^{13}$ each, independently of one another, denote a straight-chain alkyl, alkoxy, alkoxyalkyl or alkenyl radical having 1 to 6 C atoms, R$^{12}$ and R$^{13}$ additionally denote halogen, preferably F,

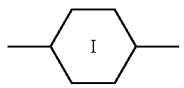

denotes

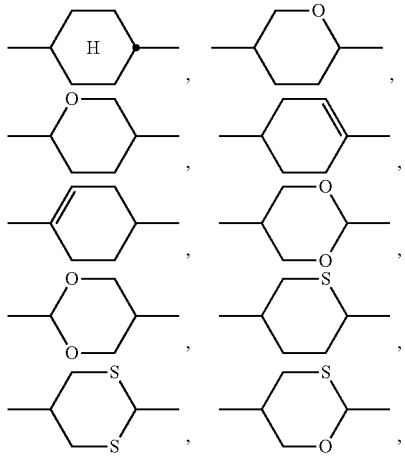

i denotes 0, 1 or 2.

Preferred compounds of the formula In are the compounds of the formulae In-1 to In-16 indicated below:

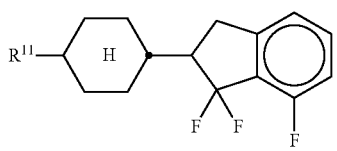
In-1

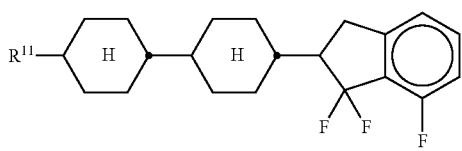
In-2

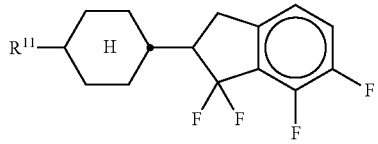
In-3

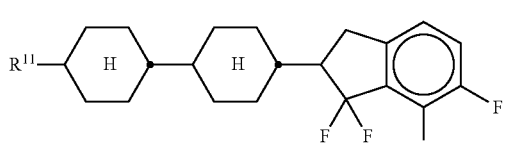
In-4

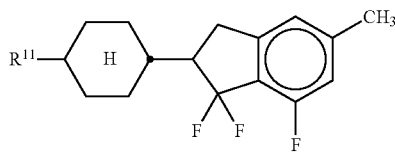
In-5

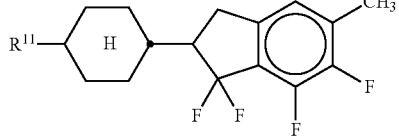
In-6

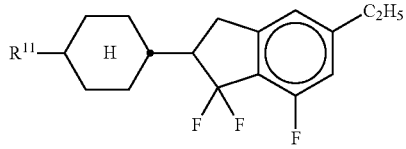
In-7

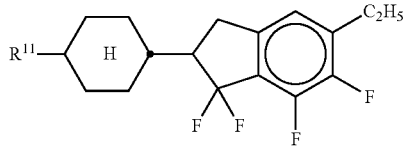
In-8

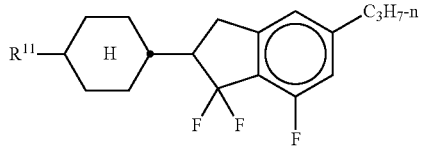
In-9

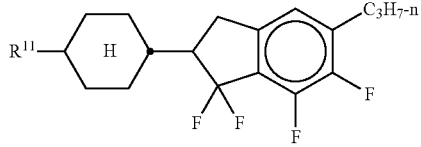
In-10

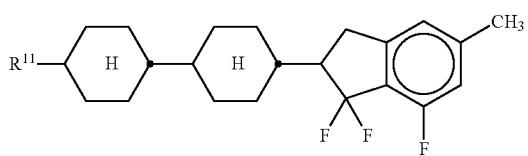
In-11

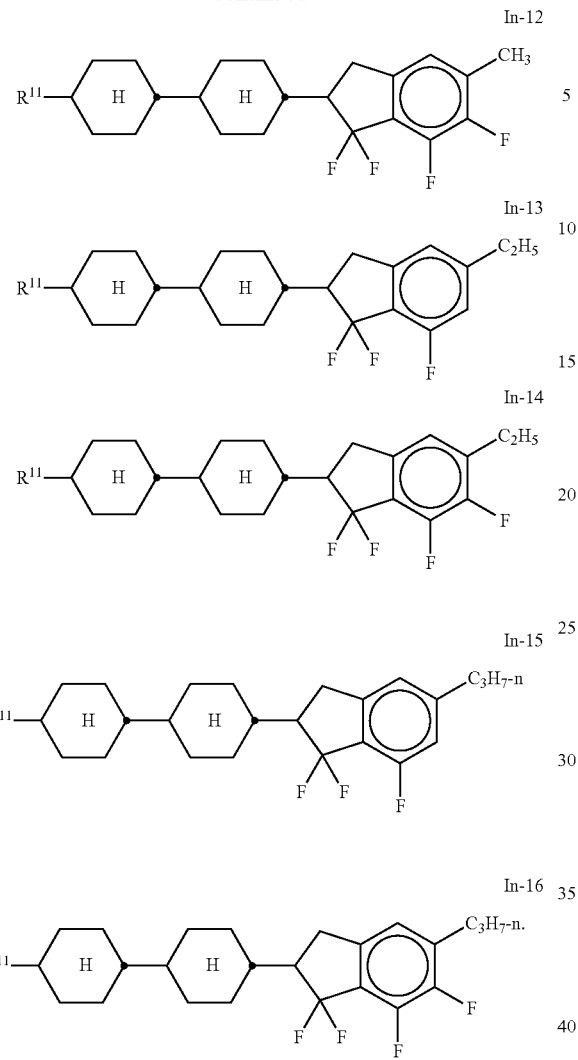

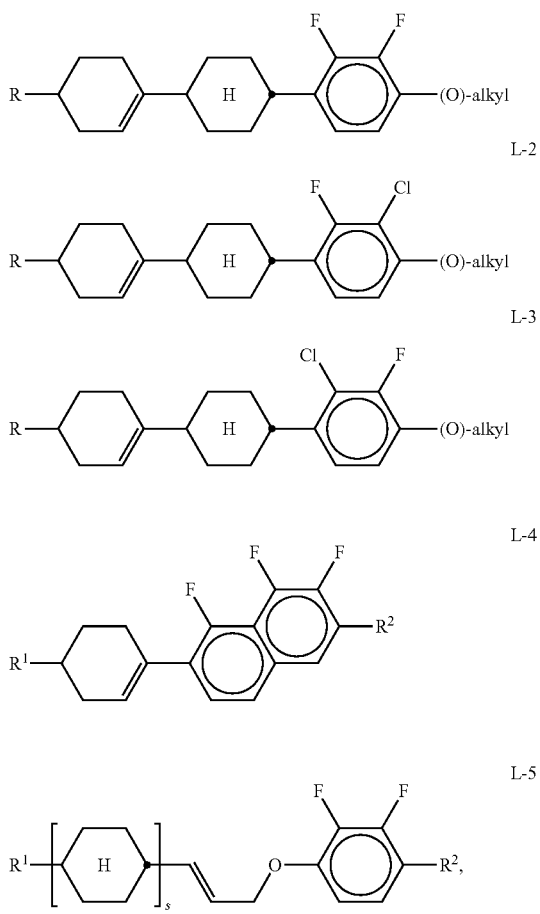

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5 to 30% by weight and very particularly preferably 5 to 25% by weight.

m) Preferred mixtures additionally comprise one or more compounds of the formulae L-1 to L-11, in which R and $R^1$ and $R^2$ each, independently of one another, have the meanings indicated for $R^{2,4}$ in formula IIA above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

Preferably, the media according to the invention, comprise a stabilizer selected from the group of compounds of the formulae ST-1 to ST-18.

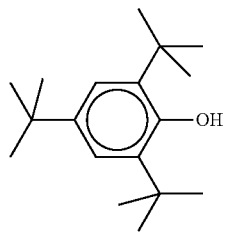

ST-1

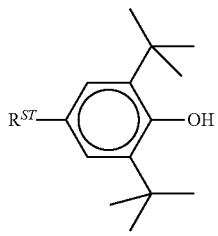

ST-2

-continued
ST-3
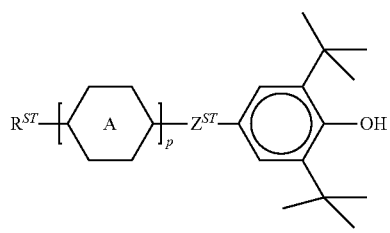
ST-4
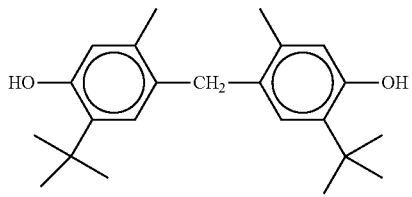
ST-5
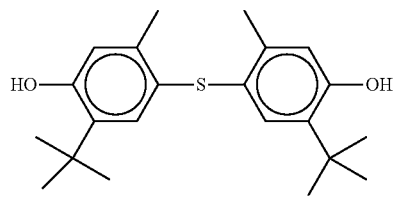
ST-6
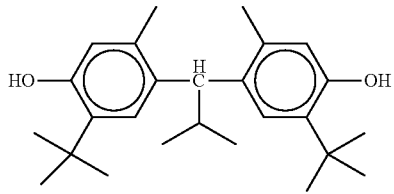
ST-7
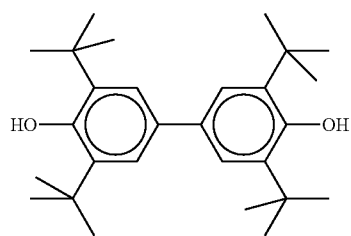
ST-8
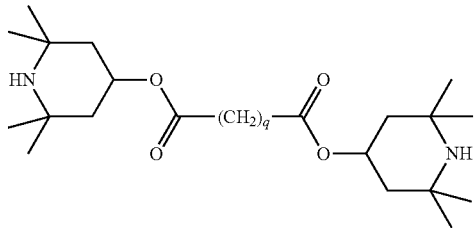
ST-9
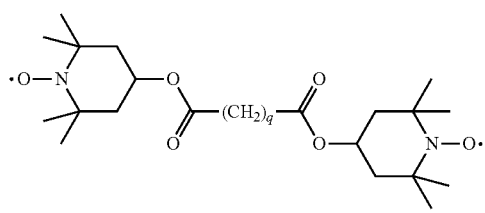
ST-10
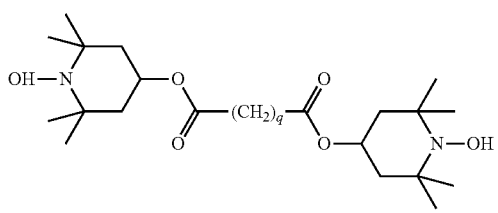
ST-11
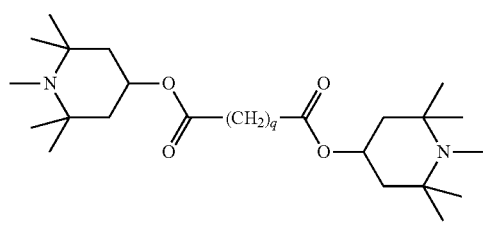
ST-12
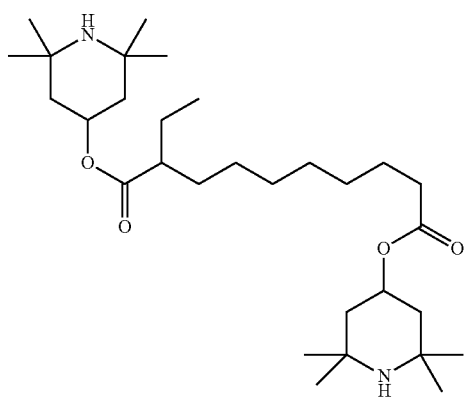
ST-13
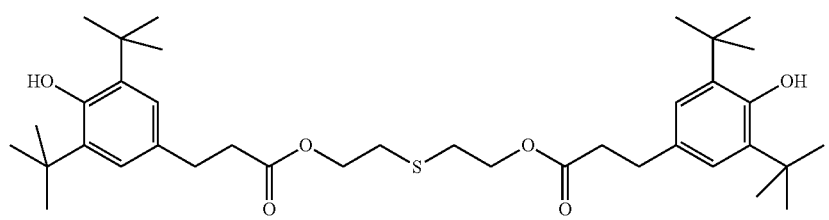

-continued

ST-14
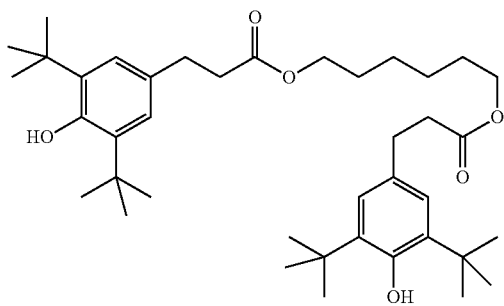

ST-15
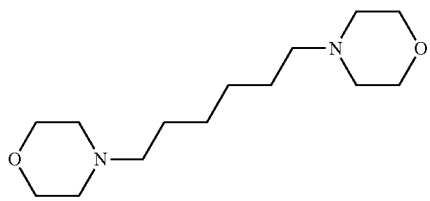

ST-16
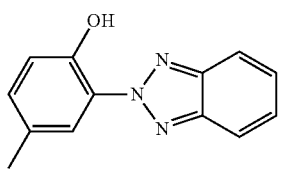

ST-17
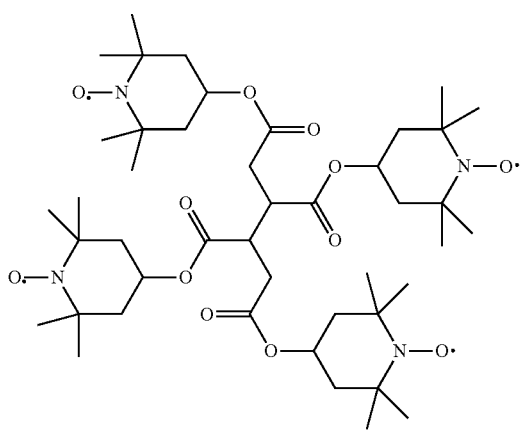

ST-18
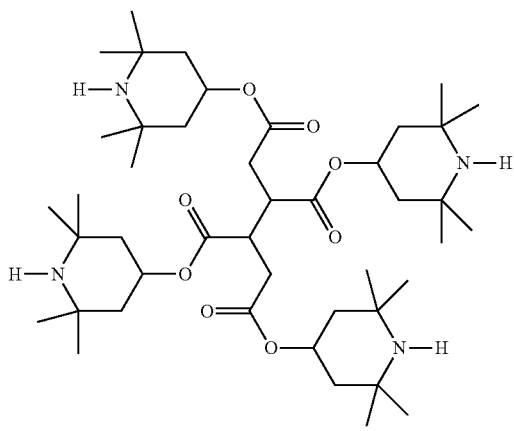

in which $R^{ST}$ denotes H, an alkyl or alkoxy radical having 1 to 15 C atoms, where, in addition, one or more CH$_2$ groups in these radicals may each be replaced, independently of one another, by —C≡C—, —CF$_2$O—, —OCF$_2$—, —CH═CH—, —O—CO—O—, —O—CO— in such a way that O atoms are not linked directly to one another, and in which, in addition, one or more H atoms may be replaced by halogen,

 denotes

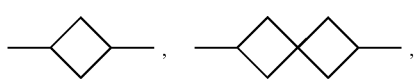

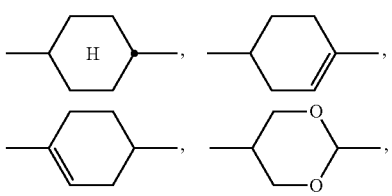

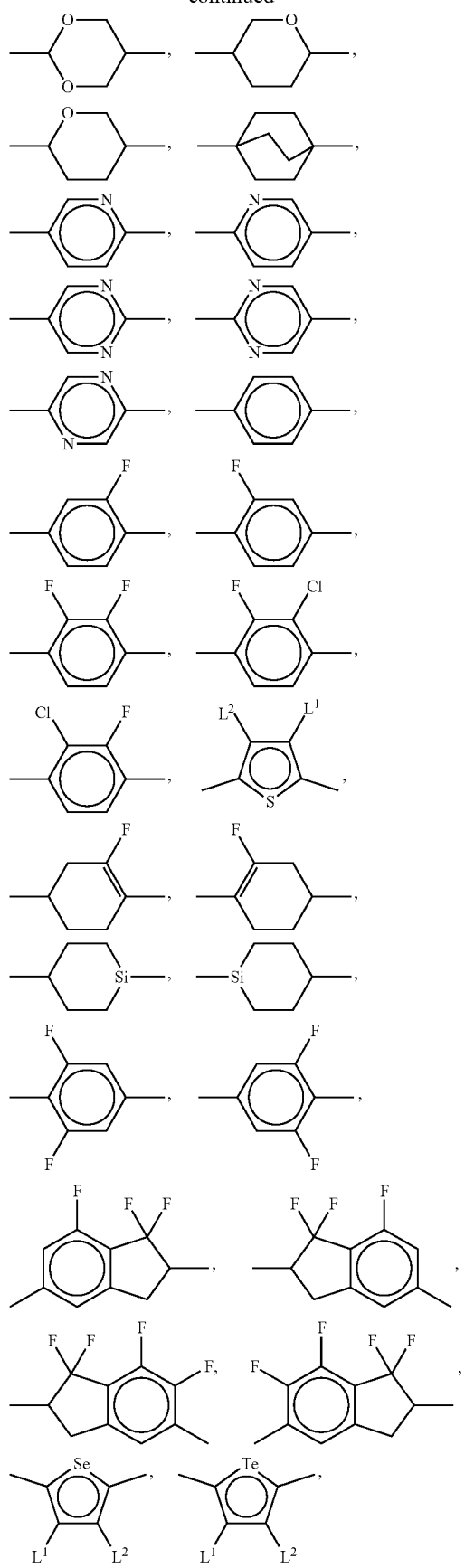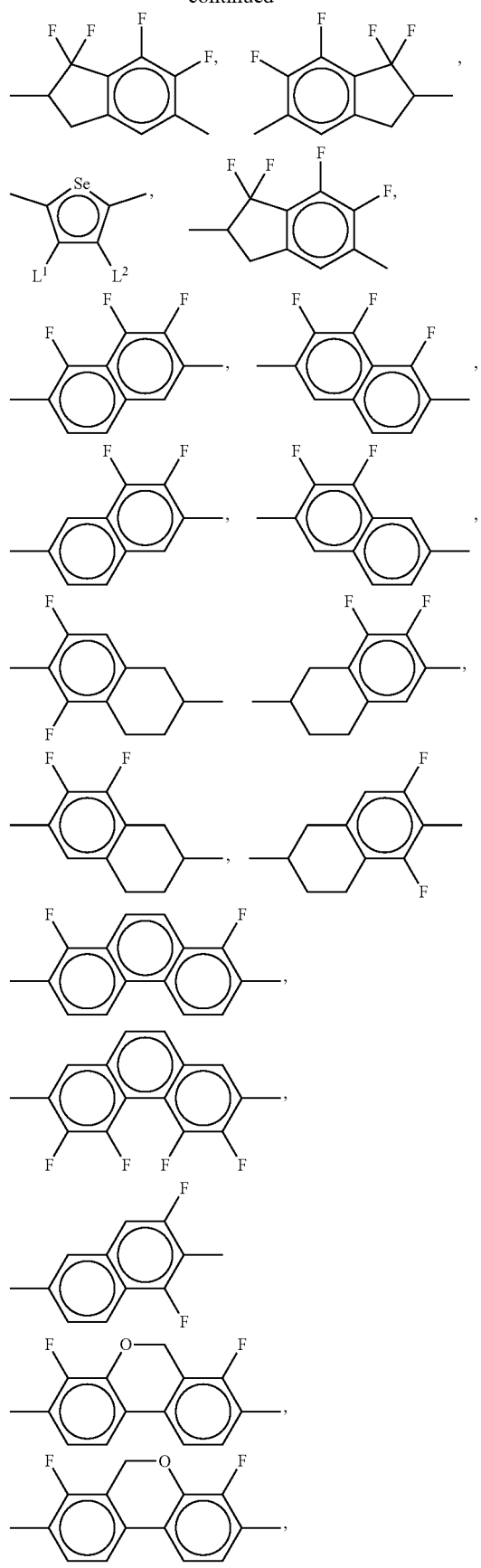

-continued

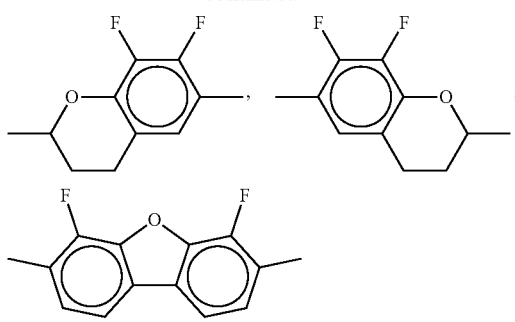

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, $L^1$ and $L^2$ each, independently of one another, denote F, Cl, CF$_3$ or CHF$_2$, p denotes 1 or 2, q denotes 1, 2, 3, 4, 5, 6, 7, 8, 9 or 10.

Of the compounds of the formula ST, special preference is given to the compounds of the formulae St-1

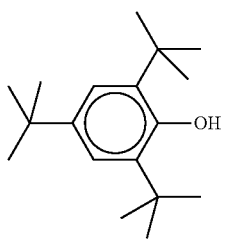

St-2a

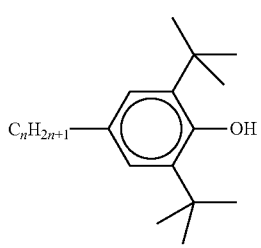

where n=1, 2, 3, 4, 5, 6 or 7, preferably n=1 or 7

St-3a

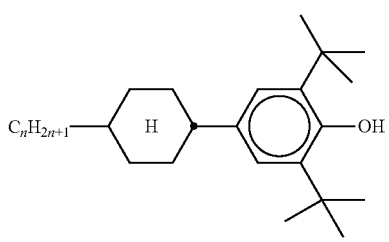

where n=1, 2, 3, 4, 5, 6 or 7, preferably n=3

ST-3b

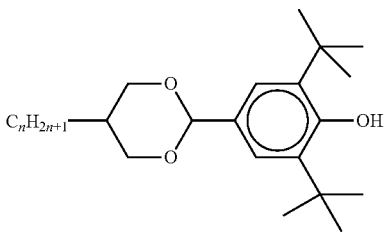

where n=1, 2, 3, 4, 5, 6 or 7, preferably n=3

ST-8-1

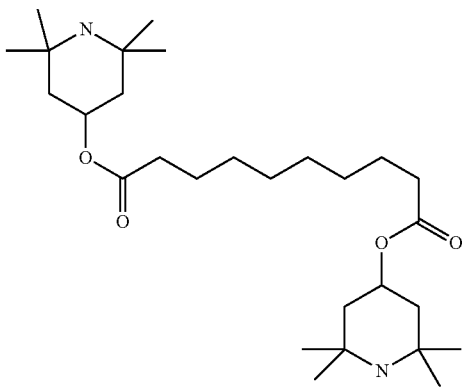

ST-9-1

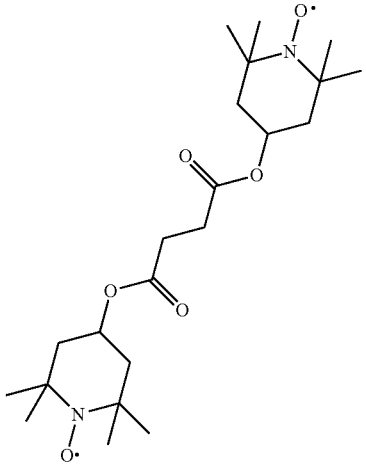

ST-12

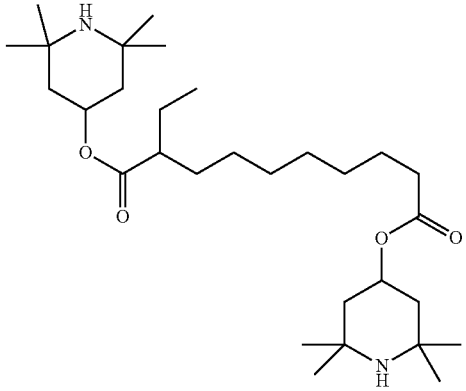

ST-16
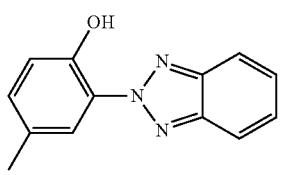
ST-17
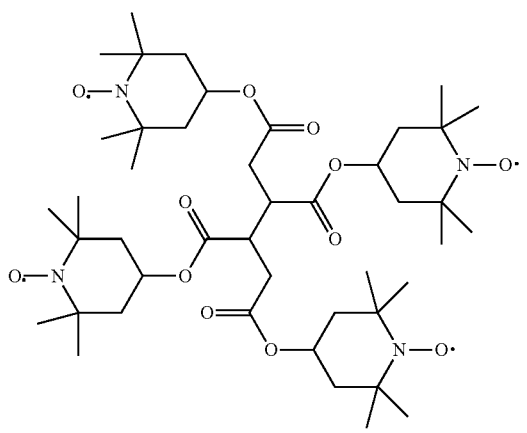
ST-18
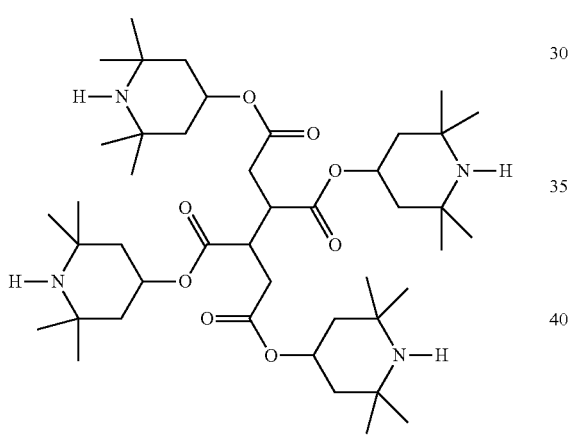
In the compounds of the formulae ST-3a and ST-3b, n preferably denotes 3. In the compounds of the formula ST-2a, n preferably denotes 7.
Very particularly preferred mixtures according to the invention comprise one or more stabilisers from the group of the compounds of the formulae ST-2a-1, ST-3a-1, ST-3b-1, ST-8-1, ST-9-1 and ST-12:
ST-2a-1
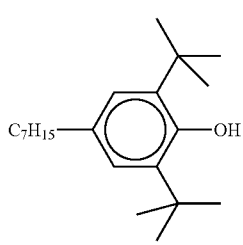
ST-3a-1
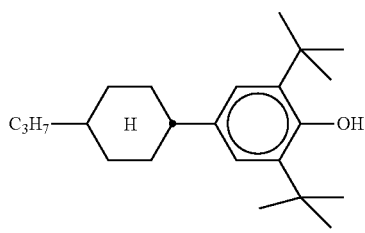
ST-3b-1
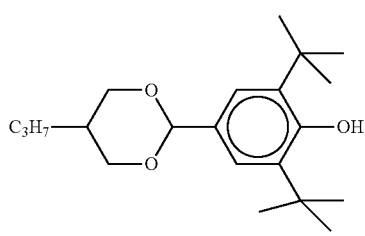
ST-8-1
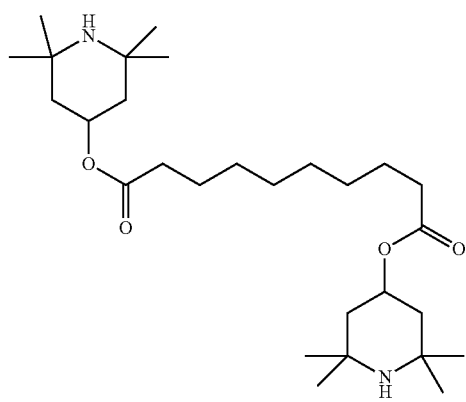
ST-9-1
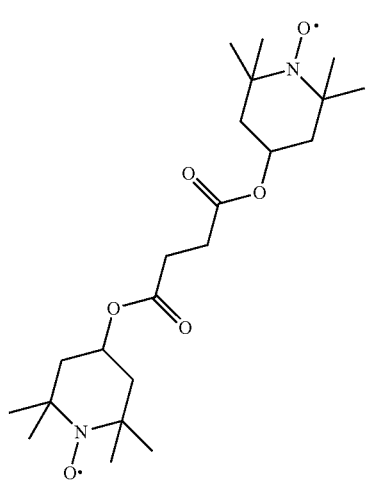

-continued

ST-12

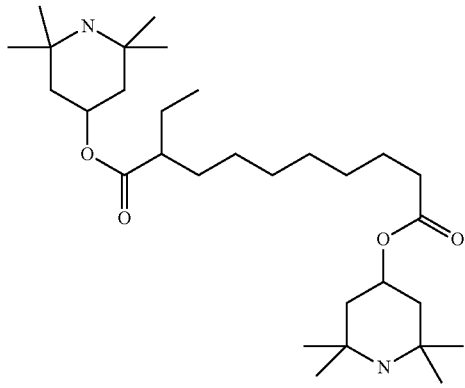

The compounds of the formulae ST-1 to ST-18 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

Particularly preferred mixture concepts are indicated below: (the acronyms used are explained in Table A. n and m here each, independently of one another, denote 1 to 15, preferably 1 to 6).

The mixtures according to the invention preferably comprise
one or more compounds of formula IA selected from COB(S)-2-O2, COB(S)-2-O4 and COB(S)-4-O4, preferably in a total concentration in the range of from 1% to 25%, more preferably from 5% to 15% and particularly preferably from 7% to 10%;
and/or
one or more compounds of formula IA and IIA and IIC, preferably in a total concentration in the range of from 25% to 65%, more preferably from 30% to 55%, particularly preferably from 40% to 50%;
and/or
one or more compounds of formula IA and IIA and IID-4 and IIC, preferably in a total concentration in the range of from 40% to 85%, more preferably from 50% to 70%, particularly preferably from 55% to 65%;
and/or
one or more compounds of formula IA and IIB and IIC, preferably in a total concentration in the range of from 15% to 45%, more preferably from 20% to 40%, particularly preferably from 25% to 35%;
and/or
one or more compounds of formula IA and IIB and IIC and IID-4, preferably in a total concentration in the range of from 30% to 60%, more preferably from 35% to 55%, particularly preferably from 40% to 50%;
and/or
one or more compounds of formula IA and of formula IC, preferably in a total concentration in the range of from 10% to 20%, particularly preferably from 12% to 18%;
and/or
one or more compounds of formula IA and IC and IIA, preferably in a total concentration in the range of from 20% to 60%, preferably from 40% to 50%; and/or
one or more compounds CY-n-Om, in particular CY-3-O4, CY-5-O4 and/or CY-3-O2, preferably in a total concentration in the range of from 5% to 20%, preferably 10% to 17%;
and/or
CPY-n-Om, in particular CPY-2-O2, CPY-3-O2 and/or CPY-5-O2, preferably in concentrations >5%, in particular 10 to 30%, based on the mixture as a whole,
and/or
one or more compounds CCY-n-Om, preferably CCY-4-O2, CCY-3-O2, CCY-3-O3, CCY-3-O1 and/or CCY-5-O2, preferably in concentrations >5%, in particular 10 to 30%, based on the mixture as a whole;
and/or
CLY-n-Om, preferably CLY-2-O4, CLY-3-O2 and/or CLY-3-O3, preferably in concentrations >5%, in particular 10 to 30%, very preferably 15 to 20%, based on the mixture as a whole;
Preference is furthermore given to mixtures according to the invention which comprise:
(n and m each, independently of one another, denote 1 to 6.)
one or more compounds of the formula IB in which $L^{11}=L^{12}=F$, $R^1$=alkyl and $R^{1*}$=alkoxy;
the compounds of formula IB, preferably of formulae IB-1 to IB-3, i.e. of formulae IB-O-1 to IB-O-3 and/or IB-S-1 to IB-S-3, especially LB-3-O4 and/or LB(S)-4-O3 in a concentration in the range of from 1 to 20%, more preferably from 2 to 15%, particularly preferably from 3 to 12% by weight and very particularly preferably from 4 to 11% by weight
CPY-n-Om and CY-n-Om, preferably in concentrations of 10 to 80%, based on the mixture as a whole,
and/or
CPY-n-Om and PY-n-Om, preferably CPY-2-O2 and/or CPY-3-O2 and PY-3-O2, preferably in concentrations of 10 to 45%, based on the mixture as a whole,
and/or
CPY-n-Om and CLY-n-Om, preferably in concentrations of 10 to 80%, based on the mixture as a whole,
and/or
CCVC-n-V, preferably CCVC-3-V, preferably in concentrations of 2 to 10%, based on the mixture as a whole,
and/or
CC-V-V, preferably in concentrations of 5 to 50%, based on the mixture as a whole.

In a particularly preferred embodiment of the present invention the medium comprises one or more compounds of formula B-nO-Om and/or B(S)-nO-Om, in particular the compound B(S)-2O-O5, preferably in a concentration in the range of from 2 to 8%, and the compound CC-3-V in a concentration in the range of from 25 to 40% and optionally the compound CC-3-V1 in a concentration in the range of from 1 to 10%, preferably 2 to 5%.

The invention furthermore relates to an electro-optical display having active-matrix addressing, characterised in that it contains, as dielectric, a liquid-crystalline medium containing one or more compounds of formula IA and wherein the display is a VA, SA-VA, IPS, U-IPS, FFS, UB-FFS, SA-FFS, PS-VA, PS-OCB, PS-IPS, PS-FFS, PS-UB-FFS, PS-posi-VA, PS-TN, polymer stabilised SA-VA or polymer stabilised SA-FFS display.

It is advantageous for the liquid-crystalline medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention has a clearing temperature of 80° C. or more, preferably of 85° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 mm$^2$·s$^{-1}$ at 20° C.

The values of the birefringence Δn in the liquid-crystal mixture are generally between 0.07 and 0.16, preferably between 0.08 and 0.13, very preferably between 0.09 and 0.12.

In a preferred embodiment of the present invention, the medium has a birefringence in the range of from 0.100 to 0.115, preferably from 0.105 to 0.112.

In another preferred embodiment, the medium according to the invention has a birefringence of 0.100 or less, in the range of from 0.070 to 0.098, preferably from 0.085 to 0.095.

The liquid-crystal mixture according to the invention has a Δε of −0.5 to −8.0, in particular −2.5 to −6.0, where Δε denotes the dielectric anisotropy. The rotational viscosity $\gamma_1$ at 20° C. is preferably ≤150 mPa·s, in particular ≤120 mPa·s.

In a preferred embodiment, the rotational viscosity $\gamma_1$ at 20° C. is ≤100 mPa·s, in particular ≤95 mPa·s.

The liquid-crystal media according to the invention have relatively low values for the threshold voltage ($V_0$). They are preferably in the range from 1.7 V to 3.0 V, particularly preferably ≤2.5 V and very particularly preferably ≤2.3 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a liquid-crystalline host and determining the capacitance of the resultant mixture in at least one test cell in each case having a layer thickness of 20 µm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA). They are furthermore suitable for IPS (in-plane switching) and FFS (fringe field switching) applications having negative Δε.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≤−0.5. Besides one or more compounds of the formula I, it preferably comprises the compounds of the formulae IIA, IIB and/or IIC, furthermore one or more compounds of the formula O-17.

The proportion of component A is preferably between 45 and 100%, in particular between 60 and 100%.

For component A, one (or more) individual compound(s) which has (have) a value of Δε≤−0.8 is (are) preferably selected. This value must be more negative, the smaller the proportion A in the mixture as a whole.

Component B has pronounced nematogeneity and a flow viscosity of not greater than 30 mm$^2$·s$^{-1}$, preferably not greater than 25 mm$^2$·s$^{-1}$, at 20° C.

A multiplicity of suitable materials is known to the person skilled in the art from the literature. Particular preference is given to compounds of the formula O-17.

Particularly preferred individual compounds in component B are extremely low-viscosity nematic liquid crystals having a flow viscosity of not greater than 18 mm$^2$·s$^{-1}$, preferably not greater than 12 mm$^2$·s$^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of ≤20% by weight, based on the mixture as a whole.

Besides one or more compounds of the formula I, the phases preferably comprise 4 to 15, in particular 5 to 12, and particularly preferably <10, compounds of the formulae IIA, IIB and/or IIC and optionally one or more compounds of the formula O-17.

Besides compounds of the formula IB and the compounds of the formulae IIA, IIB and/or IIC and optionally O-17, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenyl-cyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula IV $$R^{20}\text{-L-G-E-}R^{21} \quad \text{IV}$$

in which L and E each denote a carbo- or heterocyclic ring system from the group formed by 1,4-disubstituted benzene and cyclohexane rings, 4,4'-disubstituted biphenyl, phenyl-cyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline, G denotes —CH=CH— —N(O)=N—
—CH=CQ- —CH=N(O)—
—C≡C— —CH$_2$—CH$_2$—
—CO—O— —CH$_2$—O—
—CO—S— —CH$_2$—S—
—CH=N— —COO-Phe-COO—
—CF$_2$O— —CF=CF—
—OCF$_2$— —OCH$_2$—
—(CH$_2$)$_4$— —(CH$_2$)$_3$O— or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The compounds of formula P are optionally added to the mixtures according to the invention in concentrations of preferably 0.01 to 5% by weight, particularly preferably 0.2 to 2% by weight, based on the mixture. These mixtures may optionally also comprise an initiator, as described, for example, in U.S. Pat. No. 6,781,665. The initiator, for example Irganox-1076 from BASF, is preferably added to the mixture comprising polymerisable compounds in amounts of 0 to 1%. Mixtures of this type can be used for so-called polymer-stabilised VA modes (PS-VA) or PSA (polymer sustained VA), in which polymerisation of the reactive mesogens is intended to take place in the liquid-crystalline mixture after filling of a display panel. The prerequisite for this is that the liquid-crystalline compounds of the LC host do not react under the polymerisation conditions of the reactive mesogens, i.e. generally on exposure to UV in the wavelength range from 320 to 360 nm. Liquid-crystalline compounds containing an alkenyl side chain, such as, for example, CC-3-V, exhibit no reaction under the polymerisation conditions (UV polymerisation) for the RMs, hence, herein, such compounds are not to be considered as RMs.

Preferred compounds or formula P are selected from the following formulae:

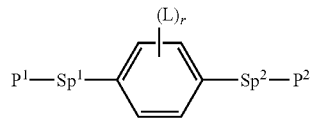
P-1

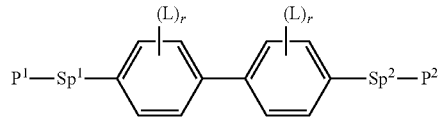
P-2

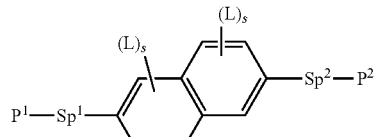
P-3

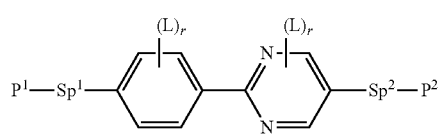
P-4

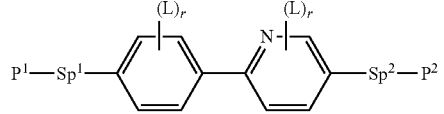
P-5

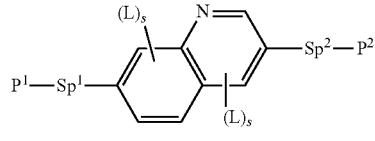
P-6

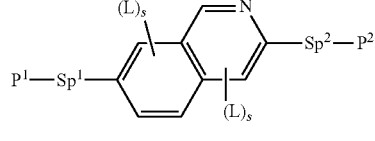
P-7

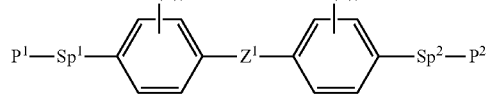
P-8

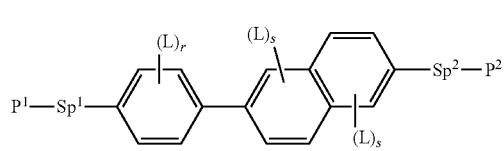
P-9

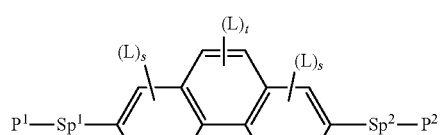
P-10

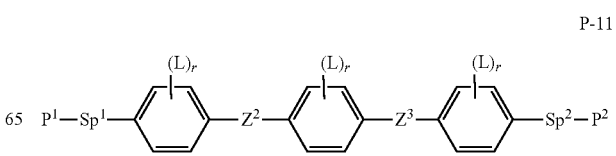
P-11

P-12 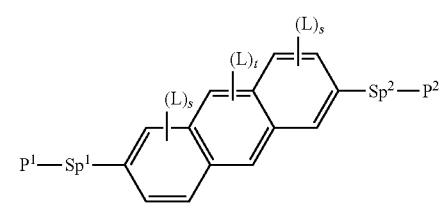
P-13 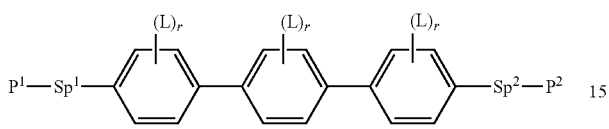
P-14 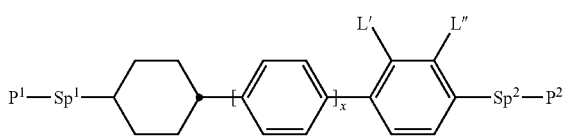
P-15 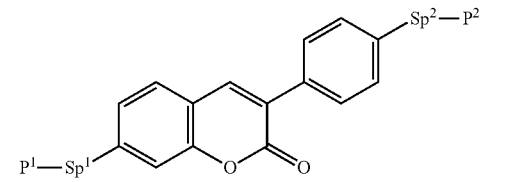
P-16 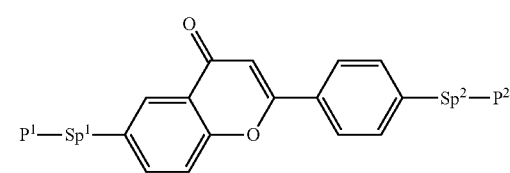
P-17 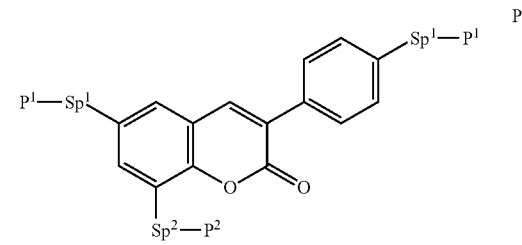
P-18 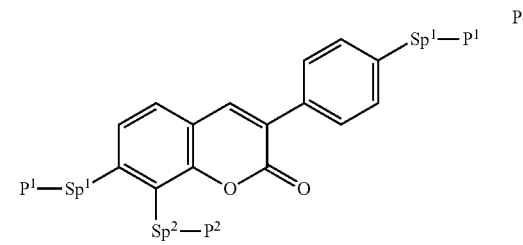
P-19 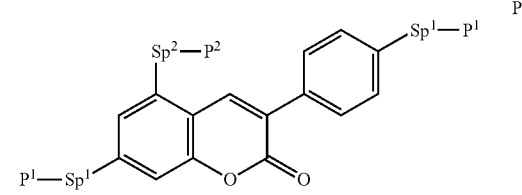
P-20 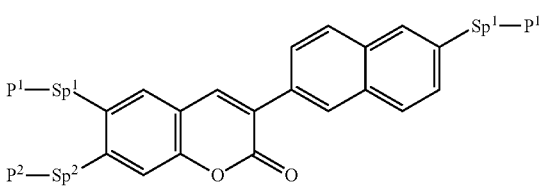
P-21 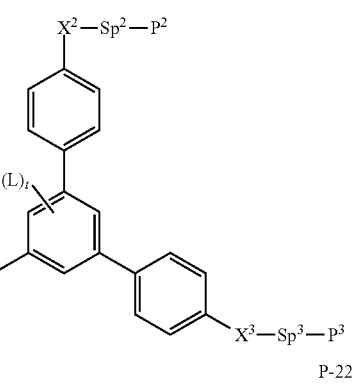
P-22 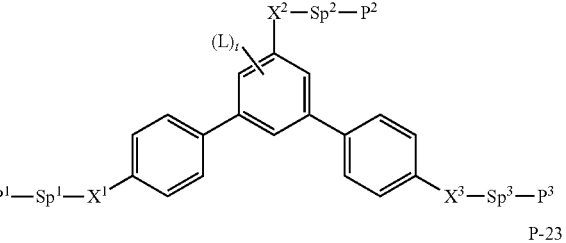
P-23 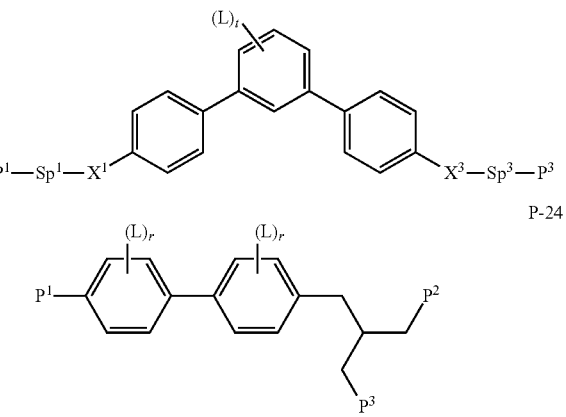
P-24 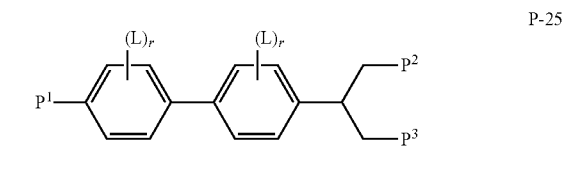
P-25 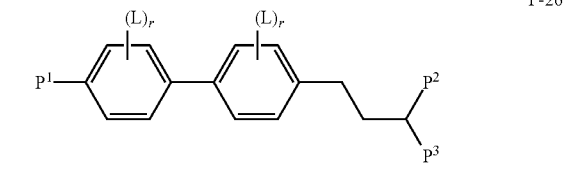
P-26

-continued

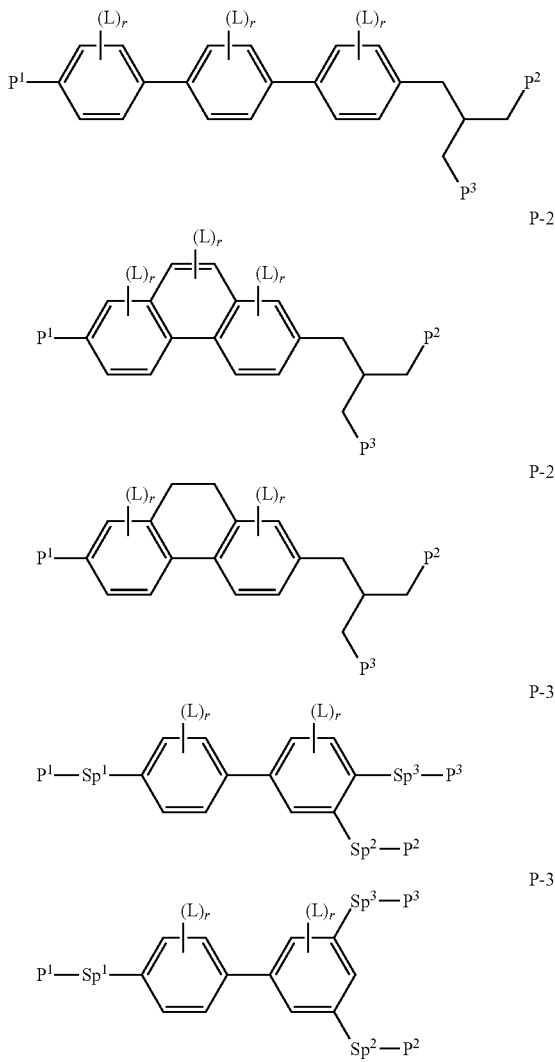

in which the individual radicals have the following meanings:
P¹, P² and P³ each, independently of one another, denote an acrylate or methacrylate group,
Sp¹, Sp² and Sp³ each, independently of one another, denote a single bond or a spacer group having one of the meanings indicated above and below for Sp, and particularly preferably denote —(CH$_2$)$_{p1}$—, —(CH$_2$)$_{p1}$—O—, —(CH$_2$)$_{p1}$—CO—O—, —(CH$_2$)$_{p1}$—O—CO— or —(CH$_2$)$_{p1}$—O—CO—O—, in which p1 is an integer from 1 to 12, where, in addition, one or more of the radicals P¹-Sp¹-, P¹—Sp²- and P³—Sp³- may denote $R^{aa}$, with the proviso that at least one of the radicals P¹-Sp¹-, P²—Sp² and P³—Sp³- present is different from $R^{aa}$,
$R^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹—Sp¹-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms),
R$^0$, R$^{00}$ each, independently of one another and identically or differently on each occurrence, denote H or alkyl having 1 to 12 C atoms,
$R^y$ and $R^z$ each, independently of one another, denote H, F, CH$_3$ or CF$_3$,
X¹, X² and X³ each, independently of one another, denote —CO—O—, —O—CO— or a single bond,
Z¹ denotes —O—, —CO—, —C(R$^y$R$^z$)— or —CF$_2$CF$_2$—,
Z² and Z³ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4,
L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F,
L' and L" each, independently of one another, denote H, F or Cl,
r denotes 0, 1, 2, 3 or 4,
s denotes 0, 1, 2 or 3,
t denotes 0, 1 or 2,
x denotes 0 or 1.

Especially preferred compounds of formula P are compounds of formulae P-2, P-13, P-17, P-22, P-23, P-24 and P-30.

Further preferred are trireactive compounds P-17 to P-31, in particular P-17, P-18, P-19, P-22, P-23, P-24, P-25, P-26, P-30 and P-31.

In the compounds of formulae P-1 to P-31 the group

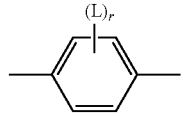

is preferably

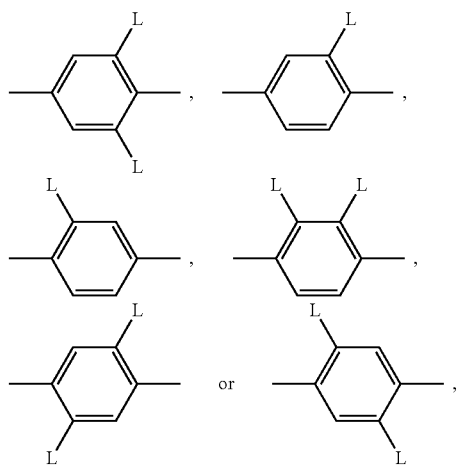

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP-A 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

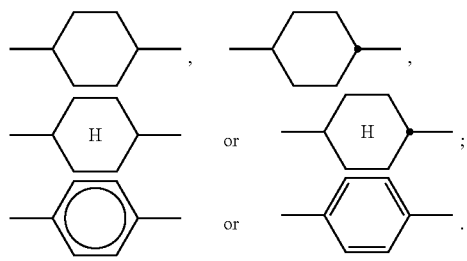

The cyclohexylene rings are trans-1,4-cyclohexylene rings, unless explicitly mentioned otherwise.

Throughout the patent application and in the working examples, the structures of the liquid-crystal compounds are indicated by means of acronyms. Unless indicated otherwise, the transformation into chemical formulae is carried out in accordance with Tables 1 to 3. All radicals $C_nH_{2n+1}$, $C_mH_{2m+1}$ and $C_mH_{2m'+1}$ or $C_nH_{2n}$ and $C_mH_{2m}$ are straight-chain alkyl radicals or alkylene radicals respectively in each case having n, m, m' or z C atoms respectively. n, m, m', z each denote, independently of one another, 1, 2, 3, 4, 5, 6, 7, 8, 9, 10, 11 or 12, preferably 1, 2, 3, 4, 5 or 6. In Table 1 the ring elements of the respective compound are coded, in Table 2 the bridging members are listed and in Table 3 the meanings of the symbols for the left-hand or right-hand side chains of the compounds are indicated.

TABLE 1

Ring elements

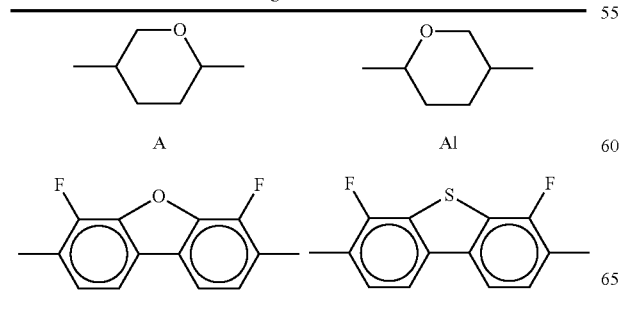

TABLE 1-continued

Ring elements

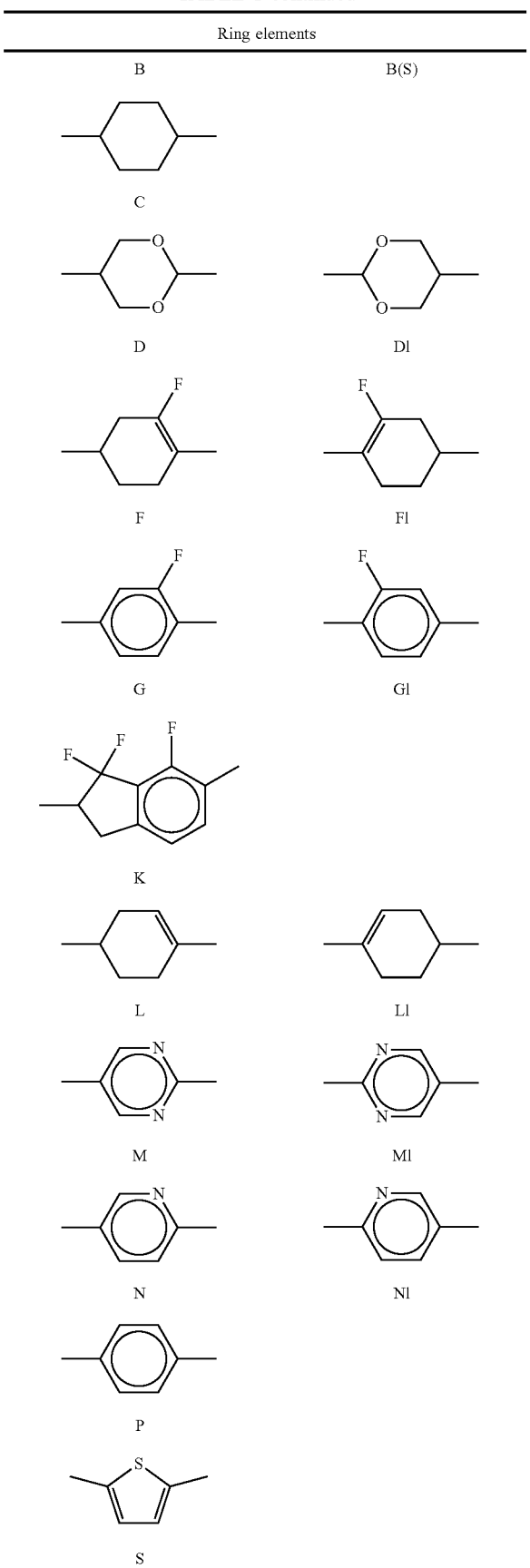

TABLE 1-continued

| Ring elements | |
|---|---|
| (F,F-disubstituted benzene ring) U | (F,F-disubstituted benzene ring) U1 |
| (F,F-disubstituted benzene ring) Y | |
| (F,Cl-disubstituted benzene ring) Y(F, Cl) | (Cl,F-disubstituted benzene ring) Y(Cl, F) |

TABLE 2

| Bridging members | | | |
|---|---|---|---|
| E | —$CH_2CH_2$— | | |
| V | —CH=CH— | | |
| T | —C≡C— | | |
| W | —$CF_2CF_2$— | | |
| Z | —COO— | ZI | —OCO— |
| O | —$CH_2O$— | OI | —$OCH_2$— |
| Q | —$CF_2O$— | QI | —$OCF_2$— |

TABLE 3

| Side chains | | | |
|---|---|---|---|
| Left-hand side chain | | Right-hand side chain | |
| n- | $C_nH_{2n+1}$— | -n | —$C_nH_{2n+1}$ |
| nO- | $C_nH_{2n+1}$—O— | -On | —O—$C_nH_{2n+1}$ |
| V- | $CH_2$=CH— | -V | —CH=$CH_2$ |
| nV- | $C_nH_{2n+1}$—CH=CH— | -nV | —$C_nH_{2n}$—CH=$CH_2$ |
| Vn- | $CH_2$=CH—$C_nH_{2n}$— | -Vn | —CH=CH—$C_nH_{2n+1}$ |
| nVm- | $C_nH_{2n+1}$—CH=CH—$C_mH_{2m}$— | -nVm | —$C_nH_{2n}$—CH=CH—$C_mH_{2m+1}$ |
| N- | N≡C— | -N | —C≡N |
| F- | F— | -F | —F |
| Cl- | Cl— | -Cl | —Cl |
| M- | $CFH_2$— | -M | —$CFH_2$ |
| D- | $CF_2H$— | -D | —$CF_2H$ |
| T- | $CF_3$— | -T | —$CF_3$ |
| MO- | $CFH_2O$— | -OM | —$OCFH_2$ |
| DO- | $CF_2HO$— | -OD | —$OCF_2H$ |
| TO- | $CF_3O$— | -OT | —$OCF_3$ |
| T- | $CF_3$— | -T | —$CF_3$ |
| A- | H—C≡C— | -A | —C≡C—H |

Besides one or more compounds of the formula I, the mixtures according to the invention preferably comprise one or more compounds of the compounds mentioned below from Table A.

TABLE A

The following abbreviations are used:

(n, m, m', z: each, independently of one another, 1, 2, 3, 4, 5 or 6;

(O)$C_mH_{2m+1}$ means $OC_mH_{2m+1}$ or $C_mH_{2m+1}$)

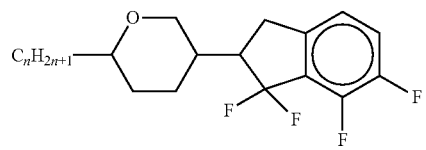

AlK-n-F

TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
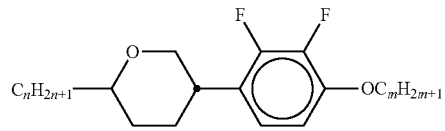
AlY-n-Om
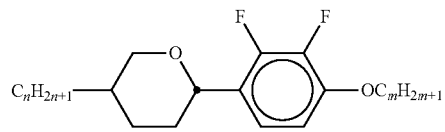
AY-n-OM
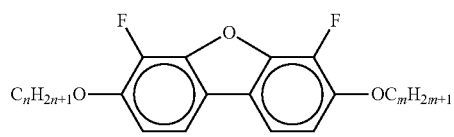
B-nO-Om
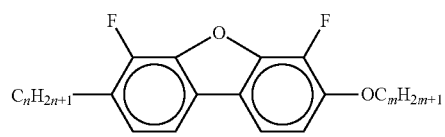
B-n-Om
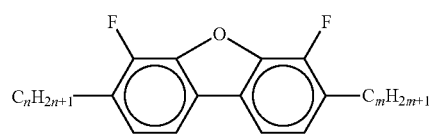
B-n-m
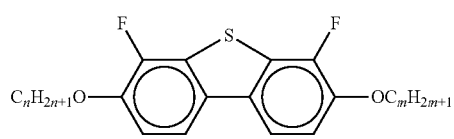
B(S)-nO-Om
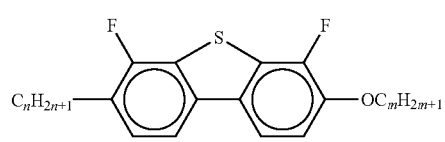
B(S)-n-Om
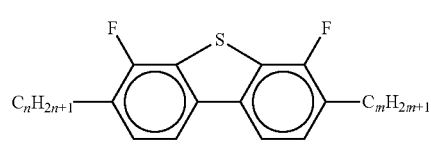
B(S)-n-m TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
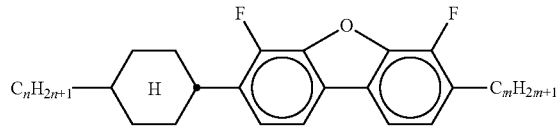
CB-n-m
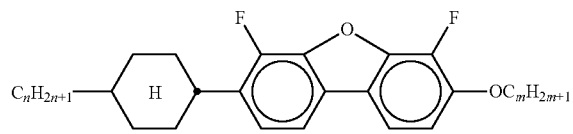
CB-n-Om
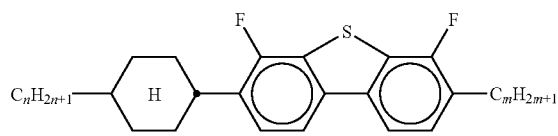
CB(S)-n-m
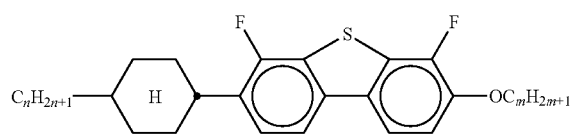
CB(S)-n-Om
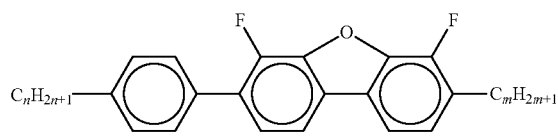
PB-n-m
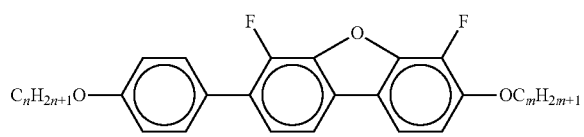
PB-nO-Om
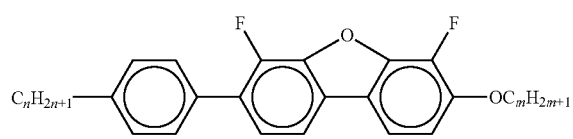
PB-n-Om
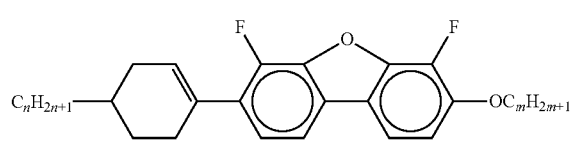
LB-n-Om TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
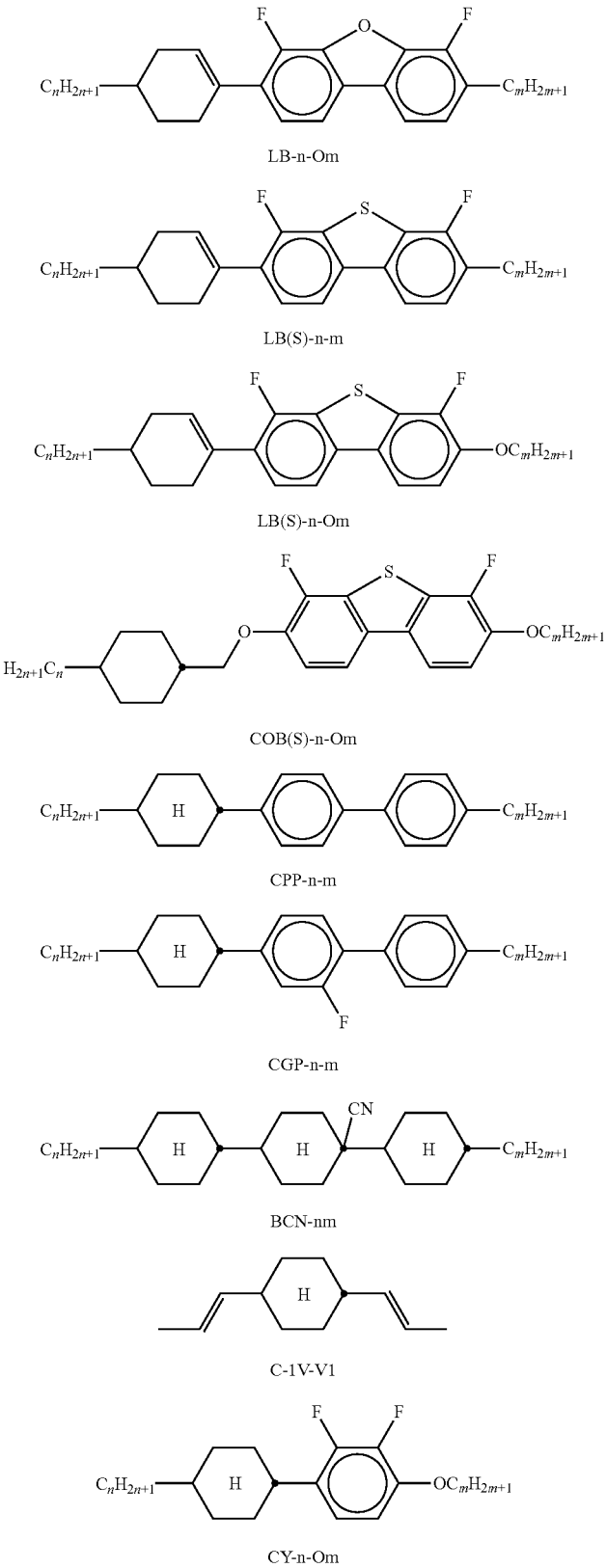

TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
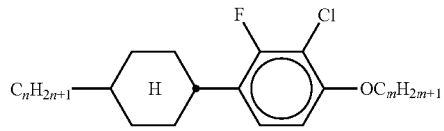
CY(F, Cl)-n-Om
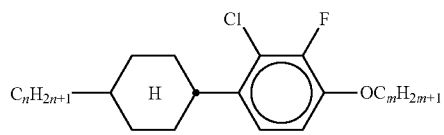
CY(Cl, F)-n-Om
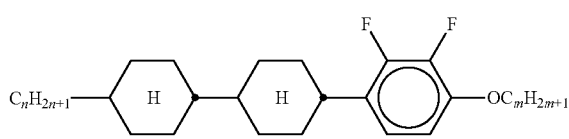
CCY-n-Om
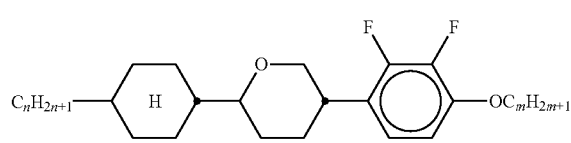
CAIY-n-Om
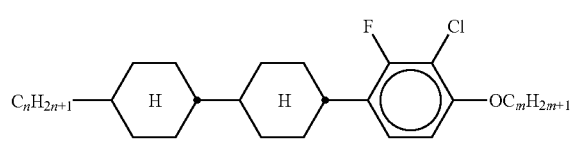
CCY(F, Cl)-n-Om
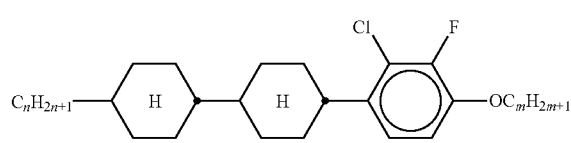
CCY(Cl, F)-n-Om
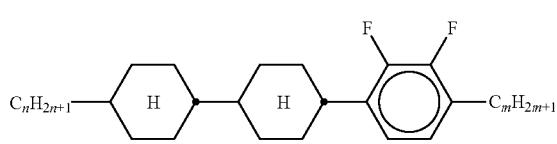
CCY-n-m
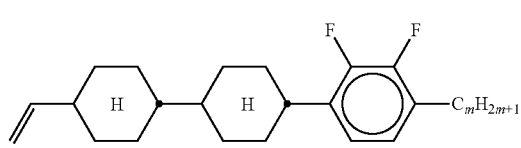
CCY-V-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
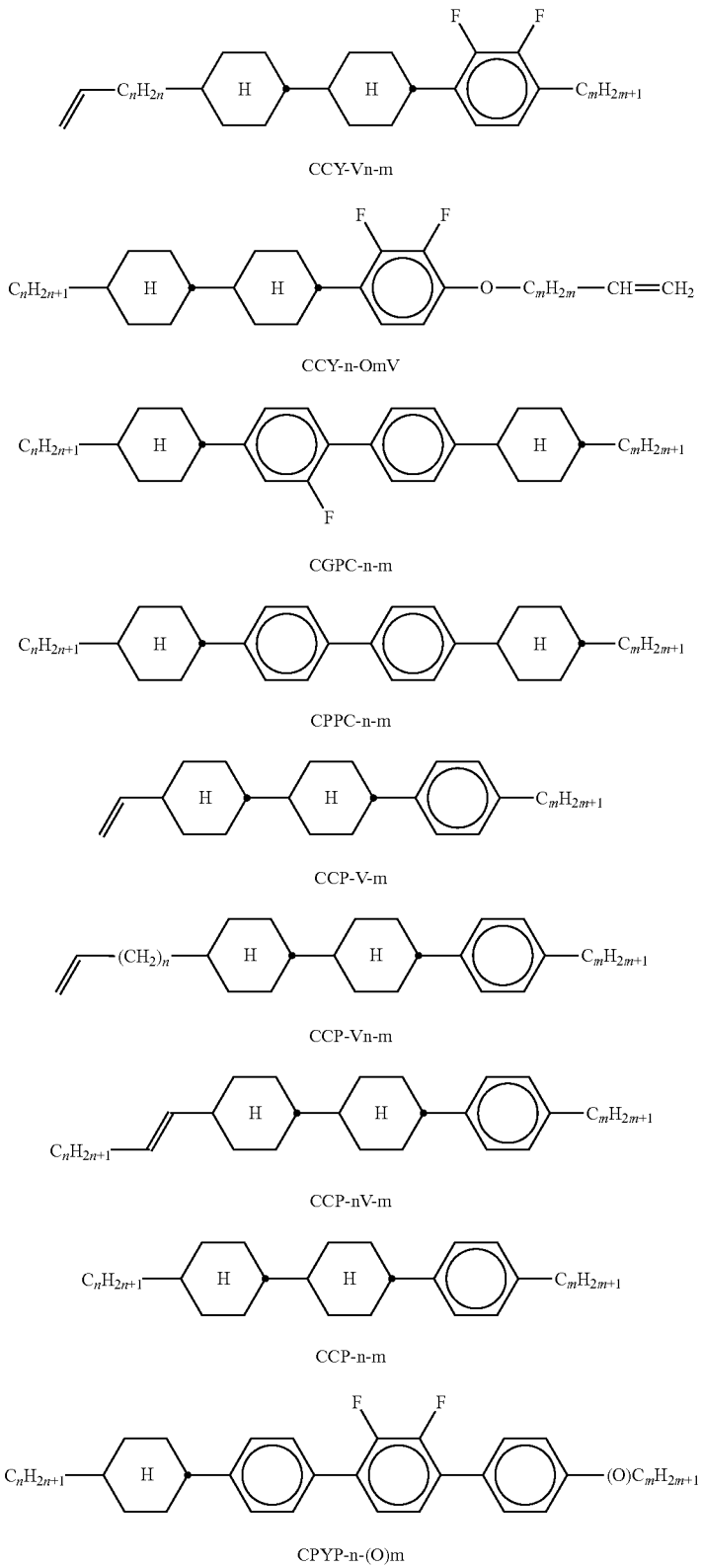

TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
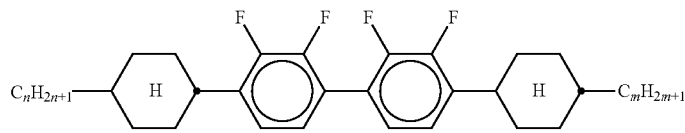
CYYC-n-m
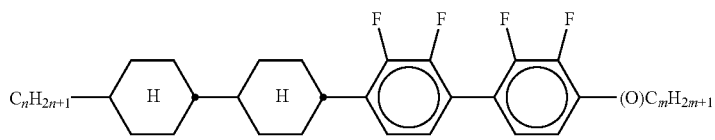
CCYY-n-(O)m
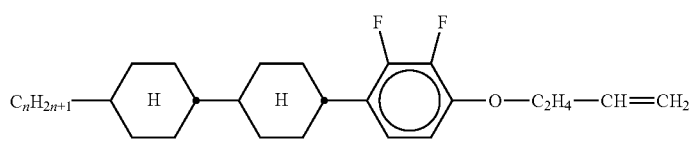
CCY-n-O2V
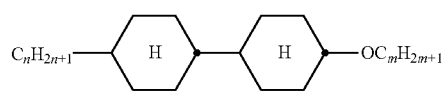
CCH-nOm
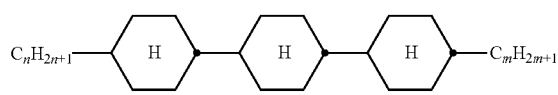
CCC-n-m
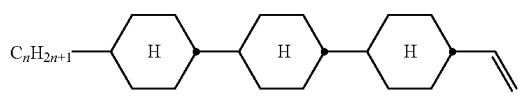
CCC-n-V
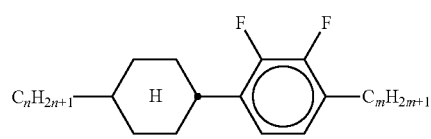
CY-n-m
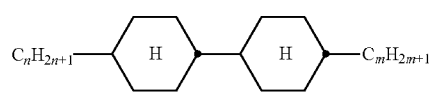
CC-n-m
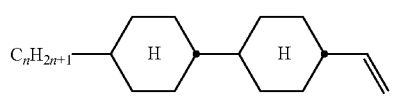
CC-n-V TABLE A-continued
The following abbreviations are used:
(n, m, m', z: each, independently of one another, 1, 2, 3, 4, 5 or 6;
(O)C$_m$H$_{2m+1}$ means OC$_m$H$_{2m+1}$ or C$_m$H$_{2m+1}$)
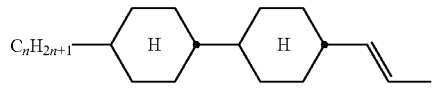
CC-n-V1
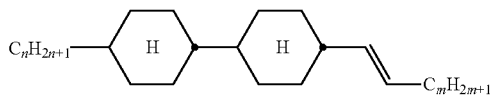
CC-n-Vm
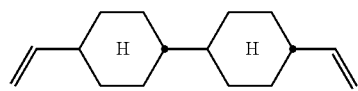
CC-V-V
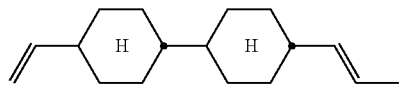
CC-V-V1
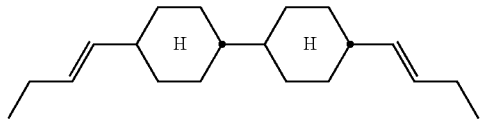
CC-2V-V2
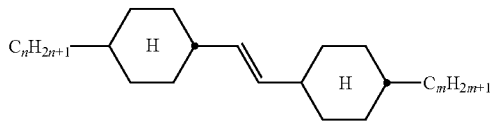
CVC-n-m
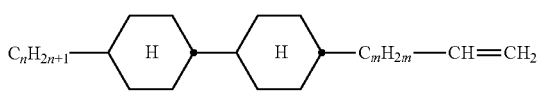
CC-n-mV
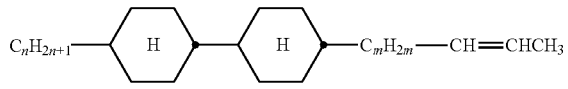
CC-n-mV1
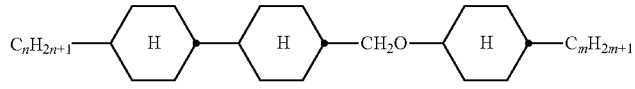
CCOC-n-m
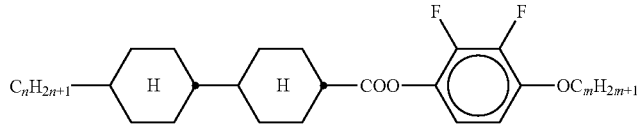
CP-nOmFF TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
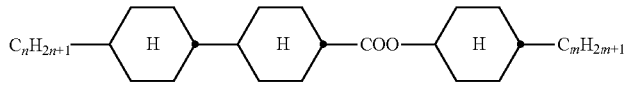
CCZC-n-m
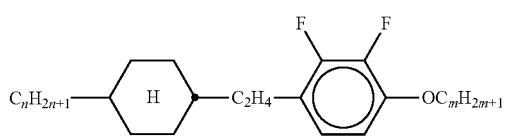
CEY-n-Om
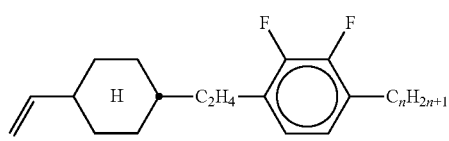
CEY-V-n
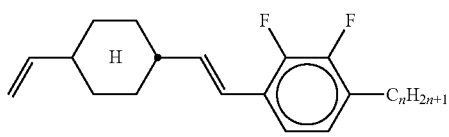
CVY-V-n
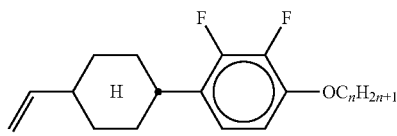
CY-V-On
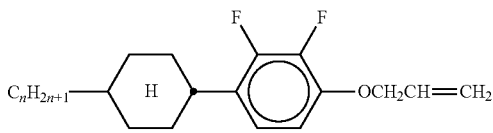
CY-n-O1V
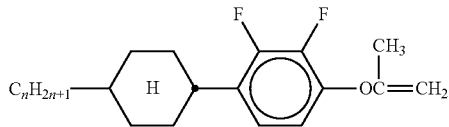
CY-n-OC(CH$_3$)=CH$_2$
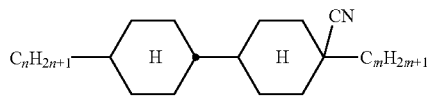
CCN-nm
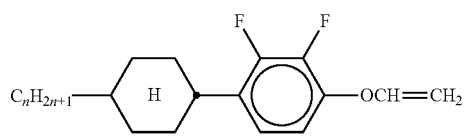
CY-n-OV TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
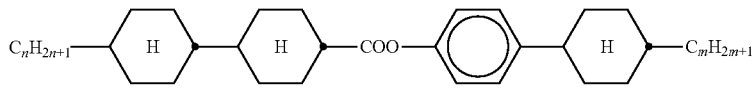
CCZPC-n-m
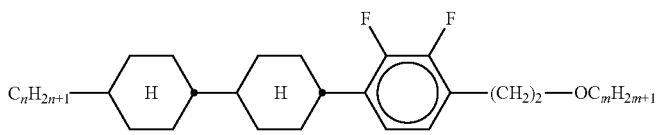
CCY-n-zOm
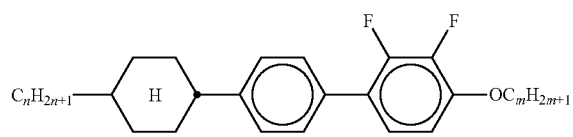
CPY-n-Om
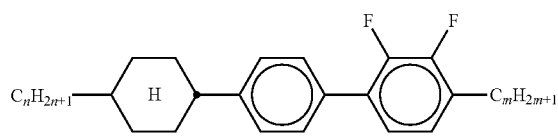
CPY-n-m
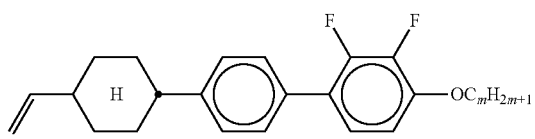
CPY-V-Om
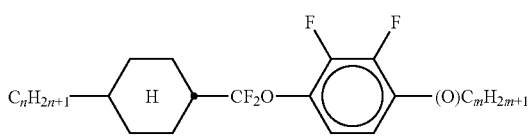
CQY-n(O)m
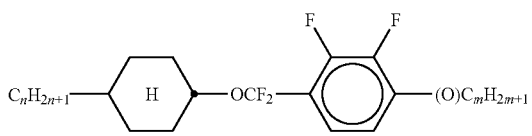
CQlY-n-(O)m
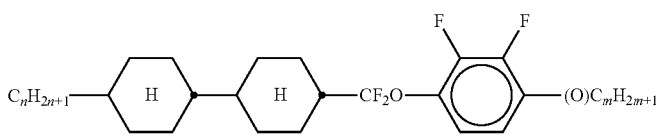
CCQY-n-(O)m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
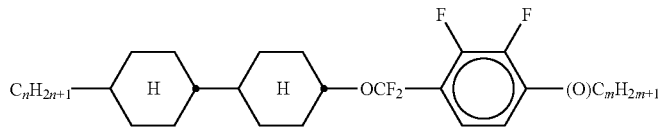
CCQIY-n-(O)m
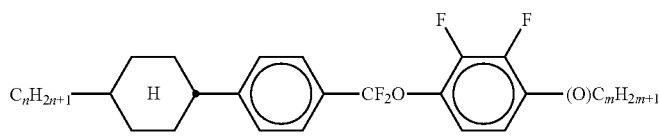
CPQY-n-(O)m
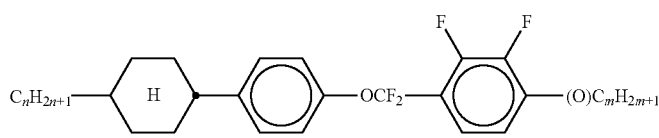
CPQIY-n-(O)m
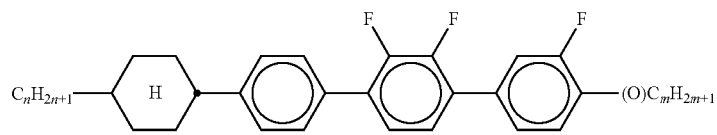
CPYG-n-(O)m
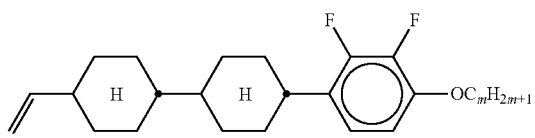
CCY-V-Om
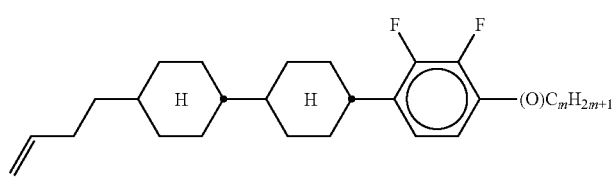
CCY-V2-(O)m
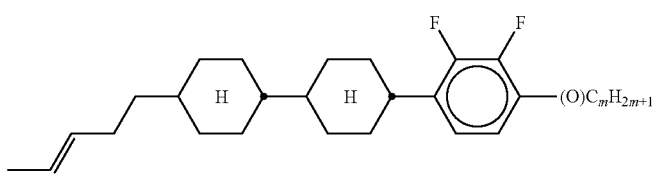
CCY-1V2-(O)m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
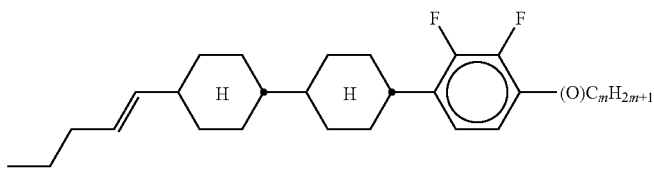
CCY-3V-(O)m
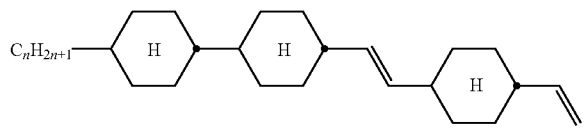
CCVC-n-V
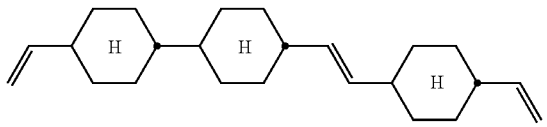
CCVC-V-V
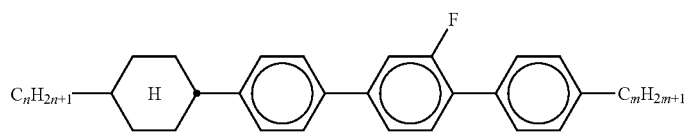
CPGP-n-m
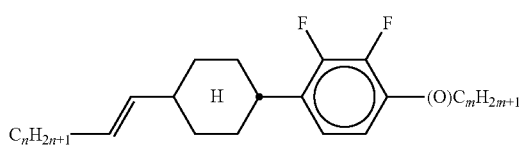
CY-nV-(O)m
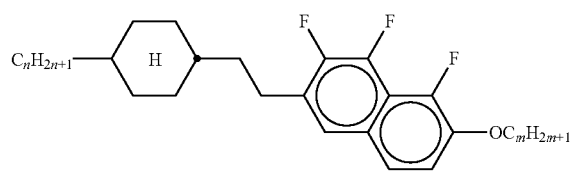
CENaph-n-Om
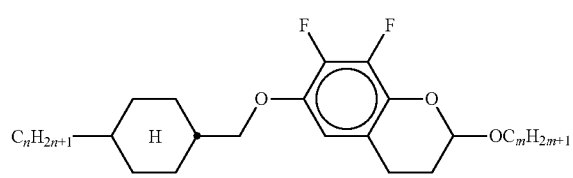
COChrom-n-Om TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
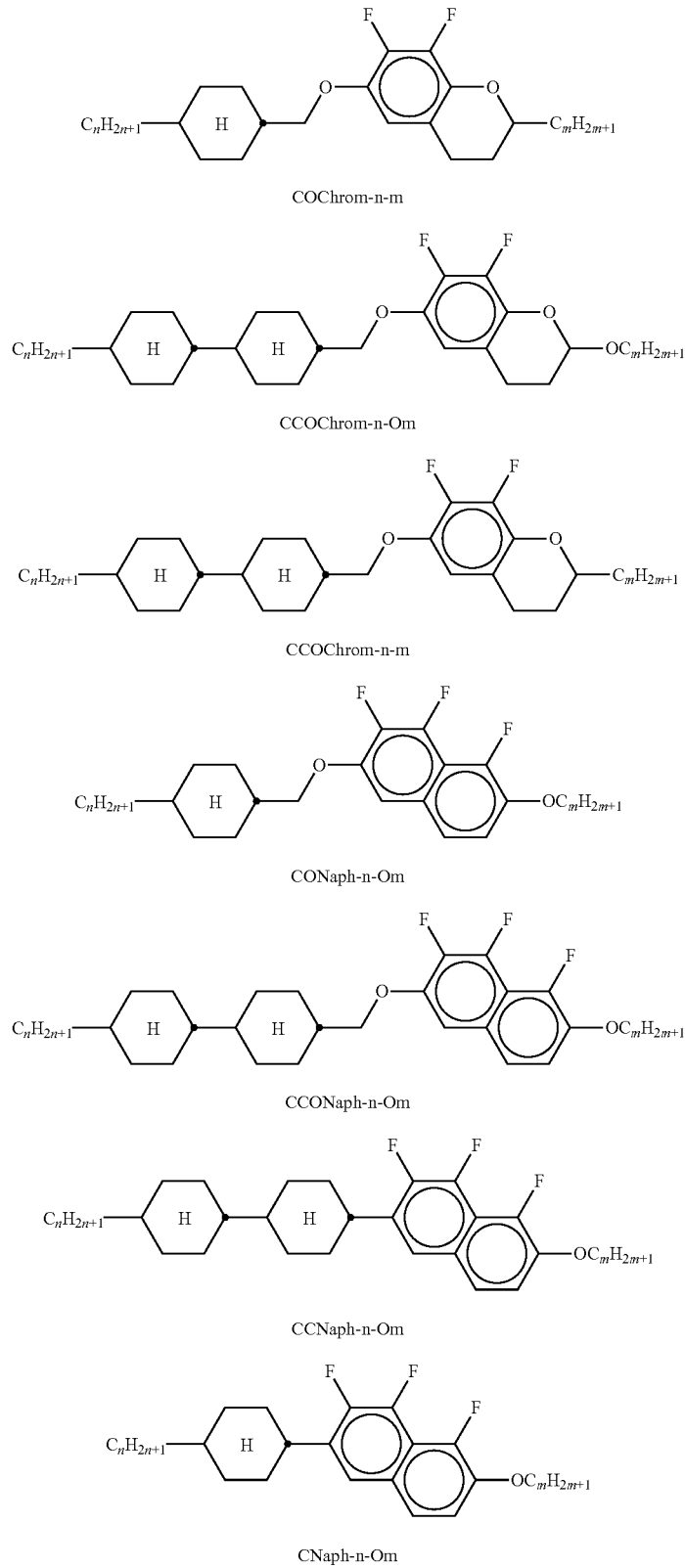
COChrom-n-m
CCOChrom-n-Om
CCOChrom-n-m
CONaph-n-Om
CCONaph-n-Om
CCNaph-n-Om
CNaph-n-Om TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
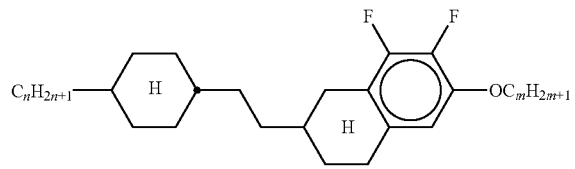
CETNaph-n-Om
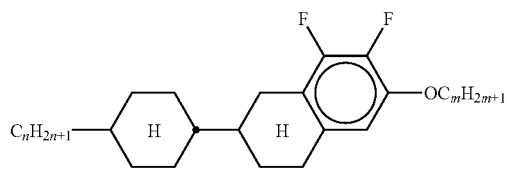
CTNaph-n-Om
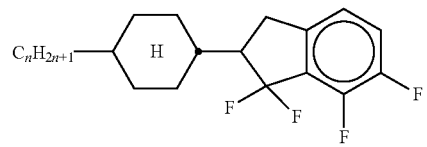
CK-n-F
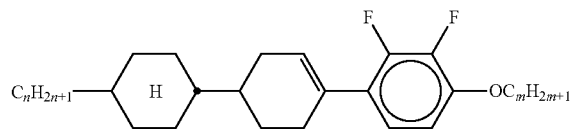
CLY-n-Om
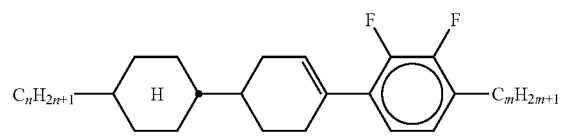
CLY-n-m
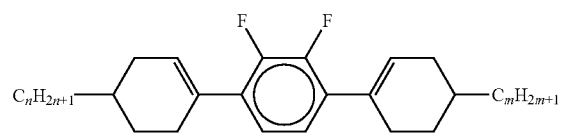
LYLl-n-m
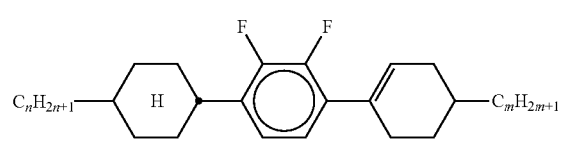
CYLl-n-m
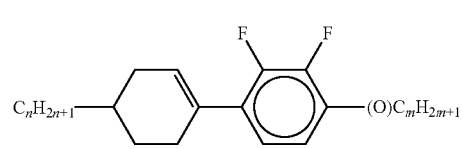
LY-n-(O)m TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
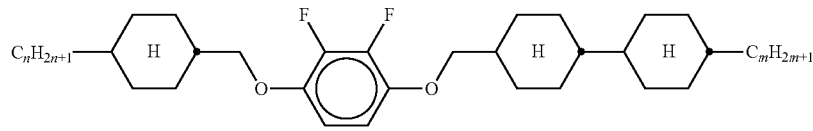
COYOlCC-n-m
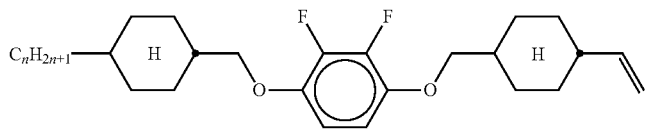
COYOlC-n-V
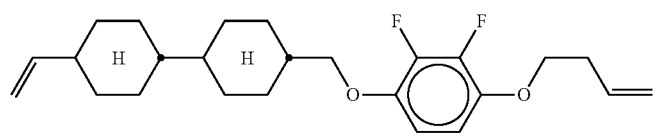
CCOY-V-O2V
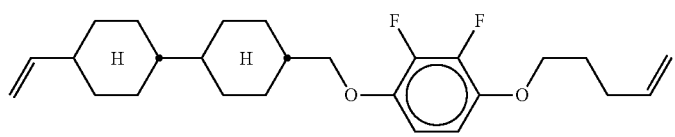
CCOY-V-O3V
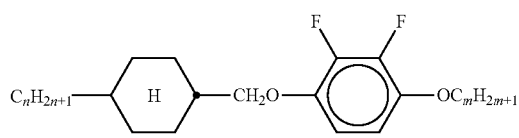
COY-n-Om
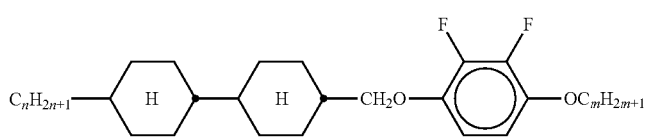
CCOY-n-Om
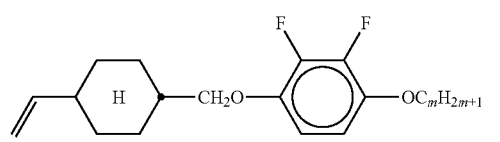
COY-V-Om
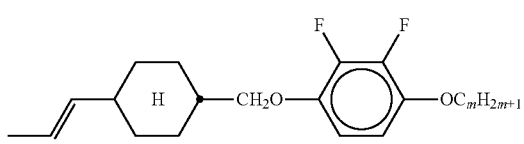
COY-1V-Om TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
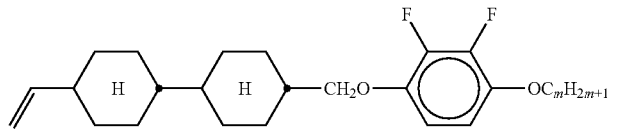
CCOY-V-Om
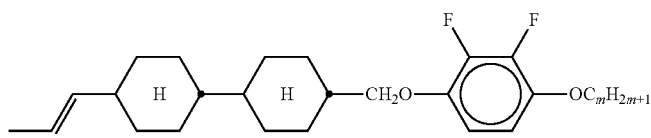
CCOY-1V-Om
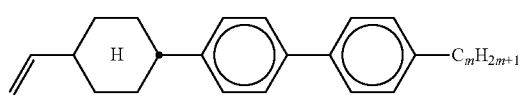
CPP-V-m
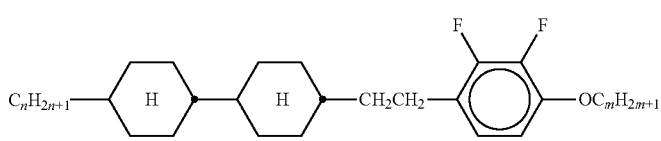
CCEY-n-Om
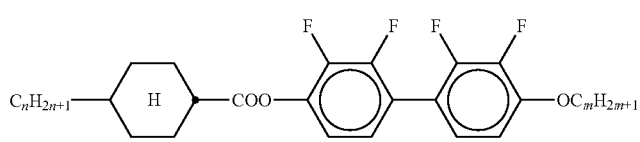
CZYY-n-Om
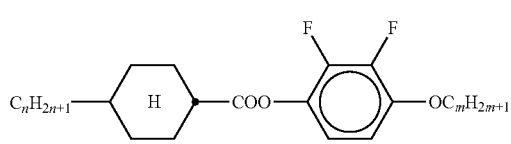
CZY-n-Om
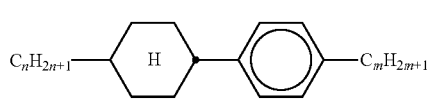
CP-n-m
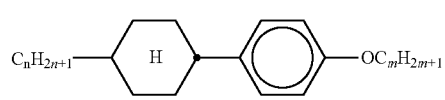
CP-n-Om
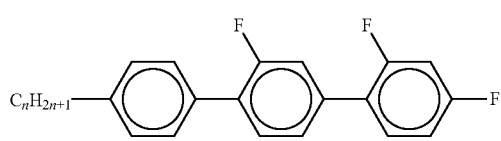
PGIGl-n-F TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
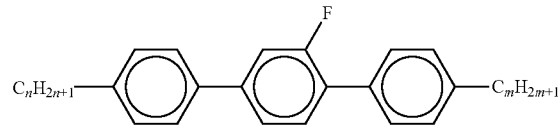
PGP-n-m
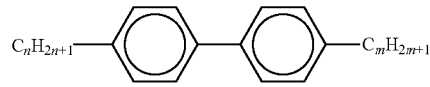
PP-n-m
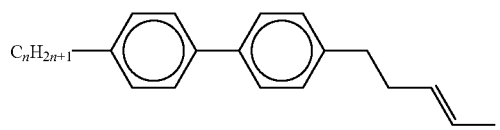
PP-n-2V1
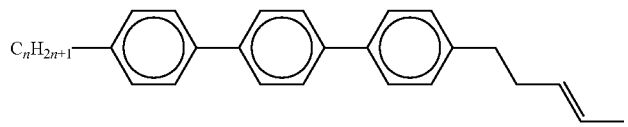
PPP-n-2V1
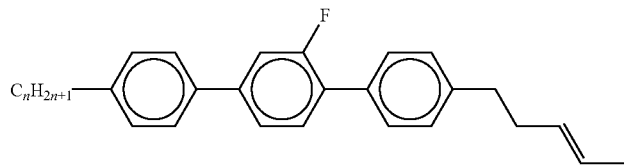
PGP-n-2V1
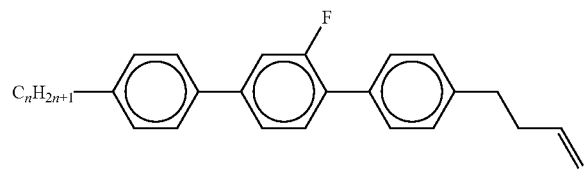
PGP-n-2V
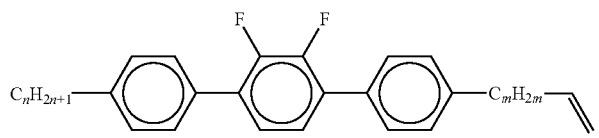
PYP-n-mV
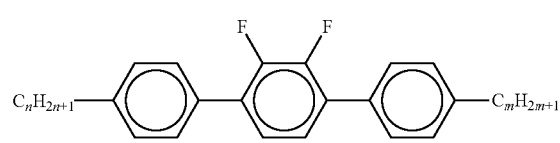
PYP-n-m TABLE A-continued
The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)
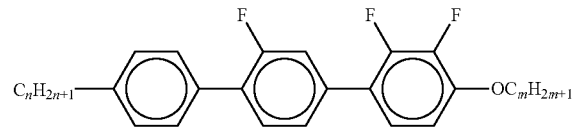
PGIY-n-Om
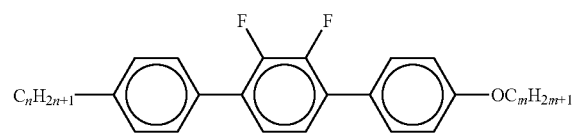
PYP-n-Om
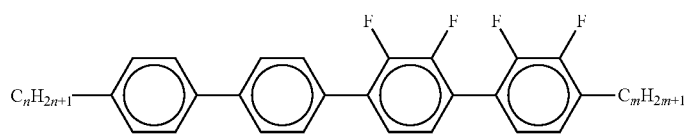
PPYY-n-m
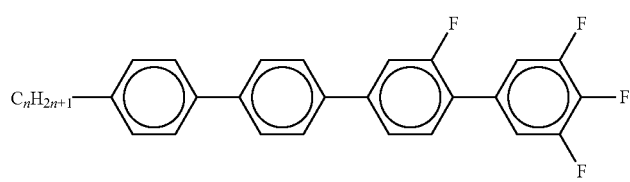
PPGU-n-F
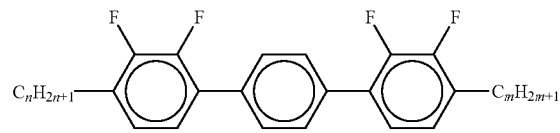
YPY-n-m
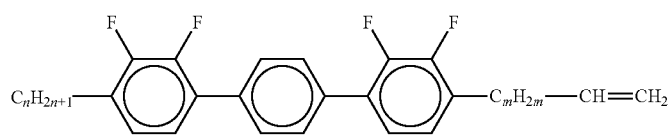
YPY-n-mV
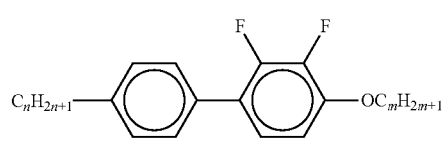
PY-n-Om
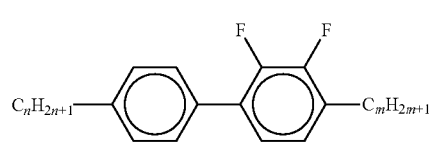
PY-n-m TABLE A-continued
The following abbreviations are used:
(n, m, m', z: each, independently of one another, 1, 2, 3, 4, 5 or 6;
(O)$C_mH_{2m+1}$ means $OC_mH_{2m+1}$ or $C_mH_{2m+1}$)
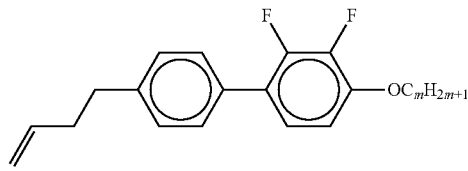
PY-V2-Om
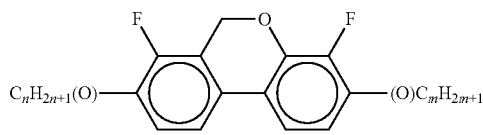
DFDBC-n(O)-(O)m
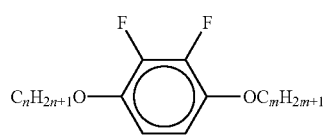
Y-nO-Om
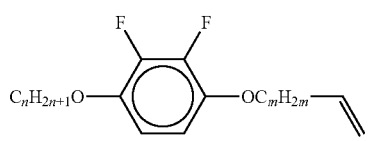
Y-nO-OmV
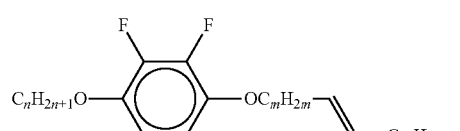
Y-nO-OmVm'
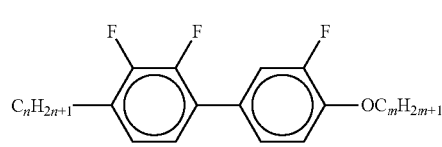
YG-n-Om
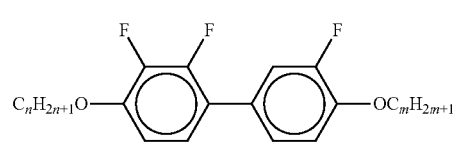
YG-nO-Om
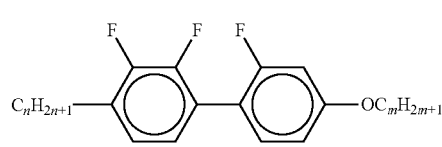
YGl-n-Om TABLE A-continued The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)

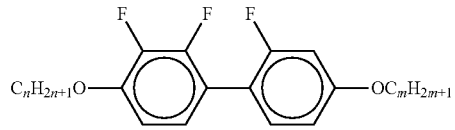

YGl-nO-Om

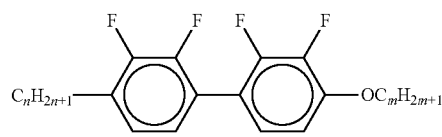

YY-n-Om

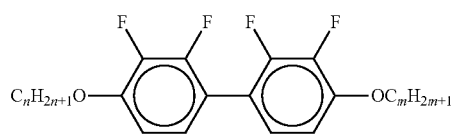

YY-nO-Om

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, IPS, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0 to 15% of pleochroic dyes, stabilisers, such as, for example, phenols, HALS (hindered amine light stabilisers), or chiral dopants may be added. Suitable stabilisers for the mixtures according to the invention are, in particular, those listed in Table C.

For example, 0 to 15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst., Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

TABLE B

Table B indicates possible dopants which can be added to the mixtures according to the invention. If the mixtures comprise a dopant, it is added in amounts of 0.01 to 4% by weight, preferably 0.01 to 3% by weight.

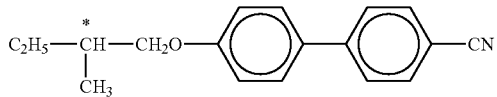

C 15

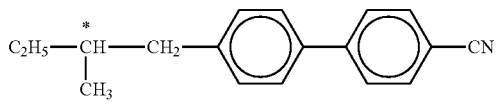

CB 15

TABLE B-continued
Table B indicates possible dopants which can be added to the mixtures according to the invention. If the mixtures comprise a dopant, it is added in amounts of 0.01 to 4% by weight, preferably 0.01 to 3% by weight.
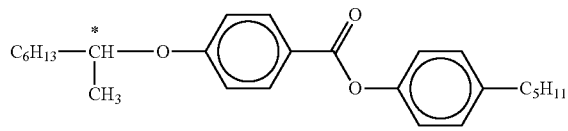
CM 21
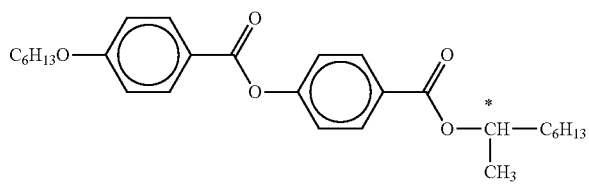
R/S-811
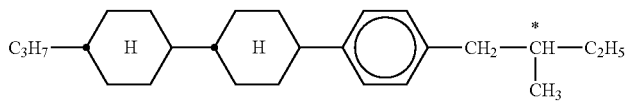
CM 44
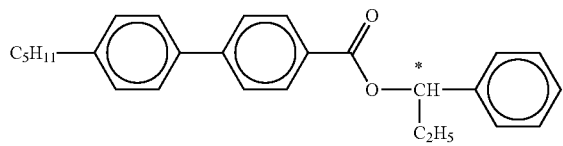
CM 45
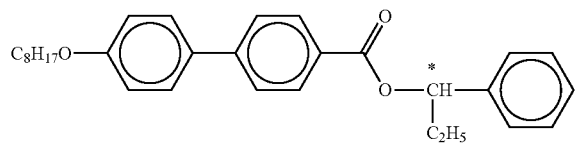
CM 47
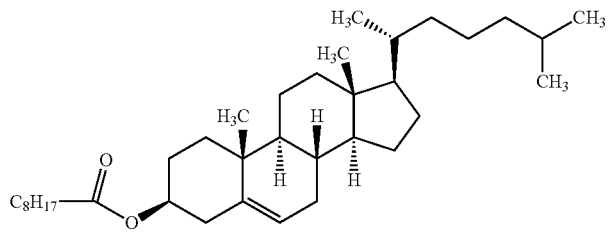
CN
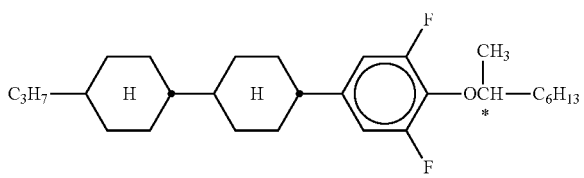
R/S-2011

TABLE B-continued

Table B indicates possible dopants which can be added to the mixtures according to the invention. If the mixtures comprise a dopant, it is added in amounts of 0.01 to 4% by weight, preferably 0.01 to 3% by weight.

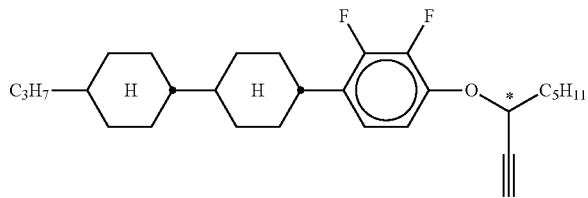

R/S-3011

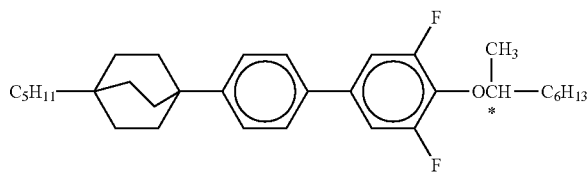

R/S-4011

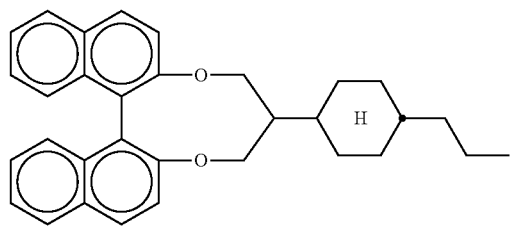

R/S-5011

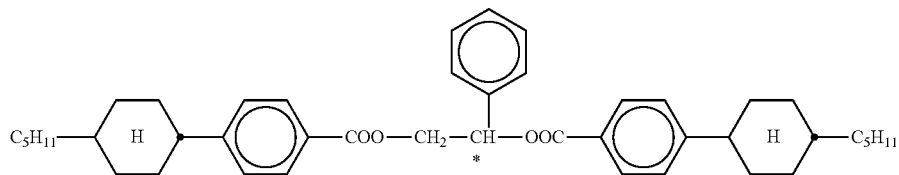

R/S-1011

The mixtures according to the invention comprise at least one stabiliser from Table C given below.

TABLE C

Stabilisers, which can be added, for example, to the mixtures according to the invention in amounts of 0 to 10% by weight, preferably 0.001 to 5% by weight, in particular 0.001 to 1% by weight, are indicated below.

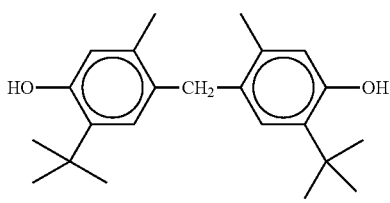

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
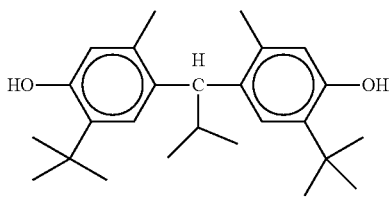
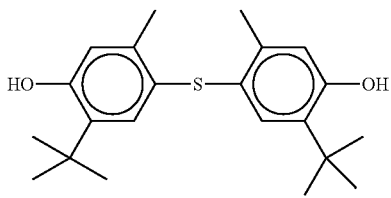
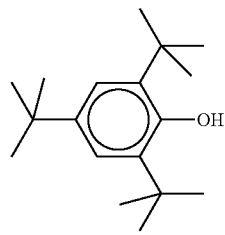
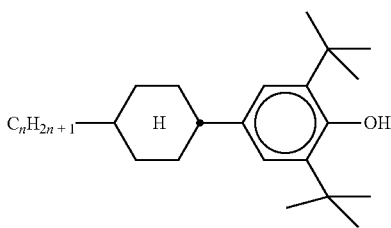
$n = 1, 2, 4, 5, 6$ or $7$
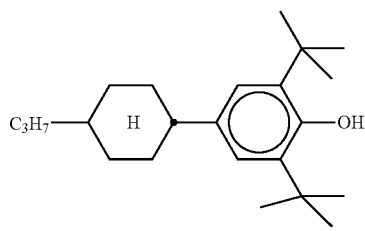
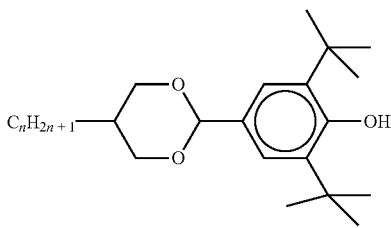
$n = 1, 2, 4, 5, 6$ or $7$ TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
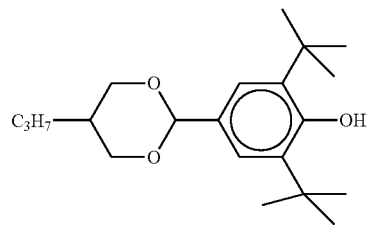
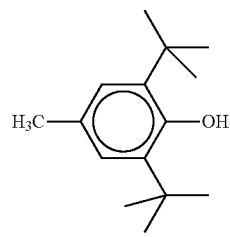
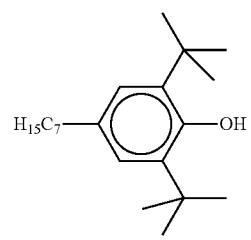
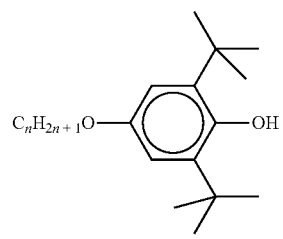
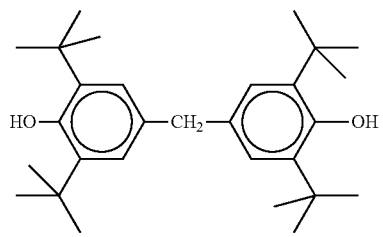
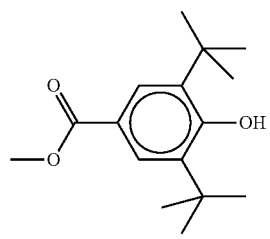

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
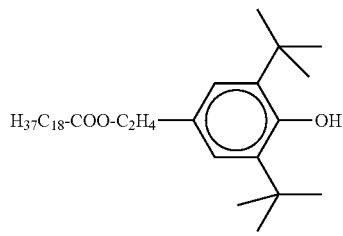
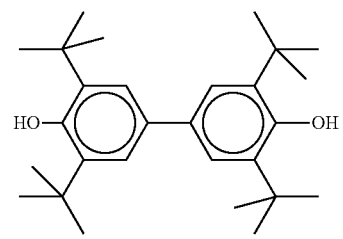
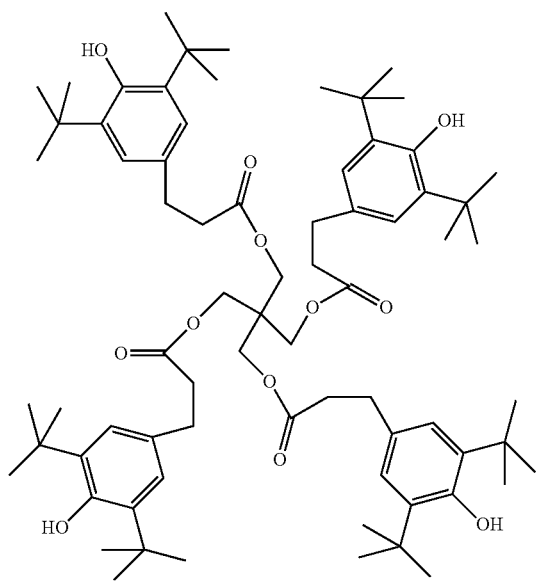 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
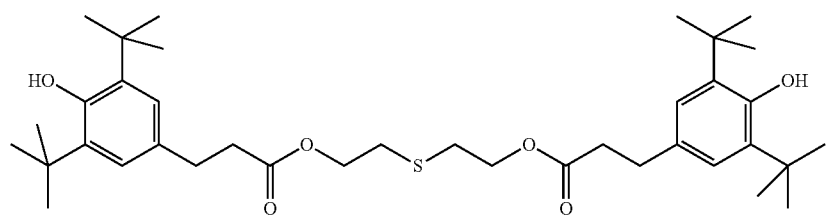 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
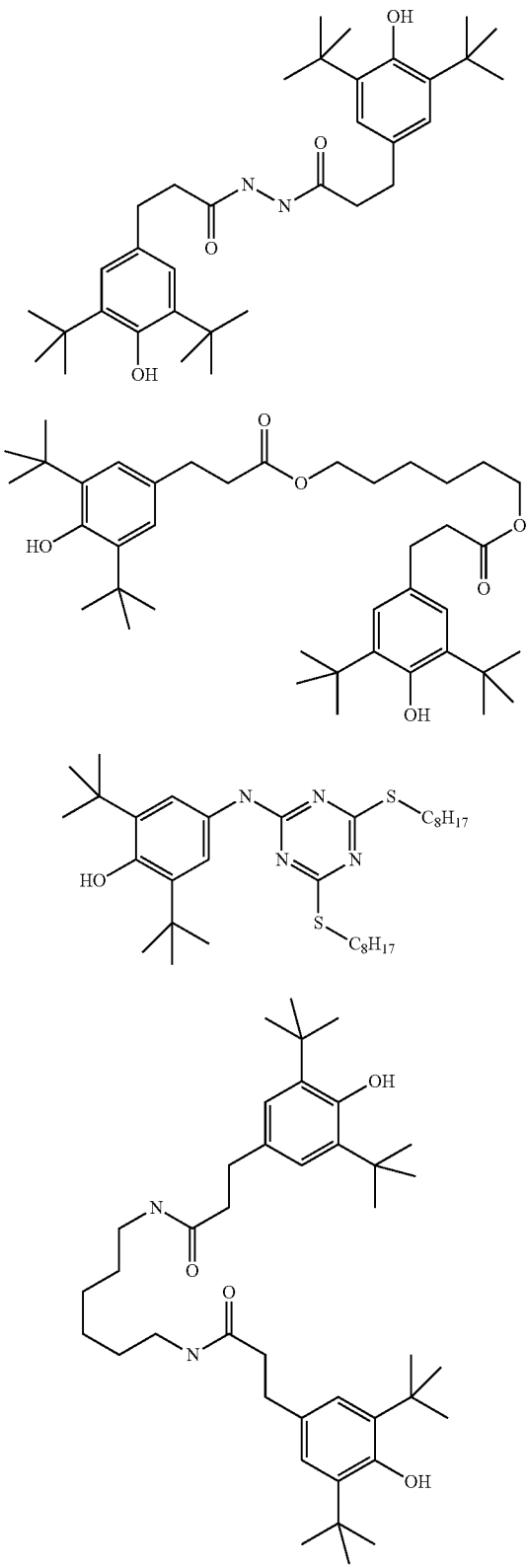

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
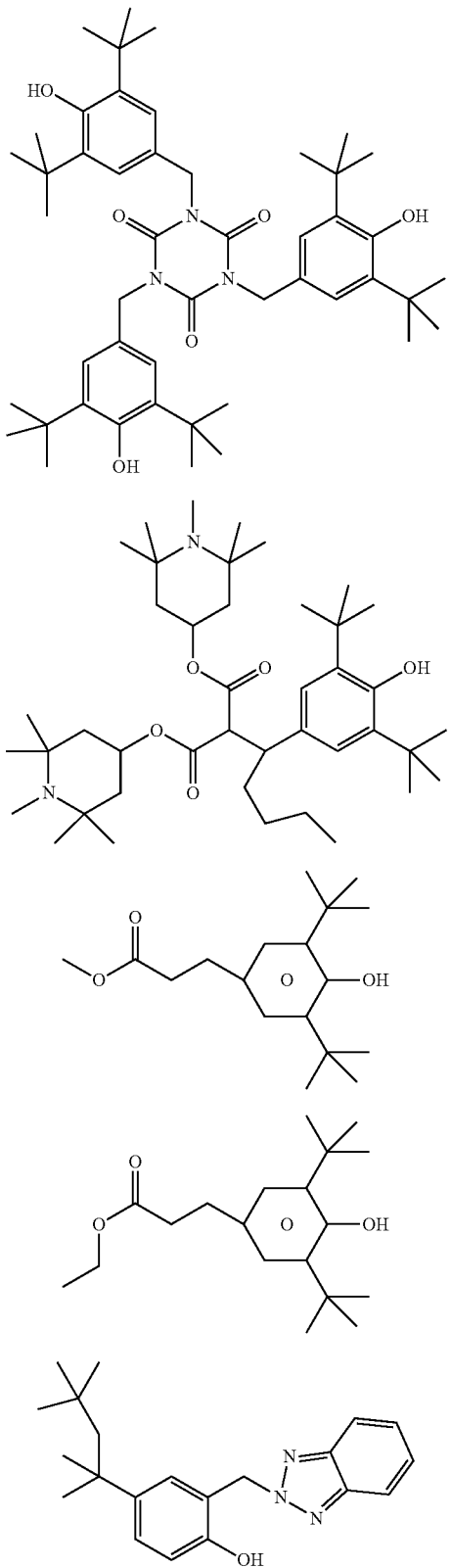

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
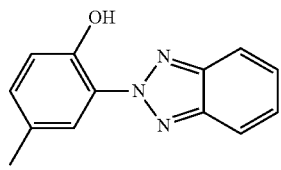 [SMILES: Cc1ccc(O)c(-n2nc3ccccc3n2)c1]
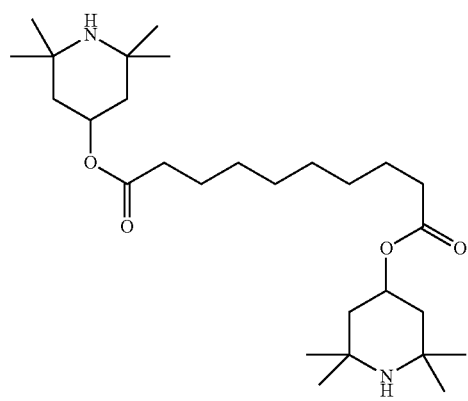
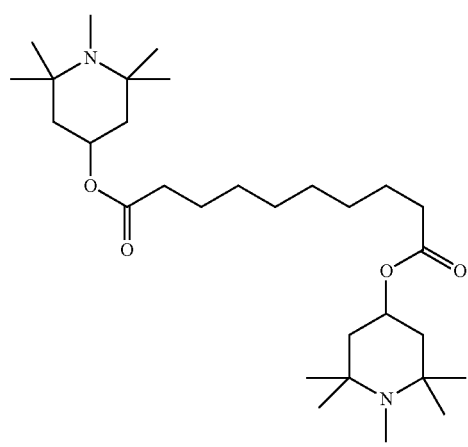
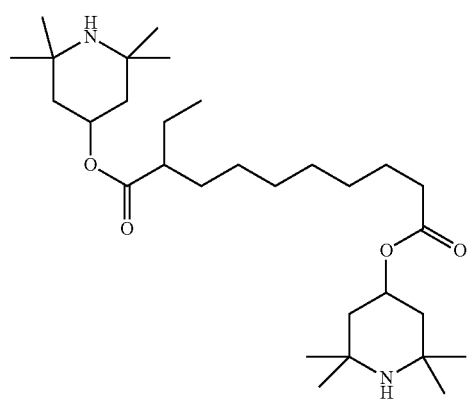

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
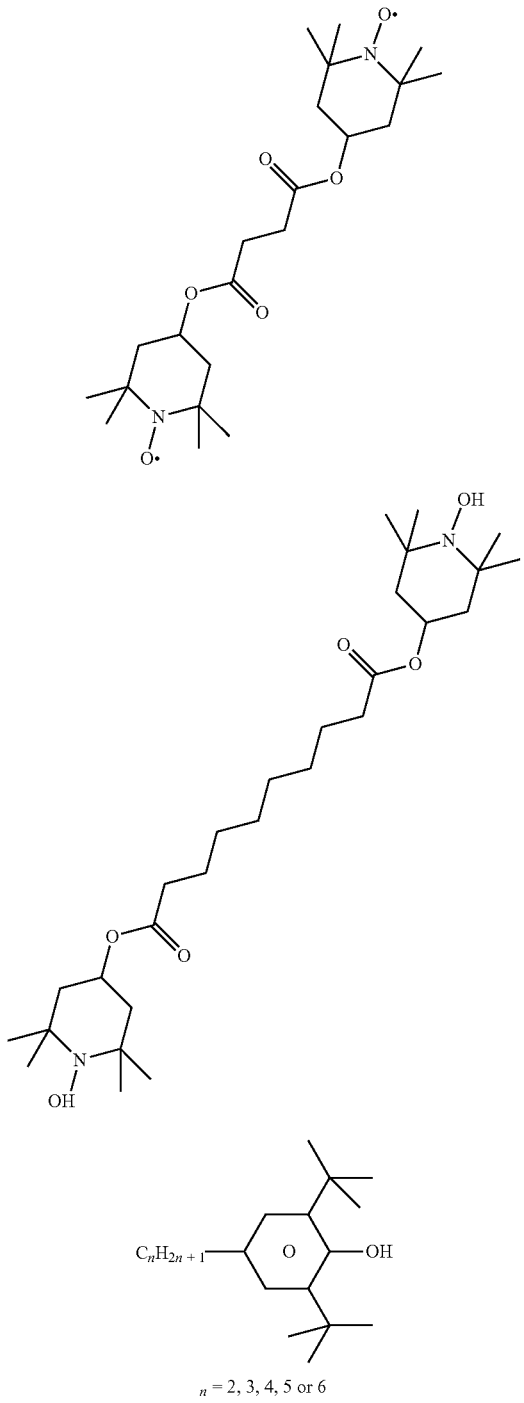
$n = 2, 3, 4, 5$ or $6$
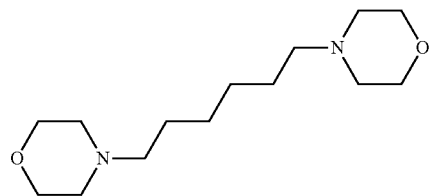 [SMILES: C(CCCN1CCOCC1)CCN1CCOCC1]

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
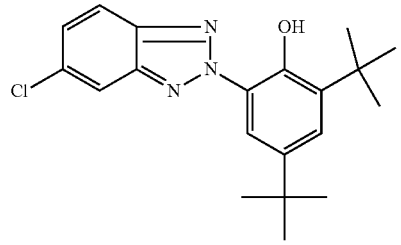
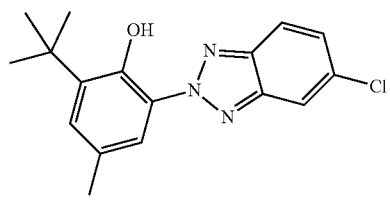 [SMILES: Cc1cc(-n2nc3ccc(Cl)cc3n2)c(O)c(C(C)(C)C)c1]
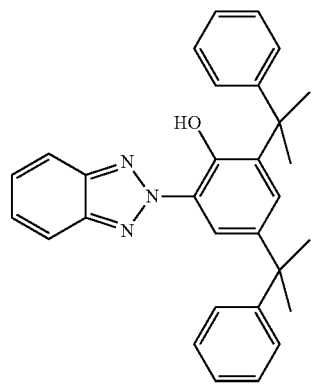 [SMILES: CC(C)(c1ccccc1)c1cc(-n2nc3ccccc3n2)c(O)c(C(C)(C)c2ccccc2)c1]
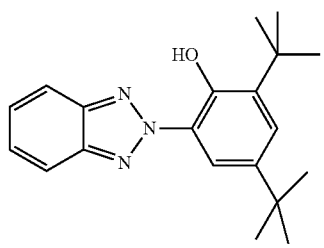 [SMILES: CC(C)(C)c1cc(-n2nc3ccccc3n2)c(O)c(C(C)(C)C)c1]
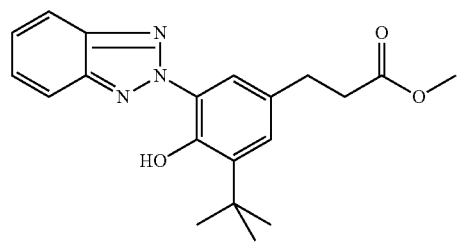

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
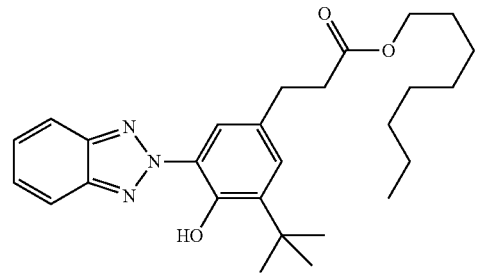 [SMILES: CCCCCCCCOC(=O)CCc1cc(-n2nc3ccccc3n2)c(O)c(C(C)(C)C)c1]
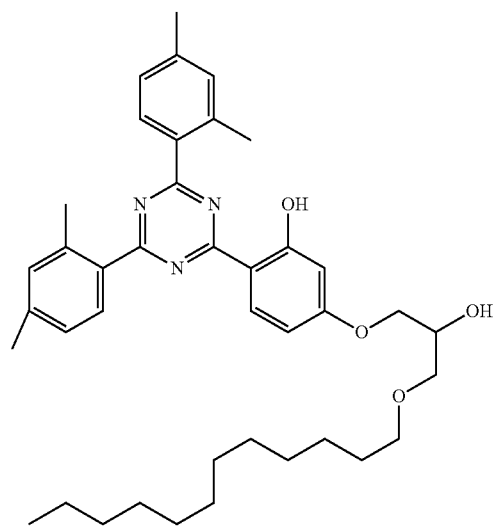 [SMILES: CCCCCCCCCCCCOCC(O)COc1ccc(-c2nc(-c3ccc(C)cc3C)nc(-c3ccc(C)cc3C)n2)c(O)c1]
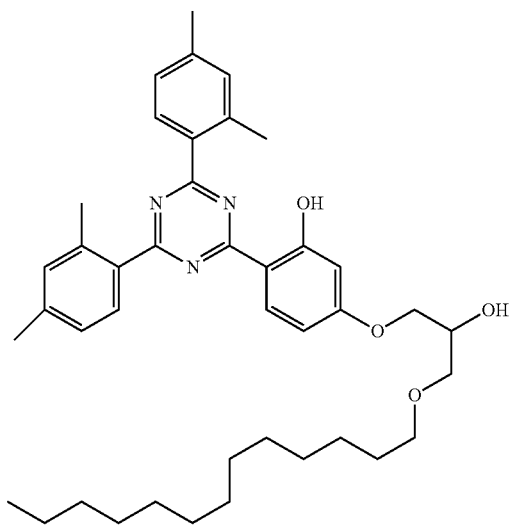 [SMILES: CCCCCCCCCCCCCOCC(O)COc1ccc(-c2nc(-c3ccc(C)cc3C)nc(-c3ccc(C)cc3C)n2)c(O)c1]

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
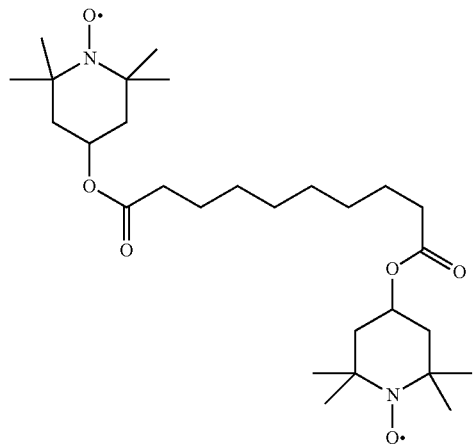
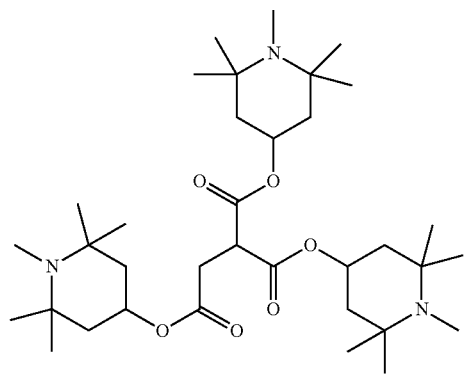
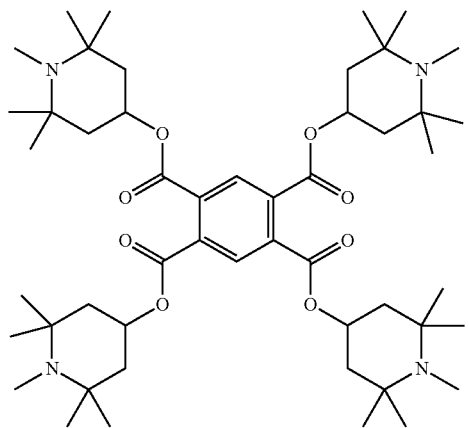

TABLE C-continued
Stabilisers, which can be added, for example, to the mixtures according to the invention in amounts of 0 to 10% by weight, preferably 0.001 to 5% by weight, in particular 0.001 to 1% by weight, are indicated below.
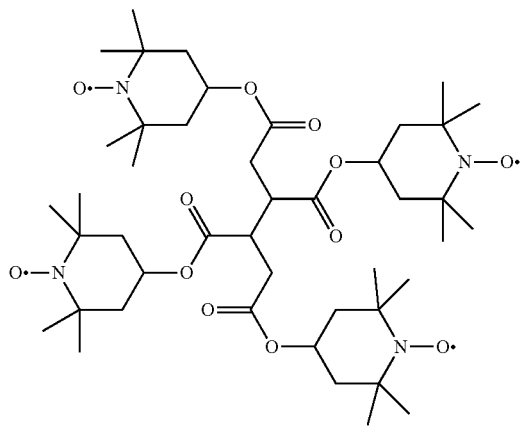
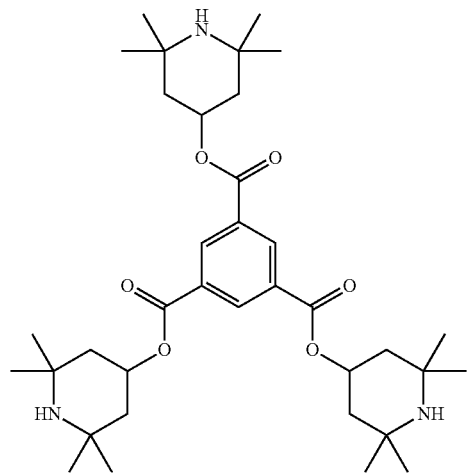
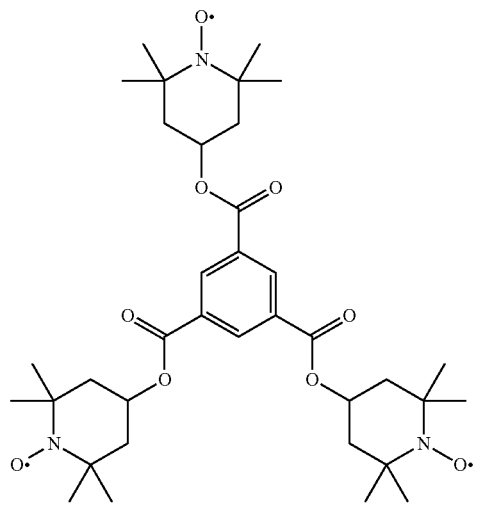

TABLE D
Table D shows illustrative reactive mesogenic compounds of formula P which can be used in the LC media in accordance with the present invention.
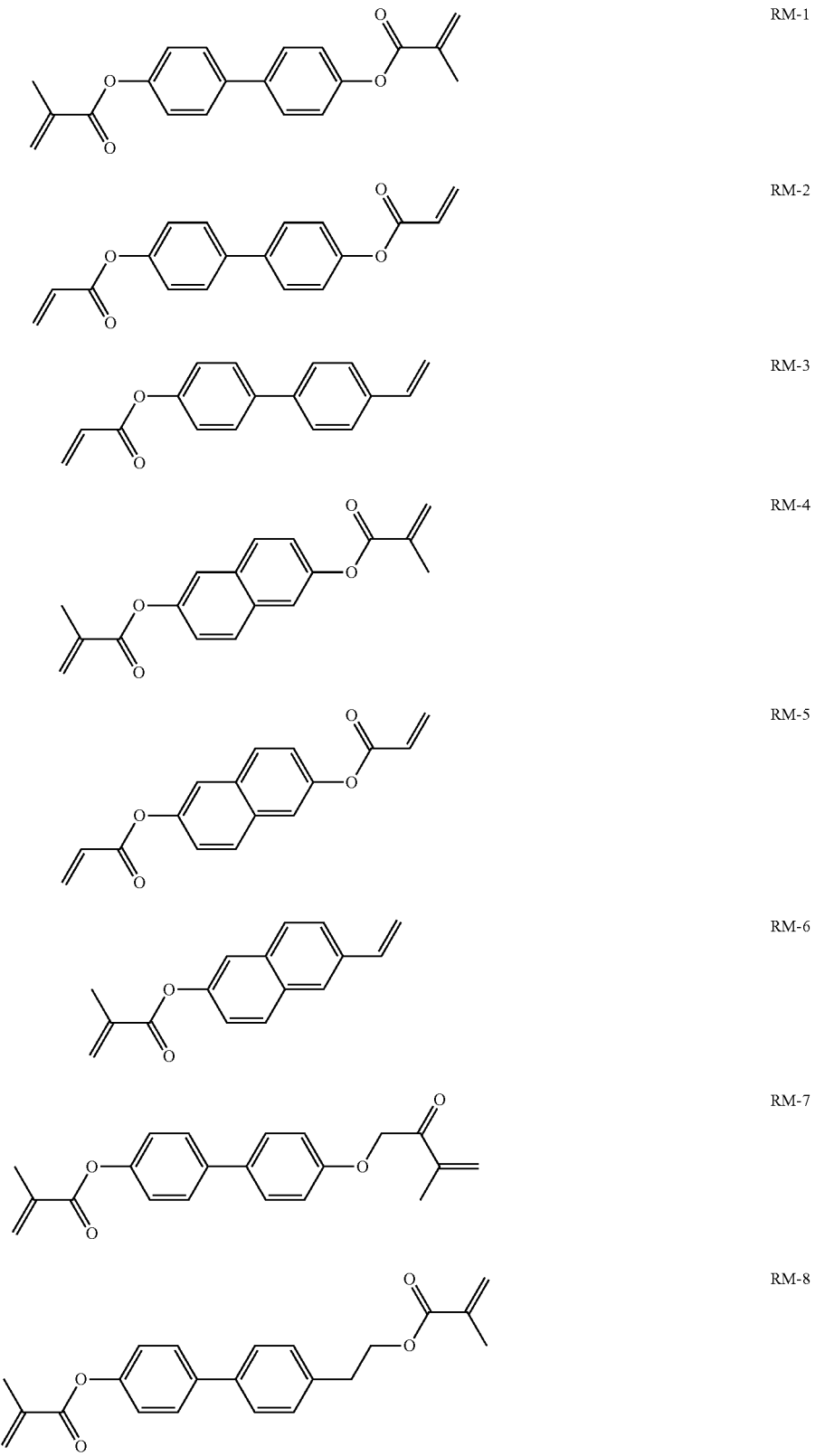

TABLE D-continued
Table D shows illustrative reactive mesogenic compounds of formula P
which can be used in the LC media in accordance with the present invention.
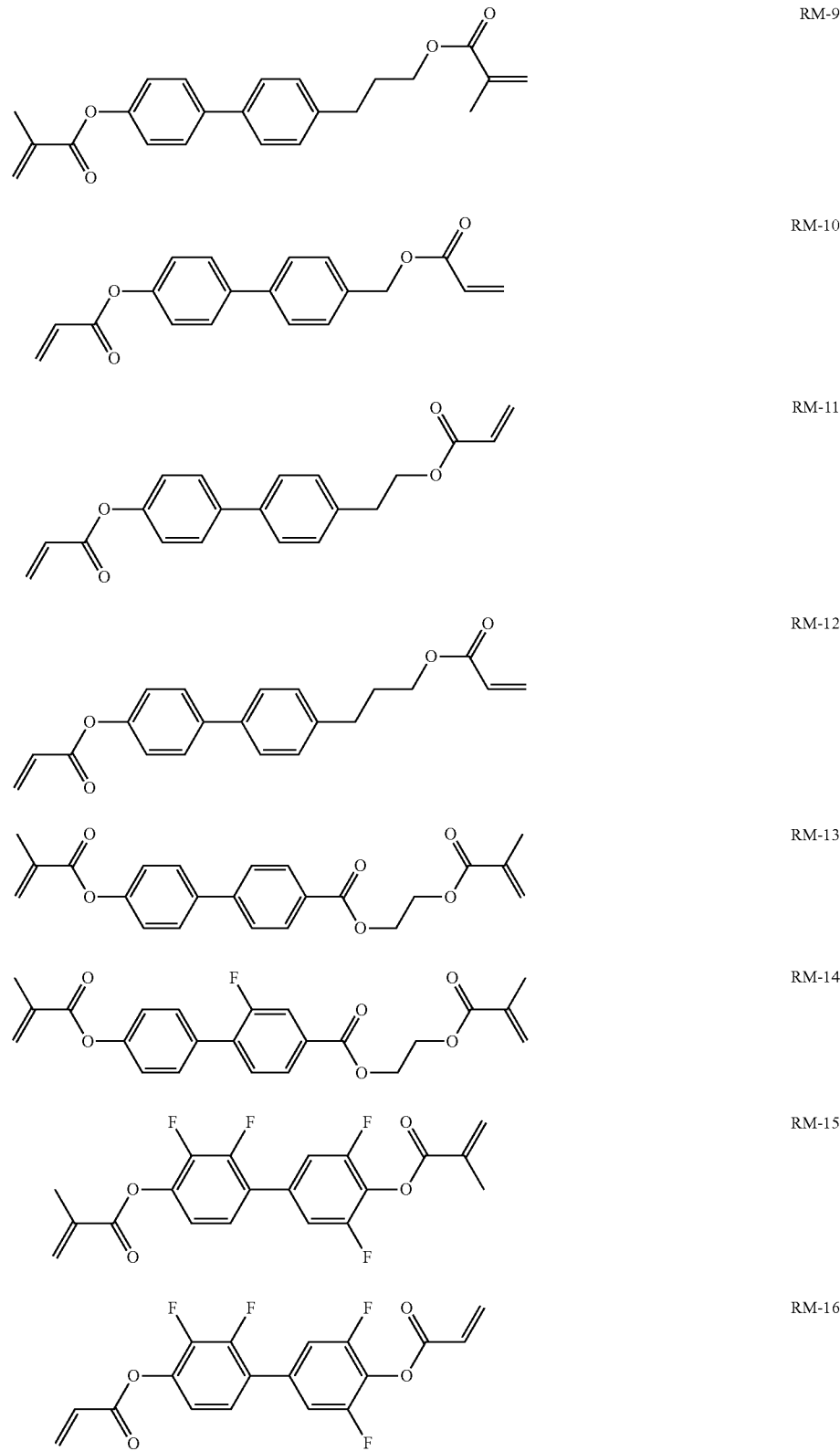

TABLE D-continued
Table D shows illustrative reactive mesogenic compounds of formula P
which can be used in the LC media in accordance with the present invention.
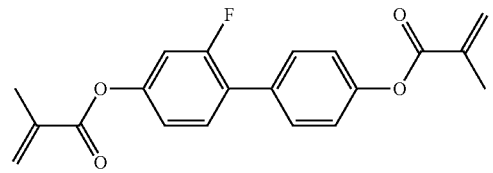 [SMILES: C=C(C)C(=O)Oc1ccc(-c2ccc(OC(=O)C(=C)C)cc2F)cc1] RM-17
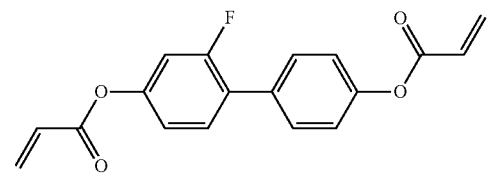 RM-18
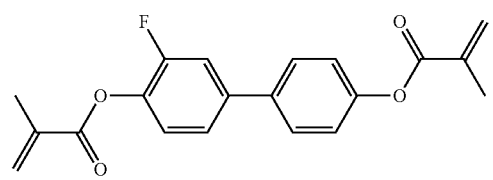 RM-19
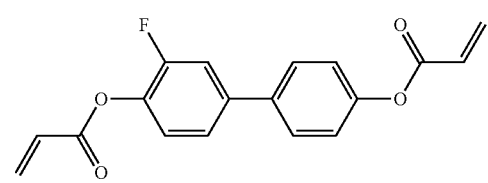 RM-20
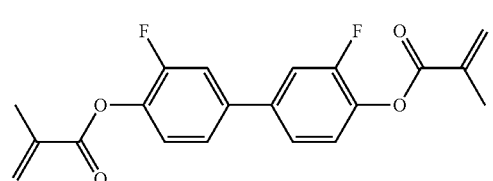 RM-21
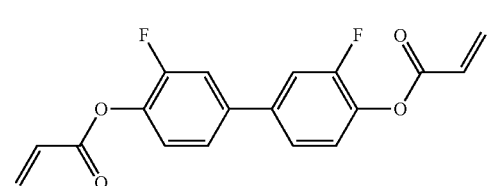 RM-22
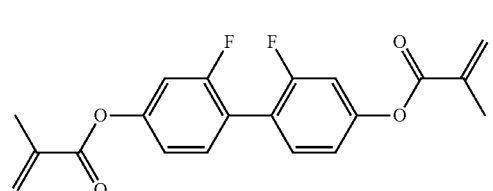 RM-23
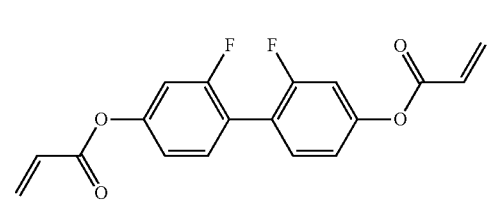 [SMILES: C=CC(=O)Oc1ccc(-c2ccc(OC(=O)C=C)cc2F)cc1] RM-24

TABLE D-continued
Table D shows illustrative reactive mesogenic compounds of formula P which can be used in the LC media in accordance with the present invention.
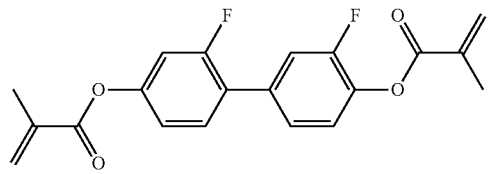 RM-25
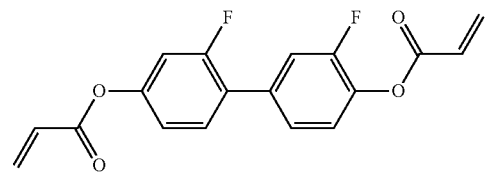 [SMILES: C=CC(=O)Oc1ccc(-c2ccc(OC(=O)C=C)c(F)c2)c(F)c1] RM-26
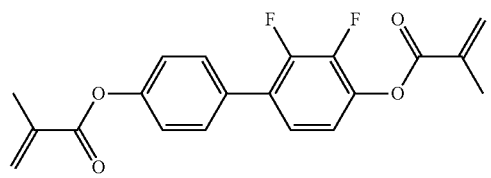 [SMILES: C=C(C)C(=O)Oc1ccc(-c2ccc(OC(=O)C(=C)C)c(F)c2F)cc1] RM-27
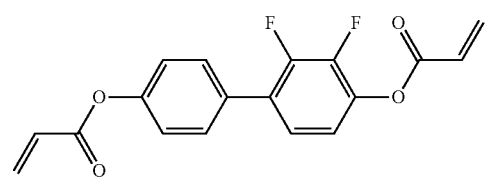 RM-28
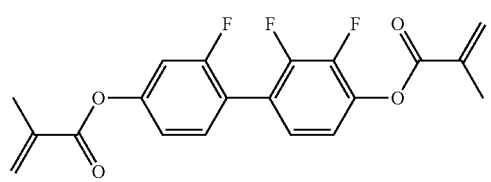 RM-29
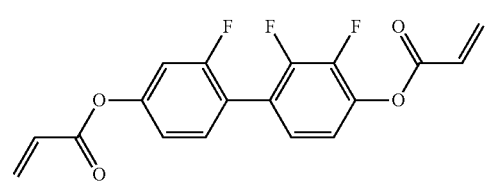 [SMILES: C=CC(=O)Oc1ccc(-c2ccc(OC(=O)C=C)c(F)c2F)cc1] RM-30
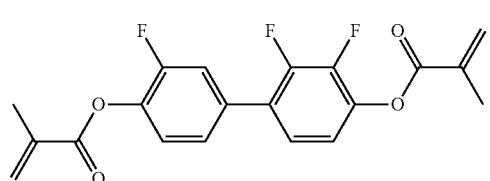 RM-31
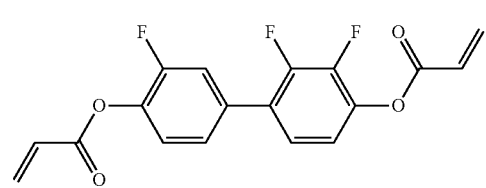 RM-32

TABLE D-continued
Table D shows illustrative reactive mesogenic compounds of formula P
which can be used in the LC media in accordance with the present invention.
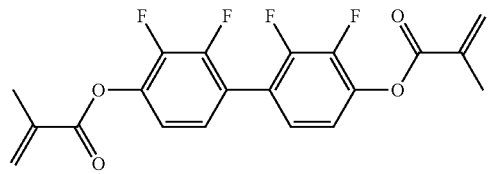 [SMILES: C=C(C)C(=O)Oc1ccc(-c2ccc(OC(=O)C(=C)C)c(F)c2F)c(F)c1]
RM-33
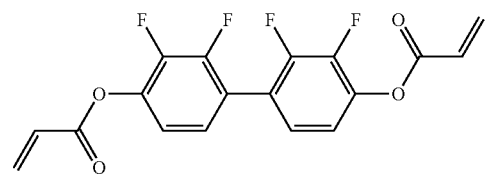 [SMILES: C=CC(=O)Oc1ccc(-c2ccc(OC(=O)C=C)c(F)c2F)c(F)c1]
RM-34
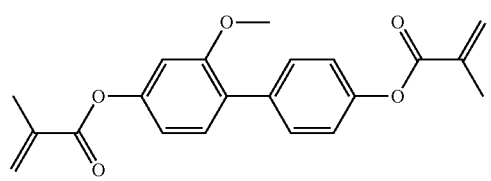
RM-35
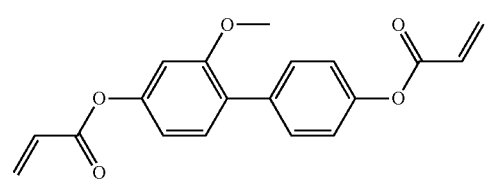 [SMILES: C=CC(=O)Oc1ccc(-c2ccc(OC(=O)C=C)cc2OC)cc1]
RM-36
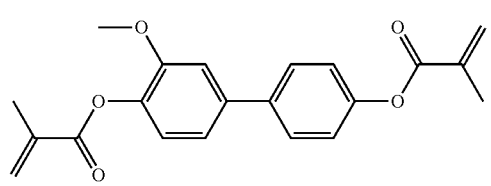
RM-37
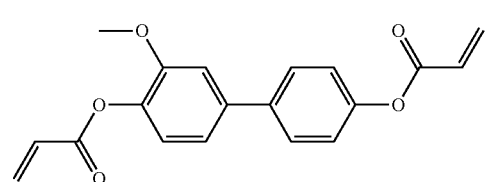
RM-38
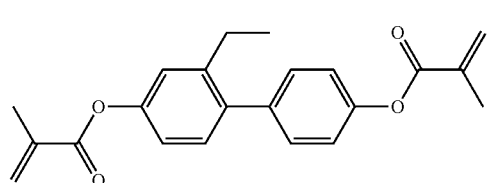
RM-39
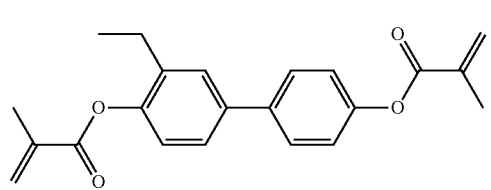 [SMILES: C=C(C)C(=O)Oc1ccc(-c2ccc(OC(=O)C(=C)C)c(CC)c2)cc1]
RM-40

TABLE D-continued
Table D shows illustrative reactive mesogenic compounds of formula P
which can be used in the LC media in accordance with the present invention.
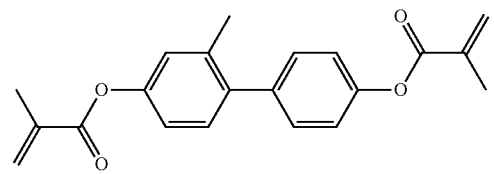 [SMILES: C=C(C)C(=O)Oc1ccc(-c2ccc(OC(=O)C(=C)C)cc2C)cc1] RM-41
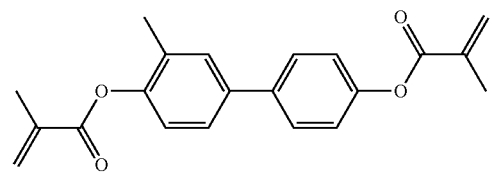 [SMILES: C=C(C)C(=O)Oc1ccc(-c2ccc(OC(=O)C(=C)C)c(C)c2)cc1] RM-42
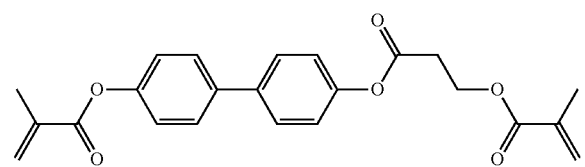 [SMILES: C=C(C)C(=O)OCCC(=O)Oc1ccc(-c2ccc(OC(=O)C(=C)C)cc2)cc1] RM-43
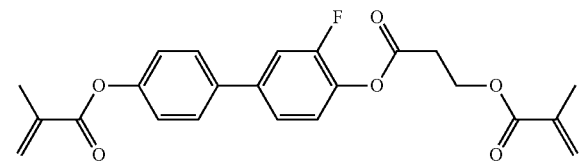 [SMILES: C=C(C)C(=O)OCCC(=O)Oc1ccc(-c2ccc(OC(=O)C(=C)C)cc2)cc1F] RM-44
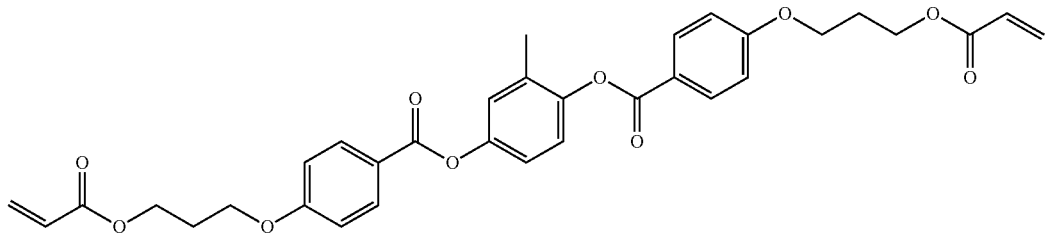 [SMILES: C=CC(=O)OCCCOc1ccc(C(=O)Oc2ccc(OC(=O)c3ccc(OCCCOC(=O)C=C)cc3)c(C)c2)cc1] RM-45
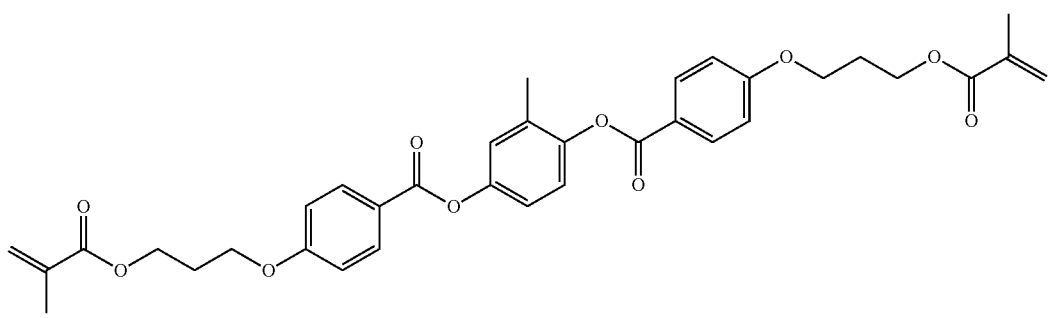 [SMILES: C=C(C)C(=O)OCCCOc1ccc(C(=O)Oc2ccc(OC(=O)c3ccc(OCCCOC(=O)C(=C)C)cc3)c(C)c2)cc1] RM-46
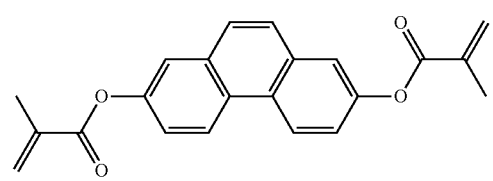 RM-47

TABLE D-continued
Table D shows illustrative reactive mesogenic compounds of formula P
which can be used in the LC media in accordance with the present invention.
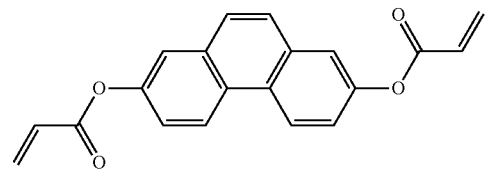 [SMILES: C=CC(=O)Oc1ccc2c(ccc3cc(OC(=O)C=C)ccc32)c1]
RM-48
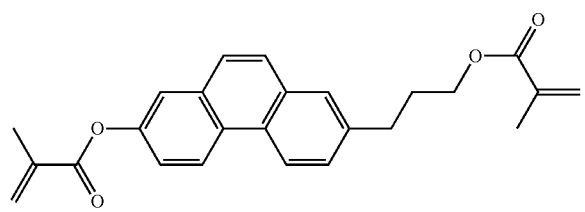 [SMILES: C=C(C)C(=O)OCCCc1ccc2c(ccc3cc(OC(=O)C(=C)C)ccc32)c1]
RM-49
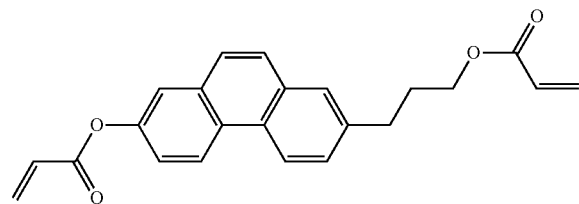 [SMILES: C=CC(=O)OCCCc1ccc2c(ccc3cc(OC(=O)C=C)ccc32)c1]
RM-50
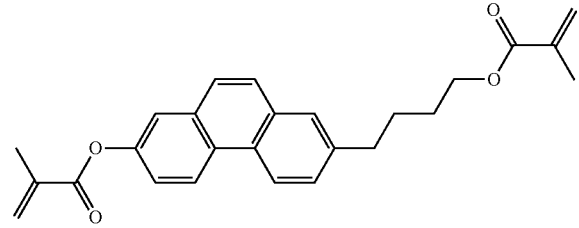 [SMILES: C=C(C)C(=O)OCCCCc1ccc2c(ccc3cc(OC(=O)C(=C)C)ccc32)c1]
RM-51
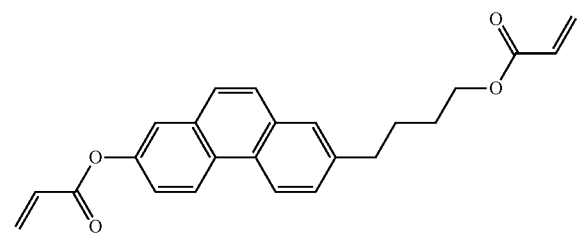 [SMILES: C=CC(=O)OCCCCc1ccc2c(ccc3cc(OC(=O)C=C)ccc32)c1]
RM-52
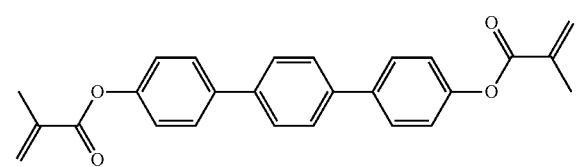
RM-53
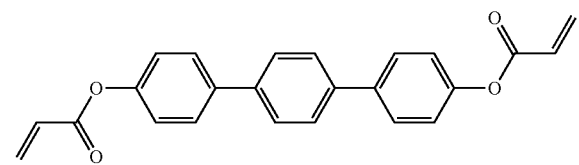 [SMILES: C=C(C)C(=O)Oc1ccc(-c2ccc(-c3ccc(OC(=O)C(=C)C)cc3)cc2)cc1]
RM-54

TABLE D-continued
Table D shows illustrative reactive mesogenic compounds of formula P which can be used in the LC media in accordance with the present invention.
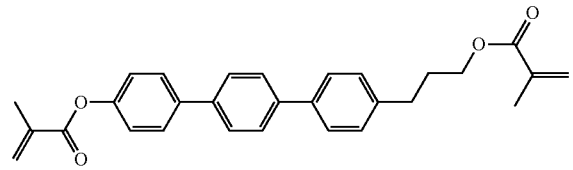 [SMILES: C=C(C)C(=O)OCCCc1ccc(-c2ccc(-c3ccc(OC(=O)C(=C)C)cc3)cc2)cc1] RM-55
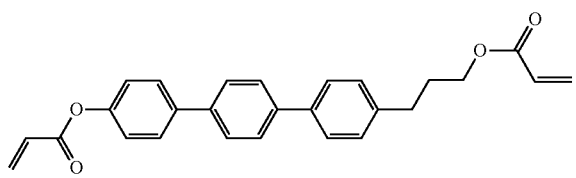 [SMILES: C=CC(=O)OCCCc1ccc(-c2ccc(-c3ccc(OC(=O)C=C)cc3)cc2)cc1] RM-56
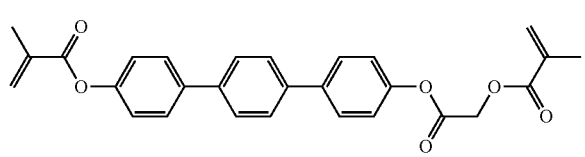 [SMILES: C=C(C)C(=O)OCC(=O)Oc1ccc(-c2ccc(-c3ccc(OC(=O)C(=C)C)cc3)cc2)cc1] RM-57
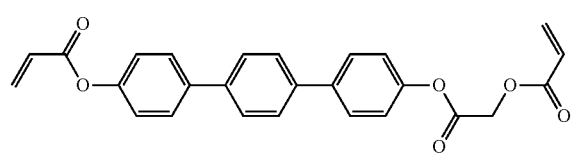 [SMILES: C=CC(=O)OCC(=O)Oc1ccc(-c2ccc(-c3ccc(OC(=O)C=C)cc3)cc2)cc1] RM-58
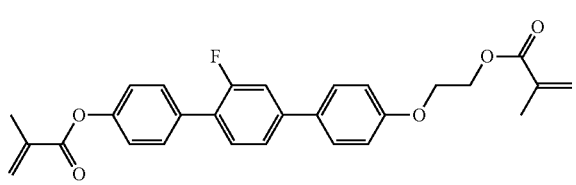 [SMILES: C=C(C)C(=O)OCCOc1ccc(-c2ccc(-c3ccc(OC(=O)C(=C)C)cc3)c(F)c2)cc1] RM-59
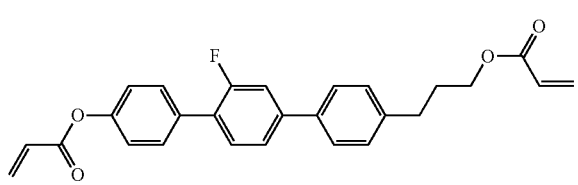 [SMILES: C=CC(=O)OCCCc1ccc(-c2ccc(-c3ccc(OC(=O)C=C)cc3)c(F)c2)cc1] RM-60
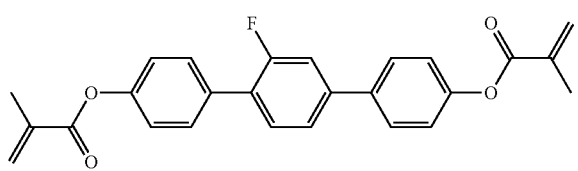 RM-61
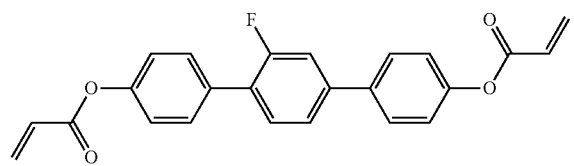 [SMILES: C=CC(=O)Oc1ccc(-c2ccc(-c3ccc(OC(=O)C=C)cc3)c(F)c2)cc1] RM-62
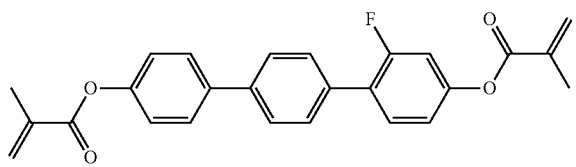 [SMILES: C=C(C)C(=O)Oc1ccc(-c2ccc(-c3ccc(OC(=O)C(=C)C)cc3F)cc2)cc1] RM-63

TABLE D-continued
Table D shows illustrative reactive mesogenic compounds of formula P
which can be used in the LC media in accordance with the present invention.
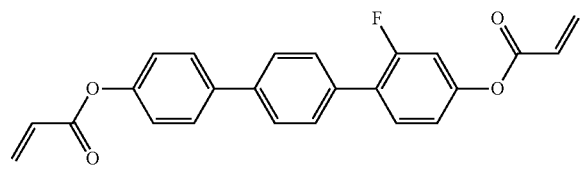
RM-64
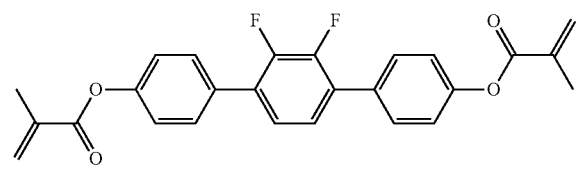
RM-65
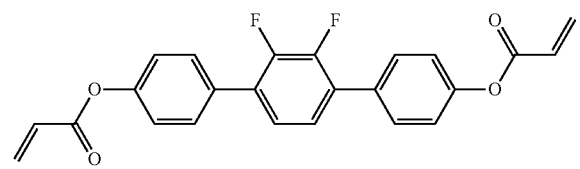
RM-66
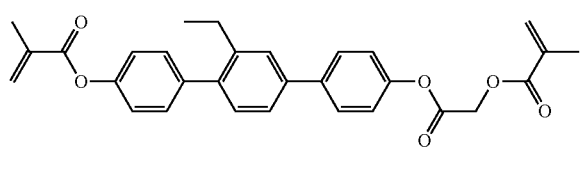 [SMILES: C=C(C)C(=O)OCC(=O)Oc1ccc(-c2ccc(-c3ccc(OC(=O)C(=C)C)cc3)c(CC)c2)cc1]
RM-67
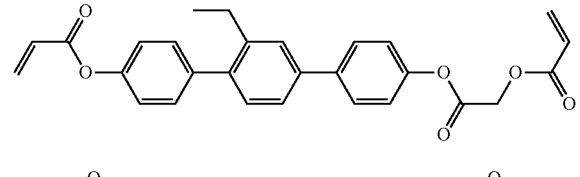
RM-68
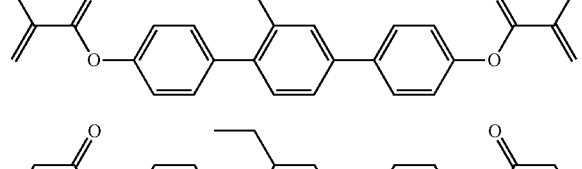
RM-69
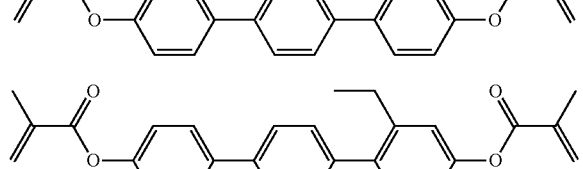
RM-70
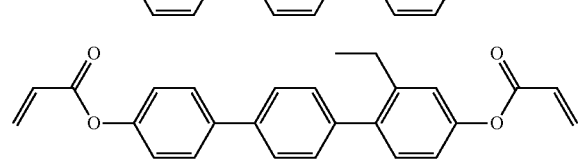
RM-71
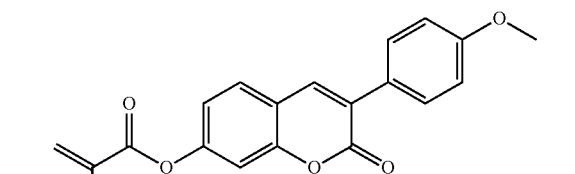
RM-72
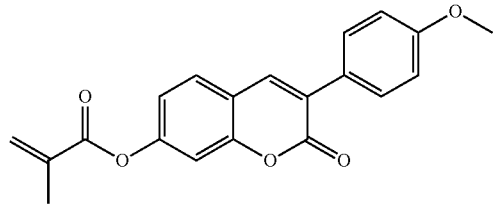 [SMILES: C=C(C)C(=O)Oc1ccc2cc(-c3ccc(OC)cc3)c(=O)oc2c1]
RM-73

TABLE D-continued
Table D shows illustrative reactive mesogenic compounds of formula P
which can be used in the LC media in accordance with the present invention.
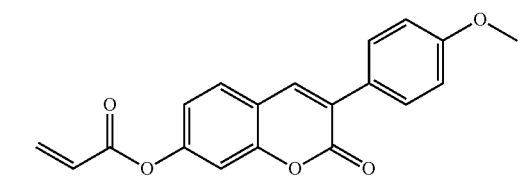 [SMILES: C=CC(=O)Oc1ccc2cc(-c3ccc(OC)cc3)c(=O)oc2c1]
RM-74
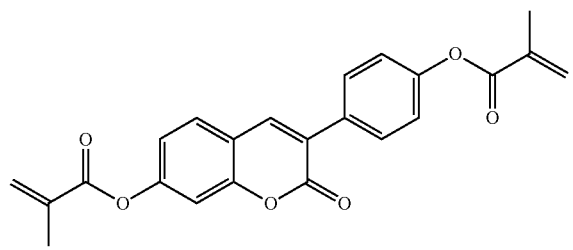 [SMILES: C=C(C)C(=O)Oc1ccc(-c2cc3ccc(OC(=O)C(=C)C)cc3oc2=O)cc1]
RM-75
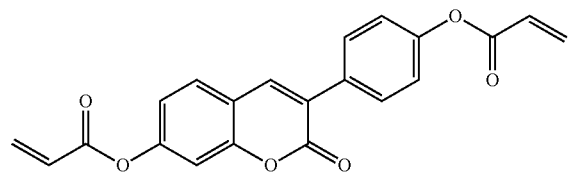 [SMILES: C=CC(=O)Oc1ccc(-c2cc3ccc(OC(=O)C=C)cc3oc2=O)cc1]
RM-76
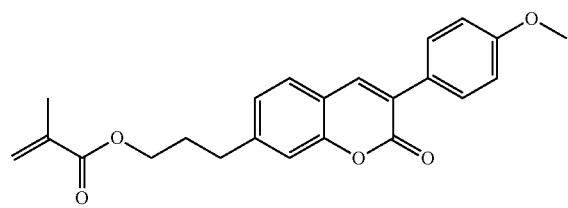 [SMILES: C=C(C)C(=O)OCCCc1ccc2cc(-c3ccc(OC)cc3)c(=O)oc2c1]
RM-77
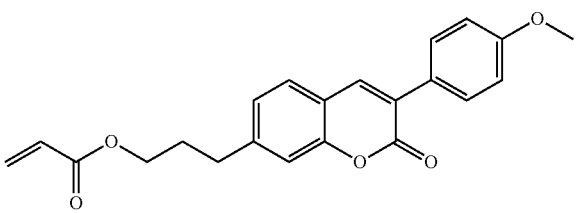 [SMILES: C=CC(=O)OCCCc1ccc2cc(-c3ccc(OC)cc3)c(=O)oc2c1]
RM-78
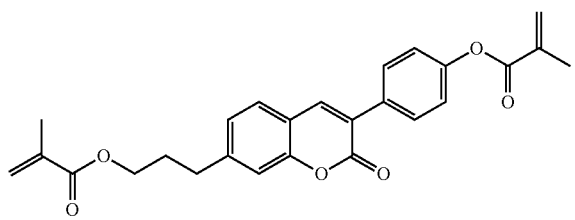 [SMILES: C=C(C)C(=O)OCCCc1ccc2cc(-c3ccc(OC(=O)C(=C)C)cc3)c(=O)oc2c1]
RM-79
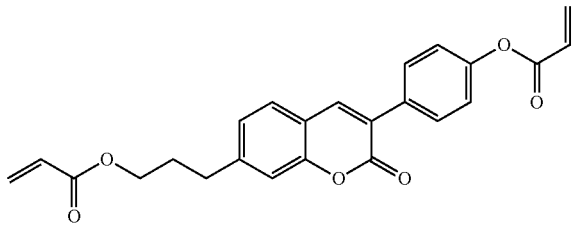 [SMILES: C=CC(=O)OCCCc1ccc2cc(-c3ccc(OC(=O)C=C)cc3)c(=O)oc2c1]
RM-80

TABLE D-continued
Table D shows illustrative reactive mesogenic compounds of formula P which can be used in the LC media in accordance with the present invention.
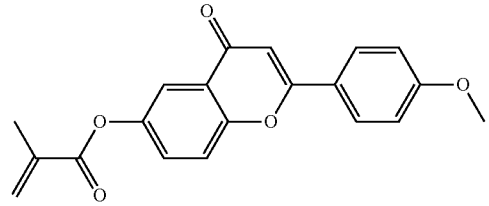 [SMILES: C=C(C)C(=O)Oc1ccc2oc(-c3ccc(OC)cc3)cc(=O)c2c1] RM-81
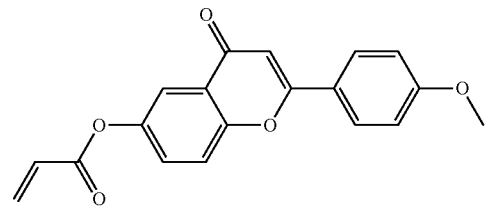 [SMILES: C=CC(=O)Oc1ccc2oc(-c3ccc(OC)cc3)cc(=O)c2c1] RM-82
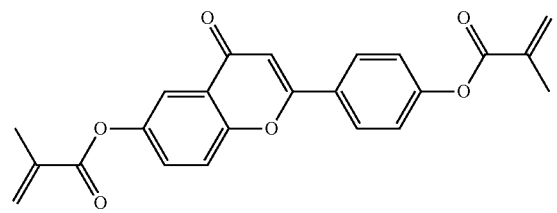 [SMILES: C=C(C)C(=O)Oc1ccc(-c2cc(=O)c3cc(OC(=O)C(=C)C)ccc3o2)cc1] RM-83
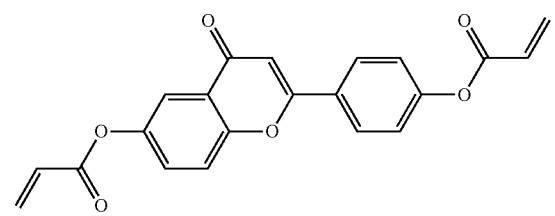 [SMILES: C=CC(=O)Oc1ccc(-c2cc(=O)c3cc(OC(=O)C=C)ccc3o2)cc1] RM-84
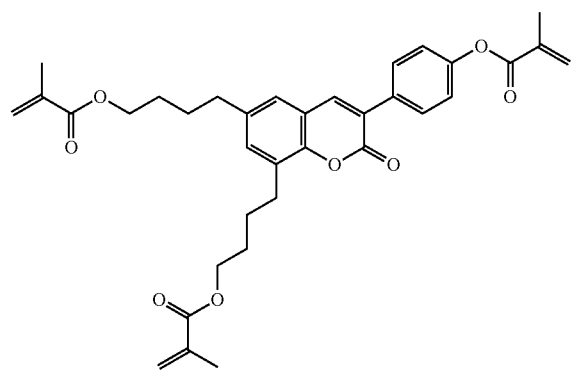 [SMILES: C=C(C)C(=O)OCCCCc1cc(CCCCOC(=O)C(=C)C)c2oc(=O)c(-c3ccc(OC(=O)C(=C)C)cc3)cc2c1] RM-85
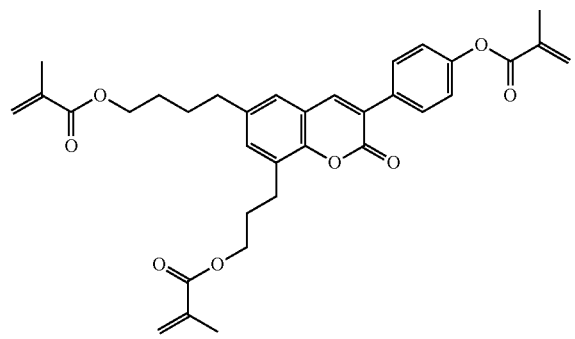 [SMILES: C=C(C)C(=O)OCCCCc1cc(CCCOC(=O)C(=C)C)c2oc(=O)c(-c3ccc(OC(=O)C(=C)C)cc3)cc2c1] RM-86

TABLE D-continued
Table D shows illustrative reactive mesogenic compounds of formula P which can be used in the LC media in accordance with the present invention.
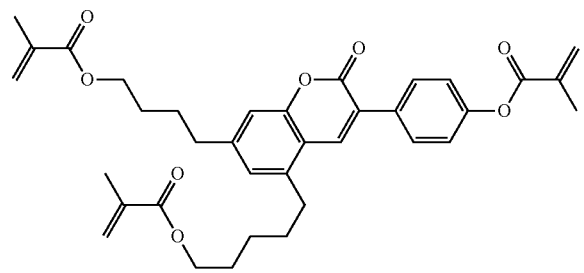 [SMILES: C=C(C)C(=O)OCCCCCc1cc(CCCCOC(=O)C(=C)C)cc2oc(=O)c(-c3ccc(OC(=O)C(=C)C)cc3)cc12] RM-87
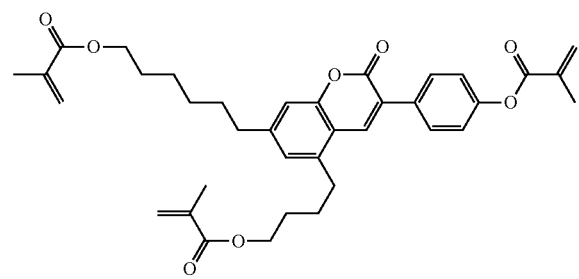 [SMILES: C=C(C)C(=O)OCCCCCCc1cc(CCCCOC(=O)C(=C)C)c2cc(-c3ccc(OC(=O)C(=C)C)cc3)c(=O)oc2c1] RM-88
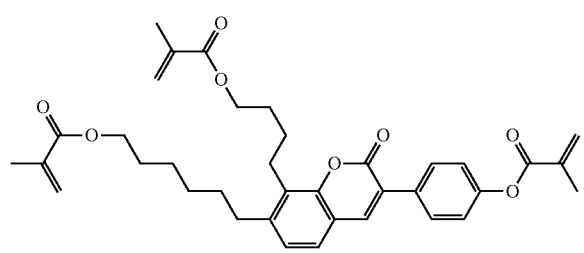 [SMILES: C=C(C)C(=O)OCCCCCCc1ccc2cc(-c3ccc(OC(=O)C(=C)C)cc3)c(=O)oc2c1CCCCOC(=O)C(=C)C] RM-89
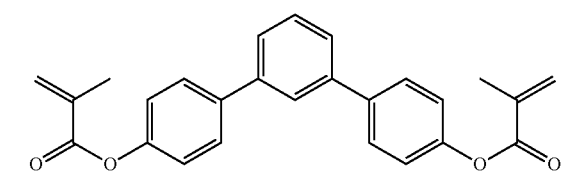 [SMILES: C=C(C)C(=O)Oc1ccc(-c2cccc(-c3ccc(OC(=O)C(=C)C)cc3)c2)cc1] RM-90
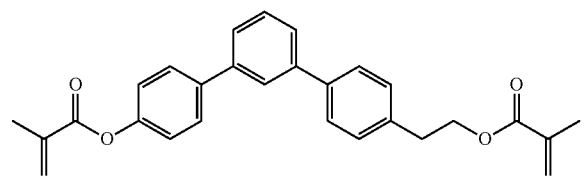 [SMILES: C=C(C)C(=O)OCCc1ccc(-c2cccc(-c3ccc(OC(=O)C(=C)C)cc3)c2)cc1] RM-91
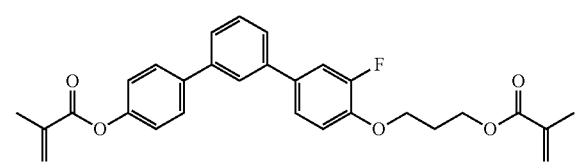 [SMILES: C=C(C)C(=O)OCCCOc1ccc(-c2cccc(-c3ccc(OC(=O)C(=C)C)cc3)c2)cc1F] RM-92
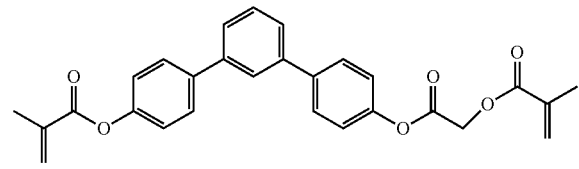 [SMILES: C=C(C)C(=O)OCC(=O)Oc1ccc(-c2cccc(-c3ccc(OC(=O)C(=C)C)cc3)c2)cc1] RM-93

TABLE D-continued
Table D shows illustrative reactive mesogenic compounds of formula P
which can be used in the LC media in accordance with the present invention.
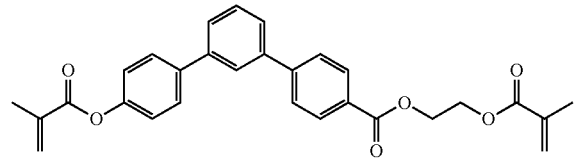 [SMILES: C=C(C)C(=O)OCCOC(=O)c1ccc(-c2cccc(-c3ccc(OC(=O)C(=C)C)cc3)c2)cc1]
RM-94
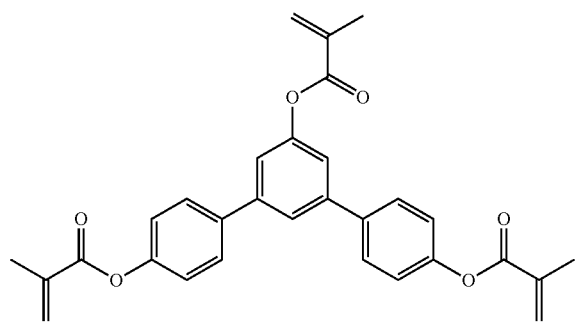 [SMILES: C=C(C)C(=O)Oc1ccc(-c2cc(OC(=O)C(=C)C)cc(-c3ccc(OC(=O)C(=C)C)cc3)c2)cc1]
RM-95
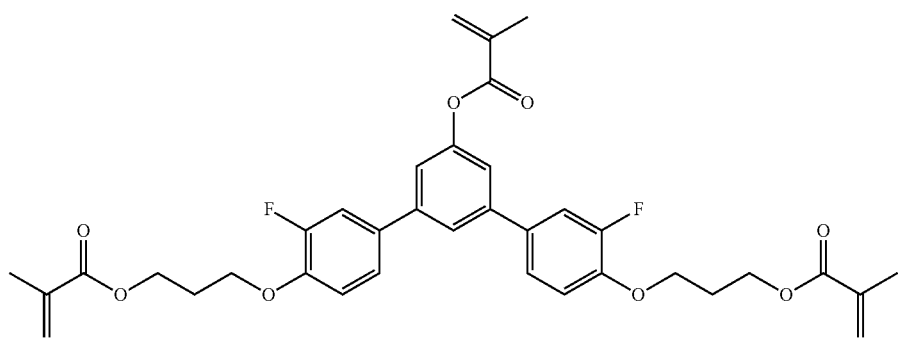 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-96
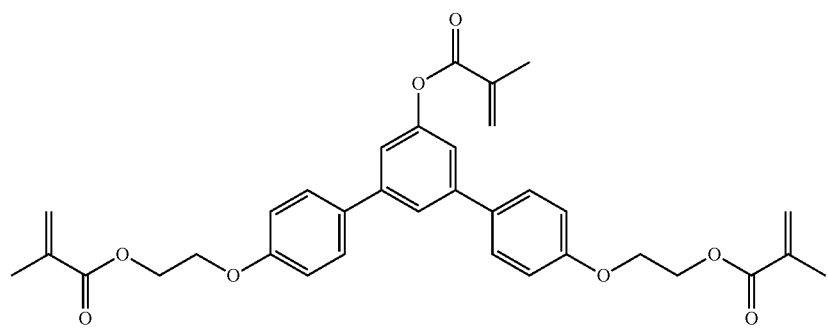 [SMILES: C=C(C)C(=O)OCCOc1ccc(-c2cc(OC(=O)C(=C)C)cc(-c3ccc(OCCOC(=O)C(=C)C)cc3)c2)cc1]
RM-97
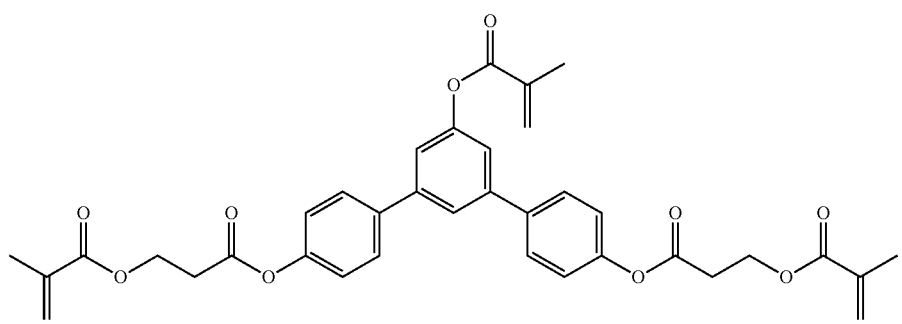 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-98

TABLE D-continued
Table D shows illustrative reactive mesogenic compounds of formula P which can be used in the LC media in accordance with the present invention.
RM-99
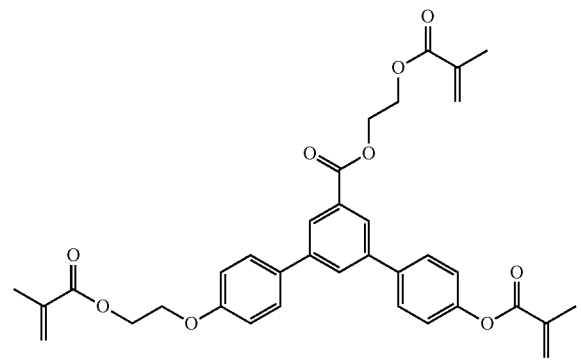 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-100
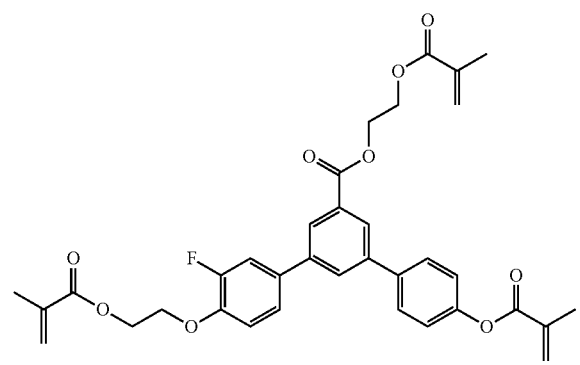 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-101
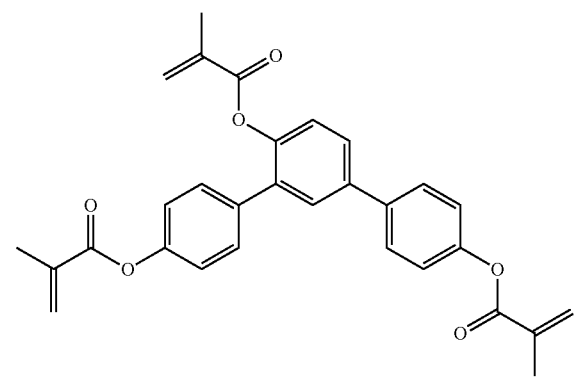 [SMILES: C=C(C)C(=O)Oc1ccc(-c2ccc(OC(=O)C(=C)C)c(-c3ccc(OC(=O)C(=C)C)cc3)c2)cc1]
RM-102
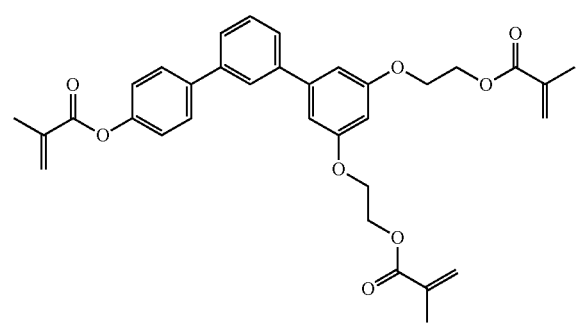 [SMILES: C=C(C)C(=O)OCCOc1cc(OCCOC(=O)C(=C)C)cc(-c2cccc(-c3ccc(OC(=O)C(=C)C)cc3)c2)c1]

TABLE D-continued
Table D shows illustrative reactive mesogenic compounds of formula P
which can be used in the LC media in accordance with the present invention.
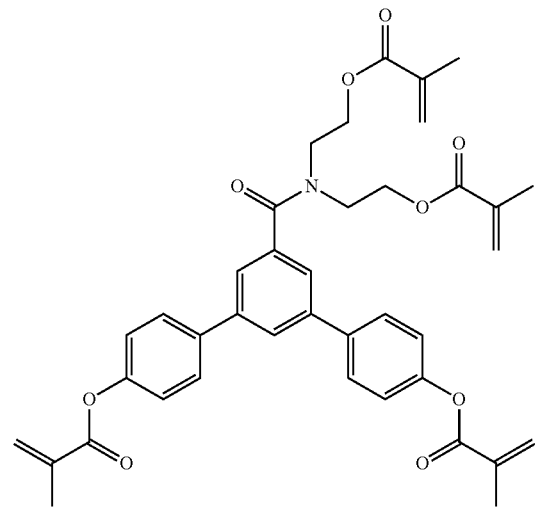 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-103
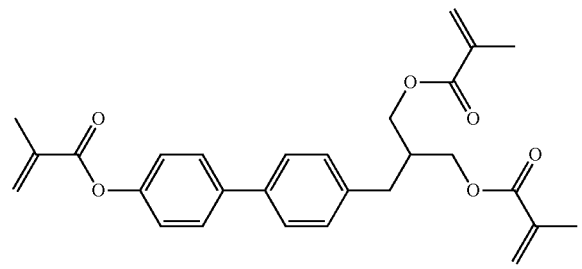 [SMILES: C=C(C)C(=O)OCC(COC(=O)C(=C)C)Cc1ccc(-c2ccc(OC(=O)C(=C)C)cc2)cc1]
RM-104
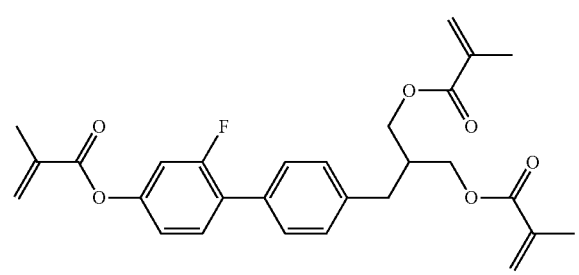 [SMILES: C=C(C)C(=O)OCC(COC(=O)C(=C)C)Cc1ccc(-c2ccc(OC(=O)C(=C)C)cc2F)cc1]
RM-105
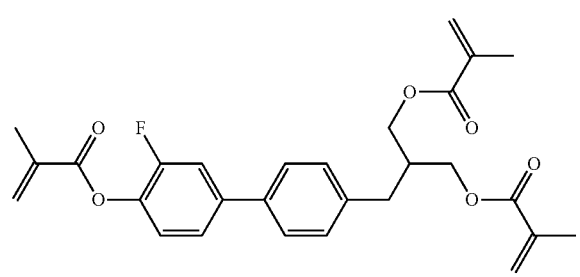 [SMILES: C=C(C)C(=O)OCC(COC(=O)C(=C)C)Cc1ccc(-c2ccc(OC(=O)C(=C)C)c(F)c2)cc1]
RM-106

TABLE D-continued
Table D shows illustrative reactive mesogenic compounds of formula P which can be used in the LC media in accordance with the present invention.
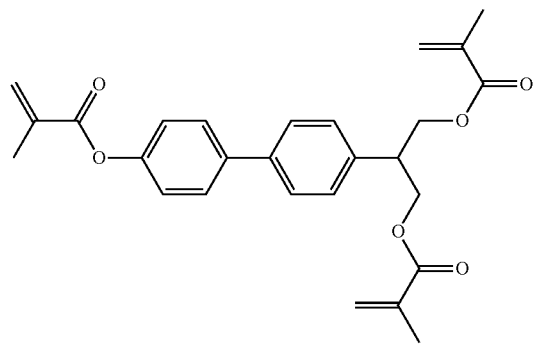 [SMILES: C=C(C)C(=O)OCC(COC(=O)C(=C)C)c1ccc(-c2ccc(OC(=O)C(=C)C)cc2)cc1]
RM-107
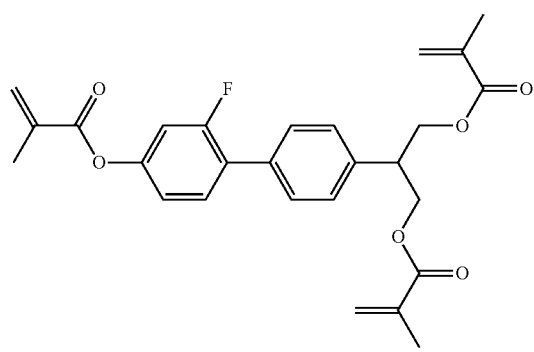 [SMILES: C=C(C)C(=O)OCC(COC(=O)C(=C)C)c1ccc(-c2ccc(OC(=O)C(=C)C)cc2F)cc1]
RM-108
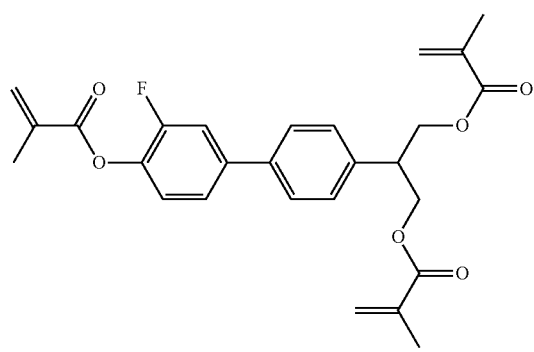
RM-109
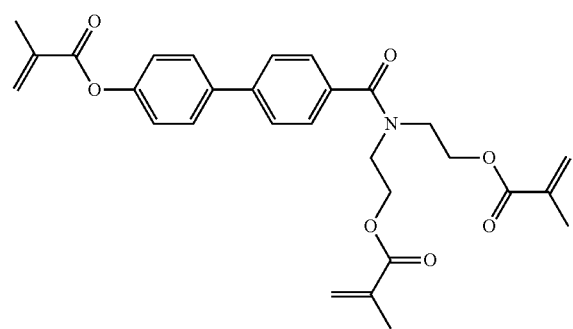 [SMILES: C=C(C)C(=O)OCCN(CCOC(=O)C(=C)C)C(=O)c1ccc(-c2ccc(OC(=O)C(=C)C)cc2)cc1]
RM-110

TABLE D-continued
Table D shows illustrative reactive mesogenic compounds of formula P
which can be used in the LC media in accordance with the present invention.
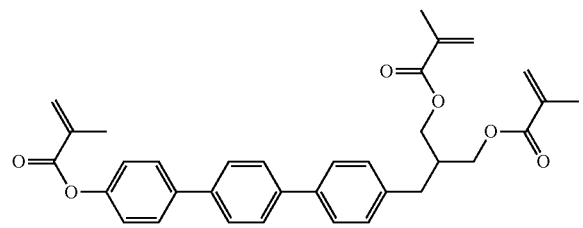 [SMILES: C=C(C)C(=O)OCC(COC(=O)C(=C)C)Cc1ccc(-c2ccc(-c3ccc(OC(=O)C(=C)C)cc3)cc2)cc1]
RM-111
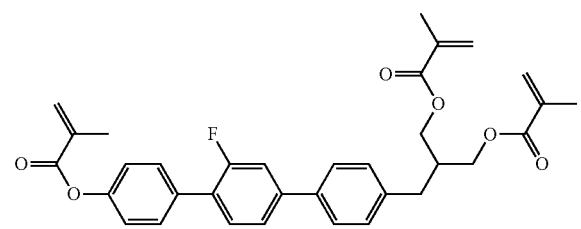 [SMILES: C=C(C)C(=O)OCC(COC(=O)C(=C)C)Cc1ccc(-c2ccc(-c3ccc(OC(=O)C(=C)C)cc3)c(F)c2)cc1]
RM-112
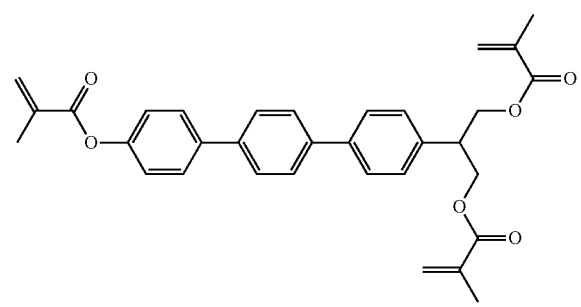
RM-113
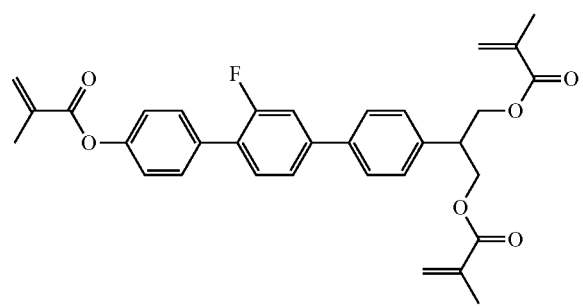 [SMILES: C=C(C)C(=O)OCC(COC(=O)C(=C)C)c1ccc(-c2ccc(-c3ccc(OC(=O)C(=C)C)cc3)c(F)c2)cc1]
RM-114
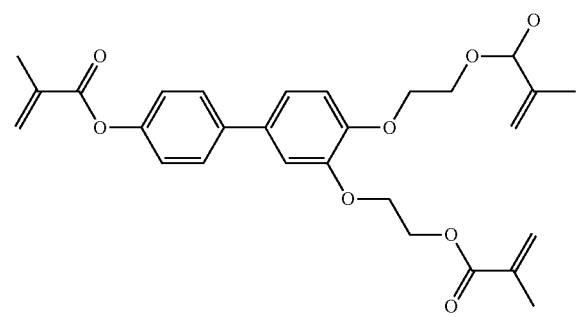
RM-115

TABLE D-continued
Table D shows illustrative reactive mesogenic compounds of formula P
which can be used in the LC media in accordance with the present invention.
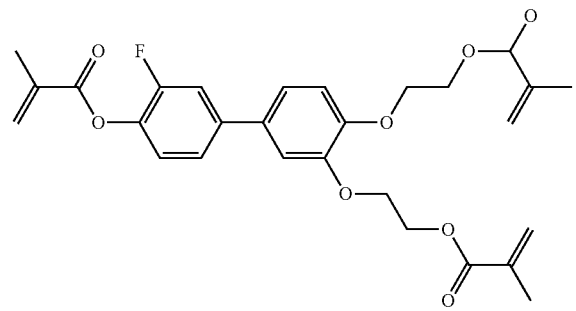 [SMILES: C=C(C)C(=O)OCCOc1cc(-c2ccc(OC(=O)C(=C)C)cc2)ccc1OCCOC(O)C(=C)C]
RM-116
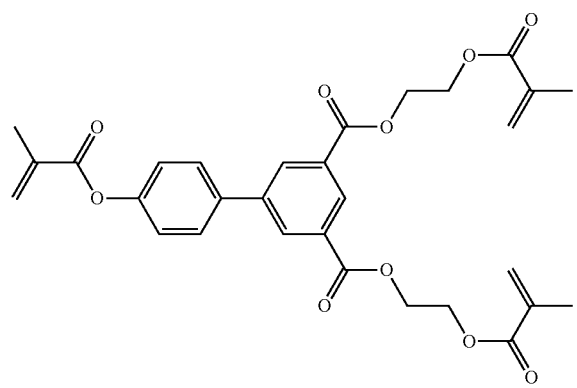 [SMILES: C=C(C)C(=O)OCCOC(=O)c1cc(C(=O)OCCOC(=O)C(=C)C)cc(-c2ccc(OC(=O)C(=C)C)cc2)c1]
RM-117
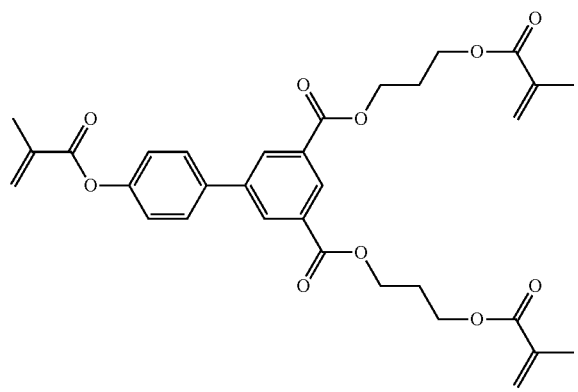 [SMILES: C=C(C)C(=O)OCCCOC(=O)c1cc(C(=O)OCCCOC(=O)C(=C)C)cc(-c2ccc(OC(=O)C(=C)C)cc2)c1]
RM-118
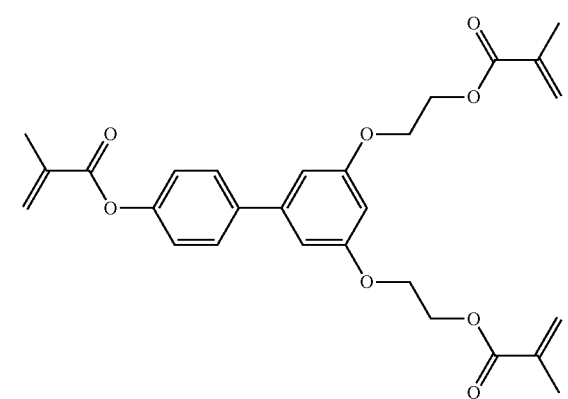 [SMILES: C=C(C)C(=O)OCCOc1cc(OCCOC(=O)C(=C)C)cc(-c2ccc(OC(=O)C(=C)C)cc2)c1]
RM-119

TABLE D-continued
Table D shows illustrative reactive mesogenic compounds of formula P
which can be used in the LC media in accordance with the present invention.
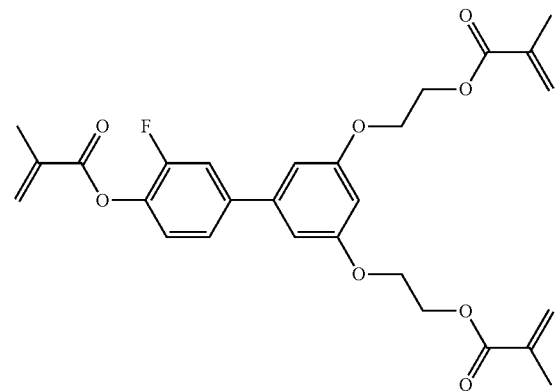 [SMILES: C=C(C)C(=O)OCCOc1cc(OCCOC(=O)C(=C)C)cc(-c2ccc(OC(=O)C(=C)C)c(F)c2)c1] RM-120
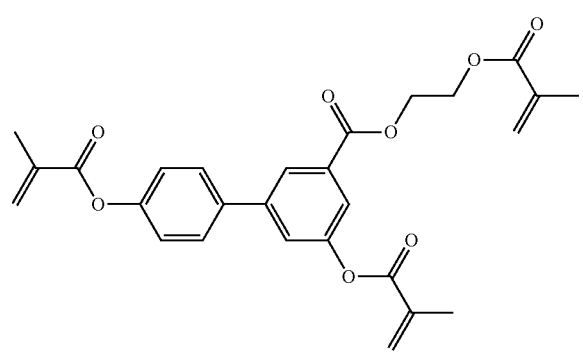 [SMILES: C=C(C)C(=O)OCCOC(=O)c1cc(OC(=O)C(=C)C)cc(-c2ccc(OC(=O)C(=C)C)cc2)c1] RM-121
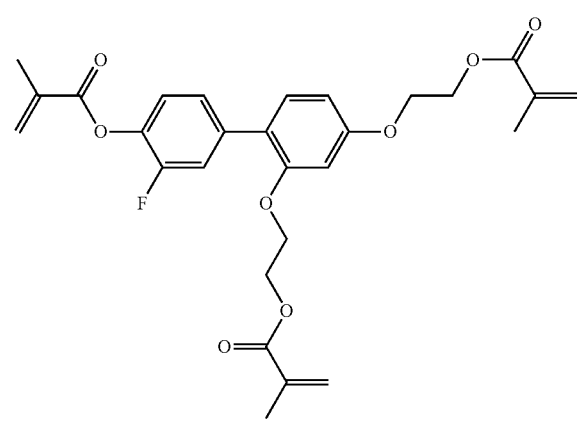 [SMILES: C=C(C)C(=O)OCCOc1ccc(-c2ccc(OC(=O)C(=C)C)c(F)c2)c(OCCOC(=O)C(=C)C)c1] RM-122
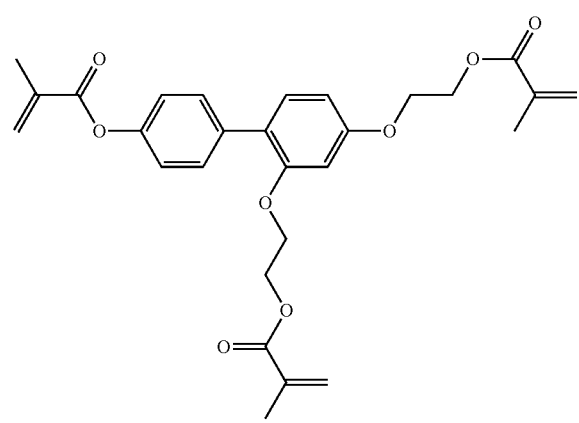 [SMILES: C=C(C)C(=O)OCCOc1ccc(-c2ccc(OC(=O)C(=C)C)cc2)c(OCCOC(=O)C(=C)C)c1] RM-123

TABLE D-continued
Table D shows illustrative reactive mesogenic compounds of formula P
which can be used in the LC media in accordance with the present invention.
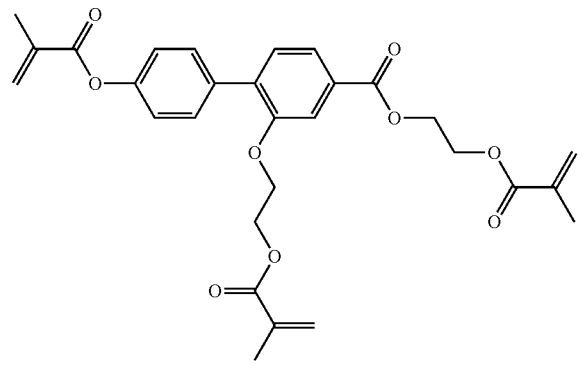 [SMILES: C=C(C)C(=O)OCCOC(=O)c1ccc(-c2ccc(OC(=O)C(=C)C)cc2)c(OCCOC(=O)C(=C)C)c1]
RM-124
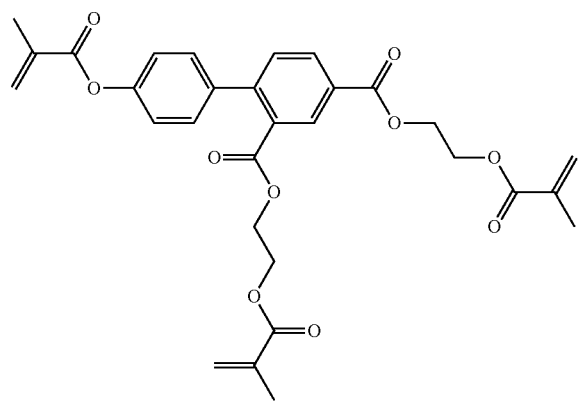 [SMILES: C=C(C)C(=O)OCCOC(=O)c1ccc(-c2ccc(OC(=O)C(=C)C)cc2)c(C(=O)OCCOC(=O)C(=C)C)c1]
RM-125
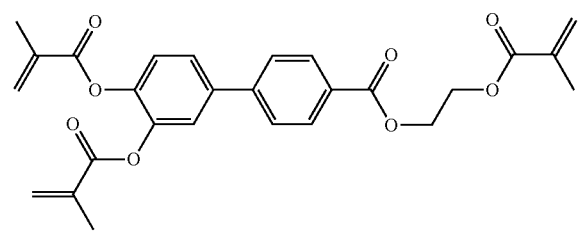 [SMILES: C=C(C)C(=O)OCCOC(=O)c1ccc(-c2ccc(OC(=O)C(=C)C)c(OC(=O)C(=C)C)c2)cc1]
RM-126
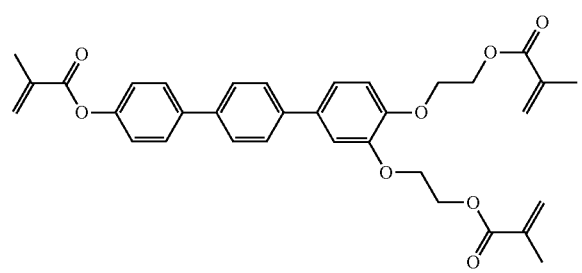 [SMILES: C=C(C)C(=O)OCCOc1ccc(-c2ccc(-c3ccc(OC(=O)C(=C)C)cc3)cc2)cc1OCCOC(=O)C(=C)C]
RM-127
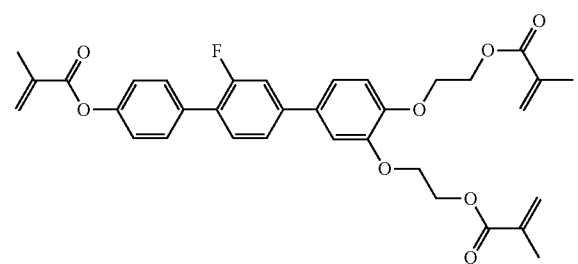 [SMILES: C=C(C)C(=O)OCCOc1ccc(-c2ccc(-c3ccc(OC(=O)C(=C)C)cc3)c(F)c2)cc1OCCOC(=O)C(=C)C]
RM-128

TABLE D-continued

Table D shows illustrative reactive mesogenic compounds of formula P
which can be used in the LC media in accordance with the present invention.

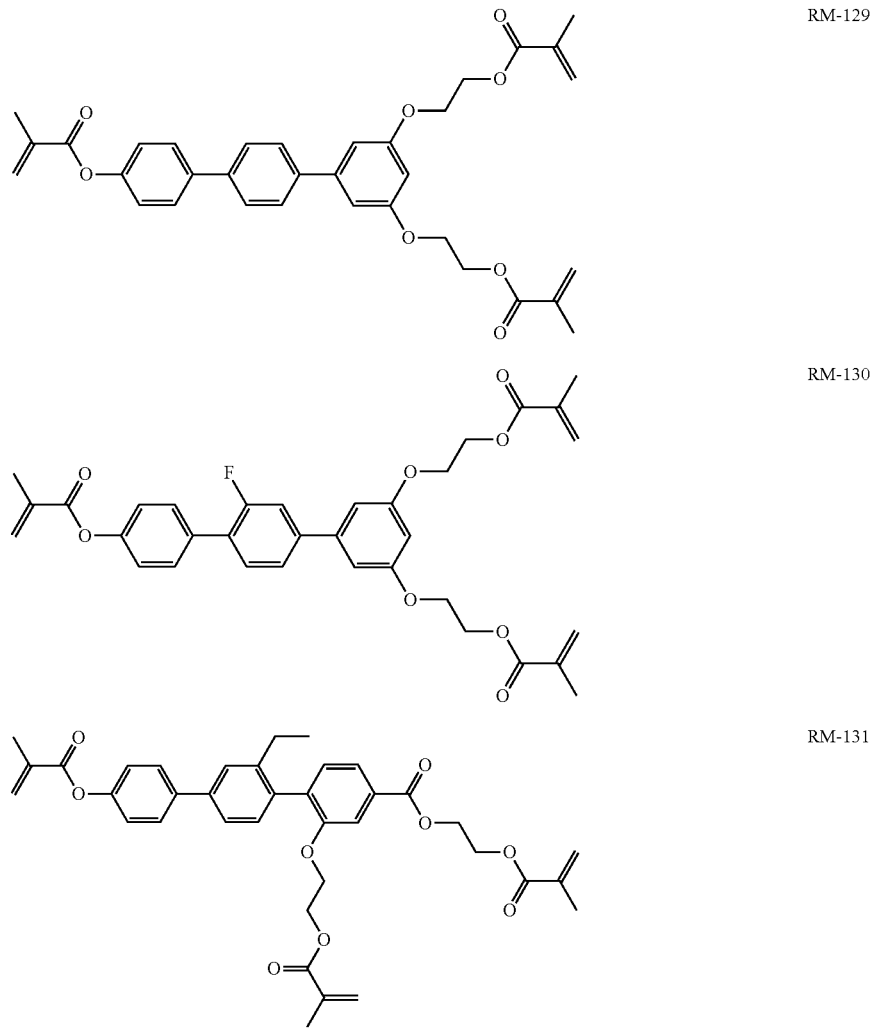

RM-129

RM-130

RM-131

In a preferred embodiment, the mixtures according to the invention comprise one or more polymerisable compounds, preferably selected from the polymerisable compounds of the formulae RM-1 to RM-131. Of these, compounds RM-1, RM-4, RM-8, RM-17, RM-19, RM-35, RM-37, RM-43, RM-47, RM-49, RM-51, RM-59, RM-69, RM-71, RM-83, RM-97, RM-98, RM-104, RM-112, RM-115, RM-116, and RM-128 are particularly preferred.

WORKING EXAMPLES

The following examples are intended to explain the invention without limiting it. In the examples, m.p. denotes the melting point and C denotes the clearing point of a liquid-crystalline substance in degrees Celsius; boiling temperatures are denoted by m.p. Furthermore: C denotes crystalline solid state, S denotes smectic phase (the index denotes the phase type), N denotes nematic state, Ch denotes cholesteric phase, I denotes isotropic phase, $T_g$ denotes glass-transition temperature. The number between two symbols indicates the conversion temperature in degrees Celsius an.

The host mixture used for determination of the optical anisotropy $\Delta n$ of the compounds of the formula IB is the commercial mixture ZLI-4792 (Merck KGaA). The dielectric anisotropy $\Delta \varepsilon$ is determined using commercial mixture ZLI-2857. The physical data of the compound to be investigated are obtained from the change in the dielectric constants of the host mixture after addition of the compound to be investigated and extrapolation to 100% of the compound employed. In general, 10% of the compound to be investigated are dissolved in the host mixture, depending on the solubility.

Unless indicated otherwise, parts or percent data denote parts by weight or percent by weight.

Above and Below:

$V_o$ denotes threshold voltage, capacitive [V] at 20° C., $n_e$ denotes extraordinary refractive index at 20° C. and 589 nm, $n_o$ denotes ordinary refractive index at 20° C. and 589 nm, $\Delta n$ denotes optical anisotropy at 20° C. and 589 nm, $\varepsilon_\perp$ denotes dielectric permittivity perpendicular to the director at 20° C. and 1 kHz, $\varepsilon_{\parallel}$ denotes dielectric permittivity parallel to the director at 20° C. and 1 kHz, $\Delta\varepsilon$ denotes dielectric anisotropy at 20° C. and 1 kHz, cl.p., T(N,I) denotes clearing point [° C.], $\gamma_1$ denotes rotational viscosity measured at 20° C. [mPa·s], determined by the rotation method in a magnetic field, $K_1$ denotes elastic constant, "splay" deformation at 20° C. [pN], $K_2$ denotes elastic constant, "twist" deformation at 20° C. [pN], $K_3$ denotes elastic constant, "bend" deformation at 20° C. [pN], and LTS denotes low-temperature stability (nematic phase), determined in test cells or in the bulk, as specified.

Unless explicitly noted otherwise, all values indicated in the present application for temperatures, such as, for example, the melting point T(C,N), the transition from the smectic (S) to the nematic (N) phase T(S,N) and the clearing point T(N,I) or cl.p., are indicated in degrees Celsius (° C.). M.p. denotes melting point. Furthermore, Tg=glass state, C=crystalline state, N=nematic phase, S=smectic phase and I=isotropic phase. The numbers between these symbols represent the transition temperatures.

The term "threshold voltage" for the present invention relates to the capacitive threshold ($V_0$), also called the Freedericksz threshold, unless explicitly indicated otherwise. In the examples, as is generally usual, the optical threshold can also be indicated for 10% relative contrast ($V_{10}$).

The display used for measurement of the capacitive threshold voltage consists of two plane-parallel glass outer plates at a separation of 20 µm, which each have on the insides an electrode layer and an unrubbed polyimide alignment layer on top, which cause a homeotropic edge alignment of the liquid-crystal molecules.

The display or test cell used for measurement of the tilt angle consists of two plane-parallel glass outer plates at a separation of 4 µm, which each have on the insides an electrode layer and a polyimide alignment layer on top, where the two polyimide layers are rubbed antiparallel to one another and cause a homeotropic edge alignment of the liquid-crystal molecules.

Unless indicated otherwise, the VHR is determined at 20° C. ($VHR_{20}$) and after 5 minutes in an oven at 100° C. ($VHR_{100}$) in a commercially available instrument Model 6254 from TOYO Corporation, Japan. The voltage used has a frequency of in a range from 1 Hz to 60 Hz, unless indicated more precisely.

The accuracy of the VHR measurement values depends on the respective value of the VHR. The accuracy decreases with decreasing values. The deviations generally observed in the case of values in the various magnitude ranges are compiled in their order of magnitude in the following table.

| VHR range VHR values | | Deviation (relative) $\Delta_G VHR/VHR/\%$ |
| --- | --- | --- |
| from | to | Approx. |
| 99.6% | 100% | +/−0.1 |
| 99.0% | 99.6% | +/−0.2 |
| 98% | 99% | +/−0.3 |
| 95% | 98% | +/−0.5 |
| 90% | 95% | +/−1 |
| 80% | 90% | +/−2 |
| 60% | 80% | +/−4 |
| 40% | 60% | +/−8 |
| 20% | 40% | +/−10 |
| 10% | 20% | +/−20 |

The stability to UV irradiation is investigated in a "Suntest CPS", a commercial instrument from Heraeus, Germany. The sealed test cells are irradiated for between 30 min and 2.0 hours, unless explicitly indicated, without additional heating. The irradiation power in the wavelength range from 300 nm to 800 nm is 765 W/m² V. A UV "cut-off" filter having an edge wavelength of 310 nm is used in order to simulate the so-called window glass mode. In each series of experiments, at least four test cells are investigated for each condition, and the respective results are indicated as averages of the corresponding individual measurements.

The decrease in the voltage holding ratio ($\Delta VHR$) usually caused by the exposure, for example by UV irradiation or by LCD backlighting, is determined in accordance with the following equation (1):

$$\Delta VHR(t) = VHR(t) - VHR(t=0) \tag{1}$$

In order to investigate the low-temperature stability (LTS), i.e. the stability of the LC mixture in the bulk against spontaneous crystallisation of individual components at low temperatures or the occurrence of smectic phases, several sealed bottles, each containing about 1 g of the material, are stored at one or more given temperatures, typically of −10° C., −20° C., −30° C. and/or −40° C. and it is inspected at regular intervals visually, whether a phase transition is observed or not. As soon as the first one of the samples at a given temperature shows a change time is noted. The time until the last inspection, at which no change has been observed, is noted as the respective LTS.

The ion density from which the resistivity is calculated is measured using the commercially available LC Material Characteristics Measurement System Model 6254 from Toyo Corporation, Japan, using VHR test cells with AL16301 Polyimide (JSR Corp., Japan) having a 3.2 µm cell gap. The measurement is performed after 5 min of storage in an oven at 60° C. or 100° C.

The so-called "HTP" denotes the helical twisting power of an optically active or chiral substance in an LC medium (in µm). Unless indicated otherwise, the HTP is measured in the commercially available nematic LC host mixture MLD-6260 (Merck KGaA) at a temperature of 20° C.

Unless explicitly noted otherwise, all concentrations in the present application are indicated in percent by weight and relate to the corresponding mixture as a whole, comprising all solid or liquid-crystalline components, without solvents. All physical properties are determined in accordance with "Merck Liquid Crystals, Physical Properties of Liquid Crystals", Status November 1997, Merck KGaA, Germany, and apply for a temperature of 20° C., unless explicitly indicated otherwise.

The following mixture examples having negative dielectric anisotropy are suitable, in particular, for liquid-crystal displays which have at least one planar alignment layer, such as, for example, IPS and FFS displays, in particular UB-FFS (=ultra-bright FFS), and for VA displays.

Mixture Examples and Comparative Examples

Comparative Mixture C₁ is prepared as follows:

| | | | |
|---|---|---|---|
| CY-3-O4 | 20.0% | Clearing point/° C.: | 86.5 |
| CCY-3-O2 | 8.0% | Δn (589 nm, 20° C.): | 0.1089 |
| CCY-3-O3 | 6.0% | $n_e$ (589 nm, 20° C.): | 1.5917 |
| CCY-4-O2 | 8.0% | Δε (1 kHz, 20° C.): | −4.3 |
| CLY-3-O2 | 5.0% | $ε_⊥$ (1 kHz, 20° C.): | 8.0 |
| CLY-3-O3 | 5.0% | $K_1$ (pN, 20° C.): | 14.6 |
| CLY-2-O4 | 6.0% | $K_3$ (pN, 20° C.): | 15.1 |
| PYP-2-3 | 10.0% | $V_0$ (20° C.)/V: | 1.99 |
| CC-3-V | 26.0% | $γ_1$ (20° C.)/mPa·s: | 151 |
| PGIY-2-O4 | 6.0% | $LTS_{bulk}$ (−20° C.)/h: | 336 |
| Σ | 100.0% | $LTS_{bulk}$ (−30° C.)/h: | 144 |

Mixture M1 is prepared as follows:

| | | | |
|---|---|---|---|
| CY-3-O4 | 14.0% | Clearing point/° C.: | 86.5 |
| CCY-3-O2 | 4.5% | Δn (589 nm, 20° C.): | 0.1101 |
| CCY-3-O3 | 3.0% | $n_e$ (589 nm, 20° C.): | 1.5956 |
| CCY-4-O2 | 4.0% | Δε (1 kHz, 20° C.): | −4.1 |
| CLY-3-O2 | 5.0% | $ε_⊥$ (1 kHz, 20° C.): | 7.7 |
| CLY-3-O3 | 5.0% | $K_1$ (pN, 20° C.): | 14.8 |
| CLY-2-O4 | 5.5% | $K_3$ (pN, 20° C.): | 14.7 |
| PYP-2-3 | 7.5% | $V_0$ (20° C.)/V: | 2.00 |
| PGIY-2-O4 | 7.0% | $γ_1$ (20° C.)/mPa·s: | 127 |
| CC-3-V | 35.5% | | |
| COB(S)-4-O4 | 3.0% | | |
| COB(S)-2-O2 | 3.0% | | |
| COB(S)-2-O4 | 3.0% | | |
| Σ | 100.0% | | |

Mixture M2 is prepared as follows:

| | | | |
|---|---|---|---|
| CY-3-O4 | 16.5% | Clearing point/° C.: | 86.5 |
| CCY-3-O2 | 5.0% | Δn (589 nm, 20° C.): | 0.1094 |
| CCY-3-O3 | 3.5% | $n_e$ (589 nm, 20° C.): | 1.5939 |
| CCY-4-O2 | 4.0% | Δε (1 kHz, 20° C.): | −4.2 |
| CLY-3-O2 | 6.5% | $ε_⊥$ (1 kHz, 20° C.): | 7.8 |
| CLY-3-O3 | 6.5% | $K_1$ (pN, 20° C.): | 14.8 |
| CLY-2-O4 | 6.5% | $K_3$ (pN, 20° C.): | 14.9 |
| PYP-2-3 | 8.0% | $V_0$ (20° C.)/V: | 2.00 |
| PGIY-2-O4 | 7.0% | $γ_1$ (20° C.)/mPa·s: | 138 |
| CC-3-V | 31.5% | | |
| COB(S)-4-O4 | 4.0% | | |
| Σ | 100.0% | | |

Mixture M3 is prepared as follows:

| | | | |
|---|---|---|---|
| CY-3-O4 | 15.0% | Clearing point 1° C.: | 87.0 |
| CCY-3-O2 | 4.0% | Δn (589 nm, 20° C.): | 0.1108 |
| CCY-3-O3 | 4.0% | $n_e$ (589 nm, 20° C.): | 1.5962 |
| CCY-4-O2 | 4.5% | Δε (1 kHz, 20° C.): | −4.2 |
| CLY-3-O2 | 5.0% | $ε_⊥$ (1 kHz, 20° C.): | 7.8 |
| CLY-3-O3 | 6.0% | $K_1$ (pN, 20° C.): | 14.9 |
| CLY-2-O4 | 6.0% | $K_3$ (pN, 20° C.): | 14.5 |
| PYP-2-3 | 8.5% | $V_0$ (20° C.)/V: | 1.96 |
| PGIY-2-O4 | 6.0% | $γ_1$ (20° C.)/mPa·s: | 133 |
| CC-3-V | 33.0% | | |
| COB(S)-2-O4 | 8.0% | | |
| Σ | 100.0% | | |

Mixture M4 is prepared as follows:

| | | | |
|---|---|---|---|
| CY-3-O4 | 13.5% | Clearing point/° C.: | 87.0 |
| CCY-3-O2 | 4.0% | Δn (589 nm, 20° C.): | 0.1109 |
| CCY-3-O3 | 3.0% | $n_e$ (589 nm, 20° C.): | 1.5969 |
| CCY-4-O2 | 5.0% | Δε (1 kHz, 20° C.): | −4.1 |
| CLY-3-O2 | 4.0% | $ε_⊥$ (1 kHz, 20° C.): | 7.7 |
| CLY-3-O3 | 5.0% | $K_1$ (pN, 20° C.): | 14.9 |
| CLY-2-O4 | 6.0% | $K_3$ (pN, 20° C.): | 14.5 |
| PYP-2-3 | 8.5% | $V_0$ (20° C.)/V: | 1.97 |
| PGIY-2-O4 | 6.0% | $γ_1$ (20° C.)/mPa·s: | 129 |
| CC-3-V | 35.0% | | |
| COB(S)-2-O4 | 10.0% | | |
| Σ | 100.0% | | |

Mixture M5 is prepared as follows:

| | | | |
|---|---|---|---|
| CC-3-V | 39.0% | Clearing point/° C.: | 81.0 |
| COB(S)-2-O2 | 7.0% | Δn (589 nm, 20° C.): | 0.1072 |
| CLY-2-O4 | 5.5% | $n_e$ (589 nm, 20° C.): | 1.5925 |
| CLY-3-O2 | 5.0% | Δε (1 kHz, 20° C.): | −3.7 |
| CLY-3-O3 | 5.0% | $ε_⊥$ (1 kHz, 20° C.): | 7.2 |
| CY-3-O4 | 13.0% | $K_1$ (pN, 20° C.): | 13.9 |
| CY-5-O4 | 2.0% | $K_3$ (pN, 20° C.): | 14.5 |
| CPY-2-O2 | 9.0% | $V_0$ (20° C.)/V: | 2.10 |
| CPY-3-O2 | 8.0% | $γ_1$ (20° C.)/mPa·s: | 106 |
| PYP-2-3 | 6.5% | | |
| Σ | 100.0% | | |

Mixture M6 is prepared as follows:

| | | | |
|---|---|---|---|
| CC-3-V | 37.5% | Clearing point/° C.: | 81.0 |
| COB(S)-4-O4 | 7.0% | Δn (589 nm, 20° C.): | 0.1082 |
| CLY-2-O4 | 5.0% | $n_e$ (589 nm, 20° C.): | 1.5937 |
| CLY-3-O2 | 5.0% | Δε (1 kHz, 20° C.): | −3.7 |
| CLY-3-O3 | 5.0% | $ε_⊥$ (1 kHz, 20° C.): | 7.2 |
| CY-3-O4 | 14.5% | $K_1$ (pN, 20° C.): | 13.8 |
| CY-5-O4 | 1.5% | $K_3$ (pN, 20° C.): | 14.3 |
| CPY-2-O2 | 9.0% | $V_0$ (20° C.)/V: | 2.09 |
| CPY-3-O2 | 8.0% | $γ_1$ (20° C.)/mPa·s: | 113 |
| PYP-2-3 | 7.5% | | |
| Σ | 100.0% | | |

Mixture M7 is prepared as follows:

| | | | |
|---|---|---|---|
| CC-3-V | 38.0% | Clearing point/° C.: | 81.0 |
| COB(S)-4-O4 | 8.0% | Δn (589 nm, 20° C.): | 0.1071 |
| CLY-2-O4 | 5.5% | $n_e$ (589 nm, 20° C.): | 1.5926 |
| CLY-3-O2 | 5.0% | Δε (1 kHz, 20° C.): | −3.8 |
| CLY-3-O3 | 5.0% | $ε_⊥$ (1 kHz, 20° C.): | 7.3 |
| CY-3-O4 | 14.0% | $K_1$ (pN, 20° C.): | 13.9 |
| CY-5-O4 | 1.5% | $K_3$ (pN, 20° C.): | 14.2 |
| CPY-2-O2 | 8.5% | $V_0$ (20° C.)/V: | 2.05 |
| CPY-3-O2 | 8.0% | $γ_1$ (20° C.)/mPa·s: | 105 |
| PYP-2-3 | 6.5% | | |
| Σ | 100.0% | | |

The VHR of the mixtures C₁ and M1 to M6 has been measured (VHR test cells with a UV-PI for planar orientation, cell gap of 4.0 μm at 1 V, 1 Hz, 60° C.) as shown in the following table. The values were measured immediately after filling of the test cells.

| Mixture | | | | | | | |
|---|---|---|---|---|---|---|---|
| | C1 | M1 | M2 | M3 | M4 | M5 | M6 | M7 |
| VHR [%] | 95.5 | 96.2 | 95.9 | 96.3 | 95.8 | 95.9 | 96.5 | 96.5 |

Surprisingly, use of a compound of formula IA in a medium according to the invention results in liquid-crystal mixtures with at least the same high VHR as the reference mixture C1. At the same time, compared to C1 the media according to the invention show a lower rotational viscosity. Hence it is possible to achieve media with improved response time without negatively influencing the reliability.

Mixture M8 is prepared as follows:

| | | | |
|---|---|---|---|
| B(S)-2O-O4 | 2.0% | Clearing point/° C.: | 85.1 |
| B(S)-2O-O5 | 4.0% | Δn (589 nm, 20° C.): | 0.0941 |
| CC-3-V | 37.0% | Δε (1 kHz, 20° C.): | −3.2 |
| CC-3-V1 | 2.0% | $\varepsilon_\perp$ (1 kHz, 20° C.): | 6.6 |
| CCP-V-1 | 18.5% | $K_1$ (pN, 20° C.): | 14.5 |
| CCY-3-O2 | 10.0% | $K_3$ (pN, 20° C.): | 16.3 |
| CCY-5-O2 | 2.0% | $V_0$ (20° C.)/V: | 2.38 |
| COB(S)-2-O4 | 10.0% | $\gamma_1$ (20° C.)/mPa·s: | 89 |
| CY-3-O2 | 14.5% | | |
| Σ | 100.0% | | |

The medium M8 is distinguished by a particularly low rotational viscosity which enables LC displays with surprisingly short switching times.

Mixture M9

| | |
|---|---|
| CY-3-O2 | 2.0% |
| CCY-3-O2 | 4.0% |
| CPY-2-O2 | 37.0% |
| CPY-3-O2 | 2.0% |
| PYP-2-3 | 18.5% |
| PYP-2-4 | 10.0% |
| CC-3-V | 2.0% |
| COB(S)-2-O4 | 14.5% |
| Σ | 100.0% |

Mixture M10

Mixture M10 consists of 99.96% of Mixture M9 and 0.04% of the compound ST-3a-1 shown above.

Mixture M11

| | | | |
|---|---|---|---|
| B(S)-2O-O4 | 2.0% | Clearing point/° C.: | 97.1 |
| B(S)-2O-O5 | 4.0% | Δn (589 nm, 20° C.): | 0.1153 |
| CC-3-V1 | 11.0% | Δε (1 kHz, 20° C.): | −4.1 |
| CC-2-3 | 18.0% | $\varepsilon_\perp$ (1 kHz, 20° C.): | 7.5 |
| CC-3-4 | 2.0% | $K_1$ (pN, 20° C.): | 20.0 |
| CCP-3-1 | 5.0% | $K_3$ (pN, 20° C.): | 16.9 |
| CCP-3-3 | 5.0% | $V_0$ (20° C.)/V: | 2.15 |
| CCP-V-1 | 2.0% | $\gamma_1$ (20° C.)/mPa·s: | 162 |
| CCY-2-1 | 5.0% | | |
| CCY-3-1 | 5.0% | | |
| CLY-3-O2 | 6.0% | | |
| COB(S)-2-O4 | 12.0% | | |
| CPY-2-O2 | 1.5% | | |
| CPY-3-O2 | 2.0% | | |
| CY-5-O2 | 10.5% | | |
| PGIY-2-O4 | 6.0% | | |
| PYP-2-3 | 3.0% | | |
| Σ | 100.0% | | |

Mixture M12

Mixture M12 consists of 99.965% of Mixture M11 and 0.035% of the compound ST-3a-1 shown above.

Mixture M13

| | | | |
|---|---|---|---|
| B(S)-2O-O4 | 2.0% | Clearing point/° C.: | 97.5 |
| B(S)-2O-O5 | 4.0% | Δn (589 nm, 20° C.): | 0.1154 |
| CC-3-V1 | 11.0% | Δε (1 kHz, 20° C.): | −3.6 |
| CC-2-3 | 18.0% | $\varepsilon_\perp$ (1 kHz, 20° C.): | 6.9 |
| CC-3-4 | 2.0% | $K_1$ (pN, 20° C.): | 19.1 |
| CCP-3-1 | 5.0% | $K_3$ (pN, 20° C.): | 17.2 |
| CCP-3-3 | 5.0% | $V_0$ (20° C.)/V: | 2.33 |
| CCP-V-1 | 6.0% | $\gamma_1$ (20° C.)/mPa·s: | 150 |
| CCY-2-1 | 5.0% | | |
| CCY-3-1 | 5.0% | | |
| CLY-3-O2 | 3.0% | | |
| COB(S)-2-O4 | 11.0% | | |
| CPY-3-O2 | 3.5% | | |
| CY-5-O2 | 9.5% | | |
| PGIY-2-O4 | 5.0% | | |
| PYP-2-3 | 5.0% | | |
| Σ | 100.0% | | |

Mixture M14

Mixture M14 consists of 99.965% of Mixture M13 and 0.035% of the compound ST-3a-1 shown above.

Mixture M15

| | | | |
|---|---|---|---|
| B(S)-2O-O5 | 1.0% | Clearing point/° C.: | 104.6 |
| CC-3-V | 5.0% | Δn (589 nm, 20° C.): | 0.1148 |
| CC-3-V1 | 11.0% | Δε (1 kHz, 20° C.): | −3.4 |
| CC-2-3 | 18.0% | $\varepsilon_\perp$ (1 kHz, 20° C.): | 6.7 |
| CC-3-4 | 2.5% | $K_1$ (pN, 20° C.): | 19.1 |
| CCP-V-1 | 11.5% | $K_3$ (pN, 20° C.): | 17.2 |
| CCY-3-O2 | 4.5% | $V_0$ (20° C.)/V: | 2.33 |
| CLY-3-O2 | 6.0% | $\gamma_1$ (20° C.)/mPa·s: | 150 |
| COB(S)-2-O4 | 12.0% | | |
| CPY-2-O2 | 10.0% | | |
| CPY-3-O2 | 7.0% | | |
| CY-5-O2 | 3.5% | | |
| CP-3-O2 | 2.0% | | |
| PGIY-2-O4 | 6.0% | | |
| Σ | 100.0% | | |

Mixture M16

Mixture M16 consists of 99.965% of Mixture M15 and 0.035% of the compound ST-3a-1 shown above.

Mixture M17

| | | | |
|---|---|---|---|
| CCP-V-1 | 15.0 | Clearing Point [° C.]: | 98 |
| CLY-3-O2 | 6.0 | Δn [589 nm, 20° C.]: | 0.0958 |
| CLY-3-O3 | 6.0 | $n_e$ [589 nm, 20° C.]: | 1.5817 |
| CLY-4-O2 | 6.0 | $n_o$ [589 nm, 20° C.]: | 1.4859 |
| CLY-5-O2 | 4.5 | Δε [1 kHz, 20° C.]: | −3.0 |
| CPY-3-O2 | 1.5 | $\varepsilon_\parallel$ [1 kHz, 20° C.]: | 3.2 |
| CC-3-V | 40.5 | $\varepsilon_\perp$ [1 kHz, 20° C.]: | 6.2 |
| CY-3-O2 | 8.5 | $\gamma_1$ [mPa s, 20° C.]: | 106 |
| COB(S)-2-O4 | 12.0 | $K_1$ [pN, 20° C.]: | 16.6 |
| Σ | 100.0 | $K_3$ [pN, 20° C.]: | 17.8 |
| | | LTS bulk [h, −20° C.]: | 1000 |

Mixture M18

| | | | |
|---|---|---|---|
| CC-3-V1 | 8.0 | Clearing Point [° C.]: | 74 |
| CC-4-V1 | 19.5 | Δn [589 nm, 20° C.]: | 0.1023 |
| CCH-301 | 15.0 | $n_e$ [589 nm, 20° C.]: | 1.5851 |
| CY-3-O2 | 15.0 | $n_o$ [589 nm, 20° C.]: | 1.4828 |
| CY-3-O4 | 2.5 | Δε [1 kHz, 20° C.]: | −3.2 |
| PP-1-2V1 | 7.5 | $\varepsilon_\parallel$ [1 kHz, 20° C.]: | 3.5 |
| CCY-3-O2 | 8.5 | $\varepsilon_\perp$ [1 kHz, 20° C.]: | 6.7 |
| CLY-3-O2 | 1.0 | $\gamma_1$ [mPa s, 20° C.]: | |
| CPY-2-O2 | 6.0 | $K_1$ [pN, 20° C.]: | 14.3 |

| | | | |
|---|---|---|---|
| CPY-3-O2 | 12.0 | $K_3$ [pN, 20° C.]: | 15.9 |
| COB(S)-2-O4 | 5.0 | LTS bulk [h, −20° C.]: | 1000 |
| Σ | 100.0 | | |

Mixture M19

| | | | |
|---|---|---|---|
| CCP-3-1 | 5.0 | Clearing Point [° C.]: | 98 |
| CCP-V-1 | 11.0 | Δn [589 nm, 20° C.]: | 0.1025 |
| CCP-V2-1 | 3.0 | $n_e$ [589 nm, 20° C.]: | 1.5875 |
| CCY-3-O2 | 5.0 | $n_o$ [589 nm, 20° C.]: | 1.4850 |
| CLY-3-O2 | 6.0 | Δε [1 kHz, 20° C.]: | −3.9 |
| CLY-4-O2 | 5.0 | $ε_{\parallel}$ [1 kHz, 20° C.]: | 3.6 |
| CLY-5-O2 | 4.0 | $ε_{\perp}$ [1 kHz, 20° C.]: | 7.5 |
| PGIY-2-O4 | 4.0 | $γ_1$ [mPa s, 20° C.]: | 137 |
| COB(S)-V-O2 | 12.0 | $K_1$ [pN, 20° C.]: | 18.1 |
| CC-3-V1 | 8.7 | $K_3$ [pN, 20° C.]: | 17.8 |
| CC-2-3 | 16.5 | LTS bulk [h, −20° C.]: | |
| CC-3-4 | 5.0 | | |
| CY-3-O2 | 10.0 | | |
| Y-4O-O4 | 4.5 | | |
| CCQU-3-F | 0.3 | | |
| Σ | 100.0 | | |

Mixture M20

| | | | |
|---|---|---|---|
| CC-3-V | 47.5 | Clearing Point [° C.]: | 77 |
| CLY-2-O4 | 4.0 | Δn [589 nm, 20° C.]: | 0.1018 |
| CLY-3-O2 | 5.0 | $n_e$ [589 nm, 20° C.]: | 1.5869 |
| CLY-3-O3 | 5.0 | $n_o$ [589 nm, 20° C.]: | 1.4851 |
| CLY-4-O2 | 4.0 | Δε [1 kHz, 20° C.]: | −3.5 |
| CLY-5-O2 | 4.0 | $ε_{\parallel}$ [1 kHz, 20° C.]: | 3.5 |
| PY-3-O2 | 9.0 | $ε_{\perp}$ [1 kHz, 20° C.]: | 7.0 |
| PY-1-O2 | 3.0 | $γ_1$ [mPa s, 20° C.]: | |
| CY-3-O2 | 2.5 | $K_1$ [pN, 20° C.]: | 14.2 |
| COB(S)-2-O4 | 13.0 | $K_3$ [pN, 20° C.]: | 14.0 |
| PYP-2-3 | 3.0 | LTS bulk [h, −20° C.]: | 144 |
| Σ | 100.0 | | |

Mixture M21

| | | | |
|---|---|---|---|
| CC-3-V1 | 8.0 | Clearing Point [° C.]: | 73 |
| CC-4-V1 | 14.5 | Δn [589 nm, 20° C.]: | 0.1025 |
| CCH-301 | 17.0 | $n_e$ [589 nm, 20° C.]: | 1.5876 |
| CY-3-O2 | 15.0 | $n_o$ [589 nm, 20° C.]: | 1.4851 |
| CP-3-O2 | 7.5 | Δε [1 kHz, 20° C.]: | −3.1 |
| PP-1-2V1 | 4.0 | $ε_{\parallel}$ [1 kHz, 20° C.]: | 3.5 |
| CCP-V2-1 | 5.5 | $ε_{\perp}$ [1 kHz, 20° C.]: | 6.6 |
| CLY-3-O2 | 1.0 | $γ_1$ [mPa s, 20° C.]: | |
| CPY-2-O2 | 5.5 | $K_1$ [pN, 20° C.]: | 13.8 |
| CPY-3-O2 | 12.0 | $K_3$ [pN, 20° C.]: | 15.1 |
| COB(S)-2-O4 | 10.0 | LTS bulk [h, −20° C.]: | 360 |
| Σ | 100.0 | | |

Mixture M22

| | | | |
|---|---|---|---|
| CC-3-V1 | 8.0 | Clearing Point [° C.]: | 73.5 |
| CC-4-V1 | 18.0 | Δn [589 nm, 20° C.]: | 0.1019 |
| CCH-301 | 10.0 | $n_e$ [589 nm, 20° C.]: | 1.5865 |
| CY-3-O2 | 15.0 | $n_o$ [589 nm, 20° C.]: | 1.4846 |
| CP-3-O2 | 17.0 | Δε [1 kHz, 20° C.]: | −3.1 |
| CPP-3-2 | 2.5 | $ε_{\parallel}$ [1 kHz, 20° C.]: | 3.4 |
| CCP-3-1 | 1.5 | $ε_{\perp}$ [1 kHz, 20° C.]: | 6.5 |
| CLY-3-O2 | 1.0 | $γ_1$ [mPa s, 20° C.]: | |
| CPY-2-O2 | 5.0 | $K_1$ [pN, 20° C.]: | 13.7 |
| CPY-3-O2 | 12.0 | $K_3$ [pN, 20° C.]: | 15.3 |
| COB(S)-2-O4 | 10.0 | LTS bulk [h, −20° C.]: | 192 |
| Σ | 100.0 | | |

Mixture M23

| | | | |
|---|---|---|---|
| CCP-V-1 | 2.0 | Clearing Point [° C.]: | 74.5 |
| CLY-3-O2 | 4.5 | Δn [589 nm, 20° C.]: | 0.0939 |
| CLY-3-O3 | 1.0 | $n_e$ [589 nm, 20° C.]: | 1.5772 |
| CPY-3-O2 | 15.0 | $n_o$ [589 nm, 20° C.]: | 1.4833 |
| CC-3-V | 52.0 | Δε [1 kHz, 20° C.]: | −2.7 |
| CY-3-O2 | 11.0 | $ε_{\parallel}$ [1 kHz, 20° C.]: | 3.3 |
| PP-1-3 | 2.5 | $ε_{\perp}$ [1 kHz, 20° C.]: | 6.0 |
| COB(S)-2-O4 | 6.0 | $γ_1$ [mPa s, 20° C.]: | 71 |
| COB(S)-2-O5 | 6.0 | $K_1$ [pN, 20° C.]: | 13.2 |
| Σ | 100.0 | $K_3$ [pN, 20° C.]: | 14.5 |
| | | LTS bulk [h, −20° C.]: | 240 |

Mixture M24

| | | | |
|---|---|---|---|
| CCP-V-1 | 2.0 | Clearing Point [° C.]: | 75 |
| CLY-3-O2 | 4.5 | Δn [589 nm, 20° C.]: | 0.0942 |
| CLY-3-O3 | 1.0 | $n_e$ [589 nm, 20° C.]: | 1.5773 |
| CPY-3-O2 | 15.0 | $n_o$ [589 nm, 20° C.]: | 1.4831 |
| CC-3-V | 52.0 | Δε [1 kHz, 20° C.]: | −2.7 |
| CY-3-O2 | 11.0 | $ε_{\parallel}$ [1 kHz, 20° C.]: | 3.3 |
| PP-1-3 | 2.5 | $ε_{\perp}$ [1 kHz, 20° C.]: | 6.0 |
| COB(S)-2-O5 | 12.0 | $γ_1$ [mPa s, 20° C.]: | 73 |
| Σ | 100.0 | $K_1$ [pN, 20° C.]: | 13.0 |
| $K_3$ [pN, 20° C.]: | 14.6 | | |
| LTS bulk [h, −20° C.]: | 0 | | |

Mixture M25

| | | | |
|---|---|---|---|
| CCP-V-1 | 15.0 | Clearing Point [° C.]: | 94 |
| CCY-3-O2 | 5.0 | Δn [589 nm, 20° C.]: | 0.0960 |
| CLY-2-O4 | 5.0 | $n_e$ [589 nm, 20° C.]: | 1.5819 |
| CLY-3-O2 | 4.0 | $n_o$ [589 nm, 20° C.]: | 1.4859 |
| CLY-3-O3 | 5.0 | Δε [1 kHz, 20° C.]: | −3.3 |
| CLY-4-O2 | 4.0 | $ε_{\parallel}$ [1 kHz, 20° C.]: | 3.4 |
| CPY-3-O2 | 1.5 | $ε_{\perp}$ [1 kHz, 20° C.]: | 6.7 |
| CC-3-V | 40.5 | $γ_1$ [mPa s, 20° C.]: | 98 |
| CY-3-O2 | 1.5 | $K_1$ [pN, 20° C.]: | 16.2 |
| COB(S)-2-O4 | 12.0 | $K_3$ [pN, 20° C.]: | 16.3 |
| B(S)-2O-O5 | 2.5 | LTS bulk [h, −20° C.]: | 1000 |
| Y-4O-O4 | 4.0 | | |
| Σ | 100.0 | | |

Mixture M26

| | | | |
|---|---|---|---|
| CCP-3-1 | 5.0 | Clearing Point [° C.]: | 93.5 |
| CCP-V-1 | 8.0 | Δn [589 nm, 20° C.]: | 0.1009 |
| CCP-V2-1 | 3.0 | $n_e$ [589 nm, 20° C.]: | 1.5848 |
| CCY-3-O2 | 5.0 | $n_o$ [589 nm, 20° C.]: | 1.4839 |
| CLY-2-O4 | 6.0 | Δε [1 kHz, 20° C.]: | −3.8 |
| CLY-4-O2 | 5.0 | $ε_{\parallel}$ [1 kHz, 20° C.]: | 3.6 |
| CLY-5-O2 | 4.0 | $ε_{\perp}$ [1 kHz, 20° C.]: | 7.4 |
| PGIY-2-O4 | 2.5 | $γ_1$ [mPa s, 20° C.]: | 128 |
| COB(S)-2-O4 | 12.0 | $K_1$ [pN, 20° C.]: | 17.7 |
| CC-2V-V2 | 15.2 | $K_3$ [pN, 20° C.]: | 15.9 |
| CC-3-V1 | 9.0 | LTS bulk [h, −20° C.]: | |
| CC-2-3 | 9.0 | | |
| CY-3-O2 | 10.5 | | |
| Y-4O-O4 | 5.5 | | |
| CCQU-3-F | 0.3 | | |
| Σ | 100.0 | | |

Mixture M27

| | | | |
|---|---|---|---|
| CCP-3-1 | 5.0 | Clearing Point [° C.]: | 94.5 |
| CCP-V-1 | 8.0 | Δn [589 nm, 20° C.]: | 0.1021 |
| CCP-V2-1 | 3.0 | $n_e$ [589 nm, 20° C.]: | 1.5863 |
| CCY-3-O2 | 5.0 | $n_o$ [589 nm, 20° C.]: | 1.4842 |
| CLY-2-O4 | 6.0 | Δε [1 kHz, 20° C.]: | −3.9 |
| CLY-4-O2 | 5.0 | $ε_{\|\|}$ [1 kHz, 20° C.]: | 3.6 |
| CLY-5-O2 | 4.0 | $ε_⊥$ [1 kHz, 20° C.]: | 7.5 |
| PGIY-2-O4 | 2.5 | $γ_1$ [mPa s, 20° C.]: | 126 |
| COB(S)-V-O4 | 12.0 | $K_1$ [pN, 20° C.]: | 17.7 |
| CC-2V-V2 | 15.2 | $K_3$ [pN, 20° C.]: | 16.2 |
| CC-3-V1 | 9.0 | LTS bulk [h, −20° C.]: | |
| CC-2-3 | 9.0 | | |
| CY-3-O2 | 10.5 | | |
| Y-4O-O4 | 5.5 | | |
| CCQU-3-F | 0.3 | | |
| Σ | 100.0 | | |

Mixture M28

| | | | |
|---|---|---|---|
| CCP-3-1 | 5.0 | Clearing Point [° C.]: | 97 |
| CCP-V-1 | 11.0 | Δn [589 nm, 20° C.]: | 0.1018 |
| CCP-V2-1 | 3.0 | $n_e$ [589 nm, 20° C.]: | 1.5870 |
| CCY-3-O2 | 5.0 | $n_o$ [589 nm, 20° C.]: | 1.4852 |
| CLY-3-O2 | 6.0 | Δε [1 kHz, 20° C.]: | −3.8 |
| CLY-4-O2 | 5.0 | $ε_{\|\|}$ [1 kHz, 20° C.]: | 3.5 |
| CLY-5-O2 | 4.0 | $ε_⊥$ [1 kHz, 20° C.]: | 7.3 |
| PGIY-2-O4 | 4.0 | $γ_1$ [mPa s, 20° C.]: | 140 |
| COB(S)-2-O3 | 12.0 | $K_1$ [pN, 20° C.]: | 18.3 |
| CC-3-V1 | 8.7 | $K_3$ [pN, 20° C.]: | 17.4 |
| CC-2-3 | 16.5 | LTS bulk [h, −20° C.]: | |
| CC-3-4 | 5.0 | | |
| CY-3-O2 | 10.0 | | |
| Y-4O-O4 | 4.5 | | |
| CCQU-3-F | 0.3 | | |
| Σ | 100.0 | | |

Mixture M29

Mixture M29 consists of 99.975% of mixture M28 and 0.025% of compound ST-3a-1 shown above.

Mixture M30

| | | | |
|---|---|---|---|
| CCP-V-1 | 10.0 | Clearing Point [° C.]: | 73 |
| CLY-3-O2 | 2.0 | Δn [589 nm, 20° C.]: | 0.0938 |
| CPY-3-O2 | 5.5 | $n_e$ [589 nm, 20° C.]: | 1.5797 |
| CC-3-V | 48.0 | $n_o$ [589 nm, 20° C.]: | 1.4859 |
| CY-3-O2 | 12.5 | Δε [1 kHz, 20° C.]: | −2.7 |
| PP-1-3 | 2.5 | $ε_{\|\|}$ [1 kHz, 20° C.]: | 3.4 |
| COB(S)-2-O4 | 9.0 | $ε_⊥$ [1 kHz, 20° C.]: | 6.1 |
| COB(S)-2-O5 | 9.0 | $γ_1$ [mPa s, 20° C.]: | 69 |
| PY-3-O2 | 1.5 | $K_1$ [pN, 20° C.]: | 12.7 |
| Σ | 100.0 | $K_3$ [pN, 20° C.]: | 13.6 |
| | | LTS bulk [h, −20° C.]: | 1000 |

Mixture M31

| | | | |
|---|---|---|---|
| CCP-3-1 | 4.0 | Clearing Point [° C.]: | 93.5 |
| CCP-V-1 | 10.0 | Δn [589 nm, 20° C.]: | 0.1026 |
| CCP-V2-1 | 3.0 | $n_e$ [589 nm, 20° C.]: | 1.5872 |
| CCY-3-O2 | 4.5 | $n_o$ [589 nm, 20° C.]: | 1.4846 |
| CLY-3-O2 | 5.0 | Δε [1 kHz, 20° C.]: | −3.9 |
| CLY-4-O2 | 5.0 | $ε_{\|\|}$ [1 kHz, 20° C.]: | 3.5 |
| CLY-5-O2 | 4.0 | $ε_⊥$ [1 kHz, 20° C.]: | 7.4 |
| PGIY-2-O4 | 6.0 | $γ_1$ [mPa s, 20° C.]: | |
| COB(S)-2-O4 | 12.0 | $K_1$ [pN, 20° C.]: | 17.6 |
| CC-3-V1 | 9.2 | $K_3$ [pN, 20° C.]: | 16.5 |
| CC-2-3 | 16.5 | LTS bulk [h, −20° C.]: | 1000 |
| CC-3-4 | 6.0 | | |
| CY-3-O2 | 9.5 | | |
| Y-4O-O4 | 5.0 | | |
| CCQU-3-F | 0.3 | | |
| Σ | 100.0 | | |

Mixture M32

| | | | |
|---|---|---|---|
| CC-3-V | 47.5 | Clearing Point [° C.]: | 77.5 |
| CLY-2-O4 | 4.0 | Δn [589 nm, 20° C.]: | 0.1014 |
| CLY-3-O2 | 6.0 | $n_e$ [589 nm, 20° C.]: | 1.5865 |
| CLY-3-O3 | 5.0 | $n_o$ [589 nm, 20° C.]: | 1.4851 |
| CLY-4-O2 | 4.0 | Δε [1 kHz, 20° C.]: | −3.4 |
| CLY-5-O2 | 4.0 | $ε_{\|\|}$ [1 kHz, 20° C.]: | 3.5 |
| PY-3-O2 | 9.0 | $ε_⊥$ [1 kHz, 20° C.]: | 6.9 |
| PY-1-O2 | 3.5 | $γ_1$ [mPa s, 20° C.]: | |
| CY-3-O2 | 2.0 | $K_1$ [pN, 20° C.]: | 14.3 |
| COB(S)-2-O4 | 12.0 | $K_3$ [pN, 20° C.]: | 14.1 |
| PYP-2-3 | 3.0 | LTS bulk [h, −20° C.]: | 288 |
| Σ | 100.0 | | |

Mixture M33

| | | | |
|---|---|---|---|
| CCP-3-1 | 4.0 | Clearing Point [° C.]: | 94.5 |
| CCP-V-1 | 12.0 | Δn [589 nm, 20° C.]: | 0.1010 |
| CLY-2-O4 | 4.0 | $n_e$ [589 nm, 20° C.]: | 1.5854 |
| CLY-3-O2 | 4.0 | $n_o$ [589 nm, 20° C.]: | 1.4844 |
| CLY-3-O3 | 5.0 | Δε [1 kHz, 20° C.]: | −3.9 |
| CLY-4-O2 | 4.0 | $ε_{\|\|}$ [1 kHz, 20° C.]: | 3.7 |
| CLY-5-O2 | 3.0 | $ε_⊥$ [1 kHz, 20° C.]: | 7.6 |
| CPY-3-O2 | 7.0 | $γ_1$ [mPa s, 20° C.]: | 128 |
| COB(S)-2-O4 | 12.0 | $K_1$ [pN, 20° C.]: | 18.5 |
| CC-3-V1 | 7.0 | $K_3$ [pN, 20° C.]: | 16.1 |
| CC-4-V1 | 18.0 | LTS bulk [h, −20° C.]: | 1000 |
| CC-2-3 | 8.7 | | |
| Y-4O-O4 | 11.0 | | |
| CCQU-3-F | 0.3 | | |
| Σ | 100.0 | | |

Mixture M34

| | | | |
|---|---|---|---|
| CCP-V-1 | 5.0 | Clearing Point [° C.]: | 93 |
| CLY-2-O4 | 3.0 | Δn [589 nm, 20° C.]: | 0.1018 |
| CLY-3-O2 | 3.0 | $n_e$ [589 nm, 20° C.]: | 1.5846 |
| CLY-3-O3 | 3.0 | $n_o$ [589 nm, 20° C.]: | 1.4828 |
| CLY-4-O2 | 4.0 | Δε [1 kHz, 20° C.]: | −3.8 |
| CLY-5-O2 | 3.0 | $ε_{\|\|}$ [1 kHz, 20° C.]: | 3.4 |
| CPY-3-O2 | 7.0 | $ε_⊥$ [1 kHz, 20° C.]: | 7.2 |
| PGIY-2-O4 | 3.0 | $γ_1$ [mPa s, 20° C.]: | 133 |
| COB(S)-2-O4 | 12.0 | $K_1$ [pN, 20° C.]: | 17.4 |
| CC-3-V1 | 9.0 | $K_3$ [pN, 20° C.]: | 16.5 |
| CC-4-V1 | 19.0 | LTS bulk [h, −20° C.]: | 1000 |
| CC-2-3 | 13.2 | | |
| CY-3-O2 | 15.5 | | |
| CCQU-3-F | 0.3 | | |
| Σ | 100.0 | | |

Mixture M35

| | | | |
|---|---|---|---|
| CCP-V-1 | 2.0 | Clearing Point [° C.]: | 74.5 |
| CLY-3-O2 | 6.5 | Δn [589 nm, 20° C.]: | 0.0939 |
| CLY-3-O3 | 4.0 | $n_e$ [589 nm, 20° C.]: | 1.5775 |
| CPY-3-O2 | 12.0 | $n_o$ [589 nm, 20° C.]: | 1.4836 |
| CC-3-V | 50.5 | Δε [1 kHz, 20° C.]: | −2.8 |
| CY-3-O2 | 8.0 | $ε_{\|\|}$ [1 kHz, 20° C.]: | 3.4 |

Mixture M36

| | | | |
|---|---|---|---|
| COB(S)-2-O4 | 12.0 | ε⊥ [1 kHz, 20° C.]: | 6.2 |
| PY-3-2 | 5.0 | γ₁ [mPa s, 20° C.]: | 73 |
| Σ | 100.0 | K₁ [pN, 20° C.]: | 13.1 |
| | | K₃ [pN, 20° C.]: | 14.0 |
| | | LTS bulk [h, −20° C.]: | 672 |

Mixture M36

| | | | |
|---|---|---|---|
| CCP-V-1 | 12.5 | Clearing Point [° C.]: | 83 |
| CLY-3-O2 | 6.0 | Δn [589 nm, 20° C.]: | 0.0934 |
| CLY-3-O3 | 2.0 | n_e [589 nm, 20° C.]: | 1.5771 |
| CPY-3-O2 | 9.0 | n_o [589 nm, 20° C.]: | 1.4837 |
| CC-3-V | 25.0 | Δε [1 kHz, 20° C.]: | −3.0 |
| CY-3-O2 | 15.0 | ε∥ [1 kHz, 20° C.]: | 3.3 |
| COB(S)-2-O4 | 12.0 | ε⊥ [1 kHz, 20° C.]: | 6.3 |
| CC-2-3 | 13.5 | γ₁ [mPa s, 20° C.]: | 89 |
| CC-3-V1 | 5.0 | K₁ [pN, 20° C.]: | 14.7 |
| Σ | 100.0 | K₃ [pN, 20° C.]: | 15.8 |
| | | LTS bulk [h, −20° C.]: | 120 |

Mixture M37

| | | | |
|---|---|---|---|
| CCP-V-1 | 15.0 | Clearing Point [° C.]: | 83 |
| CLY-3-O2 | 2.5 | Δn [589 nm, 20° C.]: | 0.0947 |
| CLY-3-O3 | 6.0 | n_e [589 nm, 20° C.]: | 1.5796 |
| CPY-3-O2 | 8.0 | n_o [589 nm, 20° C.]: | 1.4849 |
| CC-3-V | 25.0 | Δε [1 kHz, 20° C.]: | −3.1 |
| CY-3-O2 | 15.0 | ε∥ [1 kHz, 20° C.]: | 3.4 |
| COB(S)-2-O4 | 12.0 | ε⊥ [1 kHz, 20° C.]: | 6.5 |
| CC-2-3 | 15.0 | γ₁ [mPa s, 20° C.]: | 93 |
| B(S)-2O-O5 | 1.5 | K₁ [pN, 20° C.]: | 14.3 |
| Σ | 100.0 | K₃ [pN, 20° C.]: | 15.1 |
| | | LTS bulk [h, −20° C.]: | 1000 |

Mixture M38

| | | | |
|---|---|---|---|
| CCP-V-1 | 8.0 | Clearing Point [° C.]: | 82 |
| CLY-3-O2 | 6.0 | Δn [589 nm, 20° C.]: | 0.0951 |
| CLY-3-O3 | 6.0 | n_e [589 nm, 20° C.]: | 1.5798 |
| CCY-3-O2 | 6.0 | n_o [589 nm, 20° C.]: | 1.4847 |
| CPY-3-O2 | 5.0 | Δε [1 kHz, 20° C.]: | −3.0 |
| CC-3-V | 43.5 | ε∥ [1 kHz, 20° C.]: | 3.4 |
| CY-3-O2 | 8.5 | ε⊥ [1 kHz, 20° C.]: | 6.4 |
| COB(S)-2-O4 | 12.0 | γ₁ [mPa s, 20° C.]: | 85 |
| PY-3-2 | 5.0 | K₁ [pN, 20° C.]: | 13.9 |
| Σ | 100.0 | K₃ [pN, 20° C.]: | 15.2 |
| | | LTS bulk [h, −20° C.]: | −1 |

Mixture M39

| | | | |
|---|---|---|---|
| CCP-3-1 | 5.5 | Clearing Point [° C.]: | 93.5 |
| CCP-V-1 | 8.0 | Δn [589 nm, 20° C.]: | 0.1036 |
| CLY-2-O4 | 2.5 | n_e [589 nm, 20° C.]: | 1.5871 |
| CLY-3-O2 | 4.0 | n_o [589 nm, 20° C.]: | 1.4836 |
| CLY-3-O3 | 3.0 | Δε [1 kHz, 20° C.]: | −3.9 |
| CLY-4-O2 | 3.0 | ε∥ [1 kHz, 20° C.]: | 3.6 |
| CLY-5-O2 | 3.0 | ε⊥ [1 kHz, 20° C.]: | 7.5 |
| CPY-3-O2 | 4.0 | γ₁ [mPa s, 20° C.]: | 122 |
| PGIY-2-O4 | 3.5 | K₁ [pN, 20° C.]: | 18.4 |
| COB(S)-V-O4 | 12.0 | K₃ [pN, 20° C.]: | 16.3 |
| CC-3-V1 | 10.0 | LTS bulk [h, −20° C.]: | 1000 |
| CC-4-V1 | 19.0 | | |
| CC-3-4 | 7.7 | | |
| CY-3-O2 | 6.0 | | |
| Y-4O-O4 | 8.5 | | |
| CCQU-3-F | 0.3 | | |
| Σ | 100.0 | | |

Mixture M40

| | | | |
|---|---|---|---|
| CCP-V-1 | 1.0 | Clearing Point [° C.]: | 73.5 |
| CLY-3-O2 | 6.0 | Δn [589 nm, 20° C.]: | 0.0949 |
| CLY-3-O3 | 3.5 | n_e [589 nm, 20° C.]: | 1.5784 |
| CPY-3-O2 | 12.0 | n_o [589 nm, 20° C.]: | 1.4835 |
| CC-3-V | 50.0 | Δε [1 kHz, 20° C.]: | −2.8 |
| CY-3-O2 | 11.5 | ε∥ [1 kHz, 20° C.]: | 3.4 |
| PP-1-4 | 4.0 | ε⊥ [1 kHz, 20° C.]: | 6.2 |
| COB(S)-2-O4 | 12.0 | γ₁ [mPa s, 20° C.]: | 72 |
| Σ | 100.0 | K₁ [pN, 20° C.]: | 13.1 |
| | | K₃ [pN, 20° C.]: | 14.1 |
| | | LTS bulk [h, −20° C.]: | 1000 |

Mixture M41

| | | | |
|---|---|---|---|
| CCP-V-1 | 3.5 | Clearing Point [° C.]: | 75 |
| CLY-3-O2 | 3.5 | Δn [589 nm, 20° C.]: | 0.0942 |
| CLY-3-O3 | 4.0 | n_e [589 nm, 20° C.]: | 1.5777 |
| CPY-3-O2 | 12.0 | n_o [589 nm, 20° C.]: | 1.4835 |
| CC-3-V | 52.0 | Δε [1 kHz, 20° C.]: | −2.8 |
| CY-3-O2 | 8.0 | ε∥ [1 kHz, 20° C.]: | 3.4 |
| COB(S)-2-O4 | 12.0 | ε⊥ [1 kHz, 20° C.]: | 6.2 |
| PY-2-O2 | 5.0 | γ₁ [mPa s, 20° C.]: | 70 |
| Σ | 100.0 | K₁ [pN, 20° C.]: | 13.1 |
| | | K₃ [pN, 20° C.]: | 14.3 |
| | | LTS bulk [h, −20° C.]: | 1000 |

Mixture M42

| | | | |
|---|---|---|---|
| CCP-3-1 | 3.0 | Clearing Point [° C.]: | 93 |
| CCP-V-1 | 11.0 | Δn [589 nm, 20° C.]: | 0.1021 |
| CLY-2-O4 | 2.0 | n_e [589 nm, 20° C.]: | 1.5853 |
| CLY-3-O3 | 4.0 | n_o [589 nm, 20° C.]: | 1.4832 |
| CLY-3-O3 | 3.5 | Δε [1 kHz, 20° C.]: | −3.8 |
| CLY-4-O2 | 3.0 | ε∥ [1 kHz, 20° C.]: | 3.6 |
| CLY-5-O2 | 4.5 | ε⊥ [1 kHz, 20° C.]: | 7.4 |
| CPY-3-O2 | 4.0 | γ₁ [mPa s, 20° C.]: | 125 |
| PGIY-2-O4 | 3.5 | K₁ [pN, 20° C.]: | 18.1 |
| COB(S)-2-O4 | 11.0 | K₃ [pN, 20° C.]: | 16.4 |
| CC-3-V1 | 12.0 | LTS bulk [h, −20° C.]: | |
| CC-4-V1 | 16.5 | | |
| CC-3-4 | 7.7 | | |
| CY-3-O2 | 5.0 | | |
| Y-4O-O4 | 9.0 | | |
| CCQU-3-F | 0.3 | | |
| Σ | 100.0 | | |

Mixture M43

| | | | |
|---|---|---|---|
| COB(S)-2-O4 | 12.0 | Clearing Point [° C.]: | 87 |
| CC-3-V | 30.5 | Δn [589 nm, 20° C.]: | 0.1087 |
| CC-3-V1 | 9.0 | n_e [589 nm, 20° C.]: | 1.5967 |
| CCP-V-1 | 11.0 | n_o [589 nm, 20° C.]: | 1.4880 |
| CLY-3-O2 | 5.0 | Δε [1 kHz, 20° C.]: | −3.0 |
| CLY-4-O2 | 4.0 | ε∥ [1 kHz, 20° C.]: | 3.4 |
| CLY-5-O2 | 4.0 | ε⊥ [1 kHz, 20° C.]: | 6.4 |
| CPY-3-O2 | 5.0 | γ₁ [mPa s, 20° C.]: | 101 |
| CY-3-O2 | 6.0 | K₁ [pN, 20° C.]: | 15.3 |
| PGIY-2-O4 | 6.5 | K₃ [pN, 20° C.]: | 15.6 |
| PY-3-2 | 7.0 | LTS bulk [h, −20° C.]: | 1000 |
| Σ | 100.0 | | |

Mixture M44

| | | | |
|---|---|---|---|
| CCP-3-1 | 2.0 | Clearing Point [° C.]: | 93.5 |
| CLY-2-O4 | 4.0 | Δn [589 nm, 20° C.]: | 0.1020 |
| CLY-3-O2 | 4.0 | $n_e$ [589 nm, 20° C.]: | 1.5840 |
| CLY-3-O3 | 3.0 | $n_o$ [589 nm, 20° C.]: | 1.4820 |
| CLY-4-O2 | 4.0 | Δε [1 kHz, 20° C.]: | −3.8 |
| CLY-5-O2 | 4.0 | $ε_{∥}$ [1 kHz, 20° C.]: | 3.4 |
| CPY-3-O2 | 4.0 | $ε_⊥$ [1 kHz, 20° C.]: | 7.2 |
| PGIY-2-O4 | 4.0 | $γ_1$ [mPa s, 20° C.]: | 131 |
| COB(S)-2-O4 | 12.0 | $K_1$ [pN, 20° C.]: | 17.8 |
| CC-3-V1 | 10.0 | $K_3$ [pN, 20° C.]: | 16.9 |
| CC-4-V1 | 18.5 | LTS bulk [h, −20° C.]: | |
| CC-3-V | 15.2 | | |
| CY-3-O2 | 10.0 | | |
| CY-5-O2 | 5.0 | | |
| CCQU-3-F | 0.3 | | |
| Σ | 100.0 | | |

Mixture M45

| | | | |
|---|---|---|---|
| CC-3-V | 27.0 | Clearing Point [° C.]: | 84 |
| CC-3-V1 | 12.0 | Δn [589 nm, 20° C.]: | 0.0946 |
| CCP-V-1 | 15.0 | $n_e$ [589 nm, 20° C.]: | 1.5785 |
| CLY-3-O2 | 3.5 | $n_o$ [589 nm, 20° C.]: | 1.4839 |
| CLY-4-O2 | 1.0 | Δε [1 kHz, 20° C.]: | −3.3 |
| CLY-5-O2 | 5.0 | $ε_{∥}$ [1 kHz, 20° C.]: | 3.4 |
| CY-3-O2 | 6.5 | $ε_⊥$ [1 kHz, 20° C.]: | 6.7 |
| CY-3-O4 | 7.0 | $γ_1$ [mPa s, 20° C.]: | 101 |
| CY-5-O2 | 7.0 | $K_1$ [pN, 20° C.]: | 15.0 |
| COB(S)-2-O4 | 8.0 | $K_3$ [pN, 20° C.]: | 16.1 |
| COB(S)-2-O5 | 8.0 | LTS bulk [h, −20° C.]: | 960 |
| Σ | 100.0 | | |

Mixture M46

| | | | |
|---|---|---|---|
| CCP-V-1 | 5.0 | Clearing Point [° C.]: | 76 |
| CLY-3-O2 | 4.0 | Δn [589 nm, 20° C.]: | 0.0945 |
| CPY-3-O2 | 9.0 | $n_e$ [589 nm, 20° C.]: | 1.5792 |
| CC-3-V | 52.0 | $n_o$ [589 nm, 20° C.]: | 1.4847 |
| CY-3-O2 | 9.5 | Δε [1 kHz, 20° C.]: | −2.7 |
| PP-1-3 | 2.5 | $ε_{∥}$ [1 kHz, 20° C.]: | 3.3 |
| COB(S)-2-O4 | 9.0 | $ε_⊥$ [1 kHz, 20° C.]: | 6.0 |
| COB(S)-2-O5 | 9.0 | $γ_1$ [mPa s, 20° C.]: | 72 |
| Σ | 100.0 | $K_1$ [pN, 20° C.]: | 13.6 |
| | | $K_3$ [pN, 20° C.]: | 14.2 |
| | | LTS bulk [h, −20° C.]: | 1000 |

Mixture M47

| | | | |
|---|---|---|---|
| CCP-V-1 | 2.0 | Clearing Point [° C.]: | 75.5 |
| CLY-3-O2 | 4.5 | Δn [589 nm, 20° C.]: | 0.0957 |
| CLY-3-O3 | 1.0 | $n_e$ [589 nm, 20° C.]: | 1.5795 |
| CPY-3-O2 | 15.0 | $n_o$ [589 nm, 20° C.]: | 1.4838 |
| CC-3-V | 52.0 | Δε [1 kHz, 20° C.]: | −2.7 |
| CY-3-O2 | 11.0 | $ε_{∥}$ [1 kHz, 20° C.]: | 3.4 |
| PP-1-3 | 2.5 | $ε_⊥$ [1 kHz, 20° C.]: | 6.1 |
| COB(S)-V-O4 | 12.0 | $γ_1$ [mPa s, 20° C.]: | 70 |
| Σ | 100.0 | $K_1$ [pN, 20° C.]: | 13.4 |
| | | $K_3$ [pN, 20° C.]: | 14.8 |
| | | LTS bulk [h, −20° C.]: | 0 |

Mixture M48

| | | | |
|---|---|---|---|
| COB(S)-2-O4 | 12.0 | Clearing Point [° C.]: | 87.5 |
| CC-3-V | 33.5 | Δn [589 nm, 20° C.]: | 0.1093 |
| CC-3-V1 | 9.0 | $n_e$ [589 nm, 20° C.]: | 1.5965 |
| CCP-V-1 | 11.0 | $n_o$ [589 nm, 20° C.]: | 1.4872 |
| CLY-3-O2 | 3.0 | Δε [1 kHz, 20° C.]: | −3.1 |
| CLY-4-O2 | 4.0 | $ε_{∥}$ [1 kHz, 20° C.]: | 3.4 |
| CLY-5-O2 | 3.0 | $ε_⊥$ [1 kHz, 20° C.]: | 6.5 |
| CPY-3-O2 | 5.5 | $γ_1$ [mPa s, 20° C.]: | 99 |
| CY-3-O2 | 5.0 | $K_1$ [pN, 20° C.]: | 15.6 |
| PGIY-2-O4 | 6.0 | $K_3$ [pN, 20° C.]: | 16.3 |
| PY-3-O2 | 8.0 | LTS bulk [h, −20° C.]: | 720 |
| Σ | 100.0 | | |

Mixture M49

| | | | |
|---|---|---|---|
| PP-1-2V1 | 10.0 | Clearing Point [° C.]: | 76 |
| CC-3-V1 | 3.5 | Δn [589 nm, 20° C.]: | 0.1014 |
| CCH-301 | 20.0 | $n_e$ [589 nm, 20° C.]: | 1.5893 |
| PCH-53 | 20.0 | $n_o$ [589 nm, 20° C.]: | 1.4879 |
| COB(S)-2-O4 | 10.0 | Δε [1 kHz, 20° C.]: | −3.1 |
| CCY-3-O1 | 6.5 | $ε_{∥}$ [1 kHz, 20° C.]: | 3.4 |
| CCY-3-O2 | 11.0 | $ε_⊥$ [1 kHz, 20° C.]: | 6.5 |
| CCY-3-O3 | 10.0 | $γ_1$ [mPa s, 20° C.]: | |
| CLY-3-O2 | 9.0 | $K_1$ [pN, 20° C.]: | 15.2 |
| Σ | 100.0 | $K_3$ [pN, 20° C.]: | 15.7 |
| | | LTS bulk [h, −20° C.]: | |

Mixture M50

| | | | |
|---|---|---|---|
| CC-3-V | 27.5 | Clearing Point [° C.]: | 83 |
| CC-3-V1 | 12.5 | Δn [589 nm, 20° C.]: | 0.0935 |
| CCP-V-1 | 15.5 | $n_e$ [589 nm, 20° C.]: | 1.5777 |
| CLY-3-O2 | 4.0 | $n_o$ [589 nm, 20° C.]: | 1.4842 |
| CLY-4-O2 | 1.0 | Δε [1 kHz, 20° C.]: | −3.2 |
| CLY-5-O2 | 3.0 | $ε_{∥}$ [1 kHz, 20° C.]: | 3.4 |
| CY-3-O2 | 6.5 | $ε_⊥$ [1 kHz, 20° C.]: | 6.6 |
| CY-3-O4 | 7.0 | $γ_1$ [mPa s, 20° C.]: | 98 |
| CY-5-O2 | 7.0 | $K_1$ [pN, 20° C.]: | 14.7 |
| COB(S)-2-O4 | 8.0 | $K_3$ [pN, 20° C.]: | 15.9 |
| COB(S)-2-O5 | 8.0 | LTS bulk [h, −20° C.]: | 1000 |
| Σ | 100.0 | | |

Mixture M51

| | | | |
|---|---|---|---|
| B(S)-2O-O4 | 2.0 | Clearing Point [° C.]: | 104.5 |
| B(S)-2O-O5 | 2.0 | Δn [589 nm, 20° C.]: | 0.1067 |
| CC-3-V | 32.0 | $n_e$ [589 nm, 20° C.]: | 1.5928 |
| CC-3-V1 | 8.0 | $n_o$ [589 nm, 20° C.]: | 1.4861 |
| CCP-3-1 | 7.0 | Δε [1 kHz, 20° C.]: | −3.9 |
| CCY-3-O2 | 5.5 | $ε_{∥}$ [1 kHz, 20° C.]: | 3.3 |
| CLY-2-O4 | 4.0 | $ε_⊥$ [1 kHz, 20° C.]: | 7.2 |
| CLY-3-O2 | 6.0 | $γ_1$ [mPa s, 20° C.]: | 141 |
| CLY-3-O3 | 5.0 | $K_1$ [pN, 20° C.]: | 19.7 |
| CLY-4-O2 | 4.0 | $K_3$ [pN, 20° C.]: | 18.8 |
| CLY-5-O2 | 4.0 | LTS bulk [h, −20° C.]: | 1000 |
| COB(S)-2-O4 | 10.0 | | |
| CY-5-O2 | 5.0 | | |
| PGIY-2-O4 | 5.5 | | |
| Σ | 100.0 | | |

Mixture M52

| | | | |
|---|---|---|---|
| CC-3-V | 28.0 | Clearing Point [° C.]: | 85.5 |
| CC-3-V1 | 12.0 | Δn [589 nm, 20° C.]: | 0.0942 |
| CCP-V-1 | 15.0 | $n_e$ [589 nm, 20° C.]: | 1.5786 |
| CLY-3-O2 | 3.5 | $n_o$ [589 nm, 20° C.]: | 1.4844 |
| CLY-4-O2 | 1.0 | Δε [1 kHz, 20° C.]: | −3.2 |
| CLY-5-O2 | 5.5 | $ε_{∥}$ [1 kHz, 20° C.]: | 3.3 |
| CY-3-O2 | 5.0 | $ε_⊥$ [1 kHz, 20° C.]: | 6.5 |

Mixture M52 (continued)

| Component | % | Property | Value |
|---|---|---|---|
| CY-3-O4 | 7.0 | $\gamma_1$ [mPa s, 20° C.]: | 103 |
| CY-5-O2 | 7.0 | $K_1$ [pN, 20° C.]: | 15.2 |
| COB(S)-2-O4 | 8.0 | $K_3$ [pN, 20° C.]: | 16.3 |
| COB(S)-2-O5 | 8.0 | LTS bulk [h, −20° C.]: | 1000 |
| Σ | 100.0 | | |

Mixture M53

| Component | % | Property | Value |
|---|---|---|---|
| CCP-V-1 | 2.0 | Clearing Point [° C.]: | 74.5 |
| CLY-3-O2 | 4.5 | Δn [589 nm, 20° C.]: | 0.0947 |
| CLY-3-O3 | 1.0 | $n_e$ [589 nm, 20° C.]: | 1.5788 |
| CPY-2-O2 | 5.0 | $n_o$ [589 nm, 20° C.]: | 1.4841 |
| CPY-3-O2 | 10.0 | Δε [1 kHz, 20° C.]: | −2.7 |
| CC-3-V | 52.0 | $\varepsilon_\parallel$ [1 kHz, 20° C.]: | 3.4 |
| CY-3-O2 | 11.0 | $\varepsilon_\perp$ [1 kHz, 20° C.]: | 6.1 |
| PP-1-3 | 2.5 | $\gamma_1$ [mPa s, 20° C.]: | 68 |
| COB(S)-V-O4 | 12.0 | $K_1$ [pN, 20° C.]: | 13.0 |
| Σ | 100.0 | $K_3$ [pN, 20° C.]: | 14.2 |
| | | LTS bulk [h, −20° C.]: | 24 |

Mixture M54

| Component | % | Property | Value |
|---|---|---|---|
| CCP-V-1 | 2.0 | Clearing Point [° C.]: | 74 |
| CLY-3-O2 | 4.5 | Δn [589 nm, 20° C.]: | 0.0943 |
| CLY-3-O3 | 1.0 | $n_e$ [589 nm, 20° C.]: | 1.5790 |
| CPY-2-O2 | 5.0 | $n_o$ [589 nm, 20° C.]: | 1.4847 |
| CPY-3-O2 | 10.0 | Δε [1 kHz, 20° C.]: | −2.7 |
| CC-3-V | 52.0 | $\varepsilon_\parallel$ [1 kHz, 20° C.]: | 3.4 |
| CY-3-O2 | 11.0 | $\varepsilon_\perp$ [1 kHz, 20° C.]: | 6.1 |
| PP-1-3 | 2.5 | $\gamma_1$ [mPa s, 20° C.]: | 68 |
| COB(S)-V-O4 | 8.0 | $K_1$ [pN, 20° C.]: | 12.9 |
| COB(S)-2-O4 | 4.0 | $K_3$ [pN, 20° C.]: | 14.2 |
| Σ | 100.0 | LTS bulk [h, −20° C.]: | 192 |

Mixture M55

| Component | % | Property | Value |
|---|---|---|---|
| CC-3-V | 28.0 | Clearing Point [° C.]: | 84 |
| CC-3-V1 | 12.0 | Δn [589 nm, 20° C.]: | 0.0957 |
| CCP-V-1 | 16.0 | $n_e$ [589 nm, 20° C.]: | 1.5817 |
| CLY-3-O2 | 1.0 | $n_o$ [589 nm, 20° C.]: | 1.4860 |
| CLY-4-O2 | 2.0 | Δε [1 kHz, 20° C.]: | −3.3 |
| CLY-5-O2 | 2.0 | $\varepsilon_\parallel$ [1 kHz, 20° C.]: | 3.4 |
| CY-3-O2 | 5.0 | $\varepsilon_\perp$ [1 kHz, 20° C.]: | 6.7 |
| CY-3-O4 | 7.0 | $\gamma_1$ [mPa s, 20° C.]: | 101 |
| CY-5-O2 | 7.0 | $K_1$ [pN, 20° C.]: | 14.9 |
| COB(S)-2-O4 | 10.0 | $K_3$ [pN, 20° C.]: | 15.6 |
| COB(S)-2-O5 | 10.0 | LTS bulk [h, −20° C.]: | 384 |
| Σ | 100.0 | | |

Mixture M56

| Component | % | Property | Value |
|---|---|---|---|
| CC-3-V | 28.0 | Clearing Point [° C.]: | 84.5 |
| CC-3-V1 | 12.0 | Δn [589 nm, 20° C.]: | 0.0961 |
| CCP-V-1 | 16.0 | $n_e$ [589 nm, 20° C.]: | 1.5823 |
| CLY-3-O2 | 1.0 | $n_o$ [589 nm, 20° C.]: | 1.4862 |
| CLY-4-O2 | 2.0 | Δε [1 kHz, 20° C.]: | −3.4 |
| CLY-5-O2 | 2.0 | $\varepsilon_\parallel$ [1 kHz, 20° C.]: | 3.4 |
| CY-3-O2 | 5.0 | $\varepsilon_\perp$ [1 kHz, 20° C.]: | 6.8 |
| CY-3-O4 | 7.0 | $\gamma_1$ [mPa s, 20° C.]: | 100 |
| CY-5-O2 | 7.0 | $K_1$ [pN, 20° C.]: | 15.0 |
| COB(S)-2-O4 | 8.0 | $K_3$ [pN, 20° C.]: | 15.6 |
| COB(S)-2-O5 | 8.0 | LTS bulk [h, −20° C.]: | 1000 |
| COB(S)-V-O4 | 4.0 | | |
| Σ | 100.0 | | |

Mixture M57

| Component | % | Property | Value |
|---|---|---|---|
| B(S)-2O-O4 | 2.0 | Clearing Point [° C.]: | 77 |
| B(S)-2O-O5 | 2.0 | Δn [589 nm, 20° C.]: | 0.1005 |
| CC-3-V | 50.0 | $n_e$ [589 nm, 20° C.]: | 1.5862 |
| CLY-2-O4 | 4.5 | $n_o$ [589 nm, 20° C.]: | 1.4857 |
| CLY-3-O2 | 5.5 | Δε [1 kHz, 20° C.]: | −3.5 |
| CLY-3-O3 | 5.0 | $\varepsilon_\parallel$ [1 kHz, 20° C.]: | 3.6 |
| CLY-4-O2 | 3.5 | $\varepsilon_\perp$ [1 kHz, 20° C.]: | 7.1 |
| CLY-5-O2 | 4.0 | $\gamma_1$ [mPa s, 20° C.]: | 81 |
| COB(S)-2-O4 | 10.0 | $K_1$ [pN, 20° C.]: | 15.4 |
| PGIY-2-O4 | 2.0 | $K_3$ [pN, 20° C.]: | 14.2 |
| PY-1-O2 | 5.5 | LTS bulk [h, −20° C.]: | 1000 |
| PY-3-O2 | 6.0 | | |
| Σ | 100.0 | | |

Mixture M58

| Component | % | Property | Value |
|---|---|---|---|
| CC-3-V | 51.0 | Clearing Point [° C.]: | 76.5 |
| CLY-2-O4 | 4.0 | Δn [589 nm, 20° C.]: | 0.1016 |
| CLY-3-O2 | 6.0 | $n_e$ [589 nm, 20° C.]: | 1.5875 |
| CLY-3-O3 | 5.0 | $n_o$ [589 nm, 20° C.]: | 1.4859 |
| CLY-4-O2 | 3.0 | Δε [1 kHz, 20° C.]: | −3.5 |
| CLY-5-O2 | 3.0 | $\varepsilon_\parallel$ [1 kHz, 20° C.]: | 3.5 |
| CPY-3-O2 | 1.5 | $\varepsilon_\perp$ [1 kHz, 20° C.]: | 7.0 |
| PY-1-O2 | 10.0 | $\gamma_1$ [mPa s, 20° C.]: | 78 |
| PGIY-2-O4 | 3.0 | $K_1$ [pN, 20° C.]: | 14.6 |
| COB(S)-2-O4 | 7.5 | $K_3$ [pN, 20° C.]: | 14.3 |
| B(S)-2O-O4 | 3.0 | LTS bulk [h, −20° C.]: | 1000 |
| B(S)-2O-O5 | 3.0 | | |
| Σ | 100.0 | | |

Mixture M59

| Component | % | Property | Value |
|---|---|---|---|
| CC-3-V | 38.5 | Clearing Point [° C.]: | 87 |
| CC-3-V1 | 2.0 | Δn [589 nm, 20° C.]: | 0.0925 |
| CCP-V-1 | 16.0 | $n_e$ [589 nm, 20° C.]: | 1.5778 |
| CCY-3-O2 | 10.0 | $n_o$ [589 nm, 20° C.]: | 1.4853 |
| CCY-5-O2 | 2.0 | Δε [1 kHz, 20° C.]: | −3.2 |
| COB(S)-2-O4 | 10.0 | $\varepsilon_\parallel$ [1 kHz, 20° C.]: | 3.4 |
| CY-3-O2 | 15.5 | $\varepsilon_\perp$ [1 kHz, 20° C.]: | 6.6 |
| COB(S)-V-O4 | 6.0 | $\gamma_1$ [mPa s, 20° C.]: | 93 |
| Σ | 100.0 | $K_1$ [pN, 20° C.]: | 14.5 |
| | | $K_3$ [pN, 20° C.]: | 16.5 |
| | | LTS bulk [h, −20° C.]: | 48 |

Mixture M60

| Component | % | Property | Value |
|---|---|---|---|
| CCP-3-1 | 5.5 | Clearing Point [° C.]: | 93 |
| CCP-V-1 | 8.0 | Δn [589 nm, 20° C.]: | 0.1022 |
| CLY-2-O4 | 2.5 | $n_e$ [589 nm, 20° C.]: | 1.5863 |
| CLY-3-O2 | 4.0 | $n_o$ [589 nm, 20° C.]: | 1.4841 |
| CLY-3-O3 | 3.0 | Δε [1 kHz, 20° C.]: | −3.8 |
| CLY-4-O2 | 3.0 | $\varepsilon_\parallel$ [1 kHz, 20° C.]: | 3.6 |
| CLY-5-O2 | 3.0 | $\varepsilon_\perp$ [1 kHz, 20° C.]: | 7.5 |
| CPY-3-O2 | 4.0 | $\gamma_1$ [mPa s, 20° C.]: | 125 |
| PGIY-2-O4 | 3.5 | $K_1$ [pN, 20° C.]: | 18.4 |
| COB(S)-2-O4 | 12.0 | $K_3$ [pN, 20° C.]: | 16.2 |
| CC-3-V1 | 10.0 | LTS bulk [h, −20° C.]: | 1000 |
| CC-4-V1 | 19.0 | | |
| CC-3-4 | 7.7 | | |
| CY-3-O2 | 6.0 | | |
| Y-4O-O4 | 8.5 | | |
| CCQU-3-F | 0.3 | | |
| Σ | 100.0 | | |

Mixture M61

| | | | |
|---|---|---|---|
| CC-3-V | 27.0 | Clearing Point [° C.]: | 85 |
| CC-3-V1 | 12.0 | Δn [589 nm, 20° C.]: | 0.0955 |
| CCP-V-1 | 15.0 | $n_e$ [589 nm, 20° C.]: | 1.5808 |
| CLY-3-O2 | 3.5 | $n_o$ [589 nm, 20° C.]: | 1.4853 |
| CLY-4-O2 | 1.0 | Δε [1 kHz, 20° C.]: | −3.4 |
| CLY-5-O2 | 5.0 | $ε_{\parallel}$ [1 kHz, 20° C.]: | 3.4 |
| CY-3-O2 | 6.5 | $ε_{\perp}$ [1 kHz, 20° C.]: | 6.8 |
| CY-3-O4 | 7.0 | $γ_1$ [mPa s, 20° C.]: | 101 |
| CY-5-O2 | 7.0 | $K_1$ [pN, 20° C.]: | 15.1 |
| COB(S)-2-O4 | 8.0 | $K_3$ [pN, 20° C.]: | 16.4 |
| COB(S)-V-O4 | 8.0 | LTS bulk [h, −20° C.]: | 48 |
| Σ | 100.0 | | |

Mixture M62

| | | | |
|---|---|---|---|
| CCP-3-1 | 9.5 | Clearing Point [° C.]: | 79 |
| CCY-2-1 | 1.5 | Δn [589 nm, 20° C.]: | 0.1018 |
| CCY-3-O2 | 8.5 | $n_e$ [589 nm, 20° C.]: | 1.5858 |
| CCY-4-O2 | 4.5 | $n_o$ [589 nm, 20° C.]: | 1.4840 |
| CPY-3-O2 | 5.5 | Δε [1 kHz, 20° C.]: | −3.6 |
| PYP-2-3 | 10.0 | $ε_{\parallel}$ [1 kHz, 20° C.]: | 3.7 |
| COB(S)-2-O4 | 10.0 | $ε_{\perp}$ [1 kHz, 20° C.]: | 7.2 |
| CC-3-V1 | 6.0 | $γ_1$ [mPa s, 20° C.]: | 110 |
| CC-4-V1 | 7.5 | $K_1$ [pN, 20° C.]: | 15.2 |
| CC-2-3 | 18.0 | $K_3$ [pN, 20° C.]: | 14.2 |
| CC-3-5 | 4.0 | LTS bulk [h, −20° C.]: | 1000 |
| CY-3-O2 | 5.5 | | |
| Y-4O-O4 | 9.5 | | |
| Σ | 100.0 | | |

Mixture M63

| | | | |
|---|---|---|---|
| CCP-V-1 | 5.0 | Clearing Point [° C.]: | 93 |
| CCP-3-1 | 5.0 | Δn [589 nm, 20° C.]: | 0.1016 |
| CLY-2-O4 | 4.0 | $n_e$ [589 nm, 20° C.]: | 1.5866 |
| CLY-3-O2 | 3.0 | $n_o$ [589 nm, 20° C.]: | 1.4850 |
| CLY-3-O3 | 4.0 | Δε [1 kHz, 20° C.]: | −3.9 |
| PGIY-2-O4 | 3.0 | $ε_{\parallel}$ [1 kHz, 20° C.]: | 3.4 |
| COB(S)-2-O4 | 12.0 | $ε_{\perp}$ [1 kHz, 20° C.]: | 7.3 |
| COB(S)-V-O4 | 7.0 | $γ_1$ [mPa s, 20° C.]: | 132 |
| CC-3-V1 | 9.0 | $K_1$ [pN, 20° C.]: | 17.9 |
| CC-4-V1 | 19.0 | $K_3$ [pN, 20° C.]: | 15.9 |
| CC-2-3 | 13.2 | LTS bulk [h, −20° C.]: | 0 |
| CY-3-O2 | 15.5 | | |
| CCQU-3-F | 0.3 | | |
| Σ | 100.0 | | |

Mixture M64

| | | | |
|---|---|---|---|
| CCP-3-1 | 12.0 | Clearing Point [° C.]: | 92 |
| CCP-V-1 | 8.0 | Δn [589 nm, 20° C.]: | 0.1010 |
| CLY-2-O4 | 3.7 | $n_e$ [589 nm, 20° C.]: | 1.5860 |
| CLY-3-O2 | 3.0 | $n_o$ [589 nm, 20° C.]: | 1.4850 |
| PGIY-2-O4 | 1.5 | Δε [1 kHz, 20° C.]: | −3.9 |
| COB(S)-2-O4 | 12.0 | $ε_{\parallel}$ [1 kHz, 20° C.]: | 3.6 |
| COB(S)-V-O4 | 7.5 | $ε_{\perp}$ [1 kHz, 20° C.]: | 7.5 |
| CC-3-V1 | 10.0 | $γ_1$ [mPa s, 20° C.]: | 118 |
| CC-4-V1 | 19.0 | $K_1$ [pN, 20° C.]: | 18.8 |
| CC-3-4 | 7.5 | $K_3$ [pN, 20° C.]: | 15.8 |
| CY-3-O2 | 7.0 | LTS bulk [h, −20° C.]: | 0 |
| Y-4O-O4 | 8.5 | | |
| CCQU-3-F | 0.3 | | |
| Σ | 100.0 | | |

Mixture M65

| | | | |
|---|---|---|---|
| CC-3-V | 49.0 | Clearing Point [° C.]: | 76.5 |
| CLY-2-O4 | 4.0 | Δn [589 nm, 20° C.]: | 0.1012 |
| CLY-3-O2 | 6.0 | $n_e$ [589 nm, 20° C.]: | 1.5870 |
| CLY-3-O3 | 5.0 | $n_o$ [589 nm, 20° C.]: | 1.4858 |
| CLY-4-O2 | 4.0 | Δε [1 kHz, 20° C.]: | −3.5 |
| CLY-5-O2 | 4.0 | $ε_{\parallel}$ [1 kHz, 20° C.]: | 3.5 |
| PY-1-O2 | 9.0 | $ε_{\perp}$ [1 kHz, 20° C.]: | 7.1 |
| CY-3-O2 | 2.5 | $γ_1$ [mPa s, 20° C.]: | 79 |
| PYP-2-3 | 3.0 | $K_1$ [pN, 20° C.]: | 14.3 |
| COB(S)-2-O4 | 7.5 | $K_3$ [pN, 20° C.]: | 14.2 |
| B(S)-2O-O4 | 3.0 | LTS bulk [h, −20° C.]: | 1000 |
| B(S)-2O-O5 | 3.0 | | |
| Σ | 100.0 | | |

Mixture M66

| | | | |
|---|---|---|---|
| CCP-V-1 | 8.0 | Clearing Point [° C.]: | 90 |
| CLY-3-O2 | 6.0 | Δn [589 nm, 20° C.]: | 0.0926 |
| CLY-3-O3 | 6.0 | $n_e$ [589 nm, 20° C.]: | 1.5773 |
| CLY-4-O2 | 5.0 | $n_o$ [589 nm, 20° C.]: | 1.4847 |
| CC-3-V | 44.5 | Δε [1 kHz, 20° C.]: | −3.3 |
| CY-3-O2 | 11.0 | $ε_{\parallel}$ [1 kHz, 20° C.]: | 3.3 |
| COB(S)-2-O4 | 12.0 | $ε_{\perp}$ [1 kHz, 20° C.]: | 6.7 |
| COB(S)-2-O5 | 2.5 | $γ_1$ [mPa s, 20° C.]: | 98 |
| CLY-5-O2 | 5.0 | $K_1$ [pN, 20° C.]: | 15.5 |
| Σ | 100.0 | $K_3$ [pN, 20° C.]: | 16.3 |
| | | LTS bulk [h, −20° C.]: | 528 |

Mixture M67

| | | | |
|---|---|---|---|
| CCP-3-1 | 12.0 | Clearing Point [° C.]: | 90.5 |
| CCP-V-1 | 8.0 | Δn [589 nm, 20° C.]: | 0.1031 |
| CLY-2-O4 | 3.0 | $n_e$ [589 nm, 20° C.]: | 1.5887 |
| CLY-3-O2 | 3.0 | $n_o$ [589 nm, 20° C.]: | 1.4856 |
| CLY-3-O3 | 2.2 | Δε [1 kHz, 20° C.]: | −3.8 |
| PGIY-2-O4 | 4.5 | $ε_{\parallel}$ [1 kHz, 20° C.]: | 3.6 |
| COB(S)-2-O4 | 16.0 | $ε_{\perp}$ [1 kHz, 20° C.]: | 7.4 |
| CC-3-V1 | 10.0 | $γ_1$ [mPa s, 20° C.]: | 121 |
| CC-4-V1 | 19.0 | $K_1$ [pN, 20° C.]: | 18.1 |
| CC-3-4 | 5.5 | $K_3$ [pN, 20° C.]: | 15.6 |
| CY-3-O2 | 8.0 | LTS bulk [h, −20° C.]: | 144 |
| Y-4O-O4 | 8.5 | | |
| CCQU-3-F | 0.3 | | |
| Σ | 100.0 | | |

Mixture M68

| | | | |
|---|---|---|---|
| CCP-3-1 | 11.5 | Clearing Point [° C.]: | 92 |
| CCP-V-1 | 8.0 | Δn [589 nm, 20° C.]: | 0.1024 |
| CLY-2-O4 | 3.0 | $n_e$ [589 nm, 20° C.]: | 1.5879 |
| CLY-3-O2 | 3.0 | $n_o$ [589 nm, 20° C.]: | 1.4855 |
| CLY-3-O3 | 2.5 | Δε [1 kHz, 20° C.]: | −3.9 |
| PGIY-2-O4 | 3.2 | $ε_{\parallel}$ [1 kHz, 20° C.]: | 3.6 |
| COB(S)-2-O4 | 10.0 | $ε_{\perp}$ [1 kHz, 20° C.]: | 7.5 |
| COB(S)-V-O4 | 7.5 | $γ_1$ [mPa s, 20° C.]: | 121 |
| CC-3-V1 | 9.0 | $K_1$ [pN, 20° C.]: | 18.6 |
| CC-4-V1 | 19.0 | $K_3$ [pN, 20° C.]: | 15.8 |
| CC-3-4 | 7.5 | LTS bulk [h, −20° C.]: | 0 |
| CY-3-O2 | 7.0 | | |
| Y-4O-O4 | 8.5 | | |
| CCQU-3-F | 0.3 | | |
| Σ | 100.0 | | |

Mixture M6

| | | | |
|---|---|---|---|
| CC-3-V | 44.0 | Clearing Point [° C.]: | 84 |
| CC-3-V1 | 0.5 | Δn [589 nm, 20° C.]: | 0.0931 |

-continued

| | | | |
|---|---|---|---|
| CCP-V-1 | 11.0 | $n_e$ [589 nm, 20° C.]: | 1.5778 |
| CCY-3-O2 | 3.0 | $n_o$ [589 nm, 20° C.]: | 1.4847 |
| CLY-3-O2 | 9.0 | $\Delta\varepsilon$ [1 kHz, 20° C.]: | −3.2 |
| CPY-3-O2 | 2.5 | $\varepsilon_{\parallel}$ [1 kHz, 20° C.]: | 3.4 |
| CY-3-O2 | 10.0 | $\varepsilon_{\perp}$ [1 kHz, 20° C.]: | 6.6 |
| CY-3-O4 | 4.0 | $\gamma_1$ [mPa s, 20° C.]: | 88 |
| COB(S)-2-O4 | 12.0 | $K_1$ [pN, 20° C.]: | 14.5 |
| COB(S)-V-O4 | 4.0 | $K_3$ [pN, 20° C.]: | 15.8 |
| Σ | 100.0 | LTS bulk [h, −20° C.]: | 72 |

Mixture M70

| | | | |
|---|---|---|---|
| CC-3-V | 38.0 | Clearing Point [° C.]: | 83.5 |
| CC-3-V1 | 4.0 | $\Delta n$ [589 nm, 20° C.]: | 0.0930 |
| CCP-V-1 | 13.0 | $n_e$ [589 nm, 20° C.]: | 1.5774 |
| CLY-3-O2 | 9.0 | $n_o$ [589 nm, 20° C.]: | 1.4844 |
| CLY-4-O2 | 3.0 | $\Delta\varepsilon$ [1 kHz, 20° C.]: | −3.3 |
| CY-3-O2 | 11.0 | $\varepsilon_{\parallel}$ [1 kHz, 20° C.]: | 3.4 |
| CY-5-O2 | 6.0 | $\varepsilon_{\perp}$ [1 kHz, 20° C.]: | 6.6 |
| COB(S)-2-O4 | 8.0 | $\gamma_1$ [mPa s, 20° C.]: | 93 |
| COB(S)-2-O5 | 8.0 | $K_1$ [pN, 20° C.]: | 14.6 |
| Σ | 100.0 | $K_3$ [pN, 20° C.]: | 15.8 |
| | | LTS bulk [h, −20° C.]: | 96 |

Mixture M71

| | | | |
|---|---|---|---|
| CCP-V-1 | 2.0 | Clearing Point [° C.]: | 74 |
| CLY-3-O2 | 4.5 | $\Delta n$ [589 nm, 20° C.]: | 0.0942 |
| CLY-3-O3 | 1.0 | $n_e$ [589 nm, 20° C.]: | 1.5770 |
| CPY-3-O2 | 15.0 | $n_o$ [589 nm, 20° C.]: | 1.4828 |
| CC-3-V | 50.0 | $\Delta\varepsilon$ [1 kHz, 20° C.]: | −3.0 |
| CY-3-O2 | 14.0 | $\varepsilon_{\parallel}$ [1 kHz, 20° C.]: | 3.4 |
| PP-1-3 | 1.5 | $\varepsilon_{\perp}$ [1 kHz, 20° C.]: | 6.4 |
| COB(S)-2-O4 | 12.0 | $\gamma_1$ [mPa s, 20° C.]: | 73 |
| Σ | 100.0 | $K_1$ [pN, 20° C.]: | 13.1 |
| | | $K_3$ [pN, 20° C.]: | 14.6 |
| | | LTS bulk [h, −20° C.]: | 72 |

Mixture M72

| | | | |
|---|---|---|---|
| CCP-V-1 | 1.0 | Clearing Point [° C.]: | 74 |
| CLY-3-O2 | 5.5 | $\Delta n$ [589 nm, 20° C.]: | 0.0947 |
| CLY-3-O3 | 1.0 | $n_e$ [589 nm, 20° C.]: | 1.5768 |
| CPY-3-O2 | 15.0 | $n_o$ [589 nm, 20° C.]: | 1.4821 |
| CC-3-V | 49.0 | $\Delta\varepsilon$ [1 kHz, 20° C.]: | −3.3 |
| CY-3-O2 | 15.5 | $\varepsilon_{\parallel}$ [1 kHz, 20° C.]: | 3.5 |
| PP-1-3 | 1.0 | $\varepsilon_{\perp}$ [1 kHz, 20° C.]: | 6.7 |
| COB(S)-2-O4 | 12.0 | $\gamma_1$ [mPa s, 20° C.]: | 76 |
| Σ | 100.0 | $K_1$ [pN, 20° C.]: | 13.0 |
| | | $K_3$ [pN, 20° C.]: | 14.6 |
| | | LTS bulk [h, −20° C.]: | 0 |

Mixture M73

| | | | |
|---|---|---|---|
| CCP-V-1 | 1.0 | Clearing Point [° C.]: | 73.5 |
| CLY-3-O2 | 6.0 | $\Delta n$ [589 nm, 20° C.]: | 0.0951 |
| CLY-3-O3 | 3.5 | $n_e$ [589 nm, 20° C.]: | 1.5789 |
| CPY-3-O2 | 12.0 | $n_o$ [589 nm, 20° C.]: | 1.4838 |
| CC-3-V | 50.0 | $\Delta\varepsilon$ [1 kHz, 20° C.]: | −2.8 |
| CY-3-O2 | 11.5 | $\varepsilon_{\parallel}$ [1 kHz, 20° C.]: | 3.4 |
| PP-1-3 | 4.0 | $\varepsilon_{\perp}$ [1 kHz, 20° C.]: | 6.2 |
| COB(S)-2-O4 | 12.0 | $\gamma_1$ [mPa s, 20° C.]: | 72 |
| Σ | 100.0 | $K_1$ [pN, 20° C.]: | 13.3 |

-continued

| | | | |
|---|---|---|---|
| | | $K_3$ [pN, 20° C.]: | 14.3 |
| | | LTS bulk [h, −20° C.]: | 120 |

Mixture M74

| | | | |
|---|---|---|---|
| CCY-2-1 | 6.5 | Clearing Point [° C.]: | 81 |
| CCY-3-O2 | 2.5 | $\Delta n$ [589 nm, 20° C.]: | 0.1020 |
| CLY-2-O4 | 5.0 | $n_e$ [589 nm, 20° C.]: | 1.5860 |
| CLY-3-O2 | 5.0 | $n_o$ [589 nm, 20° C.]: | 1.4840 |
| CLY-3-O3 | 5.0 | $\Delta\varepsilon$ [1 kHz, 20° C.]: | −3.6 |
| PYP-2-3 | 10.0 | $\varepsilon_{\parallel}$ [1 kHz, 20° C.]: | 3.4 |
| COB(S)-2-O4 | 10.0 | $\varepsilon_{\perp}$ [1 kHz, 20° C.]: | 7.0 |
| CC-3-V1 | 6.0 | $\gamma_1$ [mPa s, 20° C.]: | 119 |
| CC-4-V1 | 15.0 | $K_1$ [pN, 20° C.]: | 15.1 |
| CC-2-3 | 18.0 | $K_3$ [pN, 20° C.]: | 14.1 |
| CY-3-O2 | 15.0 | LTS bulk [h, −20° C.]: | −1 |
| CY-3-O4 | 2.0 | | |
| Σ | 100.0 | | |

Mixture M75

| | | | |
|---|---|---|---|
| CPP-3-2 | 2.5 | Clearing Point [° C.]: | 81.5 |
| CC-3-V1 | 8.0 | $\Delta n$ [589 nm, 20° C.]: | 0.0914 |
| CC-4-V1 | 20.0 | $n_e$ [589 nm, 20° C.]: | 1.5718 |
| CC-2-3 | 18.0 | $n_o$ [589 nm, 20° C.]: | 1.4804 |
| CCH-301 | 3.0 | $\Delta\varepsilon$ [1 kHz, 20° C.]: | −3.3 |
| CLY-3-O2 | 9.0 | $\varepsilon_{\parallel}$ [1 kHz, 20° C.]: | 3.2 |
| CLY-3-O3 | 6.0 | $\varepsilon_{\perp}$ [1 kHz, 20° C.]: | 6.6 |
| CLY-4-O2 | 4.0 | $\gamma_1$ [mPa s, 20° C.]: | 102 |
| COB(S)-2-O4 | 12.0 | $K_1$ [pN, 20° C.]: | 15.8 |
| CY-3-O2 | 14.5 | $K_3$ [pN, 20° C.]: | 14.5 |
| PY-3-O2 | 3.0 | LTS bulk [h, −20° C.]: | 96 |
| Σ | 100.0 | | |

Mixture M76

| | | | |
|---|---|---|---|
| CCP-V-1 | 8.0 | Clearing Point [° C.]: | 90 |
| CLY-3-O2 | 6.0 | $\Delta n$ [589 nm, 20° C.]: | 0.0938 |
| CLY-3-O3 | 6.0 | $n_e$ [589 nm, 20° C.]: | 1.5777 |
| CLY-4-O2 | 5.0 | $n_o$ [589 nm, 20° C.]: | 1.4839 |
| CLY-5-O2 | 6.0 | $\Delta\varepsilon$ [1 kHz, 20° C.]: | −3.4 |
| CPY-3-O2 | 2.0 | $\varepsilon_{\parallel}$ [1 kHz, 20° C.]: | 3.3 |
| CC-3-V | 43.0 | $\varepsilon_{\perp}$ [1 kHz, 20° C.]: | 6.7 |
| CY-3-O2 | 12.0 | $\gamma_1$ [mPa s, 20° C.]: | 100 |
| COB(S)-2-O4 | 12.0 | $K_1$ [pN, 20° C.]: | 15.5 |
| Σ | 100.0 | $K_3$ [pN, 20° C.]: | 16.7 |
| | | LTS bulk [h, −20° C.]: | 1000 |

Mixture M77

| | | | |
|---|---|---|---|
| CCP-V-1 | 8.0 | Clearing Point [° C.]: | 86 |
| CLY-3-O2 | 5.0 | $\Delta n$ [589 nm, 20° C.]: | 0.0936 |
| CLY-3-O3 | 6.0 | $n_e$ [589 nm, 20° C.]: | 1.5772 |
| CLY-4-O2 | 6.0 | $n_o$ [589 nm, 20° C.]: | 1.4836 |
| CLY-5-O2 | 5.5 | $\Delta\varepsilon$ [1 kHz, 20° C.]: | −3.4 |
| CC-3-V | 43.0 | $\varepsilon_{\parallel}$ [1 kHz, 20° C.]: | 3.4 |
| CY-3-O2 | 12.0 | $\varepsilon_{\perp}$ [1 kHz, 20° C.]: | 6.7 |
| PY-3-O2 | 2.5 | $\gamma_1$ [mPa s, 20° C.]: | 95 |
| COB(S)-2-O4 | 12.0 | $K_1$ [pN, 20° C.]: | 14.9 |
| Σ | 100.0 | $K_3$ [pN, 20° C.]: | 15.9 |
| | | LTS bulk [h, −20° C.]: | 240 |

Mixture M78

| | | | |
|---|---|---|---|
| CCP-V-1 | 8.0 | Clearing Point [° C.]: | 87.5 |
| CLY-3-O2 | 5.0 | Δn [589 nm, 20° C.]: | 0.0943 |
| CLY-3-O3 | 6.0 | $n_e$ [589 nm, 20° C.]: | 1.5787 |
| CLY-4-O2 | 6.0 | $n_o$ [589 nm, 20° C.]: | 1.4844 |
| CLY-5-O2 | 5.5 | Δε [1 kHz, 20° C.]: | −3.4 |
| CC-3-V | 43.0 | $\varepsilon_{\parallel}$ [1 kHz, 20° C.]: | 3.4 |
| CY-3-O2 | 12.0 | $\varepsilon_{\perp}$ [1 kHz, 20° C.]: | 6.8 |
| PY-3-O2 | 2.5 | $\gamma_1$ [mPa s, 20° C.]: | 92 |
| COB(S)-V-O4 | 12.0 | $K_1$ [pN, 20° C.]: | 14.9 |
| Σ | 100.0 | $K_3$ [pN, 20° C.]: | 16.1 |
| | | LTS bulk [h, −20° C.]: | 48 |

Mixture M79

| | | | |
|---|---|---|---|
| CC-3-V1 | 8.0 | Clearing Point [° C.]: | 73 |
| CC-4-V1 | 20.0 | Δn [589 nm, 20° C.]: | 0.1029 |
| CCH-301 | 10.5 | $n_e$ [589 nm, 20° C.]: | 1.5861 |
| CCH-303 | 2.0 | $n_o$ [589 nm, 20° C.]: | 1.4832 |
| CC-3-4 | 0.5 | Δε [1 kHz, 20° C.]: | −3.1 |
| CCY-3-O2 | 11.0 | $\varepsilon_{\parallel}$ [1 kHz, 20° C.]: | 3.6 |
| COB(S)-2-O4 | 7.5 | $\varepsilon_{\perp}$ [1 kHz, 20° C.]: | 6.7 |
| CLP-3-T | 1.0 | $\gamma_1$ [mPa s, 20° C.]: | 106 |
| CPY-3-O2 | 10.5 | $K_1$ [pN, 20° C.]: | 15.8 |
| CY-3-O2 | 15.5 | $K_3$ [pN, 20° C.]: | 16.3 |
| CY-3-O4 | 3.5 | LTS bulk [h, −20° C.]: | 1000 |
| PP-1-2V1 | 10.0 | | |
| Σ | 100.0 | | |

Mixture M80

| | | | |
|---|---|---|---|
| CC-3-V1 | 8.0 | Clearing Point [° C.]: | 73 |
| CC-4-V1 | 20.0 | Δn [589 nm, 20° C.]: | 0.1031 |
| CCH-301 | 11.5 | $n_e$ [589 nm, 20° C.]: | 1.5871 |
| CCH-303 | 2.0 | $n_o$ [589 nm, 20° C.]: | 1.4840 |
| CC-3-4 | 3.0 | Δε [1 kHz, 20° C.]: | −3.0 |
| CCY-3-O2 | 7.0 | $\varepsilon_{\parallel}$ [1 kHz, 20° C.]: | 3.4 |
| COB(S)-2-O4 | 7.5 | $\varepsilon_{\perp}$ [1 kHz, 20° C.]: | 6.5 |
| CPY-2-O2 | 8.0 | $\gamma_1$ [mPa s, 20° C.]: | 101 |
| CPY-3-O2 | 8.0 | $K_1$ [pN, 20° C.]: | 14.6 |
| CY-3-O2 | 16.0 | $K_3$ [pN, 20° C.]: | 15.2 |
| PP-1-2V1 | 9.0 | LTS bulk [h, −20° C.]: | 1000 |
| Σ | 100.0 | | |

Mixture M81

| | | | |
|---|---|---|---|
| CCP-V-1 | 7.0 | Clearing Point [° C.]: | 86 |
| CLY-3-O2 | 6.0 | Δn [589 nm, 20° C.]: | 0.0932 |
| CLY-3-O3 | 6.0 | $n_e$ [589 nm, 20° C.]: | 1.5767 |
| CLY-4-O2 | 6.0 | $n_o$ [589 nm, 20° C.]: | 1.4835 |
| CLY-5-O2 | 6.0 | Δε [1 kHz, 20° C.]: | −3.3 |
| CC-3-V | 43.0 | $\varepsilon_{\parallel}$ [1 kHz, 20° C.]: | 3.4 |
| CY-3-O2 | 12.0 | $\varepsilon_{\perp}$ [1 kHz, 20° C.]: | 6.7 |
| PY-3-O2 | 2.5 | $\gamma_1$ [mPa s, 20° C.]: | 95 |
| COB(S)-2-O4 | 10.0 | $K_1$ [pN, 20° C.]: | 15.1 |
| CPY-3-O2 | 1.5 | $K_3$ [pN, 20° C.]: | 16.1 |
| Σ | 100.0 | LTS bulk [h, −20° C.]: | 1000 |

Mixture M82

| | | | |
|---|---|---|---|
| B(S)-2O-O4 | 2.0 | Clearing Point [° C.]: | 85.5 |
| B(S)-2O-O5 | 4.0 | Δn [589 nm, 20° C.]: | 0.0937 |
| CC-3-V | 37.0 | $n_e$ [589 nm, 20° C.]: | 1.5783 |
| CC-3-V1 | 3.0 | $n_o$ [589 nm, 20° C.]: | 1.4846 |
| CCP-V-1 | 14.5 | Δε [1 kHz, 20° C.]: | −3.3 |
| CCY-3-O2 | 11.5 | $\varepsilon_{\parallel}$ [1 kHz, 20° C.]: | 3.5 |
| CCY-5-O2 | 3.0 | $\varepsilon_{\perp}$ [1 kHz, 20° C.]: | 6.8 |
| COB(S)-2-O4 | 10.0 | $\gamma_1$ [mPa s, 20° C.]: | 94 |
| CY-3-O2 | 14.0 | $K_1$ [pN, 20° C.]: | 14.9 |
| CLP-3-T | 1.0 | $K_3$ [pN, 20° C.]: | 16.6 |
| Σ | 100.0 | LTS bulk [h, −20° C.]: | −1 |

Mixture M83

| | | | |
|---|---|---|---|
| CCP-V-1 | 10.0 | Clearing Point [° C.]: | 84 |
| CLY-3-O2 | 6.0 | Δn [589 nm, 20° C.]: | 0.0938 |
| CLY-3-O3 | 6.0 | $n_e$ [589 nm, 20° C.]: | 1.5783 |
| CLY-4-O2 | 6.0 | $n_o$ [589 nm, 20° C.]: | 1.4845 |
| CC-3-V | 43.0 | Δε [1 kHz, 20° C.]: | −3.2 |
| CY-3-O2 | 10.0 | $\varepsilon_{\parallel}$ [1 kHz, 20° C.]: | 3.4 |
| PY-3-O2 | 4.0 | $\varepsilon_{\perp}$ [1 kHz, 20° C.]: | 6.6 |
| COB(S)-2-O4 | 12.0 | $\gamma_1$ [mPa s, 20° C.]: | 91 |
| CCY-3-O2 | 3.0 | $K_1$ [pN, 20° C.]: | 14.9 |
| Σ | 100.0 | $K_3$ [pN, 20° C.]: | 15.9 |
| | | LTS bulk [h, −20° C.]: | 168 |

Mixture M84

| | | | |
|---|---|---|---|
| CCP-V-1 | 2.5 | Clearing Point [° C.]: | 83.5 |
| CCY-3-O1 | 8.0 | Δn [589 nm, 20° C.]: | 0.0936 |
| CLY-3-O3 | 6.0 | $n_e$ [589 nm, 20° C.]: | 1.5773 |
| CPY-2-O2 | 12.0 | $n_o$ [589 nm, 20° C.]: | 1.4837 |
| CPY-3-O2 | 2.0 | Δε [1 kHz, 20° C.]: | −3.1 |
| CC-3-V | 49.5 | $\varepsilon_{\parallel}$ [1 kHz, 20° C.]: | 3.4 |
| CY-3-O2 | 8.0 | $\varepsilon_{\perp}$ [1 kHz, 20° C.]: | 6.5 |
| COB(S)-2-O4 | 12.0 | $\gamma_1$ [mPa s, 20° C.]: | 86 |
| Σ | 100.0 | $K_1$ [pN, 20° C.]: | 14.0 |
| | | $K_3$ [pN, 20° C.]: | 14.9 |
| | | LTS bulk [h, −20° C.]: | 168 |

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding European application No. EP 18197231.6, filed Sep. 27, 2018, are incorporated by reference herein.

The invention claimed is:

1. A liquid-crystalline medium, comprising one or more compounds of formula IA

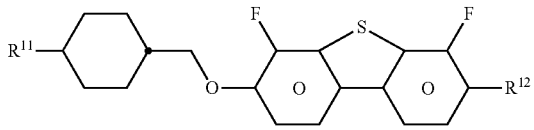

IA in which $R^{11}$, $R^{12}$ identically or differently, denote H, an alkyl or alkoxy radical having 1 to 15 C atoms, in which one or more $CH_2$ groups are optionally each replaced, independently of one another, by —C≡C—, —$CF_2$O—, —$OCF_2$—, —CH═CH—,

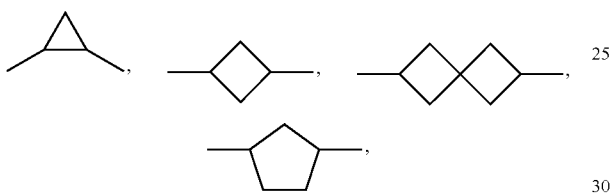

—O—, —CO—O— or —O—CO— in such a way that O atoms are not linked directly to one another, and in which one or more H atoms are optionally replaced by halogen;

and one or more compounds selected from the group of compounds of formulae T-1 to T-21

T-1
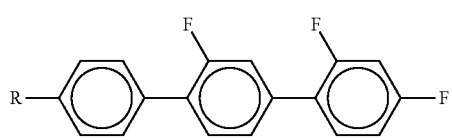

T-2
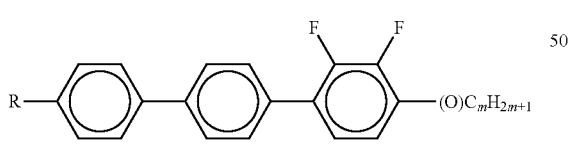

T-3
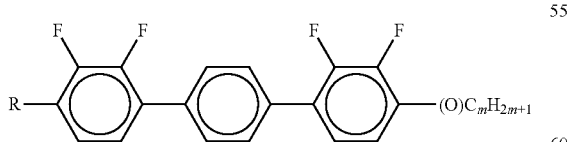

T-4
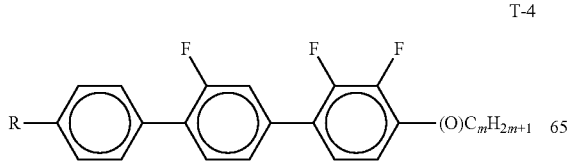

T-5
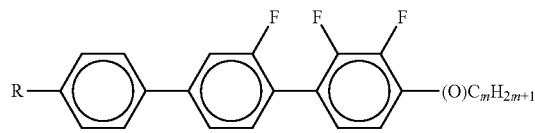

T-6
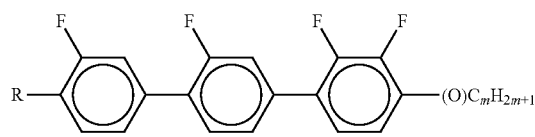

T-7
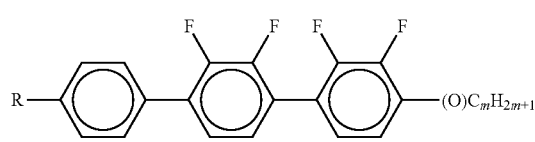

T-8
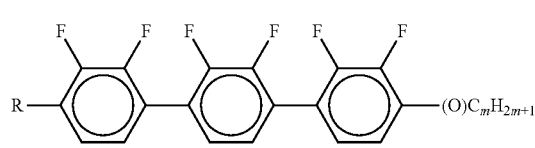

T-9
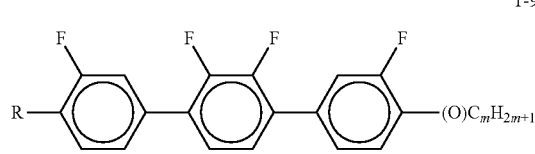

T-10
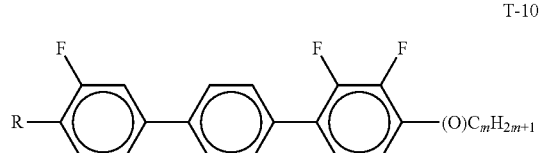

T-11
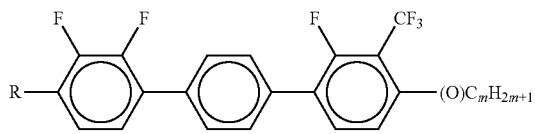

T-12
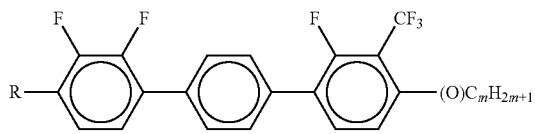

T-13
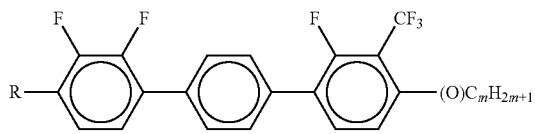

T-14
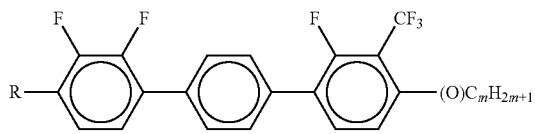

-continued

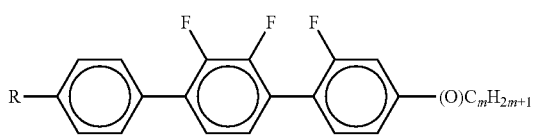
T-15

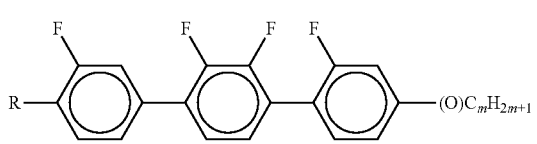
T-16

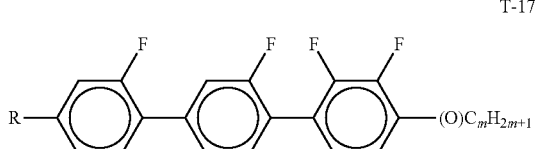
T-17

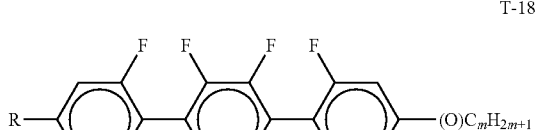
T-18

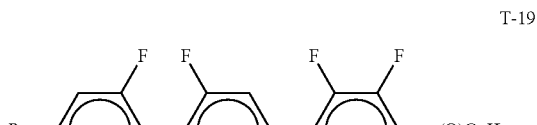
T-19

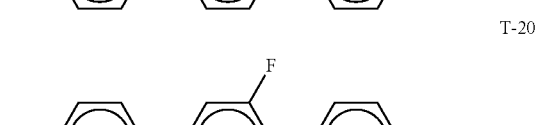
T-20

T-21

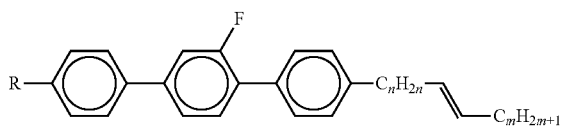

in which
R denotes a straight-chain alkyl or alkoxy radical having 1 to 6 C atoms,
(O) denotes —O— or a single bond,
m is 0, 1, 2, 3, 4, 5 or 6, and
n is 0, 1, 2, 3 or 4;
or
one or more polymerizable compounds of formula P P-Sp-A$^1$-(Z$^1$-A$^2$)$_z$-R    P in which
P denotes a polymerisable group,
Sp denotes a spacer group or a single bond,
A$^1$, A$^2$ each, independently, denotes an aromatic, heteroaromatic, alicyclic or heteroaliphatic group, which may contain fused rings, and which is unsubstituted, or mono- or polysubstituted by L,
Z$^1$ denotes —O—, —S—, —CO—, —CO—O—, —O—CO—, —O—CO—O—, OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —CR$^0$R$^{00}$—, or a single bond,
R$^0$, R$^{00}$ identically or differently, denote H or alkyl having 1 to 12 C atom,
R denotes H, L, or P-Sp-,
L denotes F, Cl, —CN, P-Sp- or straight chain alkyl having 1 to 25 C atoms or a branched or cyclic alkyl having 3 to 25 C atoms, in which one or more non-adjacent CH$_4$-groups are optionally replaced by —O—, —S—, —CO—, —CO—O—, —O—CO—, or —O—CO—O— in such a manner that O- and/or S-atoms are not directly connected with each other, and in which one or more H atoms are each optionally replaced by P-Sp-, F or Cl,
z is 0, 1, 2 or 3, and
n1 is 1, 2, 3 or 4.

2. The medium according to claim 1, wherein R$^{11}$ and R$^{12}$, identically or differently, denote alkyl, alkenyl or alkoxy having 1 to 7 C atoms.

3. The medium according to claim 1, wherein R$^{12}$ denotes alkoxy having 1 to 7 C atoms.

4. The medium according to claim 1, wherein the total concentration of the one or more compounds of formula IA is 1% to 25% by weight.

5. The medium according to claim 1, further comprising one or more compounds selected from the group of compounds of formulae IIA, IIB, IIC and IID,

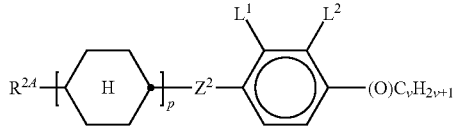
IIA

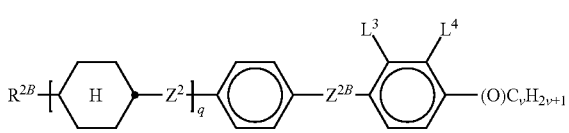
IIB

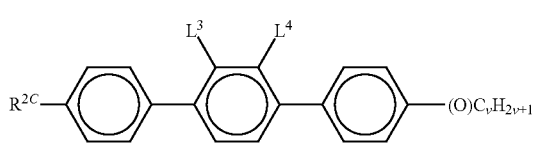
IIC

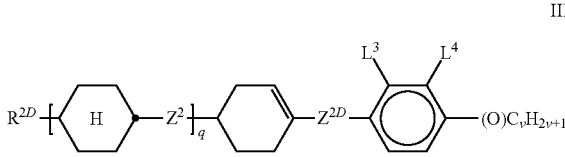
IID in which
R$^{2A}$, R$^{2B}$, R$^{2C}$ and R$^{2D}$ each, independently of one another, denote H, an alkyl radical having 1 to 15 C atoms or alkenyl radical having 2 to 15 C atoms, which is unsubstituted, monosubstituted by CN or CF$_3$ or at least monosubstituted by halogen, in which one or more CH$_2$ groups are optionally replaced by —O—, —S—,

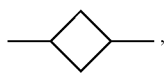

—C≡C—, —CF$_2$O—, —OCF$_2$—, —OC—O— or —O—CO— in such a way that O atoms are not linked directly to one another, L$^1$ to L$^4$ each, independently of one another, denote F or Cl, Z$^2$, Z$^{2B}$, and Z$^{2D}$ each, independently of one another, denote a single bond, —CH$_2$CH$_2$—, —CH—CH—, —CF$_2$O—, —OCF$_2$—, —CH$_2$O—, —OCH$_2$—, —COO—, —OCO—, —C$_2$F$_4$—, —CF═CF—, or —CH═CHCH$_2$O—, (O) denotes —O— or a single bond, p denotes 0, 1 or 2, q denotes 0 or 1, and v denotes 1 to 6.

6. The medium according to claim 1, further comprising one or more compounds of formula IC

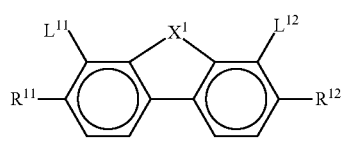

IC in which

R$^{11}$ and R$^{12}$ each, independently of one another, denote H, an alkyl or alkoxy radical having 1 to 15 C atoms, in which one or more CH$_2$ groups are optionally each replaced, independently of one another, by —C≡C—, —CF$_2$O—, —OCF$_2$—, —CH═CH—,

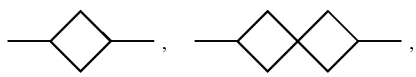

—O—, —CO—O— or —O—CO— in such a way that O atoms are not linked directly to one another, and in which one or more H atoms are optionally replaced by halogen, X$^1$ denotes S or O, and L$^{11}$ and L$^{12}$ each, independently of one another, denote F, Cl, CF$_3$ or CHF$_2$.

7. The medium according to claim 6, wherein in formula IC

X$^1$ denotes S,

R$^{11}$ and R$^{12}$ each, independently of one another, denote an alkyl or alkoxy radical having 1 to 15 C atoms, or an alkenyl radical having 2 to 15 C atoms and L$^{11}$ and L$^{12}$ both denote F.

8. The liquid-crystalline medium according to claim 1, further comprising one or more compounds selected from the group of compounds of formulae O-1 to O-18,

O-1

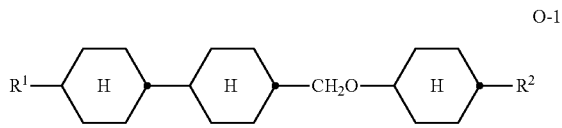

O-2

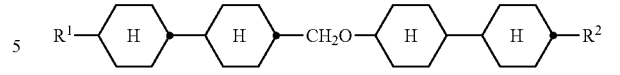

O-3

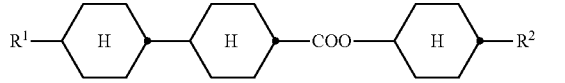

O-4

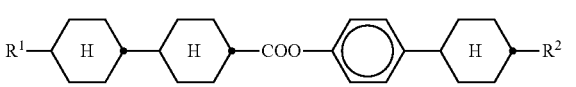

O-5

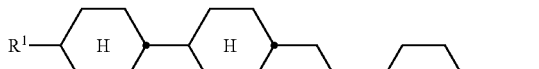

O-6

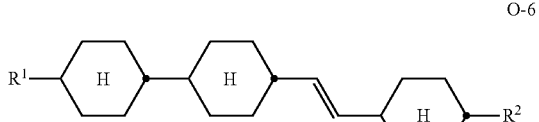

O-7

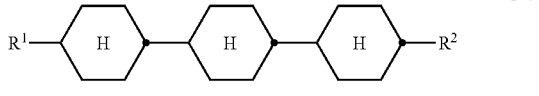

O-8

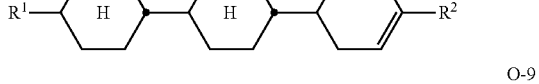

O-9

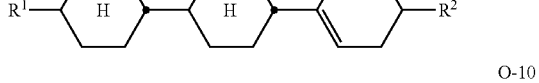

O-10

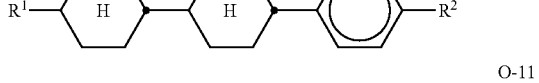

O-11

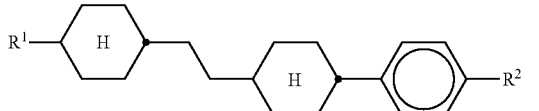

O-12

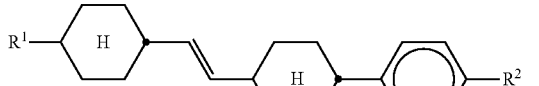

O-13

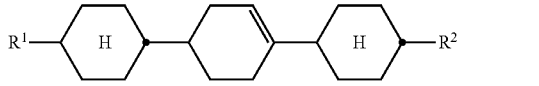

O-14

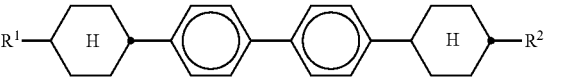

-continued

O-15
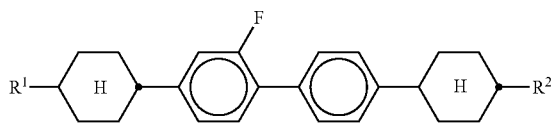

O-16

O-17
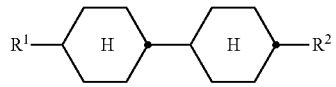

O-18
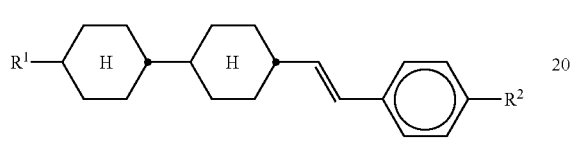

in which

R¹ and R² each, independently of one another, denote H, an alkyl radical having 1 to 15 C atoms or alkenyl radical having 2 to 15 C atoms, which is unsubstituted, monosubstituted by CN or $CF_3$ or at least monosubstituted by halogen, in which one or more $CH_2$ groups are optionally replaced by —O—, —S—,

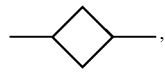

—C≡C—, —$CF_2$O—, —O$CF_2$—, —OC—O— or —O—CO— in such a way that O atoms are not linked directly to one another.

9. The liquid-crystalline medium according to claim 1, which comprises one or more compounds selected from the group of compounds of formulae T-1 to T-21, T-1
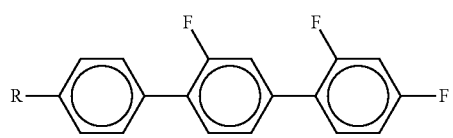

T-2
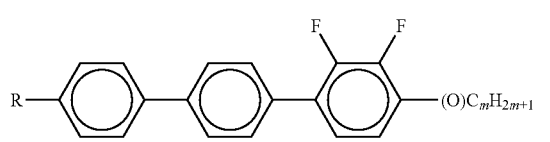

T-3
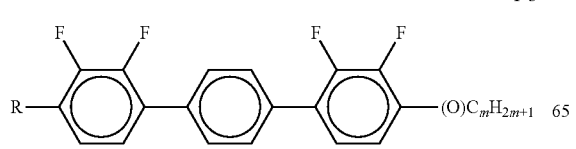

-continued

T-4
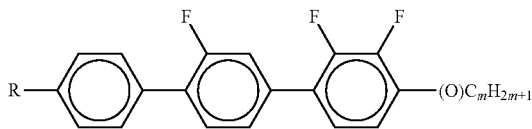

T-5
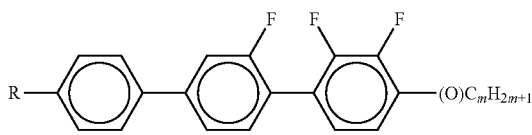

T-6
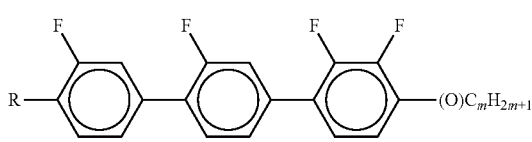

T-7
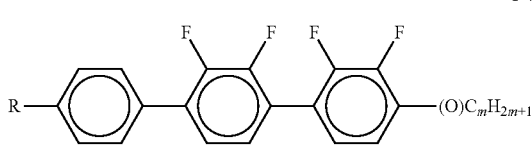

T-8
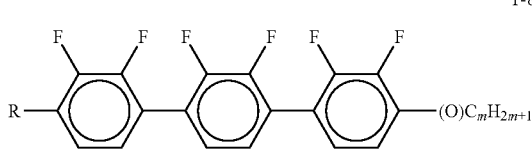

T-9
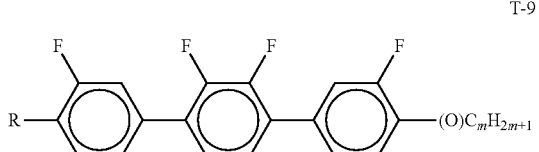

T-10
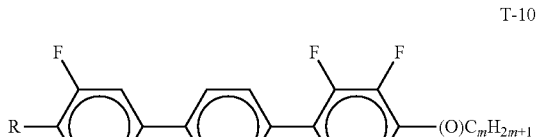

T-11
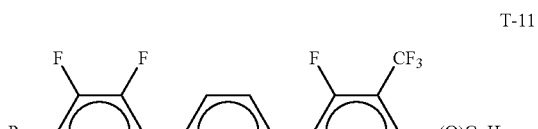

T-12
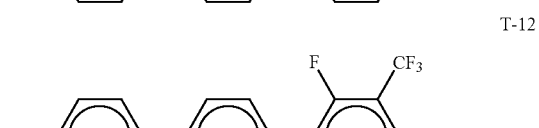

T-13
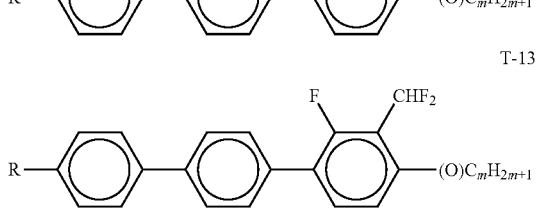

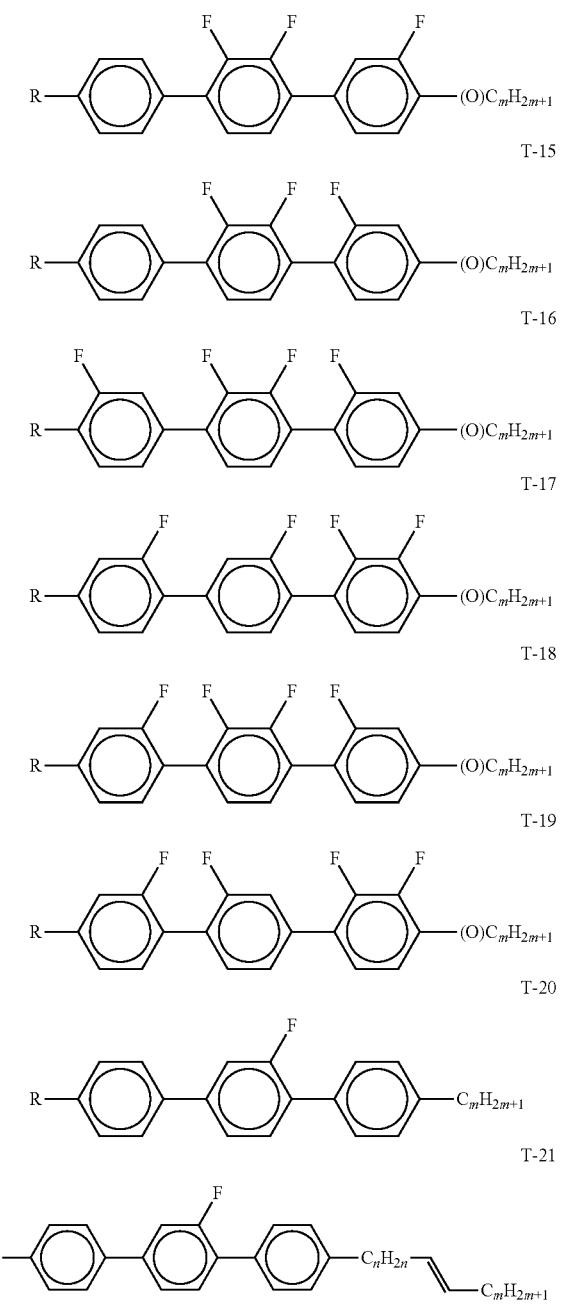

in which
R denotes a straight-chain alkyl or alkoxy radical having 1 to 6 C atoms,
(O) denotes —O— or a single bond,
m is 0, 1, 2, 3, 4, 5 or 6, and
n is 0, 1, 2, 3 or 4.

10. The liquid-crystalline medium according to claim 1, which comprises one or more polymerizable compounds of formula P $$P\text{-Sp-}A^1\text{-}(Z^1\text{-}A^2)_z\text{-}R \qquad P$$

in which
P denotes a polymerisable group,
Sp denotes a spacer group or a single bond,
$A^1$, $A^2$ each, independently, denotes an aromatic, heteroaromatic, alicyclic or heteroaliphatic group, which may contain fused rings, and which is unsubstituted, or mono- or polysubstituted by L,
$Z^1$ denotes —O—, —S—, —CO—, —CO—O—, —O—CO—, —O—CO—C—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—CO—C—, —O—CO—CH=CH—, —CH$_2$—CH$_2$—CO—O—, —O—CO—CH$_2$—CH$_2$—, —CR$^0$R$^{00}$—, or a single bond,
$R^0$, $R^{00}$ identically or differently, denote H or alkyl having 1 to 12 C atoms,
R denotes H, L, or P-Sp-,
L denotes F, Cl, —CN, P-Sp- or straight chain alkyl having 1 to 25 C atoms or a branched or cyclic alkyl having 3 to 25 C atoms, in which one or more non-adjacent CH$_2$-groups are optionally replaced by —O—, —S—, —CO—, —CO—O—, —O—CO—, or —O—CO—O— in such a manner that O- and/or S-atoms are not directly connected with each other, and in which one or more H atoms are each optionally replaced by P-Sp-, F or Cl,
z is 0, 1, 2 or 3, and
n1 is 1, 2, 3 or 4.

11. The liquid-crystalline medium according to claim 10, wherein the polymerisable compounds of formula P are polymerised.

12. The liquid-crystalline medium according to claim 10, wherein a compound of formula IA is a compound of one of formulae IA-1 to IA-10:

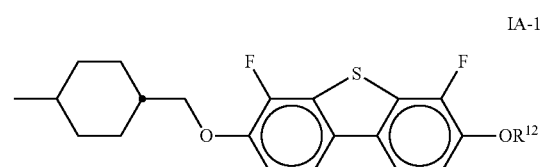

IA-1

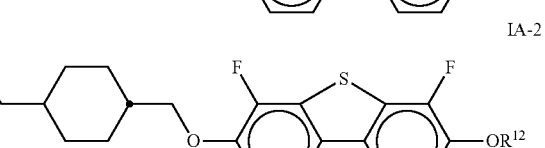

IA-2

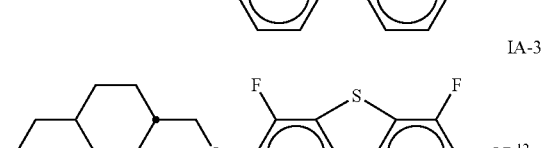

IA-3

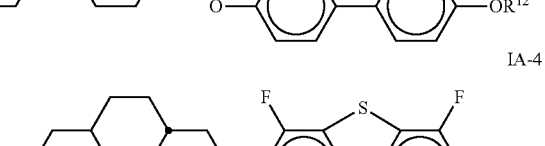

IA-4

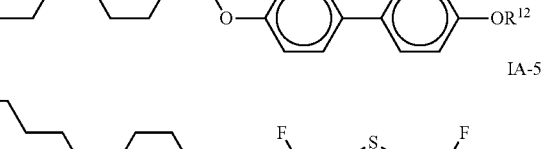

IA-5

-continued

IA-6
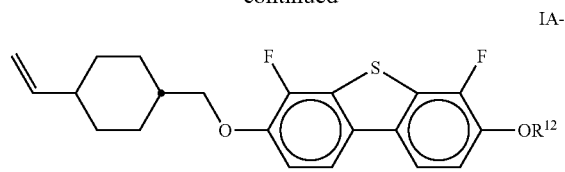

IA-7
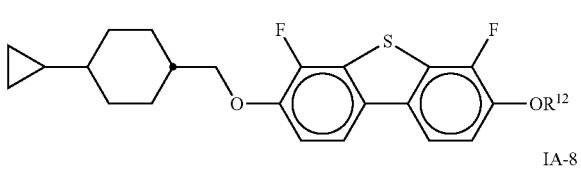

IA-8
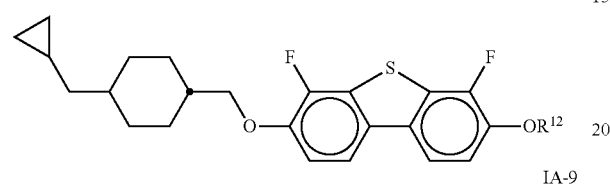

IA-9
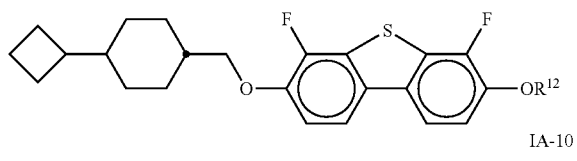

IA-10
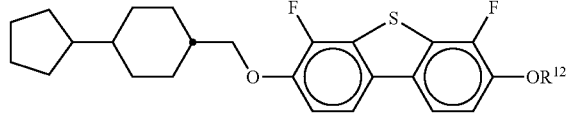

in which $R^{12}$ denotes alkyl having 1 to 7 C-atoms.

13. A process of preparing an LC medium according to claim 1, comprising mixing one or more compounds of formula IA with one or more compounds selected from the group of compounds of formulae T-1 to T-21 or with one or more polymerizable compounds of formula P and optionally with one or more additives.

14. A liquid-crystalline display comprising a medium according to claim 1.

15. A liquid-crystalline display, which is a PSA display, comprising a liquid-crystalline medium that comprises one or more compounds of formula IA IA
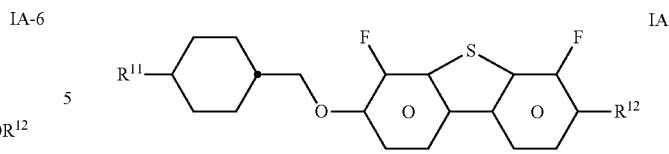

in which
$R^{11}$, $R^{12}$ identically or differently, denote H, an alky or alkoxy radical having 1 to 15 C atoms, in which one or more $CH_2$ groups are optionally each replaced, independently of one another, by —C≡C—, —$CF_2$O—, —$OCF_2$—, —CH=CH—,

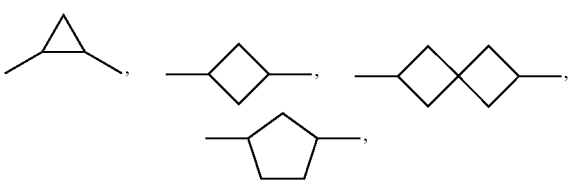

—O—, —CO—O— or —O—CO— in such a way that O atoms are not linked directly to one another, and in which one or more H atoms are optionally replaced by halogen.

16. The display according to claim 14, which is a PS-VA, PS-OCB, PS-IPS, PS-FFS, PS-UB-FFS, PS-posi-VA, PS-TN, polymer stabilised SA-VA, polymer stabilised SA-FFS display, VA IPS, U-IPS, FFS, UB-FFS, SA-FFS or SA-VA display.

17. The PSA display according to claim 15, wherein, in a compound of formula IA, $R^{11}$ and $R^{12}$ identically or differently, denote alkyl, alkenyl or alkoxy having 1 to 7 C atoms.

18. The liquid-crystalline medium according to claim 12, wherein $R^{12}$ denotes ethyl, n-propyl or n-butyl.

19. The liquid-crystalline medium according to claim 12, wherein a compound of formula IA is a compound of one of formulae IA-1 to IA-6.

20. The liquid-crystalline medium according to claim 12, wherein a compound of formula IA is a compound of one of formulae IA-7 to IA-10.

* * * * *